US010037138B2

(12) United States Patent
Bernstein et al.

(10) Patent No.: US 10,037,138 B2
(45) Date of Patent: Jul. 31, 2018

(54) DEVICE, METHOD, AND GRAPHICAL USER INTERFACE FOR SWITCHING BETWEEN USER INTERFACES

(71) Applicant: Apple Inc., Cupertino, CA (US)

(72) Inventors: Jeffrey Traer Bernstein, San Francisco, CA (US); Avi E. Cieplinski, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/857,700

(22) Filed: Sep. 17, 2015

(65) Prior Publication Data

US 2016/0004432 A1   Jan. 7, 2016

Related U.S. Application Data

(63) Continuation of application No. 14/609,006, filed on Jan. 29, 2015, which is a continuation of application No. PCT/US2013/069489, filed on Nov. 11, 2013.

(Continued)

(51) Int. Cl.
*G06F 3/0488* (2013.01)
*G06F 3/0481* (2013.01)
*G06F 3/0486* (2013.01)

(52) U.S. Cl.
CPC ........ *G06F 3/04883* (2013.01); *G06F 3/0481* (2013.01); *G06F 3/0486* (2013.01); *G06F 3/0488* (2013.01); *G06F 2203/04808* (2013.01)

(58) Field of Classification Search
CPC ................... G06F 17/24; G06F 3/0488; G06F 2203/04808
See application file for complete search history.

(56) References Cited

U.S. PATENT DOCUMENTS 4,864,520 A    9/1989   Setoguchi et al.
5,184,120 A    2/1993   Schultz
(Continued)

FOREIGN PATENT DOCUMENTS

AU    2016100649 A4    6/2016
CN    1808362 A        7/2006
(Continued)

OTHER PUBLICATIONS

Agarwal, "How to Copy and Paste Text on Windows Phone 8," Guiding Tech, http://web.archive.org/web20130709204246/http://www.guidingtech.com/20280/copy-paste-text-windows-phone-8/, Jul. 9, 2013, 10 pages.

(Continued)

*Primary Examiner* — Alvin Tan
(74) *Attorney, Agent, or Firm* — Morgan, Lewis & Bockius LLP

(57) ABSTRACT

An electronic device includes a touch-sensitive surface and a display. The device displays, on the display, a first user interface. The device detects a gesture on the touch-sensitive surface. The gesture includes movement of a contact in a respective direction on the touch-sensitive surface. In response to detecting the gesture: in accordance with a determination that the movement of the contact is entirely on a first portion of the touch-sensitive surface, the device performs an operation in the first user interface that corresponds to the gesture; and in accordance with a determination that the movement of the contact is entirely on a second portion of the touch-sensitive surface, the device replaces display of the first user interface with display of a second user interface different from the first user interface.

21 Claims, 78 Drawing Sheets

Related U.S. Application Data

(60) Provisional application No. 61/778,418, filed on Mar. 13, 2013, provisional application No. 61/747,278, filed on Dec. 29, 2012.

(56) References Cited

U.S. PATENT DOCUMENTS

| | | | |
|---|---|---|---|
| 5,374,787 A | 12/1994 | Miller et al. | |
| 5,428,730 A | 6/1995 | Baker et al. | |
| 5,463,722 A | 10/1995 | Venolia | |
| 5,510,813 A | 4/1996 | Makinwa et al. | |
| 5,555,354 A | 9/1996 | Strasnick et al. | |
| 5,559,301 A | 9/1996 | Bryan, Jr. et al. | |
| 5,627,914 A | 5/1997 | Pagallo | |
| 5,710,896 A | 1/1998 | Seidl | |
| 5,717,438 A | 2/1998 | Kim et al. | |
| 5,793,360 A | 8/1998 | Fleck et al. | |
| 5,793,377 A | 8/1998 | Moore | |
| 5,801,692 A | 9/1998 | Muzio et al. | |
| 5,805,144 A | 9/1998 | Scholder et al. | |
| 5,805,167 A | 9/1998 | Van Cruyningen | |
| 5,809,267 A | 9/1998 | Moran et al. | |
| 5,819,293 A | 10/1998 | Comer et al. | |
| 5,825,352 A | 10/1998 | Bisset et al. | |
| 5,844,560 A | 12/1998 | Crutcher et al. | |
| 5,872,922 A | 2/1999 | Hogan et al. | |
| 5,946,647 A | 8/1999 | Miller et al. | |
| 6,002,397 A | 12/1999 | Jaaskelainen, Jr. | |
| 6,031,989 A | 2/2000 | Cordell | |
| 6,088,019 A | 7/2000 | Rosenberg | |
| 6,088,027 A | 7/2000 | Konar et al. | |
| 6,111,575 A * | 8/2000 | Martinez | G06F 9/4443 715/234 |
| 6,121,960 A | 9/2000 | Carroll et al. | |
| 6,180,894 B1 | 1/2001 | Chao et al. | |
| 6,208,329 B1 | 3/2001 | Ballare | |
| 6,208,340 B1 | 3/2001 | Amin et al. | |
| 6,219,034 B1 | 4/2001 | Elbing et al. | |
| 6,227,743 B1 | 5/2001 | Robb | |
| 6,243,080 B1 | 6/2001 | Moine | |
| 6,252,594 B1 | 6/2001 | Xia et al. | |
| 6,266,684 B1 | 7/2001 | Kraus et al. | |
| 6,323,846 B1 | 11/2001 | Westerman et al. | |
| 6,347,997 B1 | 2/2002 | Armstrong | |
| 6,396,523 B1 | 5/2002 | Segal et al. | |
| 6,400,303 B2 | 6/2002 | Armstrong | |
| 6,448,977 B1 | 9/2002 | Braun et al. | |
| 6,456,778 B2 | 9/2002 | Armstrong | |
| 6,459,442 B1 * | 10/2002 | Edwards | G06F 3/04883 715/700 |
| 6,469,691 B1 | 10/2002 | Armstrong | |
| 6,470,078 B1 | 10/2002 | Armstrong | |
| 6,489,978 B1 | 12/2002 | Gong et al. | |
| 6,504,527 B1 | 1/2003 | Armstrong | |
| 6,512,530 B1 | 1/2003 | Rzepkowski et al. | |
| 6,532,000 B2 | 3/2003 | Armstrong | |
| 6,551,357 B1 | 4/2003 | Madduri | |
| 6,559,831 B1 | 5/2003 | Armstrong | |
| 6,563,487 B2 | 5/2003 | Martin et al. | |
| 6,567,102 B2 | 5/2003 | Kung | |
| 6,583,798 B1 | 6/2003 | Hoek et al. | |
| 6,590,568 B1 | 7/2003 | Astala et al. | |
| 6,661,438 B1 | 12/2003 | Shiraishi et al. | |
| 6,670,952 B2 | 12/2003 | Jaeger et al. | |
| 6,735,307 B1 | 5/2004 | Volckers | |
| 6,750,890 B1 * | 6/2004 | Sugimoto | G06T 1/00 345/594 |
| 6,822,635 B2 | 11/2004 | Shahoian et al. | |
| 6,891,551 B2 | 5/2005 | Keely et al. | |
| 6,904,405 B2 | 6/2005 | Suominen | |
| 6,906,697 B2 | 6/2005 | Rosenberg | |
| 6,919,927 B1 | 7/2005 | Hyodo | |
| 7,138,983 B2 | 11/2006 | Wakai et al. | |
| 7,259,752 B1 | 8/2007 | Simmons | |
| 7,312,791 B2 | 12/2007 | Hoshino et al. | |
| 7,411,575 B2 | 8/2008 | Hill et al. | |
| 7,479,949 B2 | 1/2009 | Jobs et al. | |
| 7,532,206 B2 | 5/2009 | Morrison et al. | |
| 7,533,352 B2 | 5/2009 | Chew et al. | |
| 7,552,397 B2 | 6/2009 | Holecek et al. | |
| 7,577,530 B2 | 8/2009 | Vignalou-Marche | |
| 7,614,008 B2 | 11/2009 | Ording | |
| 7,619,616 B2 | 11/2009 | Rimas Ribikauskas et al. | |
| 7,629,966 B2 | 12/2009 | Anson | |
| 7,656,413 B2 | 2/2010 | Khan et al. | |
| 7,683,889 B2 | 3/2010 | Rimas Ribikauskas et al. | |
| 7,743,348 B2 | 6/2010 | Robbins et al. | |
| 7,760,187 B2 | 7/2010 | Kennedy | |
| 7,787,026 B1 | 8/2010 | Flory et al. | |
| 7,797,642 B1 | 9/2010 | Karam et al. | |
| 7,801,950 B2 | 9/2010 | Eisenstadt et al. | |
| 7,812,826 B2 | 10/2010 | Ording et al. | |
| 7,890,862 B2 | 2/2011 | Kompe et al. | |
| 7,903,090 B2 | 3/2011 | Soss et al. | |
| 7,952,566 B2 | 5/2011 | Poupyrev et al. | |
| 7,956,847 B2 | 6/2011 | Christie | |
| 7,966,352 B2 | 6/2011 | Madan et al. | |
| 7,973,778 B2 | 7/2011 | Chen | |
| 8,040,142 B1 | 10/2011 | Bokma et al. | |
| 8,059,104 B2 | 11/2011 | Shahoian et al. | |
| 8,106,856 B2 | 1/2012 | Matas et al. | |
| 8,125,440 B2 | 2/2012 | Guyot-Sionnest et al. | |
| 8,125,492 B1 | 2/2012 | Wainwright et al. | |
| RE43,448 E | 6/2012 | Kimoto et al. | |
| 8,209,628 B1 | 6/2012 | Davidson | |
| 8,271,900 B2 | 9/2012 | Walizaka et al. | |
| 8,363,020 B2 | 1/2013 | Li et al. | |
| 8,390,583 B2 | 3/2013 | Forutanpour et al. | |
| 8,423,089 B2 | 4/2013 | Song et al. | |
| 8,446,376 B2 | 5/2013 | Levy et al. | |
| 8,453,057 B2 | 5/2013 | Stallings et al. | |
| 8,456,431 B2 * | 6/2013 | Victor | G06F 3/0482 345/173 |
| 8,466,889 B2 | 6/2013 | Tong et al. | |
| 8,482,535 B2 | 7/2013 | Pryor | |
| 8,508,494 B2 | 8/2013 | Moore | |
| 8,542,205 B1 | 9/2013 | Keller | |
| 8,553,092 B2 | 10/2013 | Tezuka et al. | |
| 8,581,870 B2 | 11/2013 | Bokma et al. | |
| 8,587,542 B2 | 11/2013 | Moore | |
| 8,593,415 B2 | 11/2013 | Han et al. | |
| 8,593,420 B1 | 11/2013 | Buuck | |
| 8,625,882 B2 | 1/2014 | Backlund et al. | |
| 8,638,311 B2 | 1/2014 | Kang et al. | |
| 8,665,227 B2 | 3/2014 | Gunawan | |
| 8,669,945 B2 | 3/2014 | Coddington | |
| 8,674,932 B2 | 3/2014 | Armstrong | |
| 8,698,765 B1 | 4/2014 | Keller | |
| 8,717,305 B2 | 5/2014 | Williamson et al. | |
| 8,743,069 B2 | 6/2014 | Morton et al. | |
| 8,769,431 B1 | 7/2014 | Prasad | |
| 8,773,389 B1 | 7/2014 | Freed | |
| 8,788,964 B2 | 7/2014 | Shin et al. | |
| 8,793,577 B2 * | 7/2014 | Schellingerhout | G06F 9/4443 715/273 |
| 8,799,816 B2 | 8/2014 | Wells et al. | |
| 8,816,989 B2 | 8/2014 | Nicholson et al. | |
| 8,854,316 B2 | 10/2014 | Shenfield | |
| 8,872,729 B2 | 10/2014 | Lyons et al. | |
| 8,872,773 B2 | 10/2014 | Mak et al. | |
| 8,875,044 B2 | 10/2014 | Ozawa et al. | |
| 8,881,062 B2 | 11/2014 | Kim et al. | |
| 8,914,732 B2 | 12/2014 | Jun et al. | |
| 8,952,987 B2 | 2/2015 | Momeyer et al. | |
| 8,959,430 B1 | 2/2015 | Spivak et al. | |
| 8,976,128 B2 | 3/2015 | Moore | |
| 9,026,932 B1 | 5/2015 | Dixon | |
| 9,030,419 B1 | 5/2015 | Freed | |
| 9,030,436 B2 | 5/2015 | Ikeda | |
| 9,046,999 B1 | 6/2015 | Teller et al. | |
| 9,063,563 B1 | 6/2015 | Gray et al. | |
| 9,069,460 B2 | 6/2015 | Moore | |
| 9,086,755 B2 | 7/2015 | Cho et al. | |
| 9,092,058 B2 | 7/2015 | Kasahara et al. | |

(56) References Cited

U.S. PATENT DOCUMENTS

| | | |
|---|---|---|
| 9,098,188 B2 | 8/2015 | Kim |
| 9,116,571 B2 | 8/2015 | Zeliff et al. |
| 9,122,364 B2 | 9/2015 | Kuwabara et al. |
| 9,146,914 B1 * | 9/2015 | Dhaundiyal ............ G06F 17/24 |
| 9,148,618 B2 | 9/2015 | Matas et al. |
| 9,164,779 B2 | 10/2015 | Brakensiek et al. |
| 9,170,607 B2 | 10/2015 | Bose et al. |
| 9,170,649 B2 | 10/2015 | Ronkainen |
| 9,218,105 B2 | 12/2015 | Mansson et al. |
| 9,244,562 B1 | 1/2016 | Rosenberg et al. |
| 9,244,576 B1 | 1/2016 | Vadagave et al. |
| 9,244,601 B2 | 1/2016 | Kim et al. |
| 9,246,487 B2 | 1/2016 | Casparian et al. |
| 9,262,002 B2 | 2/2016 | Momeyer et al. |
| 9,304,668 B2 | 4/2016 | Rezende et al. |
| 9,307,112 B2 | 4/2016 | Molgaard et al. |
| 9,349,552 B2 | 5/2016 | Huska et al. |
| 9,361,018 B2 | 6/2016 | Defazio et al. |
| 9,389,718 B1 | 7/2016 | Letourneur |
| 9,389,722 B2 | 7/2016 | Matsuki et al. |
| 9,400,581 B2 | 7/2016 | Bokma et al. |
| 9,405,367 B2 | 8/2016 | Jung et al. |
| 9,417,754 B2 | 8/2016 | Smith |
| 9,423,938 B1 | 8/2016 | Morris |
| 9,436,344 B2 | 9/2016 | Kuwabara et al. |
| 9,448,694 B2 | 9/2016 | Sharma et al. |
| 9,451,230 B1 | 9/2016 | Henderson et al. |
| 9,471,145 B2 | 10/2016 | Langlois et al. |
| 9,477,393 B2 | 10/2016 | Zambetti et al. |
| 9,542,013 B2 | 1/2017 | Dearman et al. |
| 9,547,525 B1 | 1/2017 | Trainor et al. |
| 9,569,093 B2 | 2/2017 | Lipman et al. |
| 9,600,114 B2 | 3/2017 | Milam et al. |
| 9,600,116 B2 | 3/2017 | Tao et al. |
| 9,612,741 B2 | 4/2017 | Brown et al. |
| 9,671,943 B2 | 6/2017 | Van der Velden |
| 9,733,716 B2 | 8/2017 | Shaffer |
| 9,760,241 B1 | 9/2017 | Lewbel |
| 2001/0024195 A1 | 9/2001 | Hayakawa et al. |
| 2001/0045965 A1 | 11/2001 | Orbanes et al. |
| 2002/0008691 A1 | 1/2002 | Hanajima et al. |
| 2002/0015064 A1 | 2/2002 | Robotham et al. |
| 2002/0109678 A1 | 8/2002 | Marmolin et al. |
| 2002/0140680 A1 | 10/2002 | Lu |
| 2002/0140740 A1 * | 10/2002 | Chen .................... G06F 3/0481 715/810 |
| 2002/0149630 A1 | 10/2002 | Kitainik et al. |
| 2002/0180763 A1 | 12/2002 | Kung |
| 2002/0186257 A1 | 12/2002 | Cadiz et al. |
| 2003/0001869 A1 | 1/2003 | Nissen |
| 2003/0086496 A1 | 5/2003 | Zhang et al. |
| 2003/0112269 A1 | 6/2003 | Lentz et al. |
| 2003/0117440 A1 | 6/2003 | Hellyar et al. |
| 2003/0122779 A1 | 7/2003 | Martin et al. |
| 2003/0151589 A1 | 8/2003 | Bensen et al. |
| 2003/0184574 A1 | 10/2003 | Phillips et al. |
| 2003/0189552 A1 | 10/2003 | Chuang et al. |
| 2003/0189647 A1 | 10/2003 | Kang |
| 2003/0206169 A1 | 11/2003 | Springer et al. |
| 2003/0222915 A1 | 12/2003 | Marion et al. |
| 2004/0021643 A1 | 2/2004 | Hoshino et al. |
| 2004/0056849 A1 | 3/2004 | Lohbihler et al. |
| 2004/0108995 A1 | 6/2004 | Hoshino et al. |
| 2004/0138849 A1 | 7/2004 | Schmidt et al. |
| 2004/0150631 A1 | 8/2004 | Fleck et al. |
| 2004/0150644 A1 | 8/2004 | Kincaid et al. |
| 2004/0174399 A1 | 9/2004 | Wu et al. |
| 2004/0219969 A1 | 11/2004 | Casey et al. |
| 2004/0267877 A1 * | 12/2004 | Shapiro ............ G06F 17/30067 709/202 |
| 2005/0012723 A1 | 1/2005 | Pallakoff |
| 2005/0039141 A1 | 2/2005 | Burke et al. |
| 2005/0091604 A1 | 4/2005 | Davis |
| 2005/0110769 A1 | 5/2005 | DaCosta et al. |
| 2005/0114785 A1 | 5/2005 | Finnigan et al. |
| 2005/0125742 A1 | 6/2005 | Grotjohn et al. |
| 2005/0132297 A1 | 6/2005 | Milic-Frayling et al. |
| 2005/0134578 A1 | 6/2005 | Chambers et al. |
| 2005/0183017 A1 | 8/2005 | Cain |
| 2005/0184973 A1 | 8/2005 | Lum et al. |
| 2005/0190280 A1 | 9/2005 | Haas et al. |
| 2005/0204295 A1 | 9/2005 | Voorhees et al. |
| 2005/0223338 A1 | 10/2005 | Partanen |
| 2005/0229112 A1 | 10/2005 | Clay et al. |
| 2005/0289476 A1 | 12/2005 | Tokkonen |
| 2006/0022955 A1 | 2/2006 | Kennedy |
| 2006/0022956 A1 | 2/2006 | Lengeling et al. |
| 2006/0026535 A1 | 2/2006 | Hotelling et al. |
| 2006/0026536 A1 | 2/2006 | Hotelling et al. |
| 2006/0031776 A1 | 2/2006 | Glein et al. |
| 2006/0036971 A1 | 2/2006 | Mendel et al. |
| 2006/0059436 A1 | 3/2006 | Nurmi |
| 2006/0067677 A1 | 3/2006 | Tokiwa et al. |
| 2006/0101347 A1 | 5/2006 | Runov et al. |
| 2006/0109252 A1 | 5/2006 | Kolmykov-Zotov et al. |
| 2006/0109256 A1 | 5/2006 | Grant et al. |
| 2006/0119586 A1 | 6/2006 | Grant et al. |
| 2006/0132455 A1 | 6/2006 | Rimas-Ribikauskas et al. |
| 2006/0132456 A1 | 6/2006 | Anson |
| 2006/0132457 A1 | 6/2006 | Rimas-Ribikauskas et al. |
| 2006/0136834 A1 | 6/2006 | Cao et al. |
| 2006/0136845 A1 | 6/2006 | Rimas-Ribikauskas et al. |
| 2006/0161861 A1 | 7/2006 | Holecek et al. |
| 2006/0161870 A1 | 7/2006 | Hotelling et al. |
| 2006/0190834 A1 | 8/2006 | Marcjan |
| 2006/0195438 A1 | 8/2006 | Galuten |
| 2006/0197753 A1 | 9/2006 | Hotelling |
| 2006/0212812 A1 | 9/2006 | Simmons et al. |
| 2006/0213754 A1 | 9/2006 | Jarrett et al. |
| 2006/0224989 A1 | 10/2006 | Pettiross et al. |
| 2006/0233248 A1 | 10/2006 | Rynderman et al. |
| 2006/0274042 A1 | 12/2006 | Krah et al. |
| 2006/0274086 A1 | 12/2006 | Forstall et al. |
| 2006/0277469 A1 | 12/2006 | Chaudhri et al. |
| 2006/0282778 A1 | 12/2006 | Barsness et al. |
| 2006/0284858 A1 | 12/2006 | Rekimoto |
| 2006/0290681 A1 | 12/2006 | Ho et al. |
| 2007/0004461 A1 | 1/2007 | Bathina et al. |
| 2007/0024595 A1 | 2/2007 | Baker et al. |
| 2007/0024646 A1 | 2/2007 | Saarinen et al. |
| 2007/0080953 A1 | 4/2007 | Lii |
| 2007/0113681 A1 | 5/2007 | Nishimura et al. |
| 2007/0115264 A1 | 5/2007 | Yu et al. |
| 2007/0120835 A1 | 5/2007 | Sato |
| 2007/0124699 A1 | 5/2007 | Michaels |
| 2007/0152959 A1 | 7/2007 | Peters |
| 2007/0157173 A1 | 7/2007 | Klein et al. |
| 2007/0168369 A1 | 7/2007 | Bruns |
| 2007/0168890 A1 | 7/2007 | Zhao et al. |
| 2007/0176904 A1 | 8/2007 | Russo |
| 2007/0182999 A1 | 8/2007 | Anthony et al. |
| 2007/0186178 A1 | 8/2007 | Schiller |
| 2007/0222768 A1 | 9/2007 | Geurts et al. |
| 2007/0229455 A1 | 10/2007 | Martin et al. |
| 2007/0229464 A1 | 10/2007 | Hotelling et al. |
| 2007/0236450 A1 | 10/2007 | Colgate et al. |
| 2007/0236477 A1 | 10/2007 | Ryu et al. |
| 2007/0245241 A1 | 10/2007 | Bertram et al. |
| 2007/0257821 A1 | 11/2007 | Son et al. |
| 2007/0270182 A1 | 11/2007 | Gulliksson et al. |
| 2007/0294295 A1 | 12/2007 | Finkelstein et al. |
| 2007/0299923 A1 | 12/2007 | Skelly et al. |
| 2008/0001924 A1 | 1/2008 | dos los Reyes et al. |
| 2008/0024459 A1 | 1/2008 | Poupyrev et al. |
| 2008/0034306 A1 | 2/2008 | Ording |
| 2008/0034331 A1 | 2/2008 | Josephsoon et al. |
| 2008/0036743 A1 | 2/2008 | Westerman et al. |
| 2008/0051989 A1 | 2/2008 | Welsh |
| 2008/0052945 A1 | 3/2008 | Matas et al. |
| 2008/0066010 A1 | 3/2008 | Brodersen et al. |
| 2008/0094367 A1 | 4/2008 | Van De Ven et al. |
| 2008/0094398 A1 | 4/2008 | Ng et al. |
| 2008/0106523 A1 | 5/2008 | Conrad |
| 2008/0109753 A1 | 5/2008 | Karstens |

(56) References Cited

U.S. PATENT DOCUMENTS

| | | |
|---|---|---|
| 2008/0136790 A1 | 6/2008 | Hio |
| 2008/0155415 A1 | 6/2008 | Yoon et al. |
| 2008/0163119 A1 | 7/2008 | Kim et al. |
| 2008/0168395 A1 | 7/2008 | Ording et al. |
| 2008/0168403 A1 | 7/2008 | Westerman et al. |
| 2008/0168404 A1 | 7/2008 | Ording |
| 2008/0202824 A1 | 8/2008 | Philipp et al. |
| 2008/0204427 A1 | 8/2008 | Heesemans et al. |
| 2008/0219493 A1 | 9/2008 | Tadmor |
| 2008/0222569 A1 | 9/2008 | Champion et al. |
| 2008/0244448 A1 | 10/2008 | Goering et al. |
| 2008/0259046 A1 | 10/2008 | Carsanaro |
| 2008/0263452 A1 | 10/2008 | Tomkins |
| 2008/0284866 A1 | 11/2008 | Mizutani |
| 2008/0294984 A1 | 11/2008 | Ramsay et al. |
| 2008/0297475 A1 | 12/2008 | Woolf et al. |
| 2008/0303799 A1 | 12/2008 | Schwesig et al. |
| 2008/0307335 A1 | 12/2008 | Chaudhri et al. |
| 2008/0307359 A1 | 12/2008 | Louch et al. |
| 2008/0317378 A1 | 12/2008 | Steinberg et al. |
| 2008/0320419 A1 | 12/2008 | Matas et al. |
| 2009/0002392 A1 | 1/2009 | Hou et al. |
| 2009/0007017 A1 | 1/2009 | Anzures et al. |
| 2009/0037846 A1 | 2/2009 | Spalink et al. |
| 2009/0046110 A1 | 2/2009 | Sadler et al. |
| 2009/0058828 A1 | 3/2009 | Jiang et al. |
| 2009/0061837 A1 | 3/2009 | Chaudhri et al. |
| 2009/0066668 A1 | 3/2009 | Kim et al. |
| 2009/0073118 A1 | 3/2009 | Yamaji et al. |
| 2009/0083665 A1 | 3/2009 | Anttila et al. |
| 2009/0085878 A1 | 4/2009 | Heubel et al. |
| 2009/0085881 A1 | 4/2009 | Keam |
| 2009/0085886 A1 | 4/2009 | Huang et al. |
| 2009/0089293 A1 | 4/2009 | Garritano et al. |
| 2009/0100343 A1 | 4/2009 | Lee et al. |
| 2009/0102804 A1 | 4/2009 | Wong et al. |
| 2009/0102805 A1 | 4/2009 | Meijer et al. |
| 2009/0140985 A1 | 6/2009 | Liu |
| 2009/0158198 A1 | 6/2009 | Hayter et al. |
| 2009/0160793 A1 | 6/2009 | Rekimoto |
| 2009/0160814 A1 | 6/2009 | Li et al. |
| 2009/0167507 A1 | 7/2009 | Maenpaa |
| 2009/0167508 A1 | 7/2009 | Fadell et al. |
| 2009/0167704 A1 | 7/2009 | Terlizzi et al. |
| 2009/0167728 A1 | 7/2009 | Geaghan et al. |
| 2009/0169061 A1 | 7/2009 | Anderson et al. |
| 2009/0187824 A1 | 7/2009 | Hinckley et al. |
| 2009/0198767 A1 | 8/2009 | Jakobson et al. |
| 2009/0219294 A1 | 9/2009 | Young et al. |
| 2009/0225037 A1 | 9/2009 | Williamson et al. |
| 2009/0228842 A1 | 9/2009 | Westerman et al. |
| 2009/0237374 A1 | 9/2009 | Li et al. |
| 2009/0247112 A1 | 10/2009 | Lundy et al. |
| 2009/0247230 A1 | 10/2009 | Lundy et al. |
| 2009/0256947 A1 | 10/2009 | Ciurea et al. |
| 2009/0259975 A1 | 10/2009 | Asai et al. |
| 2009/0267906 A1 | 10/2009 | Schroderus |
| 2009/0276730 A1 | 11/2009 | Aybes et al. |
| 2009/0280860 A1 | 11/2009 | Dahlke |
| 2009/0282360 A1 | 11/2009 | Park et al. |
| 2009/0288032 A1 | 11/2009 | Chang et al. |
| 2009/0293009 A1 | 11/2009 | Meserth et al. |
| 2009/0303187 A1 | 12/2009 | Pallakoff |
| 2009/0307633 A1 | 12/2009 | Haughay, Jr. et al. |
| 2009/0322893 A1 | 12/2009 | Stallings et al. |
| 2010/0007926 A1 | 1/2010 | Imaizumi et al. |
| 2010/0011304 A1 | 1/2010 | Van Os |
| 2010/0013613 A1 | 1/2010 | Weston |
| 2010/0013777 A1 | 1/2010 | Baudisch et al. |
| 2010/0017710 A1 | 1/2010 | Kim et al. |
| 2010/0026640 A1 | 2/2010 | Kim et al. |
| 2010/0026647 A1 | 2/2010 | Abe et al. |
| 2010/0039446 A1 | 2/2010 | Hillis et al. |
| 2010/0044121 A1 | 2/2010 | Simon et al. |
| 2010/0057235 A1 | 3/2010 | Wang et al. |
| 2010/0058231 A1 | 3/2010 | Duarte et al. |
| 2010/0070908 A1 | 3/2010 | Mori et al. |
| 2010/0073329 A1 | 3/2010 | Raman et al. |
| 2010/0083116 A1 | 4/2010 | Akifusa et al. |
| 2010/0085302 A1 | 4/2010 | Fairweather et al. |
| 2010/0085314 A1 | 4/2010 | Kwok |
| 2010/0085317 A1 | 4/2010 | Park et al. |
| 2010/0088596 A1 | 4/2010 | Griffin et al. |
| 2010/0088639 A1 | 4/2010 | Yach et al. |
| 2010/0090988 A1 | 4/2010 | Park |
| 2010/0110082 A1 | 5/2010 | Myrick et al. |
| 2010/0111434 A1 | 5/2010 | Madden |
| 2010/0127983 A1 | 5/2010 | Irani et al. |
| 2010/0128002 A1 | 5/2010 | Stacy et al. |
| 2010/0138776 A1 | 6/2010 | Korhonen |
| 2010/0148999 A1 | 6/2010 | Casparian et al. |
| 2010/0149096 A1 | 6/2010 | Migos et al. |
| 2010/0153879 A1 | 6/2010 | Rimas-Ribikauskas et al. |
| 2010/0156813 A1 | 6/2010 | Duarte et al. |
| 2010/0156818 A1 | 6/2010 | Burrough et al. |
| 2010/0156823 A1 | 6/2010 | Paleczny et al. |
| 2010/0156825 A1 | 6/2010 | Sohn et al. |
| 2010/0171713 A1 | 7/2010 | Kwok et al. |
| 2010/0175023 A1 | 7/2010 | Gatlin et al. |
| 2010/0180225 A1 | 7/2010 | Chiba et al. |
| 2010/0194693 A1 | 8/2010 | Selin et al. |
| 2010/0199227 A1 | 8/2010 | Xiao et al. |
| 2010/0211872 A1 | 8/2010 | Rolston et al. |
| 2010/0214239 A1 | 8/2010 | Wu |
| 2010/0214257 A1 | 8/2010 | Wussler et al. |
| 2010/0225604 A1 | 9/2010 | Homma et al. |
| 2010/0231534 A1 | 9/2010 | Chaudhri et al. |
| 2010/0235726 A1 | 9/2010 | Ording et al. |
| 2010/0235735 A1 | 9/2010 | Ording et al. |
| 2010/0235746 A1 | 9/2010 | Anzures |
| 2010/0251168 A1 | 9/2010 | Fujita et al. |
| 2010/0271312 A1 | 10/2010 | Alameh et al. |
| 2010/0271500 A1 | 10/2010 | Park et al. |
| 2010/0277419 A1 | 11/2010 | Ganey et al. |
| 2010/0277496 A1 | 11/2010 | Kawanishi et al. |
| 2010/0281379 A1 | 11/2010 | Meaney et al. |
| 2010/0281385 A1 | 11/2010 | Meaney et al. |
| 2010/0289807 A1 | 11/2010 | Yu et al. |
| 2010/0302177 A1 | 12/2010 | Kim et al. |
| 2010/0302179 A1 | 12/2010 | Ahn et al. |
| 2010/0306702 A1 | 12/2010 | Warner |
| 2010/0308983 A1 | 12/2010 | Conte et al. |
| 2010/0309147 A1 | 12/2010 | Fleizach et al. |
| 2010/0313124 A1 | 12/2010 | Privault et al. |
| 2010/0313156 A1 | 12/2010 | Louch et al. |
| 2010/0313158 A1* | 12/2010 | Lee .................... G06F 3/04883 715/769 |
| 2010/0313166 A1 | 12/2010 | Nakayama et al. |
| 2010/0315417 A1 | 12/2010 | Cho et al. |
| 2010/0315438 A1 | 12/2010 | Horodezky et al. |
| 2010/0321301 A1 | 12/2010 | Casparian et al. |
| 2010/0325578 A1 | 12/2010 | Mital et al. |
| 2011/0010626 A1 | 1/2011 | Fino et al. |
| 2011/0018695 A1 | 1/2011 | Bells et al. |
| 2011/0035145 A1 | 2/2011 | Yamasaki |
| 2011/0050576 A1 | 3/2011 | Forutanpour et al. |
| 2011/0050588 A1 | 3/2011 | Li et al. |
| 2011/0050591 A1 | 3/2011 | Kim et al. |
| 2011/0050594 A1 | 3/2011 | Kim et al. |
| 2011/0050629 A1 | 3/2011 | Homma et al. |
| 2011/0050630 A1 | 3/2011 | Ikeda |
| 2011/0050653 A1 | 3/2011 | Miyazawa et al. |
| 2011/0054837 A1 | 3/2011 | Ikeda |
| 2011/0055135 A1 | 3/2011 | Dawson et al. |
| 2011/0055741 A1 | 3/2011 | Jeon et al. |
| 2011/0057886 A1 | 3/2011 | Ng et al. |
| 2011/0057903 A1 | 3/2011 | Yamano et al. |
| 2011/0061029 A1* | 3/2011 | Yeh .................... G06F 3/04883 715/863 |
| 2011/0063248 A1 | 3/2011 | Yoon |
| 2011/0069012 A1 | 3/2011 | Martensson |
| 2011/0069016 A1 | 3/2011 | Victor |
| 2011/0074697 A1 | 3/2011 | Rapp et al. |
| 2011/0080350 A1 | 4/2011 | Almalki et al. |

(56) References Cited

U.S. PATENT DOCUMENTS

| | | |
|---|---|---|
| 2011/0084910 A1 | 4/2011 | Almalki et al. |
| 2011/0087982 A1 | 4/2011 | McCann et al. |
| 2011/0087983 A1 | 4/2011 | Shim |
| 2011/0093815 A1 | 4/2011 | Gobeil |
| 2011/0093817 A1 | 4/2011 | Song et al. |
| 2011/0107272 A1 | 5/2011 | Aguilar |
| 2011/0116716 A1 | 5/2011 | Kwon et al. |
| 2011/0122087 A1 | 5/2011 | Jang et al. |
| 2011/0126139 A1 | 5/2011 | Jeong et al. |
| 2011/0138295 A1 | 6/2011 | Momchilov et al. |
| 2011/0141031 A1 | 6/2011 | McCullough et al. |
| 2011/0141052 A1 | 6/2011 | Bernstein et al. |
| 2011/0144777 A1 | 6/2011 | Firkins et al. |
| 2011/0145752 A1 | 6/2011 | Fagans |
| 2011/0145753 A1 | 6/2011 | Prakash |
| 2011/0145764 A1 | 6/2011 | Higuchi et al. |
| 2011/0149138 A1 | 6/2011 | Watkins |
| 2011/0163971 A1 | 7/2011 | Wagner et al. |
| 2011/0164042 A1 | 7/2011 | Chaudhri |
| 2011/0167369 A1 | 7/2011 | van Os |
| 2011/0169765 A1 | 7/2011 | Aono |
| 2011/0175830 A1 | 7/2011 | Miyazawa et al. |
| 2011/0179368 A1 | 7/2011 | King et al. |
| 2011/0179381 A1 | 7/2011 | King |
| 2011/0181538 A1 | 7/2011 | Aono |
| 2011/0185299 A1 | 7/2011 | Hinckley et al. |
| 2011/0185300 A1 | 7/2011 | Hinckley et al. |
| 2011/0185316 A1 | 7/2011 | Reid et al. |
| 2011/0193788 A1 | 8/2011 | King et al. |
| 2011/0193809 A1 | 8/2011 | Walley et al. |
| 2011/0193881 A1 | 8/2011 | Rydenhag |
| 2011/0197160 A1 | 8/2011 | Kim et al. |
| 2011/0201387 A1 | 8/2011 | Paek et al. |
| 2011/0202834 A1 | 8/2011 | Mandryk et al. |
| 2011/0202853 A1 | 8/2011 | Mujkic |
| 2011/0202879 A1 | 8/2011 | Stovicek et al. |
| 2011/0205163 A1 | 8/2011 | Hinckley et al. |
| 2011/0209088 A1 | 8/2011 | Hinckley et al. |
| 2011/0209093 A1 | 8/2011 | Hinckley et al. |
| 2011/0209097 A1 | 8/2011 | Hinckley et al. |
| 2011/0209099 A1 | 8/2011 | Hinckley et al. |
| 2011/0209104 A1 | 8/2011 | Hinckley et al. |
| 2011/0210931 A1 | 9/2011 | Shai |
| 2011/0215914 A1 | 9/2011 | Edwards |
| 2011/0221684 A1 | 9/2011 | Rydenhag |
| 2011/0221776 A1 | 9/2011 | Shimotani et al. |
| 2011/0231789 A1 | 9/2011 | Bukurak et al. |
| 2011/0238690 A1 | 9/2011 | Arrasvouri et al. |
| 2011/0239110 A1 | 9/2011 | Garrett et al. |
| 2011/0242029 A1 | 10/2011 | Kasahara et al. |
| 2011/0246877 A1 | 10/2011 | Kwak et al. |
| 2011/0248916 A1 | 10/2011 | Griffin et al. |
| 2011/0248948 A1 | 10/2011 | Griffin et al. |
| 2011/0252346 A1 | 10/2011 | Chaudhri |
| 2011/0252357 A1 | 10/2011 | Chaudhri |
| 2011/0252362 A1 | 10/2011 | Cho et al. |
| 2011/0258537 A1* | 10/2011 | Rives ............... G06F 3/04883 715/255 |
| 2011/0263298 A1 | 10/2011 | Park |
| 2011/0267530 A1 | 11/2011 | Chun |
| 2011/0279381 A1 | 11/2011 | Tong et al. |
| 2011/0279395 A1 | 11/2011 | Kuwabara et al. |
| 2011/0279852 A1 | 11/2011 | Oda et al. |
| 2011/0285656 A1 | 11/2011 | Yaksick et al. |
| 2011/0285659 A1 | 11/2011 | Kuwabara et al. |
| 2011/0291945 A1 | 12/2011 | Ewing, Jr. et al. |
| 2011/0291951 A1 | 12/2011 | Tong |
| 2011/0296334 A1 | 12/2011 | Ryu et al. |
| 2011/0296351 A1 | 12/2011 | Ewing, Jr. et al. |
| 2011/0304559 A1 | 12/2011 | Pasquero |
| 2011/0304577 A1 | 12/2011 | Brown et al. |
| 2011/0310049 A1 | 12/2011 | Homma et al. |
| 2012/0005622 A1 | 1/2012 | Park et al. |
| 2012/0011437 A1 | 1/2012 | James et al. |
| 2012/0013541 A1 | 1/2012 | Boka et al. |
| 2012/0013542 A1 | 1/2012 | Shenfield |
| 2012/0019448 A1 | 1/2012 | Pitkanen et al. |
| 2012/0026110 A1 | 2/2012 | Yamano |
| 2012/0036441 A1 | 2/2012 | Basir et al. |
| 2012/0036556 A1 | 2/2012 | LeBeau et al. |
| 2012/0038580 A1 | 2/2012 | Sasaki |
| 2012/0044153 A1 | 2/2012 | Arrasvouri et al. |
| 2012/0056837 A1 | 3/2012 | Park et al. |
| 2012/0056848 A1 | 3/2012 | Yamano et al. |
| 2012/0062564 A1 | 3/2012 | Miyashita et al. |
| 2012/0062604 A1 | 3/2012 | Lobo |
| 2012/0062732 A1 | 3/2012 | Marman et al. |
| 2012/0066630 A1 | 3/2012 | Kim et al. |
| 2012/0066648 A1 | 3/2012 | Rolleston et al. |
| 2012/0081375 A1 | 4/2012 | Robert et al. |
| 2012/0084689 A1 | 4/2012 | Ledet et al. |
| 2012/0084713 A1 | 4/2012 | Desai et al. |
| 2012/0089932 A1 | 4/2012 | Kano et al. |
| 2012/0089942 A1 | 4/2012 | Gammon |
| 2012/0089951 A1 | 4/2012 | Cassidy |
| 2012/0092355 A1 | 4/2012 | Yamamoto et al. |
| 2012/0096393 A1 | 4/2012 | Shim et al. |
| 2012/0096400 A1 | 4/2012 | Cho |
| 2012/0102437 A1 | 4/2012 | Worley et al. |
| 2012/0105358 A1 | 5/2012 | Momeyer et al. |
| 2012/0105367 A1 | 5/2012 | Son et al. |
| 2012/0106852 A1 | 5/2012 | Khawand et al. |
| 2012/0113007 A1 | 5/2012 | Koch et al. |
| 2012/0113023 A1 | 5/2012 | Koch et al. |
| 2012/0126962 A1 | 5/2012 | Ujii et al. |
| 2012/0131495 A1 | 5/2012 | Goossens et al. |
| 2012/0139864 A1 | 6/2012 | Sleeman et al. |
| 2012/0146945 A1 | 6/2012 | Miyazawa et al. |
| 2012/0147052 A1 | 6/2012 | Homma et al. |
| 2012/0154328 A1 | 6/2012 | Kono |
| 2012/0154329 A1 | 6/2012 | Shinozaki |
| 2012/0159380 A1 | 6/2012 | Kocienda et al. |
| 2012/0169646 A1 | 7/2012 | Berkes et al. |
| 2012/0169716 A1 | 7/2012 | Mihara |
| 2012/0176403 A1 | 7/2012 | Cha et al. |
| 2012/0179967 A1* | 7/2012 | Hayes ............... G06F 3/0485 715/719 |
| 2012/0182226 A1 | 7/2012 | Tuli |
| 2012/0183271 A1 | 7/2012 | Forutanpour et al. |
| 2012/0206393 A1 | 8/2012 | Hillis et al. |
| 2012/0216114 A1 | 8/2012 | Privault et al. |
| 2012/0218203 A1 | 8/2012 | Kanki |
| 2012/0235912 A1 | 9/2012 | Laubach |
| 2012/0240044 A1 | 9/2012 | Johnson et al. |
| 2012/0249575 A1 | 10/2012 | Krolczyk et al. |
| 2012/0249853 A1 | 10/2012 | Krolczyk et al. |
| 2012/0256846 A1 | 10/2012 | Mak |
| 2012/0256847 A1 | 10/2012 | Mak et al. |
| 2012/0256857 A1 | 10/2012 | Mak |
| 2012/0257071 A1 | 10/2012 | Prentice |
| 2012/0260220 A1 | 10/2012 | Griffin |
| 2012/0274591 A1 | 11/2012 | Rimas-Ribikauskas et al. |
| 2012/0274662 A1 | 11/2012 | Kim et al. |
| 2012/0284673 A1 | 11/2012 | Lamb et al. |
| 2012/0293449 A1 | 11/2012 | Dietz |
| 2012/0293551 A1 | 11/2012 | Momeyer et al. |
| 2012/0297041 A1 | 11/2012 | Momchilov |
| 2012/0299859 A1 | 11/2012 | Kinoshita |
| 2012/0304108 A1 | 11/2012 | Jarrett et al. |
| 2012/0304132 A1 | 11/2012 | Sareen et al. |
| 2012/0304133 A1 | 11/2012 | Nan et al. |
| 2012/0306748 A1 | 12/2012 | Fleizach et al. |
| 2012/0306764 A1 | 12/2012 | Kamibeppu |
| 2012/0306765 A1 | 12/2012 | Moore |
| 2012/0306766 A1 | 12/2012 | Moore |
| 2012/0306772 A1 | 12/2012 | Tan et al. |
| 2012/0306778 A1 | 12/2012 | Wheeldreyer et al. |
| 2012/0306927 A1 | 12/2012 | Lee et al. |
| 2012/0311429 A1 | 12/2012 | Decker et al. |
| 2012/0311437 A1 | 12/2012 | Weeldreyer et al. |
| 2012/0311498 A1 | 12/2012 | Kluttz et al. |
| 2013/0002561 A1 | 1/2013 | Wakasa |
| 2013/0016042 A1 | 1/2013 | Makinen et al. |
| 2013/0016122 A1 | 1/2013 | Bhatt et al. |

(56) References Cited

U.S. PATENT DOCUMENTS

| | | |
|---|---|---|
| 2013/0019158 A1 | 1/2013 | Watanabe |
| 2013/0019174 A1 | 1/2013 | Gil et al. |
| 2013/0031514 A1 | 1/2013 | Gabbert |
| 2013/0036386 A1 | 2/2013 | Park et al. |
| 2013/0044062 A1 | 2/2013 | Bose et al. |
| 2013/0047100 A1 | 2/2013 | Kroeger et al. |
| 2013/0050131 A1 | 2/2013 | Lee et al. |
| 2013/0050143 A1 | 2/2013 | Kim et al. |
| 2013/0061172 A1 | 3/2013 | Huang et al. |
| 2013/0063389 A1 | 3/2013 | Moore |
| 2013/0067383 A1 | 3/2013 | Kataoka et al. |
| 2013/0067513 A1 | 3/2013 | Takami |
| 2013/0067527 A1 | 3/2013 | Ashbook et al. |
| 2013/0074003 A1 | 3/2013 | Dolenc |
| 2013/0077804 A1 | 3/2013 | Glebe et al. |
| 2013/0082824 A1 | 4/2013 | Colley |
| 2013/0086056 A1 | 4/2013 | Dyor et al. |
| 2013/0093691 A1 | 4/2013 | Moosavi |
| 2013/0093764 A1 | 4/2013 | Andersson et al. |
| 2013/0097520 A1 | 4/2013 | Lewin et al. |
| 2013/0097521 A1 | 4/2013 | Lewin et al. |
| 2013/0097534 A1 | 4/2013 | Lewin et al. |
| 2013/0097539 A1 | 4/2013 | Mansson et al. |
| 2013/0097556 A1 | 4/2013 | Louch |
| 2013/0097562 A1 | 4/2013 | Kermoian et al. |
| 2013/0106766 A1 | 5/2013 | Yilmaz et al. |
| 2013/0111398 A1 | 5/2013 | Lu et al. |
| 2013/0113715 A1 | 5/2013 | Grant et al. |
| 2013/0113720 A1 | 5/2013 | Van Eerd et al. |
| 2013/0120278 A1 | 5/2013 | Cantrell |
| 2013/0120295 A1 | 5/2013 | Kim et al. |
| 2013/0120306 A1 | 5/2013 | Furukawa |
| 2013/0135243 A1 | 5/2013 | Hirsch et al. |
| 2013/0135499 A1 | 5/2013 | Song |
| 2013/0141364 A1 | 6/2013 | Lynn et al. |
| 2013/0141396 A1 | 6/2013 | Lynn et al. |
| 2013/0145313 A1 | 6/2013 | Roh et al. |
| 2013/0154948 A1 | 6/2013 | Schediwy et al. |
| 2013/0154959 A1 | 6/2013 | Lindsay et al. |
| 2013/0155018 A1 | 6/2013 | Dagdeviren |
| 2013/0159893 A1 | 6/2013 | Lewis et al. |
| 2013/0162603 A1 | 6/2013 | Peng et al. |
| 2013/0162667 A1 | 6/2013 | Eskolin et al. |
| 2013/0169549 A1 | 7/2013 | Seymour et al. |
| 2013/0174049 A1 | 7/2013 | Townsend et al. |
| 2013/0174089 A1 | 7/2013 | Ki |
| 2013/0174094 A1 | 7/2013 | Heo et al. |
| 2013/0174179 A1 | 7/2013 | Park et al. |
| 2013/0179840 A1 | 7/2013 | Fisher et al. |
| 2013/0191791 A1 | 7/2013 | Rydenhag et al. |
| 2013/0194217 A1 | 8/2013 | Lee et al. |
| 2013/0198690 A1 | 8/2013 | Barsoum et al. |
| 2013/0212515 A1 | 8/2013 | Eleftheriou |
| 2013/0212541 A1 | 8/2013 | Dolenc et al. |
| 2013/0215079 A1 | 8/2013 | Johnson et al. |
| 2013/0222274 A1 | 8/2013 | Mori et al. |
| 2013/0222671 A1 | 8/2013 | Tseng et al. |
| 2013/0227419 A1 | 8/2013 | Lee et al. |
| 2013/0227450 A1 | 8/2013 | Na et al. |
| 2013/0232402 A1 | 9/2013 | Lu et al. |
| 2013/0234929 A1 | 9/2013 | Libin |
| 2013/0239057 A1 | 9/2013 | Ubillos et al. |
| 2013/0249814 A1 | 9/2013 | Zeng |
| 2013/0257793 A1 | 10/2013 | Zeliff et al. |
| 2013/0257817 A1 | 10/2013 | Yliaho |
| 2013/0265246 A1 | 10/2013 | Tae |
| 2013/0268875 A1 | 10/2013 | Han et al. |
| 2013/0278520 A1 | 10/2013 | Weng et al. |
| 2013/0305184 A1 | 11/2013 | Kim et al. |
| 2013/0307792 A1 | 11/2013 | Andres et al. |
| 2013/0321340 A1 | 12/2013 | Seo et al. |
| 2013/0321457 A1 | 12/2013 | Bauermeister et al. |
| 2013/0325342 A1 | 12/2013 | Pylappan et al. |
| 2013/0326420 A1 | 12/2013 | Liu et al. |
| 2013/0326421 A1 | 12/2013 | Jo |
| 2013/0328770 A1 | 12/2013 | Parham |
| 2013/0332836 A1 | 12/2013 | Cho |
| 2013/0332892 A1 | 12/2013 | Matsuki |
| 2013/0339909 A1 | 12/2013 | Ha |
| 2014/0002355 A1 | 1/2014 | Lee et al. |
| 2014/0002374 A1 | 1/2014 | Hunt et al. |
| 2014/0002386 A1 | 1/2014 | Rosenberg et al. |
| 2014/0026098 A1 | 1/2014 | Gilman |
| 2014/0028571 A1 | 1/2014 | St. Clair |
| 2014/0028601 A1 | 1/2014 | Moore |
| 2014/0049491 A1 | 2/2014 | Nagar et al. |
| 2014/0055367 A1 | 2/2014 | Dearman et al. |
| 2014/0055377 A1 | 2/2014 | Kim |
| 2014/0059460 A1 | 2/2014 | Ho |
| 2014/0059485 A1 | 2/2014 | Lehrian et al. |
| 2014/0063316 A1 | 3/2014 | Lee et al. |
| 2014/0063541 A1 | 3/2014 | Yamazaki |
| 2014/0072281 A1 | 3/2014 | Cho et al. |
| 2014/0078318 A1 | 3/2014 | Alameh |
| 2014/0078343 A1 | 3/2014 | Dai et al. |
| 2014/0082536 A1 | 3/2014 | Costa et al. |
| 2014/0092025 A1 | 4/2014 | Pala et al. |
| 2014/0092030 A1 | 4/2014 | Van der Velden |
| 2014/0108936 A1 | 4/2014 | Khosropour et al. |
| 2014/0109016 A1 | 4/2014 | Ouyang et al. |
| 2014/0111456 A1 | 4/2014 | Kashiwa et al. |
| 2014/0111670 A1 | 4/2014 | Lord et al. |
| 2014/0118268 A1 | 5/2014 | Kuscher |
| 2014/0139471 A1 | 5/2014 | Matsuki |
| 2014/0152581 A1 | 6/2014 | Case et al. |
| 2014/0157203 A1 | 6/2014 | Jeon et al. |
| 2014/0160063 A1 | 6/2014 | Yairi et al. |
| 2014/0160073 A1 | 6/2014 | Matsuki |
| 2014/0164955 A1 | 6/2014 | Thiruvidam et al. |
| 2014/0164966 A1 | 6/2014 | Kim et al. |
| 2014/0165006 A1 | 6/2014 | Chaudhri et al. |
| 2014/0168093 A1 | 6/2014 | Lawrence |
| 2014/0168153 A1 | 6/2014 | Deichmann et al. |
| 2014/0173517 A1 | 6/2014 | Chaudhri |
| 2014/0184526 A1 | 7/2014 | Cho |
| 2014/0201660 A1 | 7/2014 | Clausen et al. |
| 2014/0208271 A1 | 7/2014 | Bell et al. |
| 2014/0210753 A1 | 7/2014 | Lee et al. |
| 2014/0210758 A1 | 7/2014 | Park et al. |
| 2014/0210760 A1 | 7/2014 | Aberg et al. |
| 2014/0210798 A1 | 7/2014 | Wilson |
| 2014/0229888 A1 | 8/2014 | Ko et al. |
| 2014/0237408 A1 | 8/2014 | Ohlsson et al. |
| 2014/0245202 A1 | 8/2014 | Yoon et al. |
| 2014/0245367 A1 | 8/2014 | Sasaki et al. |
| 2014/0267114 A1 | 9/2014 | Lisseman et al. |
| 2014/0267135 A1 | 9/2014 | Chhabra |
| 2014/0267362 A1 | 9/2014 | Kocienda et al. |
| 2014/0282084 A1 | 9/2014 | Murarka et al. |
| 2014/0282214 A1 | 9/2014 | Shirzadi et al. |
| 2014/0300569 A1 | 10/2014 | Matsuki et al. |
| 2014/0304651 A1 | 10/2014 | Johansson et al. |
| 2014/0306897 A1 | 10/2014 | Cueto |
| 2014/0306899 A1 | 10/2014 | Hicks |
| 2014/0310638 A1 | 10/2014 | Lee et al. |
| 2014/0313130 A1 | 10/2014 | Yamano et al. |
| 2014/0333551 A1 | 11/2014 | Kim et al. |
| 2014/0333561 A1 | 11/2014 | Bull et al. |
| 2014/0344765 A1 | 11/2014 | Hicks et al. |
| 2014/0354845 A1 | 12/2014 | Molgaard et al. |
| 2014/0354850 A1 | 12/2014 | Kosaka et al. |
| 2014/0359438 A1 | 12/2014 | Matsuki |
| 2014/0359528 A1 | 12/2014 | Murata |
| 2014/0365945 A1 | 12/2014 | Karunamuni et al. |
| 2014/0380247 A1 | 12/2014 | Tecarro et al. |
| 2015/0015763 A1 | 1/2015 | Lee et al. |
| 2015/0020036 A1 | 1/2015 | Kim et al. |
| 2015/0026584 A1 | 1/2015 | Kobayakov et al. |
| 2015/0026592 A1 | 1/2015 | Mohammed et al. |
| 2015/0029149 A1 | 1/2015 | Andersson et al. |
| 2015/0033184 A1 | 1/2015 | Kim et al. |
| 2015/0042588 A1 | 2/2015 | Park |
| 2015/0046876 A1 | 2/2015 | Goldenberg |
| 2015/0049033 A1 | 2/2015 | Kim et al. |

(56) References Cited

U.S. PATENT DOCUMENTS

| | | |
|---|---|---|
| 2015/0058723 A1 | 2/2015 | Cieplinski et al. |
| 2015/0062046 A1 | 3/2015 | Cho et al. |
| 2015/0062052 A1 | 3/2015 | Bernstein et al. |
| 2015/0062068 A1 | 3/2015 | Shih et al. |
| 2015/0067495 A1 | 3/2015 | Bernstein et al. |
| 2015/0067496 A1 | 3/2015 | Missig et al. |
| 2015/0067497 A1 | 3/2015 | Cieplinski et al. |
| 2015/0067513 A1 | 3/2015 | Zambetti et al. |
| 2015/0067519 A1 | 3/2015 | Missig et al. |
| 2015/0067534 A1 | 3/2015 | Choi et al. |
| 2015/0067559 A1 | 3/2015 | Missig et al. |
| 2015/0067560 A1 | 3/2015 | Cieplinski et al. |
| 2015/0067563 A1 | 3/2015 | Bernstein et al. |
| 2015/0067596 A1 | 3/2015 | Brown et al. |
| 2015/0067601 A1 | 3/2015 | Bernstein et al. |
| 2015/0067602 A1 | 3/2015 | Bernstein et al. |
| 2015/0067605 A1 | 3/2015 | Zambetti et al. |
| 2015/0071547 A1 | 3/2015 | Keating et al. |
| 2015/0116205 A1 | 4/2015 | Westerman et al. |
| 2015/0121218 A1 | 4/2015 | Kim et al. |
| 2015/0121225 A1 | 4/2015 | Somasundaram et al. |
| 2015/0128092 A1 | 5/2015 | Lee et al. |
| 2015/0135109 A1 | 5/2015 | Zambetti et al. |
| 2015/0138126 A1 | 5/2015 | Westerman |
| 2015/0138155 A1 | 5/2015 | Bernstein et al. |
| 2015/0139605 A1 | 5/2015 | Wiklof |
| 2015/0143273 A1 | 5/2015 | Bernstein et al. |
| 2015/0143284 A1 | 5/2015 | Bennett et al. |
| 2015/0149899 A1 | 5/2015 | Bernstein et al. |
| 2015/0149964 A1 | 5/2015 | Bernstein et al. |
| 2015/0149967 A1 | 5/2015 | Bernstein et al. |
| 2015/0153897 A1 | 6/2015 | Huang et al. |
| 2015/0153929 A1 | 6/2015 | Bernstein et al. |
| 2015/0160729 A1 | 6/2015 | Nakagawa |
| 2015/0185840 A1 | 7/2015 | Golyshko et al. |
| 2015/0193099 A1 | 7/2015 | Murphy |
| 2015/0193951 A1 | 7/2015 | Lee et al. |
| 2015/0205495 A1 | 7/2015 | Koide et al. |
| 2015/0234446 A1 | 8/2015 | Nathan et al. |
| 2015/0234493 A1 | 8/2015 | Parivar et al. |
| 2015/0253866 A1 | 9/2015 | Amm et al. |
| 2015/0268786 A1 | 9/2015 | Kitada |
| 2015/0268813 A1 | 9/2015 | Bos |
| 2015/0321607 A1 | 11/2015 | Cho et al. |
| 2015/0332107 A1 | 11/2015 | Paniaras |
| 2015/0378519 A1 | 12/2015 | Brown et al. |
| 2015/0378982 A1 | 12/2015 | McKenzie et al. |
| 2015/0381931 A1 | 12/2015 | Uhma et al. |
| 2016/0004393 A1 | 1/2016 | Faaborg et al. |
| 2016/0004427 A1 | 1/2016 | Zambetti et al. |
| 2016/0004428 A1 | 1/2016 | Bernstein et al. |
| 2016/0004429 A1 | 1/2016 | Bernstein et al. |
| 2016/0004430 A1 | 1/2016 | Missig et al. |
| 2016/0004431 A1 | 1/2016 | Bernstein et al. |
| 2016/0011771 A1 | 1/2016 | Cieplinski |
| 2016/0019718 A1 | 1/2016 | Mukkamala et al. |
| 2016/0021511 A1 | 1/2016 | Jin et al. |
| 2016/0041750 A1 | 2/2016 | Cieplinski et al. |
| 2016/0048326 A1 | 2/2016 | Kim et al. |
| 2016/0062466 A1 | 3/2016 | Moussette et al. |
| 2016/0062619 A1 | 3/2016 | Reeve et al. |
| 2016/0070401 A1 | 3/2016 | Kim et al. |
| 2016/0132139 A1 | 5/2016 | Du et al. |
| 2016/0188181 A1 | 6/2016 | Smith |
| 2016/0196028 A1 | 7/2016 | Kenney et al. |
| 2016/0210025 A1 | 7/2016 | Bernstein et al. |
| 2016/0224220 A1 | 8/2016 | Ganguly |
| 2016/0259412 A1 | 9/2016 | Flint et al. |
| 2016/0259413 A1 | 9/2016 | Anzures et al. |
| 2016/0259495 A1 | 9/2016 | Butcher et al. |
| 2016/0259496 A1 | 9/2016 | Butcher et al. |
| 2016/0259497 A1 | 9/2016 | Foss et al. |
| 2016/0259498 A1 | 9/2016 | Foss et al. |
| 2016/0259499 A1 | 9/2016 | Kocienda et al. |
| 2016/0259516 A1 | 9/2016 | Kudurshian et al. |
| 2016/0259517 A1 | 9/2016 | Butcher et al. |
| 2016/0259518 A1 | 9/2016 | King et al. |
| 2016/0259519 A1 | 9/2016 | Foss et al. |
| 2016/0259527 A1 | 9/2016 | Kocienda et al. |
| 2016/0259528 A1 | 9/2016 | Foss et al. |
| 2016/0259536 A1 | 9/2016 | Kudurshian et al. |
| 2016/0259548 A1 | 9/2016 | Ma |
| 2016/0274686 A1 | 9/2016 | Ruiz et al. |
| 2016/0274728 A1 | 9/2016 | Luo et al. |
| 2016/0274761 A1 | 9/2016 | Ruiz et al. |
| 2016/0283054 A1 | 9/2016 | Suzuki |
| 2016/0320906 A1 | 11/2016 | Bokma et al. |
| 2016/0334960 A1 | 11/2016 | Brown et al. |
| 2016/0357305 A1 | 12/2016 | Wells et al. |
| 2016/0357368 A1 | 12/2016 | Federighi et al. |
| 2016/0357389 A1 | 12/2016 | Dakin et al. |
| 2016/0357390 A1 | 12/2016 | Federighi et al. |
| 2016/0357404 A1 | 12/2016 | Alonso Ruiz et al. |
| 2016/0360116 A1 | 12/2016 | Penha et al. |
| 2017/0045981 A1 | 2/2017 | Karunamuni et al. |
| 2017/0046039 A1 | 2/2017 | Karunamuni et al. |
| 2017/0046058 A1 | 2/2017 | Karunamuni et al. |
| 2017/0046059 A1 | 2/2017 | Karunamuni et al. |
| 2017/0046060 A1 | 2/2017 | Karunamuni et al. |
| 2017/0075520 A1 | 3/2017 | Bauer et al. |
| 2017/0075562 A1 | 3/2017 | Bauer et al. |
| 2017/0075563 A1 | 3/2017 | Bauer et al. |
| 2017/0109011 A1 | 4/2017 | Jiang |
| 2018/0024681 A1 | 1/2018 | Bernstein et al. |

FOREIGN PATENT DOCUMENTS

| | | |
|---|---|---|
| CN | 101118469 A | 2/2008 |
| CN | 101202866 A | 6/2008 |
| CN | 101222704 A | 7/2008 |
| CN | 101320303 A | 12/2008 |
| CN | 100524183 | 8/2009 |
| CN | 101593077 A | 12/2009 |
| CN | 101809526 A | 8/2010 |
| CN | 102004593 A | 4/2011 |
| CN | 102112946 A | 6/2011 |
| CN | 102160021 A | 8/2011 |
| CN | 102385478 A | 3/2012 |
| CN | 102438092 A | 5/2012 |
| CN | 102483677 A | 5/2012 |
| CN | 102662573 A | 9/2012 |
| CN | 102841677 A | 12/2012 |
| CN | 103097992 A | 5/2013 |
| DE | 100 59 906 A1 | 6/2002 |
| EP | 0 859 307 A1 | 3/1998 |
| EP | 0 880 090 A2 | 11/1998 |
| EP | 1 028 583 A1 | 8/2000 |
| EP | 1406150 A1 | 4/2004 |
| EP | 1 674 977 A2 | 6/2006 |
| EP | 1 882 902 A1 | 1/2008 |
| EP | 2 000 896 A2 | 12/2008 |
| EP | 2 017 701 A1 | 1/2009 |
| EP | 2 028 583 A2 | 2/2009 |
| EP | 2 141 574 A2 | 1/2010 |
| EP | 2 175 357 A1 | 4/2010 |
| EP | 2 196 893 A2 | 6/2010 |
| EP | 2 214 087 A1 | 8/2010 |
| EP | 2 226 715 A2 | 9/2010 |
| EP | 2 299 351 A2 | 3/2011 |
| EP | 2 302 496 A1 | 3/2011 |
| EP | 2 375 309 A1 | 10/2011 |
| EP | 2 375 314 A1 | 10/2011 |
| EP | 2 386 935 A1 | 11/2011 |
| EP | 2 407 868 A1 | 1/2012 |
| EP | 2 420 924 A2 | 2/2012 |
| EP | 2 426 580 A2 | 3/2012 |
| EP | 2 447 818 A1 | 5/2012 |
| EP | 2 527 966 A2 | 11/2012 |
| EP | 2 530 677 A2 | 12/2012 |
| EP | 2 541 376 A1 | 1/2013 |
| EP | 2 555 500 A1 | 2/2013 |
| EP | 2 568 359 A2 | 3/2013 |
| EP | 2 615 535 A1 | 7/2013 |
| EP | 2 631 737 A1 | 8/2013 |

(56) References Cited

FOREIGN PATENT DOCUMENTS

| | | |
|---|---|---|
| EP | 2 674 846 A2 | 12/2013 |
| EP | 2 733 578 A2 | 5/2014 |
| EP | 2 808 764 A1 | 12/2014 |
| EP | 2 809 058 A1 | 12/2014 |
| EP | 2 813 938 A1 | 12/2014 |
| GB | 2 402 105 A | 12/2004 |
| JP | 58-182746 | 10/1983 |
| JP | H07-151512 A | 6/1995 |
| JP | H08-227341 A | 9/1996 |
| JP | H09-269883 A | 10/1997 |
| JP | H09-330175 A | 12/1997 |
| JP | H11-203044 A | 7/1999 |
| JP | 2001-202192 A | 7/2001 |
| JP | 2002-149312 A | 5/2002 |
| JP | 2003-157131 A | 5/2003 |
| JP | 2003-186597 A | 7/2003 |
| JP | 2004-054861 A | 2/2004 |
| JP | 2004-062648 A | 2/2004 |
| JP | 2004-070492 A | 3/2004 |
| JP | 2004-086733 A | 3/2004 |
| JP | 2005-031786 A | 2/2005 |
| JP | 2005-092386 A | 4/2005 |
| JP | 2005-135106 A | 5/2005 |
| JP | 2005-157842 A | 6/2005 |
| JP | 2005-196810 A | 7/2005 |
| JP | 2006-185443 A | 7/2006 |
| JP | 2007-116384 A | 5/2007 |
| JP | 2007-264808 A | 10/2007 |
| JP | 2008-009759 A | 1/2008 |
| JP | 2008-015890 A | 1/2008 |
| JP | 2008-033739 A | 2/2008 |
| JP | 2008-516348 A | 5/2008 |
| JP | 2008-146453 A | 6/2008 |
| JP | 2008-537615 | 9/2008 |
| JP | 2008 305174 A | 12/2008 |
| JP | 2009-500761 | 1/2009 |
| JP | 2009-211704 A | 9/2009 |
| JP | 2009-217543 A | 9/2009 |
| JP | 2010-009321 A | 1/2010 |
| JP | 2010-503130 A | 1/2010 |
| JP | 2010-055274 A | 3/2010 |
| JP | 2010-146507 A | 7/2010 |
| JP | 2010-152716 A | 7/2010 |
| JP | 2010-176174 A | 8/2010 |
| JP | 2010-176337 A | 8/2010 |
| JP | 2010-181934 A | 8/2010 |
| JP | 2010-541071 A | 12/2010 |
| JP | 2011-501307 A | 1/2011 |
| JP | 2011-048666 A | 3/2011 |
| JP | 2011-048686 A | 3/2011 |
| JP | 2011-048762 A | 3/2011 |
| JP | 2011-048832 A | 3/2011 |
| JP | 2011-053831 A | 3/2011 |
| JP | 2011-053972 A | 3/2011 |
| JP | 2011-053973 A | 3/2011 |
| JP | 2011-053974 A | 3/2011 |
| JP | 2011-059821 A | 3/2011 |
| JP | 2011-070342 A | 4/2011 |
| JP | 2011-100290 A | 5/2011 |
| JP | 2011-107823 A | 6/2011 |
| JP | 2011-123773 A | 6/2011 |
| JP | 2011-141868 A | 7/2011 |
| JP | 2011 192179 A | 9/2011 |
| JP | 2011-192215 A | 9/2011 |
| JP | 2011-242386 A | 12/2011 |
| JP | 2011-253556 A | 12/2011 |
| JP | 2011-257941 A | 12/2011 |
| JP | 2011-530101 A | 12/2011 |
| JP | 2012-027940 A | 2/2012 |
| JP | 2012-043266 A | 3/2012 |
| JP | 2012-043267 A | 3/2012 |
| JP | 2012-053754 | 3/2012 |
| JP | 2012-053926 A | 3/2012 |
| JP | 2012-073873 A | 4/2012 |
| JP | 2012-509605 A | 4/2012 |
| JP | 2012-093820 A | 5/2012 |
| JP | 2012-123564 A | 6/2012 |
| JP | 2012-128825 A | 7/2012 |
| JP | 2013-030050 A | 2/2013 |
| JP | 2013-058149 A | 3/2013 |
| JP | 2013-080521 A | 5/2013 |
| JP | 2013-529339 A | 7/2013 |
| JP | 2013-542488 A | 11/2013 |
| JP | 2014-130567 A | 7/2014 |
| JP | 2014-140112 A | 7/2014 |
| JP | 2014-519109 A | 8/2014 |
| JP | 2015-153420 A | 8/2015 |
| KR | 2006-0071353 A | 6/2006 |
| KR | 2008-0045143 A | 4/2008 |
| KR | 2008-0054346 A | 6/2008 |
| KR | 2010 0046087 | 6/2010 |
| KR | 2010 0133246 A | 12/2010 |
| KR | 2011 0086501 A | 7/2011 |
| KR | 20120103670 A | 9/2012 |
| KR | 2013 0099647 A | 9/2013 |
| KR | 2014 0016495 A | 2/2014 |
| KR | 2014 0043760 A | 4/2014 |
| KR | 2014 0079110 A | 6/2014 |
| KR | 20150021977 A | 3/2015 |
| WO | WO 2005/106637 A2 | 11/2005 |
| WO | WO 2006/013485 A2 | 2/2006 |
| WO | WO 2006/042309 A1 | 4/2006 |
| WO | WO 2006/094308 A2 | 9/2006 |
| WO | WO 2007/121557 A1 | 11/2007 |
| WO | WO 2008/030976 A2 | 3/2008 |
| WO | WO 2008/064142 A2 | 5/2008 |
| WO | WO 2009/155981 A1 | 12/2009 |
| WO | WO 2009/158549 A2 | 12/2009 |
| WO | WO 2010/013876 A1 | 2/2010 |
| WO | WO 2010/090010 A1 | 8/2010 |
| WO | WO 2010/122813 A1 | 10/2010 |
| WO | WO 2011/024389 A1 | 3/2011 |
| WO | WO 2011/024465 A1 | 3/2011 |
| WO | WO 2011/093045 A1 | 8/2011 |
| WO | WO 2011/105009 A1 | 9/2011 |
| WO | WO 2011/108190 A1 | 9/2011 |
| WO | WO 2011/115187 A1 | 9/2011 |
| WO | WO 2011/121375 A1 | 10/2011 |
| WO | WO 2012/021417 A1 | 2/2012 |
| WO | WO 2012/037664 | 3/2012 |
| WO | WO 2012/096804 A2 | 7/2012 |
| WO | WO 2012/108213 A1 | 8/2012 |
| WO | WO 2012/114760 A1 | 8/2012 |
| WO | WO 2012/150540 A2 | 11/2012 |
| WO | WO 2013/169299 A1 | 11/2013 |
| WO | WO 2013/169300 A1 | 11/2013 |
| WO | WO 2013/169845 A1 | 11/2013 |
| WO | WO 2013/169849 A2 | 11/2013 |
| WO | WO 2013/169851 A2 | 11/2013 |
| WO | WO 2013/169853 A1 | 11/2013 |
| WO | WO 2013/169854 A2 | 11/2013 |
| WO | WO 2013/169870 A1 | 11/2013 |
| WO | WO 2013/169875 A2 | 11/2013 |
| WO | WO 2013/169877 A2 | 11/2013 |
| WO | WO 2013/169882 A2 | 11/2013 |
| WO | WO 2013/173838 A2 | 11/2013 |
| WO | WO 2014/105275 A1 | 7/2014 |
| WO | WO 2014/105276 A1 | 7/2014 |
| WO | WO 2014/105277 A1 | 7/2014 |
| WO | WO 2014/105278 A1 | 7/2014 |
| WO | WO 2014/105279 A1 | 7/2014 |
| WO | WO 2014/129655 A1 | 8/2014 |
| WO | WO 2014/149473 A1 | 9/2014 |
| WO | WO 2014/200733 A1 | 12/2014 |

OTHER PUBLICATIONS

Azundris, "A Fire in the Sky," http://web.archive.org/web/20140722062639/http://blog.azundrix.com/archives/168-A-fire-in-the-sky.html, Jul. 22, 2014, 8 pages.

b-log—betriebsraum weblog, "Extremely Efficient Menu Selection: Marking Menus for the Flash Platform," http://www.betriebsraum.de/blog/2009/12/11/extremely-efficient-menu-selection-marking-for-the-flash-platform, Dec. 11, 2009, 9 pages.

(56) References Cited

OTHER PUBLICATIONS

Clark, "Global Moxie, Touch Means a Renaissance for Radial Menus," http://globalmoxie.com/blog/radial-menus-for-touch-ui~print.shtml, Jul. 17, 2012, 7 pages.
Cohen, Cinemagraphs are Animated Gifs for Adults, http://www.tubefilter.com/2011/07/10/cinemagraph, Jul. 10, 2011, 3 pages.
CrackBerry Forums, Windows 8 Bezel Control and Gestures, http://wwwforums.crackberry.com/blackberry-playbook-f222/windows-8-bezel-control-gestures-705129/, Mar. 1, 2012, 8 pages.
Crook, "Microsoft Patenting Multi-Screen, Milti-Touch Gesures," http://techcrunch.com/2011/08/25/microsoft-awarded-patents-for-multi-screen-multi-touch-gestures/, Aug. 25, 2011, 8 pages.
cvil.ly—a design blog, Interesting Touch Interactions on Windows 8, http://cvil.ly/2011/06/04/interesting-touch-interactions-on-windows-8/, Jun. 4, 2011, 3 pages.
Drinkwater, "Glossary: Pre/Post Alarm Image Buffer," http://www.networkwebcams.com/ip-camera-learning-center/2008/07/17/glossary-prepost-alarm-image-buffer/, Jul. 17, 2008, 1 page.
Fenlon, "The Case for Bezel Touch Gestures on Apple's iPad," http://www.tested.com/tech/tablets/3104-the case-for-bezel-touch-gestures-on-apples-ipad/, Nov. 2, 2011, 6 pages.
Flixel, "Cinemagraph Pro for Mac", https://flixel.com/products/mac/cinemagraph-pro, 2014, 7 pages.
Flock, "Cinemagraphics: What It Looks Like When a Photo Moves," http://www.washingtonpost.com/blogs/blowpost/post/cinemagraphs-what-it-looks-like-when-a-photo-moves/2011/07-08/gl@AONez3H.blog.html, Jul. 12, 2011, 3 pages.
Forlines, et al., "Glimpse: a Novel Input Model for Multi-level Devices", Chi '05 Extended Abstracts on Human Factors in Computing Systems, Apr. 2, 2005, 4 pages.
IBM et al., "Pressure-Sensitive Icons", IBM Technical Disclosure Bulletin, vol. 33, No. 1B, Jun. 1, 1990, 3 pages.
iCIMS Recruiting Software, "Blackberry Playbook Review," http://www.tested.com/tech.tablets/5749-blackberry-playbook-review/, 2015, 11 pages.
Kronfli, "HTC Zoe Comes to Goole Play, Here's Everthing You Need to Know," Know Your Mobile, http://www.knowyourmobile.com/htc/htc-one/19550/what-htc-zoe, Aug. 14, 2014, 5 pages.
Laurie, "The Power of the Right Click," http://vlaurie.com/right-click/customize-context-menu.html, 2002-2016, 3 pages.
McRitchie, "Internet Explorer Right-Click Menus," http://web.archive.org/web-201405020/http:/dmcritchie.mvps.org/ie/rightie6.htm, May 2, 2014, 10 pages.
Microsoft, "Use Radial Menus to Display Commands in OneNote for Windows 8," https://support.office.com/en-us/article/Use-radial-menues-to-display-OneNote-commands-Od75f03f-cde7-493a-a8a0b2ed6f99fbe2, 2016, 5 pages.
Nikon, "Scene Recognition System and Advanced SRS," http://www.nikonusa.com/en.Learn-And-Explore/Article/ftlzi4rr/Scene-Recognition-System.html, Jul. 22, 2015, 2 pages.
Pallenberg, "Wow, the new iPad had gestures." https://plus.google.com/+SaschaPallenberg/posts/aaJtJogu8ac, Mar. 7, 2012, 2 pages.
PoliceOne.com, "COBAN Technoligies Pre-Event Buffer & Fail Safe Feature," http://www.policeone.com/police-products/police-technology/mobile-computures/videos/5955587-COBAN-Technologies-Pre-Event, Nov. 11, 2010, 2 pages.
Pradeep, "Android App Development—Microsoft Awarded With Patents on Gestures Supported on Windows 8," http://mspoweruser.com/microsoft-awarded-with-patents-on-gestures-supported-on-windows-8/, Aug. 25, 2011, 16 pages.
"Quickly Preview Songs in Windows Media Player 12 in Windows 7," Quickly Preview Songs in Windows Media Player 12 in Windows 7. How-to Geek, Apr. 28, 2010, Web. May 8, 2010, http://web.archive.org/web/20100502013134/http://www.howtogeek.com/howto/16157/quickly-preview-songs-in-windows-media-center-12-in-windows-7>, 6 pages.
Sony, "Intelligent Scene Recognition," https://www.sony-asia.com/article/252999/section/product/product/dsc-t77, downloaded on May 20, 2016, 5 pages.
Stross, "Wearing A Badge, and a Video Camera," The New York Times, http://www.nytimes.com/2013/04/07/business/wearable-video-cameras-for-police-offers.html? R=0, Apr. 6, 2013, 4 pages.
Taser, "Taser Axon Body Camera User Manual," https://www.taser.com/images/support/downloads/product-resourses/axon_body_product_manual.pdf, Oct. 1, 2013, 24 pages.
Tidwell, "Designing Interfaces," O'Reilly Media, Inc., USA, Nov. 2005, 348 pages.
Wikipedia, "AirDrop,", Wikipedia, the free encyclopedia, http://en.wikipedia.org/wiki/AirDrop, May 17, 2016, 5 pages.
Wikipedia, "Cinemagraph," Wikipedia, the free encyclopedia, http://en.wikipedia.org/wiki/Cinemagraph, Last Modified Mar. 16, 2016, 2 pages.
Wikipedia, "Context Menu," Wikipedia, the free encyclopedia https://en.wikipedia.org/wiki/Context menu, Last Modified May 15, 2016, 4 pages.
Wikipedia, "HTC One (M7)," Wikipedia, the free encyclopedia, https://en.wikipedia.org/wiki/HTC_One_(M7), Mar. 2013, 20 pages.
Wikipedia, "Mobile Ad Hoc Network," Wikipedia, the free encyclopedia, http://en.wikipedia.org/wiki/Mobile_ad_hoc_network, May 20, 2016, 4 pages.
Wikipedia, "Pie Menu," Wikipedia, the free encyclopedia, http://en.wikipedia.org/wiki/Pie_menu, Last Modified Jun. 4, 2016, 3 pages.
Wikipedia, "Quick Look," from Wikipedia, the free encyclopedia, https://en.wikipedia.org/wiki/Quick_Look, Last Modified Jan. 15, 2016, 3 pages.
Wikipedia, "Sony Xperia Z1", Wikipedia, the free encyclopedia, https://enwikipedia.org/wiki/Sony_Experia_Z1, Sep. 2013, 10 pages.
YouTube, "Blackberry Playbook bezel interaction," https://www.youtube.com/watch?v=YGkzFqnOwXl, Jan. 10, 2011, 2 pages.
Office Action, dated Dec. 18, 2015, received in Australian Patent Application No. 2013368440, which corresponds with U.S. Appl. No. 14/536,426, 3 pages.
Office Action, dated Apr. 5, 2016, received in Korean Patent Application No. 10-2015-7018851, which corresponds with U.S. Appl. No. 14/536,426, 7 pages.
Office Action, dated Jul. 21, 2016, received in European Patent Application No. 13795391.5, which corresponds with U.S. Appl. No. 14/536,426, 9 pages.
Office Action, dated Dec. 17, 2015, received in U.S. Appl. No. 14/536,426, 28 pages.
Final Office Action, dated May 6, 2016, received in U.S. Appl. No. 14/536,426, 23 pages.
Notice of Allowance, dated May 23, 2016, received in Australian Patent Application No. 2013259606, which corresponds with U.S. Appl. No. 14/536,426, 3 pages.
Office Action, dated Nov. 18, 2015, received in Australian Patent Application No. 2015101231, which corresponds with U.S. Appl. No. 14/536,426, 3 pages.
Decision to Grant, dated Jul. 14, 2016, received in European Patent Application No. 13724100.6, which corresponds with U.S. Appl. No. 14/536,426, 1 page.
Office Action, dated Mar. 4, 2016, received in Japanese Patent Application No. 2015-511644, which corresponds with U.S. Appl. No. 14/536,426, 3 pages.
Office Action, dated Feb. 1, 2016, received in Australian Patent Application No. 2013368441, which corresponds with U.S. Appl. No. 14/608,926, 3 pages.
Notice of Allowance, dated Mar. 30, 2016, received in Australian Patent Application No. 2013368441, which corresponds with U.S. Appl. No. 14/608,926, 1 page.
Certificate of Grant, dated Jul. 29, 2016, received in Australian Patent Application No. 2013368441, which corresponds with U.S. Appl. No. 14/608,926, 1 page.
Office Action, dated Apr. 21, 2016, received in European Patent Application No. 13795392.3, which corresponds with U.S. Appl. No. 14/608,926, 6 pages.
Office Action, dated May 6, 2016, received in European Patent Application No. 13795392.3, which corresponds with U.S. Appl. No. 14/608,926, 6 pages.

(56) References Cited

OTHER PUBLICATIONS

Office Action, dated Mar. 14, 2016, received in Japanese Patent Application No. 2015-549392, which corresponds with U.S. Appl. No. 14/608,926, 4 pages.
Office Action, dated May 12, 2016, received in Korean Patent Application No. 10-2015-7018853, which corresponds with U.S. Appl. No. 14/608,926, 4 pages.
Office Action, dated May 31, 2016, received in Australian Patent Application No. 2013259613, which corresponds with U.S. Appl. No. 14/536,646, 4 pages.
Notice of Allowance, dated Jul. 5, 2016, received in Australian Patent Application No. 2013259613, which corresponds with U.S. Appl. No. 14/536,646, 3 pages.
Office Action, dated Nov. 12, 2015, received in European Patent Application No. 13724102.2, which corresponds with U.S. Appl. No. 14/536,646, 6 pages.
Office Action, dated May 31, 2016, received in European Patent Application No. 13724102.2, which corresponds with U.S. Appl. No. 14/536,646, 5 pages.
Office Action, dated Feb. 29, 2016, received in Japanese Patent Application No. 2015-511645, which corresponds with U.S. Appl. No. 14/536,646, 5 pages.
Office Action, dated Jan. 7, 2016, received in European Patent Application No. 13726053.5, which corresponds with U.S. Appl. No. 14/536,141, 10 pages.
Office Action, dated Feb. 29, 2016, received in Japanese Patent Application No. 2015-511646, which corresponds with U.S. Appl. No. 14/536,141, 3 pages.
Office Action, dated Jan. 29, 2016, received in Australian Patent Application No. 2013368443, which corresponds with U.S. Appl. No. 14/536,141, 3 pages.
Notice of Allowance, dated Mar. 11, 2016, received in Australian Patent Application No. 2013368443, which corresponds with U.S. Appl. No. 14/536,141, 2 pages.
Certificate of Grant, dated Jul. 7, 2016, received in Australian Patent Application No. 2013368443, which corresponds with U.S. Appl. No. 14/536,141, 3 pages.
Office Action, dated Jul. 4, 2016, received in Japanese Patent Application No. 2015-549393, which corresponds with U.S. Appl. No. 14/536,141, 4 pages.
Office Action, dated Apr. 5, 2016, received in Korean Patent Application No. 10-2015-7018448, which corresponds with U.S. Appl. No. 14/536,141, 6 pages.
Office Action, dated Aug. 1, 2016, received in U.S. Appl. No. 14/536,203, 14 pages.
Notice of Allowance, dated Jun. 15, 2016, received in Australian Patent Applicatin No. 2013259630, which corresponds with U.S. Appl. No. 14/536,203, 3 pages.
Office Action, dated Nov. 11, 2015, received in European Patent Application No. 13724104.8, which corresponds with U.S. Appl. No. 14/536,203, 5 pages.
Office Action, dated May 31, 2016, received in European Patent Application No. 13724104.8, which corresponds with U.S. Appl. No. 14/536,203, 5 pages.
Office Action, dated Feb. 15, 2016, received in Japanese Patent Application No. 2015-511650, which corresponds with U.S. Appl. No. 14/536,203, 5 pages.
Notice of Allowance, dated Aug. 5, 2016, received in Japanese Patent Application No. 2015-511650, which corresponds with U.S. Appl. No. 14/536,203, 4 pages.
Office Action, dated Dec. 4, 2015, received in Korean Patent Application No. 2014-7034520, which corresponds with U.S. Appl. No. 14/536,203, 4 pages.
Office Action, dated Jul. 22, 2016, received in European Office Action No. 13798465.4, which corresponds with U.S. Appl. No. 14/608,965, 8 pages.
Notice of Allowance, dated Jun. 28, 2016, received in Australian Patent Application No. 2013259637, which corresponds with U.S. Appl. No. 14/536,267, 3 pages.
Office Action, dated Jan. 29, 2016, received in Japanese Patent Application No. 2015-511652, which corresponds with U.S. Appl. No. 14/536,267, 3 pages.
Office Action, dated Dec. 4, 2015, received in Korean Patent Application No. 2014-7034530, which corresponds with U.S. Appl. No. 14/536,267, 3 pages.
Office Action, dated Jul. 25, 2016, received in Australian Patent Application No. 2013259642, which corresponds with U.S. Appl. No. 14/536,291, 3 pages.
Office Action, dated Aug. 10, 2016, received in AustralianPatent Application No. 2013259642, which corresponds with U.S. Appl. No. 14/536,291, 4 pages.
Office Action, dated Jan. 7, 2016, received in European Patent Application No. 13724107.1, which corresponds with U.S. Appl. No. 14/536,291, 11 pages.
Office Action, dated Mar. 8, 2016, received in Japanese Patent Application No. 2015-511655, which corresponds with U.S. Appl. No. 14/536,291, 4 pages.
Office Action, dated Jan. 15, 2016, received in Australian Patent Application No. 2013368445, which corresponds with U.S. Appl. No. 14/608,985, 3 pages.
Office Action, dated Jul. 25, 2016, received in Japanese Patent Application No. 13811032.5, which corresponds with U.S. Appl. No. 14/608,985, 8 pages.
Office Action, dated Apr. 25, 2016, received in Japanese Patent Application No. 2015-550384, which corresponds with U.S. Appl. No. 14/608,985, 4 pages.
Office Action, dated Mar. 31, 2016, received in U.S. Appl. No. 14/864,737, 17 pages.
Notice of Allowance, dated Jul. 1, 2016, received in Chinese Patent Application No. 201620214376.7, which correresponds with U.S. Appl. No. 14/864,737, 3 pages.
Patent, dated Aug. 8, 2016, received in Chinese Patent Application No. 201620214376.7, which correresponds with U.S. Appl. No. 14/864,737, 5 pages.
Certificate of Registration, dated Jun. 20, 2016, received in German Patent Application No. 202016001845.1, which correresponds with U.S. Appl. No. 14/864,737, 3 pages.
Office Action, dated Apr. 5, 2016, received in Danish Patent Application No. 201500577, which corresponds with U.S. Appl. No. 14/864,737, 7 pages.
Intention to Grant, dated Aug. 2, 2016, received in Danish Patent Application No. 201500577, which corresponds with U.S. Appl. No. 14/864,737, 2 pages.
Office Action, dated Jun. 27, 2016, received in U.S. Appl. No. 14/866,981, 22 pages.
Office Action, dated May 10, 2016, received in Australian Patent Application No. 2016100254, which corresponds with U.S. Appl. No. 14/866,981, 6 pages.
Notice of Allowance, dated Jul. 27, 2016, received in Chinese Patent Application No. 201620176169.7, which corresponds with U.S. Appl. No. 14/866,981, 3 pages.
Certificate of Registration, dated Jun. 20, 2016, received in German Patent Application No. 202016001514.2, which corresponds with U.S. Appl. No. 14/864,737, 3 pages.
Office Action, dated Mar. 18, 2016, received in Danish Patent Application No. 2016100254, which corresponds with U.S. Appl. No. 14/866,981, 9 pages.
Office Action, dated May 19, 2016, received in Australian Patent Application No. 2016100251, which corresponds with U.S. Appl. No. 14/866,159, 5 pages.
Certificate of Registration, dated Jun. 16, 2016, received in German Patent No. 202016001483.9, which corresponds with U.S. Appl. No. 14/866,159, 3 pages.
Office Action, dated Mar. 9, 2016, received in Danish Patent Application No. 201500574, which corresponds with U.S. Appl. No. 14/866,159, 11 pages.
Innovation Patent Certificate, dated Aug. 4, 2016, received in Australian Patent Appliction No. 2016101201, which corresponds with U.S. Appl. No. 14/686,078, 1 page.
Certificate of Registration, dated Jun. 30, 2016, received in German Patent Application No. 20201600156.9, which corresponds with U.S. Appl. No. 14/868,078, 3 pages.

(56) References Cited

OTHER PUBLICATIONS

Office Action, dated Mar. 30, 2016, received in Australian Patent Application No. 201500588, which corresponds with U.S. Appl. No. 14/868,078, 9 pages.
Office Action, dated May 9, 2016, received in U.S. Appl. No. 14/863,432, 26 pages.
Office Action, dated Apr. 4, 2016, received in Danish Patent Application No. 201500582, which corresponds with U.S. Appl. No. 14/863,432, 10 pages.
Patent, dated Aug. 8, 2016, received in Australian Patent Application 2016100653, corresponds with U.S. Appl. No. 14/866,511, 1 page.
Office Action, dated Mar. 22, 2016, received in Danish Patent Application No. 201500576, which corresponds with U.S. Appl. No. 14/866,511, 10 pages.
Notice of Allowance, dated Jun. 8, 2016, received in Danish Patent Application No. 201500576, which corresponds with U.S. Appl. No. 14/866,511, 2 pages.
Office Action, dated May 10, 2016, received in U.S. Appl. No. 14/866,489, 15 pages.
Office Action, dated Mar. 28, 2016, received in U.S. Appl. No. 14/869,899, 17 pages.
Office Action, dated Jun. 28, 2016, received in U.S. Appl. No. 14/869,899, 5 pages.
Office Action, dated Feb. 3, 2016, received in Danish Patent Application No. 201500592, which corresponds with U.S. Appl. No. 14/869,899, 9 pages.
Office Action, dated Mar. 4, 2016, received in U.S. Appl. No. 14/866,992, 30 pages.
Final Office Action, dated Jul. 29, 2016, received in U.S. Appl. No. 14/866,992, 35 pages.
Office Action, dated Mar. 18, 2016, received in Danish Patent Application No. 201500593, which corresponds with U.S. Appl. No. 14/866,992, 10 pages.
Office Action, dated Jun. 27, 2016, received in Danish Patent Application No. 201500593, which corresponds with U.S. Appl. No. 14/866,992, 7 pages.
Office Action, dated Nov. 30, 2015, received in U.S. Appl. No. 14/845,217, 24 pages.
Final Office Action, dated Apr. 22, 2016, received in U.S. Appl. No. 14/845,217, 36 pages.
Office Action, dated Feb. 3, 2016, received in U.S. Appl. No. 14/856,517, 36 pages.
Final Office Action, dated Jul. 13, 2016, received in U.S. Appl. No. 14/856,517, 30 pages.
Office Action, dated Feb. 11, 2016, received in U.S. Appl. No. 14/856,519, 34 pages.
Final Office Action, dated Jul. 15, 2016, received in U.S. Appl. No. 14/856,519, 31 pages.
Office Action, dated Feb. 1, 2016, received in U.S. Appl. No. 14/857,645, 15 pages.
Final Office Action, dated Jun. 16, 2016, received in U.S. Appl. No. 14/857,645, 12 pages.
Office Action, dated Jan. 25, 2016, received in U.S. Appl. No. 14/864,580, 29 pages.
Notice of Allowance, dated May 23, 2016, received in U.S. Appl. No. 14/864,580, 9 pages.
Corrected Notice of Allowability, dated Jun. 16, 2016, received in U.S. Appl. No. 14/864,580, 2 pages.
Notice of Allowance, dated Aug. 4, 2016, received in U.S. Appl. No. 14/864,580, 9 pages.
Office Action, dated Apr. 8, 2016, received in Danish Patent Application No. 201500584, which corresponds with U.S. Appl. No. 14/864,580, 9 pages.
Office Action, dated Apr. 19, 2016, received in U.S. Appl. No. 14/864,627, 9 pages.
Office Action, dated Apr. 8, 2016, received in Danish Patent Application No. 201500585, which corresponds with U.S. Appl. No. 14/864,627, 9 pages.
Office Action, dated Mar. 29, 2016, received in U.S. Appl. No. 14/866,361, 22 pages.
Notice of Allowance, dated Jul. 19, 2016, received in U.S. Appl. No. 14/866,361, 8 pages.
Office Action, dated Jun. 10, 2016, received in Australian Patent Application No. 2016100292, which corresponds with U.S. Appl. No. 14/866,361, 4 pages.
Notice of Allowance/Grant, dated Jul. 1, 2016, received in Chinese Patent Application No. 201620251706.X, which corresponds with U.S. Appl. No. 14/866,361, 3 pages.
Letters Patent, dated Aug. 3, 2016, received in Chinese Patent Application No. 201620251706.X, which corresponds with U.S. Appl. No. 14/866,361, 3 pages.
Certificate of Registration, dated Jun. 24, 2016, received in German Patent Application No. 202016001819.2, which corresponds with U.S. Appl. No. 14/866,361, 3 pages.
Office Action, dated Apr. 7, 2016, received in Danish Patent Application No. 201500579, which corresponds with U.S. Appl. No. 14/866,361, 10 pages.
Patent, dated Aug. 8, 2016, received in Australian Patent Application No. 2016100649, which corresponds with U.S. Appl. No. 14/866,987, 1 page.
Office Action, dated Mar. 22, 2016, received in Danish Patent Application No. 201500587, which corresponds with U.S. Appl. No. 14/866,987, 8 pages.
Notice of Allowance, dated Jun. 10, 2016, received in Danish Patent Application No. 201500587, which corresponds with U.S. Appl. No. 14/866,987, 2 pages.
Certificate of Exam, dated Jul. 21, 2016, received in Australian Patent Application No. 2016100652, which corresponds with U.S. Appl. No. 14/866,989, 1 page.
Office Action, dated Apr. 1, 2016, received in Danish Patent Application No. 201500589, which corresponds with U.S. Appl. No. 14/866,989, 8 pages.
Notice of Allowance, dated Jun. 10, 2016, received in Danish Patent Application No. 201500589, which corresponds with U.S. Appl. No. 14/866,989, 2 pages.
Office Action, dated Apr. 11, 2016, received in U.S. Appl. No. 14/871,236, 23 pages.
Office Action, dated Jun. 28, 2016, received in U.S. Appl. No. 14/871,236, 21 pages.
Office Action, dated Apr. 8, 2016, received in Danish Patent Application No. 201500595, which corresponds with U.S. Appl. No. 14/871,236, 12 pages.
Office Action, dated May 26, 2016, received in Danish Patent Application No. 201500595, which corresponds with U.S. Appl. No. 14/871,236, 14 pages.
Office Action, dated Apr. 6, 2016, received in Danish Patent Application No. 201500596, which corresponds with U.S. Appl. No. 14/870,882, 7 pages.
Office Action, dated Jun. 9, 2016, received in Danish Patent Application No. 201500596, which corresponds with U.S. Appl. No. 14/870,882, 9 pages.
Office Action, dated Apr. 7, 2016, received in Danish Patent Application No. 201500597, which corresponds with U.S. Appl. No. 14/871,227, 7 pages.
Notice of Allowance, dated Jun. 21, 2016, received in Danish Patent Application No. 201500597, which corresponds with U.S. Appl. No. 14/871,227, 2 pages.
Office Action, dated Apr. 18, 2016, received in Danish Patent Application No. 201500601, which corresponds with U.S. Appl. No. 14/871,336, 8 pages.
Notice of Allowance, dated Apr. 18, 2016, received in Danish Patent Application No. 201500600, which corresponds with U.S. Appl. No. 14/871,462, 7 pages.
Office Action, dated Apr. 29, 2016, received in U.S. Appl. No. 14/867,823, 28 pages.
Office Action, dated Mar. 18, 2016, received in Danish Patent Application No. 201500594, which corresponds with U.S. Appl. No. 14/867,823, 10 pages.
Office Action, dated May 10, 2016, received in U.S. Appl. No. 14/867,892, 28 pages.

(56) References Cited

OTHER PUBLICATIONS

Office Action, dated Mar. 21, 2016, received in Danish Patent Application No. 201500598, which corresponds with U.S. Appl. No. 14/867,892, 9 pages.
Office Action, dated May 23, 2016, received in Australian Patent Application No. 2016100253, which corresponds with U.S. Appl. No. 14/867,990, 5 pages.
Certificate of Registration, dated Jun. 16, 2016, received in German Patent No. 202016001489.8, which corresponds with U.S. Appl. No. 14/867,990, 3 pages.
Office Action, dated Mar. 18, 2016, received in Danish Patent Application No. 201500581, which corresponds with U.S. Appl. No. 14/867,990, 9 pages.
International Preliminary Report on Patentability, dated Jun. 30, 2015, received in International Patent Application No. PCT/US2013/069479, which corresponds with U.S. Appl. No. 14/608,926, 11 pages.
International Search Report and Written Opinion, dated Apr. 25, 2016, received in International Patent Application No. PCT/US2016/018758, which corresponds with U.S. Appl. No. 14/866,159, 15 pages.
International Search Report and Written Opinion, dated Jul. 21, 2016, received in International Patent Application No. PCT/US2016/019913, which corresponds with U.S. Appl. No. 14/868,078, 16 pages.
Bautisa, "Microsoft Mathematics Tutorial 7—The Ink Input", <URL:http://mathandmultimedia.com/2012/05/23/microsoft-math-tutorial-7-ink>, May 23, 2012, 3 pages.
Davidson, et al., "Extending 2D Object Arrangement with Pressure-Sensitive Layering Cues", Proceedings of the 21st Annual ACM Symposium on User Interface Software and Technology, Oct. 19, 2008, 4 pages.
Dinwiddie, et al., "Combined-User Interface for Computers, Television, Video Recorders, and Telephone, Etc", ip.com Journal, Aug. 1, 1990, 3 Pages.
Harrison, "Stylus-Based Interface with Full Mouse Emulation", IBM Technical Disclosure Bulletin, vol. 34, No. 10B, Mar. 1, 1992, 3 pages.
Kaaresoja, et al., "Snap-Crackle-Pop: Tactile Feedback for Mobile Touch Screens", Proceedings of Eurohaptics vol. 2006, Jul. 3, 2006, 2 pages.
Minsky, "Computational Haptics The *Sandpaper* System for Synthesizing Texture for a Force-Feedback Display," Massachusetts Institute of Technology, Jun. 1978, 217 pages.
O'Hara, et al., "Pressure-Sensitive Icons", ip.com Journal, Jun. 1, 1990, 2 Pages.
Quinn, et al., "Zoofing! Faster List Selections with Pressure-Zoom-Flick-Scrolling", Proceedings of the 21st Annual Conference of the Australian Computer-Human Interaction Special Interest Group on Design, Nov. 23, 2009, ACM Press, vol. 411, 8 pages.
Rekimoto, et al., "PreSense: Interaction Techniques for Finger Sensing Input Devices", Proceedings of the 16th Annual ACM Symposium on User Interface Software and Technology, Nov. 30, 2003, 10 pages.
Rekimoto, et al., "PreSensell: Bi-directional Touch and Pressure Sensing Interactions with Tactile Feedback", Conference on Human Factors in Computing Systems Archive, ACM, Apr. 22, 2006, 6 pages.
Song, et al., "Grips and Gestures on a Multi-Touch Pen," The ACM CHI Conference on Human Factors in Computing Systems, <URL:research.microsoft.com/pubs/
/gripsandgenstures%20mtpen-chi201>, May 7-12, 2011, 10 pages.
Office Action, dated Jul. 15, 2015, received in Australian Patent Application No. 2013259606, which corresponds with U.S. Appl. No. 14/536,426, 3 pages.
Office Action, dated Jul. 17, 2015, received in Australian Patent Application No. 2013259613, which corresponds with U.S. Appl. No. 14/536,646, 5 pages.

Office Action, dated Aug. 27, 2015, received in Australian Patent Application No. 2013259614, which corresponds with U.S. Appl. No. 14/536,141, 4 pages.
Office Action, dated Jul. 9, 2015, received in Australian Patent Application No. 2013259630, which corresponds with U.S. Appl. No. 14/536,203, 3 pages.
Office Action, dated Aug. 10, 2015, received in Australian Patent Application No. 2013259637, which corresponds with U.S. Appl. No. 14/536,203, 3 pages.
Office Action, dated Aug. 18, 2015, received in Australian Patent Application No. 2013259642, which corresponds with U.S. Appl. No. 14/536,291, 3 pages.
International Search Report and Written Opinion dated May 26, 2014, received in International Application No. PCT/US2013/040053, which corresponds to U.S. Appl. No. 14/535,671, 32 pages.
International Preliminary Report on Patentability dated Nov. 20, 2014, received in International Application No. PCT/US2013/040053, which corresponds to U.S. Appl. No. 14/535,671, 26 pages.
Invitation to Pay Additional Fees dated Feb. 10, 2014, received in International Application No. PCT/US2013/069472, which corresponds to U.S. Appl. No. 14/608,895, 6 pages.
International Search Report and Written Opinion dated Apr. 7, 2014, received in International Application No. PCT/US2013/069472, which corresponds to U.S. Appl. No. 14/608,895, 24 pages.
International Preliminary Report on Patentability, dated Jun. 30, 2015, received in International Patent Application No. PCT/US2013/069472, which corresponds with U.S. Appl. No. 14/608,895, 18 pages.
International Search Report and Written Opinion dated Aug. 7, 2013, received in International Application No. PCT/US2013/040054, which corresponds to U.S. Appl. No. 14/536,235, 12 pages.
International Preliminary Report on Patentability dated Nov. 20, 2014, received in International Application No. PCT/US2013/040054, which corresponds to U.S. Appl. No. 14/536,235, 11 pages.
International Search Report and Written Opinion dated Aug. 7, 2013, received in International Application No. PCT/US2013/040056, which corresponds to U.S. Appl. No. 14/536,367, 12 pages
International Preliminary Report on Patentability dated Nov. 20, 2014, received in International Application No. PCT/US2013/040056, which corresponds to U.S. Appl. No. 14/536,367, 11 pages.
International Search Report and Written Opinion dated Aug. 6, 2013, received in International Application No. PCT/US2013/040058, which corresponds to U.S. Appl. No. 14/536,426, 12 pages.
International Preliminary Report on Patentability dated Nov. 20, 2014, received in International Application No. PCT/US2013/040058, which corresponds to U.S. Appl. No. 14/536,426, 11 pages.
Invitation to Pay Additional Fees dated Sep. 25, 2013, received in International Application No. PCT/US2013/040061, which corresponds to U.S. Appl. No. 14/536,464, 6 pages.
International Search Report and Written Opinion dated Feb. 5, 2014, received in International Application No. PCT/US2013/040061, which corresponds to U.S. Appl. No. 14/536,464, 30 pages.
International Preliminary Report on Patentability dated Nov. 20, 2014, received in International Application No. PCT/US2013/040061, which corresponds to U.S. Appl. No. 14/536,464, 26 pages.
Invitation to Pay Additional Fees dated Oct. 8, 2013, received in International Application No. PCT/US2013/040067, which corresponds to U.S. Appl. No. 14/536,644, 8 pages.
International Search Report and Written Opinion dated May 8, 2014, received in International Application No. PCT/US2013/040067, which corresponds to U.S. Appl. No. 14/536,644, 45 pages.
International Preliminary Report on Patentability dated Nov. 20, 2014, received in International Application No. PCT/US2013/040067, which corresponds to U.S. Appl. No. 14/536,644, 36 pages.
International Search Report and Written Opinion dated Mar. 12, 2014, received in International Application No. PCT/US2013/069479, which corresponds with U.S. Appl. No. 14/608,926, 14 pages.
International Search Report and Written Opinion dated Aug. 7, 2013, received in International Application No. PCT/US2013/040070, which corresponds to U.S. Appl. No. 14/535,646, 12 pages.

(56) References Cited

OTHER PUBLICATIONS

International Preliminary Report on Patentability dated Nov. 20, 2014, received in International Application No. PCT/US2013/040070, which corresponds to U.S. Appl. No. 14/535,646, 10 pages.
Invitation to Pay Additional Fees dated Oct. 28, 2013, received in International Application No. PCT/US2013/040072, which corresponds to U.S. Appl. No. 14/536,141, 7 pages.
International Search Report and Written Opinion dated Apr. 7, 2014, received in International Application No. PCT/US2013/040072, which corresponds to U.S. Appl. No. 14/536,141, 38 pages.
International Preliminary Report on Patentability dated Nov. 20, 2014, received in International Application No. PCT/US2013/040072, which corresponds to U.S. Appl. No. 14/536,141, 32 pages.
Invitation to Pay Additional Fees dated Feb. 14, 2014, received in International Application No. PCT/US2013/069483, which corresponds with U.S. Appl. No. 14/608,942, 7 pages.
International Search Report and Written Opinion dated Apr. 7, 2014, received in International Application No. PCT/US2013/069483, which corresponds with U.S. Appl. No. 14/608,942, 18 pages.
International Preliminary Report on Patentability, dated Jun. 30, 2015, received in International Application No. PCT/2013/069483, which corresponds to U.S. Appl. No. 14/608,942, 13 pages.
Invitation to Pay Additional Fees dated Oct. 28, 2013, received in International Application No. PCT/US2013/040087, which corresponds to U.S. Appl. No. 14/536,166, 8 pages.
International Search Report and Written Opinion dated Mar. 3, 2014, received in International Application No. PCT/US2013/040087, which corresponds to U.S. Appl. No. 14/536,166, 35 pages.
International Preliminary Report on Patentability dated Nov. 20, 2014, received in International Application No. PCT/2013/040087, which corresponds to U.S. Appl. No. 14/536,166, 29 pages.
International Search Report and Written Opinion dated Aug. 7, 2013, received in International Application No. PCT/US2013/040093, which corresponds to U.S. Appl. No. 14/536,203, 11 pages.
International Preliminary Report on Patentability dated Nov. 20, 2014, received in International Application No. PCT/2013040093, which corresponds to U.S. Appl. No. 14/536,203, 9 pages.
Invitation to Pay Additional Fees dated Apr. 17, 2014, received in International Application No. PCT/US2013/069484, which corresonds with U.S. Appl. No. 14/608,965, 7 pages.
International Search Report and Written Opinion dated Jul. 9, 2014, received in International Application No. PCT/US2013/069484, which corresonds with U.S. Appl. No. 14/608,965, 17 pages.
International Preliminary Report on Patentability, dated Jun. 30, 2015, received in International Patent Application No. PCT/US2013/069484, which corresponds with U.S. Appl. No. 14/608,965, 12 pages.
Invitation to Pay Additional Fees dated Sep. 25, 2013, received in International Application No. PCT/US2013/040098, which corresponds to U.S. Appl. No. 14/536,247, 8 pages.
International Search Report and Written Opinion dated Feb. 5, 2014, received in International Application No. PCT/US2013/040098, which corresponds to U.S. Appl. No. 14/536,247, 35 pages.
International Preliminary Report on Patentability dated Nov. 20, 2014, received in International Application No. PCT/2013/040098, which corresponds to U.S. Appl. No. 14/536,247, 27 pages.
Invitation to Pay Additional Fees dated Aug. 7, 2013, received in International Application No. PCT/US2013/040101, which corresponds to U.S. Appl. No. 14/536,267, 7 pages.
International Search Report and Written Opinion dated Jan. 27, 2014, received in International Application No. PCT/US2013/040101, which corresponds to U.S. Appl. No. 14/536,267, 30 pages.
International Preliminary Report on Patentability dated Nov. 20, 2014, received in International Application No. PCT/2013/040101, which corresponds to U.S. Appl. No. 14/536,267, 24 pages.
Invitation to Pay Additional Fees dated Aug. 7, 2013, received in International Application No. PCT/US2013/040108, which corresponds to U.S. Appl. No. 14/536,291, 6 pages.
International Search Report and Written Opinion dated Jan. 8, 2014, received in International Application No. PCT/US2013/040108, which corresponds to U.S. Appl. No. 14/536,291, 30 pages.
International Preliminary Report on Patentability dated Nov. 20, 2014, received in International Application No. PCT/2013/040108, which corresponds to U.S. Appl. No. 14/536,291, 25 pages.
Invitation to Pay Additional Fees dated Apr. 1, 2014, received in International Application No. PCT/US2013/069486, which corresponds with U.S. Appl. No. 14/608,985, 7 pages.
International Search Report and Written Opinion dated Jun. 2, 2014, received in International Application No. PCT/US2013/069486, which corresponds with U.S. Appl. No. 14/608,985, 7 pages.
International Preliminary Report on Patentability, dated Jun. 30, 2015, received in International Patent Application No. PCT/US2013/069486, which corresponds with U.S. Appl. No. 14/608,985, 19 pages.
International Search Report and Written Opinion dated Mar. 6, 2014, received in International Application No. PCT/US2013/069489, which corresponds with U.S. Appl. No. 14/609,006, 12 pages.
International Preliminary Report on Patentability, dated Jun. 30, 2015, received in International Patent Application No. PCT/US2013/069489, which corresponds with U.S. Appl. No. 14/609,006, 10 pages.
International Search Report and Written Opinion dated Sep. 30, 2014, received in International Application No. PCT/US2014/047303, which corresponds with U.S. Appl. No. 14/030,682, 10 pages.
Angelov, "Sponsor Flip Wall With Jquery & CSS", Tutorialzine. N.p., Mar. 24, 2010. Web. http://tutorialzine.com/2010/03/sponsor-wall-slip-jquery-cssi, Mar. 24, 2010, 8 pages.
Anonymous, "Nokia 808 PureView screenshots", retrieved from Internet; no URL, Nov. 12, 2012, 8 pages.
Anonymous, "Nokia 808 PureView User Guide," http://download-fds.webapps.microsoft.com/supportFiles/phones/files/pdf_guides/devices/808/Nokia _808_UG_en_APAC.pdf, Jan. 1, 2012, 144 pages.
Anonymous, "Notifications, Android 4.4 and Lower", Android Developers, https://developer.android.com/design/patterns/notifications_k.html, May 24, 2015, 9 pages.
Bolluyt, "5 Apple Watch Revelations from Apple's New WatchKit", http://www.cheatsheetcom/tecnology/5-apple-watch-revelations-from-apples-new-watchkit.html/?a=viewall, Nov. 22, 2014, 3 pages.
Dzyre, "10 Android Notification Features You Can Fiddle With", http://www.hongkiat.com/blog/android-notification-features, Mar. 10, 2014, 10 pages.
Elliot, "Mac System 7", YouTube. Web. Mar. 8, 2017, http://www.youtube.com/watch?v=XLv22hfuuik, Aug. 3, 2011, 1 page.
Farshad, "SageThumbs-Preview and Convert Pictures From Windows Context Menu", https://web.addictivetips.com/windows-tips/sagethumbs-preview-and-convert-photos-from-windows-context-menu, Aug. 8, 2011, 5 pages.
Flaherty, "Is Apple Watch's Pressure-Sensitive Screen a Bigger Deal Than the Gadget Itself?", http://www.wired.com/2014/09/apple-watchs-pressure-sensitive-screen-bigger-deal-gadget, Sep. 15, 2014, 3 pages.
Gardner, "Recenz—Recent Apps in One Tap", You Tube, https://www.youtube.com/watch?v=qailSHRgsTo, May 15, 2015, 1 page.
Gonzalo et al., "Zliding: Fluid Zooming and Sliding for High Precision Parameter Manipulation", Department of Computer Science, University of Toronto, Seattle, Washington, Oct. 23, 2005, 10 pages.
Grant, "Android's Notification Center", https://www.objc.io/issues/11-android/android-notifications, Apr. 30, 2014, 26 pages.
iPodHacks 142: "Water Ripple Effects on the Home and Lock Screen: AquaBoard Cydia Tweak Review", YouTube, https://www.youtube.comwatch?v-Auu_uRaYHJs, Sep. 24, 2012, 3 pages.
Kiener, "Force Touch on iPhone", https://www.youtube.com/watch?v=CEMmnsU5fC8, Aug. 4, 2015, 4 pages.
Kost, "LR3-Deselect All Images But One", Julieanne Kost's Blog, blogs.adobe.com/jkost/2011/12/lr3-deselect-all-images-but-one.html, Dec. 22, 2011, 1 page.

(56) References Cited

OTHER PUBLICATIONS

Kumar, "How to Enable Ripple Effect on Lock Screen of Galaxy S2", YouTube, http, http://www.youtube.com/watch?v+B9-4M5abLXA, Feb. 12, 2013, 3 pages.
Matthew, "How to Preview Photos and Images From Right-Click Context Menue in Windows [Tip]", https://dottech.org/159009/add-image-preview-in-windows-context-menu-tip, Jul. 4, 2014, 5 pages.
Microsoft, "Lumia—How to Personalize Your Start Screen", https://www.youtube.com/watch?v=6GI5Z3TrSEs, Nov. 11, 2014, 3 pages.
Mitroff, "Google Android 5.0 Lollipop," http://www.cnet.com/products/google-android-5-0-lollipop, Mar. 12, 2015, 5 pages.
Mohr, "Do Not Disturb—The iPhone Feature You Should Be Using", http.www.wonderoftech.com/do-not-disturb-iphone, Jul. 14, 2014, 30 pages.
Nacca, "NiLS Lock Screen Notifications / Floating Panel—Review", https://www.youtube.com/watch?v=McT4QnS9TDY, Feb. 3, 2014, 4 pages.
Phonebuff, "How to Pair Bluetooth on the iPhone", https://www.youtube.com/watch?v=LudNwEar9A8, Feb. 8, 2012, 3 pages.
VGJFeliz, "How to Master Android Lollipop Notifications in Four Minutes!", https://www.youtube.com/watch?v=S-zBRG7GJgs, Feb. 8, 2015, 5 pages.
Office Action, dated Mar. 15, 2017, received in U.S. Appl. No. 14/535,671, 13 pages.
Office Action, dated Oct. 18, 2016, received in Australian Patent Application No. 2013368440, which corresponds with U.S. Appl. No. 14/536,426, 3 pages.
Notice of Allowance, dated Dec. 20, 2016, received in Australian Patent Application No. 2013368440, which corresponds, with U.S. Appl. No. 14/536,426, 3 pages.
Office Action, dated Sep. 13, 2016, received in Japanese Patent Application No. 2015-547948, which corresponds with U.S. Appl. No. 14/536,426, 5 pages.
Office Action, dated Feb. 24, 2017, received in Korean Patent Application No. 10-2015-7018851, which corresponds with U.S. Appl. No. 14/536,426, 3 pages.
Certificate of Grant, dated Sep. 15, 2016, received in Australian Patent Australian Patent Application No. 2013259606, which corresponds with U.S. Appl. No. 14/536,426, 1 page.
Letters Patent, dated Aug. 10, 2016, received in European Patent Application No. 13724100.6, which corresponds with U.S. Appl. No. 14/536,426, 1 page.
Office Action, dated Jan. 20, 2017, received in European Patent Application No. 15183980.0, which corresponds with U.S. Appl. No. 14/536,426, 5 pages.
Office Action, dated Feb. 6, 2017, received in Japanese Patent Application No. 2015-511644, which corresponds with U.S. Appl. No. 14/536,426, 6 pages.
Office Action, dated Mar. 9, 2017, received in U.S. Appl. No. 14/536,464, 21 pages.
Office Action, dated Jan. 3, 2017, received in Australian Patent Application No. 2016201451, which corresponds with U.S. Appl. No. 14/608,926, 3 pages.
Office Action, dated Nov. 11, 2016, received in European Patent Application No. 13795392.3, which corresponds with U.S. Appl. No. 14/608,926, 6 pages.
Notice of Allowance, dated Jan. 17, 2017, received in Japanese Patent Application No. 2015-549392, which corresponds with U.S. Appl. No. 14/608,926, 2 pages.
Patent, dated Feb. 17, 2017, received in Japanese Patent Application No. 2015-549392, which corresponds with U.S. Appl. No. 14/608,926, 3 pages.
Office Action, dated Dec. 1, 2016, received in Chinese Patent Application No. 2013800362059, which corresponds with U.S. Appl. No. 14/536,646, 3 pages.
Notice of Allowance, dated Jan. 4, 2017, received in European Patent Application No. 13724102.2, which corresponds with U.S. Appl. No. 14/536,646, 5 pages.
Notice of Allowance, dated Dec. 22, 2016, received in Japanese Patent Application No. 2015-511645, which corresponds with U.S. Appl. No. 14/536,646, 2 pages.
Office Action, dated Mar. 3, 2017, received in Chinese Patent Application No. 201380035893.7, which corresponds with U.S. Appl. No. 14/536,646, 8 pages.
Notice of Allowance, dated Aug. 15, 2016, received in Australian Patent Application No. 2013259614, which corresponds with U.S. Appl. No. 14/536,141, 1 page.
Office Action, dated Aug. 31, 2016, received in European Patent Application No. 13726053.5, which corresponds with U.S. Appl. No. 14/536,141, 10 pages.
Office Action, dated Oct. 25, 2016, received in Japanese Patent Application No. 2015-511646, which corresponds with U.S. Appl. No. 14/536,141, 6 pages.
Office Action, dated Dec. 8, 2016, received in U.S. Appl. No. 14/608,942, 9 pages.
Office Action, dated Oct. 7, 2016, received in European Patent Application No. 13798464.7, which corresponds with U.S. Appl. No. 14/608,942, 7 pages.
Office Action, dated Feb. 24, 2017, received in Korean Patent Application No. 2015-7018448, which corresponds with U.S. Appl. No. 14/536,141, 4 pages.
Notice of Allowance, dated Feb. 1, 2017, received in U.S. Appl. No. 14/536,203, 9 pages.
Certificate of Grant, dated Oct. 21, 2016, received in Australian Patent Application No. 2013259630, which corresponds with U.S. Appl. No. 14/536,203, 3 pages.
Certificate of Patent, dated Sep. 9, 2016, received in Japanese Patent Application No. 2015-511650, which corresponds with U.S. Appl. No. 14/536,203, 3 pages.
Notice of Allowance, dated Sep. 1, 2016, received in Korean Patent Application No. 2014-7034520, which corresponds with U.S. Appl. No. 14/536,203, 5 pages.
Office Action, dated Feb. 6, 2017, received in Korean Patent Application No. 2016-7033834, which corresponds with U.S. Appl. No. 14/536,203, 4 pages.
Office Action, dated Oct. 20, 2016, received in U.S. Appl. No. 14/536,247, 10 pages.
Final Office Action, dated Mar. 24, 2017, received in U.S. Appl. No. 14/536,247, 14 pages.
Office Action, dated Mar. 24, 2017, received in U.S. Appl. No. 14/536,267, 12 pages.
Certificate of Grant, dated Oct. 21, 2016, received in Australian Patent Application No. 2013259637, which corresponds with U.S. Appl. No. 14/536,267, 3 pages.
Office Action, dated Mar. 24, 2017, received in Australian Patent Application No. 2016204411, which corresponds with U.S. Appl. No. 14/536,267, 3 pages.
Office Action, dated Dec. 9, 2016, received in Chinese Patent Application No. 2016120601564130, which corresponds with U.S. Appl. No. 14/536,267, 4 pages.
Notice of Allowance, dated Sep. 26, 2016, received in Japanese Patent Application No. 2015-511652, which corresponds with U.S. Appl. No. 14/536,267, 5 pages.
Office Action, dated Mar. 3, 2017, received in Japanese Patent Application No. 2016-125839, which corresponds with U.S. Appl. No. 14/536,267, 6 pages.
Notice of Allowance, dated Sep. 1, 2016, received in Korean Patent Application No. 2014-7034530, which corresponds with U.S. Appl. No. 14/536,267, 3 pages.
Office Action, dated Jan. 5, 2017, received in Korean Patent Application No. 2016-7029533, which corresponds with U.S. Appl. No. 14/536,267, 2 pages.
Innovation Patent, dated Sep. 1, 2016, received in Australian Patent Application No. 2016101481, which corresponds with U.S. Appl. No. 14/536,291, 1 page.
Office Action, dated Sep. 29, 2016, received in Australian Patent Application No. 2016101481, which corresponds with U.S. Appl. No. 14/536,291, 3 pages.
Office Action, dated Aug. 22, 2016, received in European Patent Application No. 13724107.1, which corresponds with U.S. Appl. No. 14/536,291, 7 pages.

(56) References Cited

OTHER PUBLICATIONS

Final Office Action, dated Dec. 22, 2016, received in Japanese Patent Application No. 2015-511655, which corresponds with U.S. Appl. No. 14/536,291, 3 pages.
Notice of Allowance, dated Jan. 18, 2017, received in Australian Patent Application No. 2013368445, which corresponds with U.S. Appl. No. 14/608,985, 3 pages.
Office Action, dated Feb. 27, 2017, received in European Patent Application No. 13811032.5, which corresponds with U.S. Appl. No. 14/608,985, 6 pages.
Notice of Allowance, dated Jan. 24, 2017, received in Japanese Patent Application No. 2015-550384, which corresponds with U.S. Appl. No. 14/608,985, 5 pages.
Patent, dated Feb. 24, 2017, received in Japanese Patent Application No. 2015-550384, which corresponds with U.S. Appl. No. 14/608,985, 2 pages.
Office Action, dated Nov. 4, 2016, received in Korean Patent Application No. 10-2015-7019984, which corresponds with U.S. Appl. No. 14/608,985, 8 pages.
Office Action, dated Mar. 24, 2017, received in U.S. Appl. No. 14/609,006, 13 pages.
Office Action, dated Jan. 19, 2017, received in U.S. Appl. No. 14/609,042, 12 pages.
Notice of Allowance, dated Feb. 27, 2017, received in U.S. Appl. No. 14/864,737, 9 pages.
Notice of Allowance, dated Oct. 24, 2016, received in U.S. Appl. No. 14/866,981, 7 pages.
Notice of Allowance, dated Feb. 10, 2017, received in U.S. Appl. No. 14/866,981, 5 pages.
Patent, dated Nov. 2, 2016, received in Australian Patent Application No. 2016100254, which corresponds with U.S. Appl. No. 14/866,981, 1 page.
Patent, dated Sep. 28, 2016, received in Chinese Patent Application No. 201620176169.7, which corresponds with U.S. Appl. No. 14/866,981, 4 pages.
Office Action, dated Dec. 5, 2016, received in Danish Patent Application No. 201500575, which corresponds with U.S. Appl. No. 14/866,981, 3 pages.
Office Action, dated Jul. 5, 2016, received in Chinese Patent Application No. 201620186008.6, which corresponds with U.S. Appl. No. 14/866,159, 3 pages.
Office Action, dated Sep. 27, 2016, received in Danish Patent Application No. 201500574, which corresponds with U.S. Appl. No. 14/866,159, 4 pages.
Office Action, dated Mar. 14, 2017, received in Danish Patent Application No. 201500574, which corresponds with U.S. Appl. No. 14/866,159, 5 pages.
Office Action, dated Oct. 12, 2016, received in Australian Patent Application No. 2016101201, which corresponds with U.S. Appl. No. 14/686,078, 3 pages.
Notice of Allowance, dated Oct. 1, 2016, received in Chinese Patent Application No. 201620175847.8, which corresponds with U.S. Appl. No. 14/686,078, 1 page.
Office Action, dated Sep. 2, 2016, received in Danish Patent Application No. 201500588, which corresponds with U.S. Appl. No. 14/868,078, 4 pages.
Notice of Allowance, dated Jan. 30, 2017, received in received in Danish Patent Application No. 201500588, which corresponds with U.S. Appl. No. 14/868,078, 2 pages.
Notice of Allowance, dated Nov. 14, 2016, received in U.S. Appl. No. 14/863,432, 7 pages.
Office Action, dated Aug. 19, 2016, received in Australian Patent Application No. 2016100647, which corresponds with U.S. Appl. No. 14/863,432, 5 pages.
Notice of Allowance, dated Jan. 12, 2017, received in Chinese Patent Application No. 201620470063.8, which corresponds with U.S. Appl. No. 14/863,432, 1 page.
Office Action and Additional Search Report, dated Oct. 7, 2016, received in Danish Patent Application No. 201500582, which corresponds with U.S. Appl. No. 14/863,432, 6 pages.
Office Action, dated Oct. 13, 2016, received in U.S. Appl. No. 14/866,511, 27 pages.
Final Office Action, dated Jan. 27, 2017, received in U.S. Appl. No. 14/866,511, 26 pages.
Notice of Allowance, dated Jan. 12, 2017, received in Chinese Patent Application No. 201620470281.1, which corresponds with U.S. Appl. No. 14/866,511, 1 page.
Patent, dated Jan. 23, 2017, received in Danish Patent Application No. 201500576, which corresponds with U.S. Appl. No. 14/866,511, 3 pages.
Final Office Action, dated Sep. 16, 2016, received in U.S. Appl. No. 14/866,489, 24 pages.
Final Office Action, dated Sep. 2, 2016, received in U.S. Appl. No. 14/869,899, 22 pages.
Notice of Allowance, dated Feb. 28, 2017, received in U.S. Appl. No. 14/869,899, 9 pages.
Innovation (Unexamined) Patent, dated Aug. 25, 2016, received in Australian Patent Application No. 2016101438, which corresponds with U.S. Appl. No. 14/869,899, 1 page.
Certificate of Examination, dated Oct. 11, 2016, received in Australian Patent Application No. 2016101438, which corresponds with U.S. Appl. No. 14/869,899, 1 page.
Office Action, dated Oct. 7, 2016, received in Danish Patent Application No. 201500592, which corresponds with U.S. Appl. No. 14/869,899, 6 pages.
Office Action, dated Nov. 22, 2016, received in Danish Patent Application No. 201670594, which corresponds with U.S. Appl. No. 14/869,899, 9 pages.
Innovation Patent, dated Sep. 22, 2016, received in Australian Patent Application No. 2016101418, which corresponds with U.S. Appl. No. 14/866,992, 1 page.
Office Action, dated Nov. 22, 2016, received in Australian Patent Application No. 2016101418, which corresponds with U.S. Appl. No. 14/866,992, 7 pages.
Office Action, dated Feb. 7, 2017, received in Australian Patent Application No. 2016101418, which corresponds with U.S. Appl. No. 14/866,992, 5 pages.
Office Action, dated Feb. 6, 2017, received in Danish Patent Application No. 201500593, which corresponds with U.S. Appl. No. 14/866,992, 4 pages.
Notice of Allowance, dated Aug. 26, 2016, received in U.S. Appl. No. 14/845,217, 5 pages.
Notice of Allowance, dated Jan. 4, 2017, received in U.S. Appl. No. 14/845,217, 5 pages.
Notice of Allowance, dated Oct. 24, 2016, received in U.S. Appl. No. 14/857,645, 6 pages.
Notice of Allowance, dated Dec. 28, 2016, received in U.S. Appl. No. 14/864,580, 8 pages.
Office Action, dated Aug. 19, 2016, received in Australian Patent Application No. 2016100648, which corresponds with U.S. Appl. No. 14/864,580, 6 pages.
Notice of Allowance, dated Nov. 8, 2016, received in Chinese Patent Application No. 201620470247.4, which corresponds with U.S. Appl. No. 14/864,580, 3 pages.
Certificate of Registration, dated Oct. 14, 2016, received in German Patent Application No. 20201600003234.9, which corresponds with U.S. Appl. No. 14/864,580, 3 pages.
Office Action, dated Oct. 7, 2016, received in Danish Patent Application No. 201500584, which corresponds with U.S. Appl. No. 14/864,580, 3 pages.
Notice of Allowance, dated Nov. 23, 2016, received in U.S. Appl. No. 14/864,601, 12 pages.
Notice of Allowance, dated Jan. 31, 2017, received in U.S. Appl. No. 14/864,627, 7 pages.
Office Action, dated Oct. 7, 2016, received in Danish Patent Application No. 201500585, which corresponds with U.S. Appl. No. 14/864,627, 3 pages.
Certificate of Examination, dated Dec. 8, 2016, received in Australian Patent Application No. 2016100292, which corresponds with U.S. Appl. No. 14/866,361, 1 page.
Office Action, dated Oct. 28, 2016, received in Danish Patent Application No. 201500579, which corresponds with U.S. Appl. No. 14/866,361, 3 pages.

(56) References Cited

OTHER PUBLICATIONS

Office Action, dated Oct. 19, 2016, received in Chinese Patent Application No. 2016201470246.X, which corresponds with U.S. Appl. No. 14/866,987, 4 pages.
Patent, dated Sep. 19, 2016, received in German Patent Application No. 202016002908.9, which corresponds with U.S. Appl. No. 14/866,987, 3 pages.
Notice of Allowance, dated Nov. 1, 2016, received in Danish Patent Application No. 201500587, which corresponds with U.S. Appl. No. 14/866,987, 2 pages.
Office Action and Search Report, dated Sep. 9, 2016, received in Danish Patent Application No. 201670463, which corresponds with U.S. Appl. No. 14/866,987, 7 pages.
Notice of Allowance, dated Jan. 31, 2017, received in Danish Patent Application No. 201670463, which corresponds with U.S. Appl. No. 14/866,987, 3 pages.
Notice of Allowance, dated Nov. 1, 2016, received in Danish Patent Application No. 201500589, which corresponds with U.S. Appl. No. 14/866,989, 2 pages.
Final Office Action, dated Nov. 4, 2016, received in U.S. Appl. No. 14/871,236, 24 pages.
Notice of Allowance, dated Feb. 28, 2017, received in U.S. Appl. No. 14/871,236, 9 pages.
Innovation (Unexamined) Patent, dated Aug. 25, 2016, received in Australian Patent Application No. 2016101433, which corresponds with U.S. Appl. No. 14/871,236, 1 page.
Office Action, dated Oct. 14, 2016, received in Australian Patent Application No. 2016101433, which corresponds with U.S. Appl. No. 14/871,236, 3 pages.
Office Action and Additional Search Report, dated Sep. 30, 2016, received in Danish Patent Application No. 201500595, which corresponds with U.S. Appl. No. 14/871,236, 10 pages.
Innovation (Unexamined) Patent, dated Aug. 25, 2016, received in Australian Patent Application No. 2016101436, which corresponds with U.S. Appl. No. 14/871,236, 1 pages.
Office Action, dated Oct. 31, 2016, received in Australian Patent Application No. 2016101438, which corresponds with U.S. Appl. No. 14/871,236, 6 pages.
Office Action, dated Oct. 17, 2016, received in Australian Patent Application No. 2016203040, which corresponds with U.S. Appl. No. 14/871,227, 7 pages.
Office Action, dated Oct. 18, 2016, received in Australian Patent Application No. 2016101431, which corresponds with U.S. Appl. No. 14/871,227, 3 pages.
Patent, dated Sep. 26, 2016, received in Danish Patent Application No. 201500597, which corresponds with U.S. Appl. No. 14/871,227, 7 pages.
Office Action, dated Oct. 14, 2016, received in Australian Patent Application No. 2016101437, which corresponds with U.S. Appl. No. 14/871,336, 2 pages.
Office Action, dated Oct. 18, 2016, received in Danish Patent Application No. 201500601, which corresponds with U.S. Appl. No. 14/871,336, 3 pages.
Notice of Allowance, dated Mar. 23, 2017, received in Danish Patent Application No. 201500601, which corresponds with U.S. Appl. No. 14/871,336, 2 pages.
Innovation Patent, dated Aug. 25, 2016, received in Australian Patent Application No. 2016101435, which corresponds with U.S. Appl. No. 14/871,462, 1 page.
Office Action, dated Oct. 4, 2016, received in Australian Patent Application No. 2016101435, which corresponds with U.S. Appl. No. 14/871,462, 3 pages.
Office Action, dated Oct. 4, 2016, received in Australian Patent Application No. 2016231505, which corresponds with U.S. Appl. No. 14/871,462, 3 pages.
Grant, dated Aug. 30, 2016, received in Danish Patent Application No. 201500600, which corresponds with U.S. Appl. No. 14/871,462, 2 pages.
Office Action, dated Mar. 13, 2017, received in Japanese Patent Application No. 2016-183289, which corresponds with U.S. Appl. No. 14/871,462, 5 pages.
Final Office Action, dated Sep. 28, 2016, received in U.S. Appl. No. 14/867,823, 31 pages.
Office Action, dated Sep. 7, 2016, received in Danish Patent Application No. 201500594, which corresponds with U.S. Appl. No. 14/867,823, 4 pages.
Final Office Action, dated Nov. 2, 2016, received in U.S. Appl. No. 14/867,892, 48 pages.
Office Action, dated Sep. 14, 2016, received in Danish Patent Application No. 201500598, which corresponds with U.S. Appl. No. 14/867,892, 4 pages.
Office Action, dated Mar. 1, 2017, received in U.S. Appl. No. 14/869,855, 14 pages.
Office Action, dated Feb. 9, 2017, received in U.S. Appl. No. 14/869,873, 17 pages.
Office Action, dated Jul. 5, 2016, received in Chinese Patent Application No. 201620176221.9, which corresponds with U.S. Appl. No. 14/867,990, 4 pages.
Office Action, dated Oct. 25, 2016, received in Chinese Patent Application No. 201620176221.9, which corresponds with U.S. Appl. No. 14/867,990, 7 pages.
Office Action, dated Sep. 26, 2016, received in Danish Patent Application No. 201500581, which corresponds with U.S. Appl. No. 14/867,990, 5 pages.
Office Action, dated Nov. 25, 2016, received in U.S. Appl. No. 15/081,771, 17 pages.
Office Action, dated Jan. 20, 2017, received in U.S. Appl. No. 15/231,745, 21 pages.
Office Action and Search Report, dated Oct. 17, 2016, received in Danish Patent Application No. 201670587, which corresponds with U.S. Appl. No. 15/231,745, 9 pages.
Office Action (Search Report), dated Dec. 14, 2016, received in Danish Patent Application No. 201670590, which corresponds with U.S. Appl. No. 15/231,745, 9 pages.
Office Action (Search Report), dated Nov. 10, 2016, received in Danish Patent Application No. 201670591, which corresponds with U.S. Appl. No. 15/231,745, 12 pages.
Office Action and Search Report, dated Oct. 26, 2016, received in Danish Patent Application No. 201670592, which corresponds with U.S. Appl. No. 15/231,745, 8 pages.
Office Action, dated Jan. 5, 2017, received in Danish Patent Application No. 201670592, which corresponds with U.S. Appl. No. 15/231,745, 3 pages.
Office Action and Search Report, dated Oct. 12, 2016, received in Danish Patent Application No. 201670593, which corresponds with U.S. Appl. No. 15/231,745, 7 pages.
Extended European Search Report, dated Oct. 7, 2016, received in European Patent Application No. 16177863.4, which corresponds with U.S. Appl. No. 14/536,267, 12 pages.
Extended European Search Report, dated Mar. 15, 2017, received in European Patent Application No. 17153418.3, which corresponds with U.S. Appl. No. 14/536,648, 7 pages.
International Search Report and Written Opinion, dated Oct. 14, 2016, received in International Patent Application No. PCT/US2016/020697, which corresponds with U.S. Appl. No. 14/866,981, 21 pages.
International Search Report and Written Opinion, dated Oct. 31, 2016, received in International Patent Application No. PCT/US2016/033578, which corresponds with U.S. Appl. No. 14/863,432, 36 pages.
International Search Report and Written Opinion, dated Nov. 14, 2016, received in International Patent Application No. PCT/US2016/033541, which corresponds with U.S. Appl. No. 14/866,511, 29 pages.
International Search Report and Written Opinion, dated Aug. 29, 2016, received in International Patent Application No. PCT/US2016/021400, which corresponds with U.S. Appl. No. 14/869,899, 48 pages.
International Search Report and Written Opinion, dated Jan. 12, 2017, received in International Patent No. PCT/US2016/046419, which corresponds with U.S. Appl. No. 14/866,992, 23 pages.

(56) References Cited

OTHER PUBLICATIONS

International Search Report and Written Opinion, dated Dec. 15, 2016, received in International Patent Application No. PCT/US2016/046403, which corresponds with U.S. Appl. No. 15/009,661, 17 pages.

International Search Report and Written Opinion, dated Feb. 27, 2017, received in International Patent Application No. PCT/US2016/046407, which corresponds with U.S. Appl. No. 15/009,688, 30 pages.

Extended European Search Report, dated Dec. 21, 2016, received in European Patent Application No. 16189790.5, which corresponds with U.S. Appl. No. 14/871,462, 8 pages.

International Search Report and Written Opinion, dated Jan. 3, 2017, received in International Patent Application No. PCT/US2016/046214, which corresponds with U.S. Appl. No. 15/231,745, 25 pages.

Brownlee, "Android 5.0 Lollipop Feature Review!", https//www.youtube.com/watch?v=pEDQ1z1-PvU, Oct. 27, 2014, 5 pages.

Google-Chrome, "Android 5.0 Lollipop", http://androidlover.net/android-os/android-5-0-lollipop/android-5-0-lollipop-recent-apps-card-google-search.html, Oct. 19, 2014, 10 pages.

iPhoneOperator, "Wasser Liveeffekt fur Homescreen & Lockscreen—Aquaboard (Cydia)", http://www.youtube.com/watch?v=fG9YMF-mB0Q, Sep. 22, 2012, 3 pages.

Sood, "MultitaskingGestures", http://cydia.saurik.com/package/org.thebigboxx.multitaskinggestures/, Mar. 3, 2014, 2 pages.

YouTube, "How to Master Android Lollipop Notifications in Four Minutes!", Video Gadgets Journal (VGJFelix), https://www.youtube.com/watch?v=S-zBRG7GGJgs, Feb. 8, 2015, 4 pages.

YouTube, "Multitasking Gestures: Zephyr Like Gestures on iOS", https://www.youtube.com/watch?v=Jcod-f7Lw01, Jan. 27, 2014, 3 pages.

YouTube, "Recentz—Recent Apps in a Tap", https://www.youtube.com/watch?v=qailSHRgsTo, May 15, 2015, 1 page.

Office Action, dated Jun. 29, 2017, received in U.S. Appl. No. 14/608,895, 30 pages.

Patent, dated May 12, 2017, received in Japanese Patent Application No. 2015-547948, which corresponds with U.S. Appl. No. 14/536,426, 3 pages.

Patent, dated May 26, 2017, received in Korean Patent Application No. 2015-7018851, which corresponds with U.S. Appl. No. 14/536,426, 3 pages.

Office Action, dated Jul. 26, 2017, received in U.S. Appl. No. 14/536,235, 14 pages.

Office Action, dated Apr. 5, 2017, received in U.S. Appl. No. 14/536,367, 16 pages.

Office action, dated Aug. 3, 2017, received in U.S. Appl. No. 14/536,426, 10 pages.

Office Action, dated May 15, 2017, received in Australian Patent Application No. 2016216580, which corresponds with U.S. Appl. No. 14/536,426, 3 pages.

Office Action, dated Aug. 21, 2017, received in European Patent Application No. 15183980.0, which corresponds with U.S. Appl. No. 14/536,426, 3 pages.

Final Office Action, dated Aug. 25, 2017, received in U.S. Appl. No. 14/536,464, 30 pages.

Office Action, dated May 4, 2017, received in Chinese Patent Application No. 201380068414.1, which corresponds with U.S. Appl. No. 14/608,926, 5 pages.

Office Action, dated Jul. 4, 2017, received in European Patent Application No. 13795392.3, which corresponds with U.S. Appl. No. 14/608,926, 4 pages.

Notice of Allowance, dated Mar. 31, 2017, received in Korean Patent Application No. 2015-7018853, which corresponds with U.S. Appl. No. 14/608,926, 4 pages.

Patent, dated Jun. 30, 2017, received in Korean Patent Application No. 2015-7018853, which corresponds with U.S. Appl. No. 14/608,926, 3 pages.

Office Action, dated Aug. 22, 2017, received in Korean Patent Application No. 2017-7018250, which corresponds with U.S. Appl. No. 14/608,926, 2 pages.

Patent, dated May 26, 2017, received in European Patent Application No. 13724102.2, which corresponds with U.S. Appl. No. 14/536,646, 1 page.

Office Action, dated Apr. 3, 2017, received in U.S. Appl. No. 14/536,141, 11 pages.

Office Action, dated Jul. 21, 2017, received in Australian Patent Application No. 2016262773, which corresponds with U.S. Appl. No. 14/536,141, 3 pages.

Notice of Allowance, dated Jun. 30, 2017, received in Japanese Patent Application No. 2015-511646, which corresponds with U.S. Appl. No. 14/536,141, 5 pages.

Patent, dated Jul. 28, 2017, received in Japanese Patent Application No. 2015-511646, which corresponds with U.S. Appl. No. 14/536,141, 3 pages.

Notice of Allowance, dated May 12, 2017, received in U.S. Appl. No. 14/608,942, 10 pages.

Office Action, dated Mar. 29, 2017, received in Australian patent Application No. 2016201303, which corresponds with U.S. Appl. No. 14/608,942, 3 pages.

Office Action, dated Jun. 16, 2017, received in Chinese Patent Application No. 201380068295.X, which corresponds with U.S. Appl. No. 14/608,942, 6 pages.

Notice of Allowance, dated May 12, 2017, received in Japanese Patent Application No. 2015-549393, which corresponds with U.S. Appl. No. 14/608,942, 5 pages.

Patent, dated Jun. 16, 2017, received in Japanese Patent Application No. 2015-549393, which corresponds with U.S. Appl. No. 14/608,942, 3 pages.

Office Action, dated Jul. 17, 2017, received in U.S. Appl. No. 14/536,166, 19 pages.

Office Action, dated Jul. 4, 2017, received in Australian Patent Application No. 2016238917, which corresponds with U.S. Appl. No. 14/536,203, 5 pages.

Office Action, dated Jun. 23, 2017, received in Japanese Patent Application No. 2016173113, which corresponds with U.S. Appl. No. 14/536,203, 5 pages.

Notice of Allowance, dated Sep. 1, 2017, received in Korean Patent Application No. 2016-7029533, which corresponds with U.S. Appl. No. 14/536,267, 4 pages.

Office Action, dated Apr. 7, 2017, received in U.S. Appl. No. 14/536,291, 11 pages.

Office Action, dated Jul. 21, 2017, received in Australian Patent Application No. 2016216658, which corresponds with U.S. Appl. No. 14/536,291, 3 pages.

Office Action, dated Mar. 23, 2017, received in European Patent Application No. 13724107.1, which corresponds with U.S. Appl. No. 14/536,291, 8 pages.

Patent, dated May 18, 2017, received in Australian Patent Application No. 2013368445, which corresponds with U.S. Appl. No. 14/608,985, 1 page.

Office Action, dated May 19, 2017, received in Chinese Patent Application No. 201380068399.0, which corresponds with U.S. Appl. No. 14/608,985, 5 pages.

Office Action, dated Apr. 19, 2017, received in U.S. Appl. No. 14/536,296, 12 pages.

Office Action, dated Jul. 21, 2017, received in Australian Patent Application No. 2016247194, which corresponds with U.S. Appl. No. 14/536,648, 3 pages.

Notice of Allowance, dated Jul. 10, 2017, received in U.S. Appl. No. 14/609,042, 8 pages.

Notice of Allowance, dated Jun. 19, 2017, received in U.S. Appl. No. 14/864,737, 8 pages.

Office Action, dated May 15, 2017, received in Japanese Patent Application No. 2016-558331, which corresponds with U.S. Appl. No. 14/864,737, 5 pages.

Notice of Allowance, dated Jun. 23, 2017, received in Japanese Patent Application No. 2016-558331, which corresponds with U.S. Appl. No. 14/864,737, 5 pages.

(56) References Cited

OTHER PUBLICATIONS

Patent, dated Jul. 28, 2017, received in Japanese Patent Application No. 2016558331, which corresponds with U.S. Appl. No. 14/864,737, 3 pages.
Office Action, dated Jul. 7, 2017, received in Danish Patent Application No. 201500575, 4 pages.
Office Action, dated Jul. 6, 2017, received in Danish Patent Application No. 201500574, which corresponds with U.S. Appl. No. 14/866,159, 3 pages.
Notice of Allowance, dated May 2, 2017, received in received in Danish Patent Application No. 201500588, which corresponds with U.S. Appl. No. 14/868,078, 2 pages.
Notice of Allowance, dated Apr. 27, 2017, received in U.S. Appl. No. 14/863,432, 7 pages.
Office Action, dated Jun. 12, 2017, received in Danish Patent Application No. 201500582, which corresponds with U.S. Appl. No. 14/863,432, 5 pages.
Grant, dated Jul. 21, 2017, received in Dutch Patent Application No. 2016801, which corresponds with U.S. Appl. No. 14/871,227, 8 pages.
Office Action, dated Jun. 9, 2017, received in Japanese Patent Application No. 2016558214, which corresponds with U.S. Appl. No. 14/866,511, 6 pages.
Notice of Allowance, dated Jul. 14, 2017, received in Japanese Patent Application No. 2016558214, which corresponds with U.S. Appl. No. 14/866,511, 5 pages.
Patent, dated Aug. 18, 2017, received in Japanese Patent Application No. 2016558214, which corresponds with U.S. Appl. No. 14/866,511, 3 pages.
Notice of Allowance, dated Apr. 27, 2017, received in U.S. Appl. No. 14/866,489, 27 pages.
Notice of Allowance, dated Jul. 6, 2017, received in U.S. Appl. No. 14/866,489, 12 pages.
Office Action, dated Jul. 3, 2017, received in Danish Patent Application No. 201500592, which corresponds with U.S. Appl. No. 14/869,899, 5 pages.
Office Action, dated Apr. 13, 2017, received in U.S. Appl. No. 14/866,992, 34 pages.
Office Action, dated Sep. 5, 2017, received in Danish Patent Application No. 201500593, which corresponds with U.S. Appl. No. 14/866,992, 6 pages.
Office Action, dated May 2, 2017, received in U.S. Appl. No. 14/856,517, 34 pages.
Office Action, dated May 18, 2017, received in U.S. Appl. No. 14/856,519, 35 pages.
Office Action, dated Jun. 9, 2017, received in U.S. Appl. No. 14/856,520, 36 pages.
Office Action, dated Jun. 30, 2017, received in U.S. Appl. No. 14/856,522, 22 pages.
Notice of Allowance, dated Jun. 16, 2017, received in in U.S. Appl. No. 14/857,645, 5 pages.
Office Action, dated May 5, 2017, received in Danish Patent Application No. 201500584, which corresponds with U.S. Appl. No. 14/864,580, 3 pages.
Notice of Allowance, dated Apr. 20, 2017, received in U.S. Appl. No. 14/864,601, 13 pages.
Office Action, dated May 5, 2017, received in Danish Patent Application No. 201500585, which corresponds with U.S. Appl. No. 14/864,627, 4 pages.
Office Action, dated Jun. 15, 2017, received in Danish Patent Application No. 201500579, which corresponds with U.S. Appl. No. 14/866,361, 2 pages.
Patent, dated May 3, 2017, received in Chinese Patent Application No. 201620147024.6.X, which corresponds with U.S. Appl. No. 14/866,987, 2 pages.
Office Action, dated Apr. 19, 2017, received in Danish Patent Application No. 201670463, which corresponds with U.S. Appl. No. 14/866,987, 3 pages.
Office Action, dated Jul. 31, 2017, received in Japanese Patent Application No. 2017126445, which corresponds with U.S. Appl. No. 14/866,987, 6 pages.
Office Action, dated Jun. 16, 2017, received in Japanese Patent Application No. 2016-233450, which corresponds with U.S. Appl. No. 14/866,989, 6 pages.
Office Action, dated Jun. 15, 2017, received in Danish Patent Application No. 201500595, which corresponds with U.S. Appl. No. 14/871,236, 4 pages.
Office Action, dated Sep. 1, 2017, received in U.S. Appl. No. 14/870,754, 22 pages.
Office Action, dated Sep. 1, 2017, received in U.S. Appl. No. 14/870,988, 14 pages.
Office Action, dated Apr. 13, 2017, received in Australian Patent Application No. 2016101431, which corresponds with U.S. Appl. No. 14/871,227, 4 pages.
Office Action, dated Mar. 24, 2017, received in Japanese Patent Application No. 2016-533201, which corresponds with U.S. Appl. No. 14/871,227, 6 pages.
Office Action, dated Aug. 4, 2017, received in Japanese Patent Application No. 2016-533201, which corresponds with U.S. Appl. No. 14/871,227, 6 pages.
Office Action, dated Apr. 11, 2017, received in Australian Patent Application No. 2016101437, which corresponds with U.S. Appl. No. 14/871,336, 4 pages.
Office Action, dated Apr. 20, 2017, received in Chinese Patent Application No. 201621044346.2, which corresponds with U.S. Appl. No. 14/871,462, 3 pages.
Office Action, dated May 11, 2017, received in U.S. Appl. No. 14/867,823, 42 pages.
Office Action, dated May 15, 2017, received in Danish Patent Application No. 201500594, which corresponds with U.S. Appl. No. 14/867,823, 4 pages.
Office Action, dated Jul. 6, 2017, received in U.S. Appl. No. 14/867,892, 55 pages.
Office Action, dated May 4, 2017, received in Danish Patent Application No. 201500598, which corresponds with U.S. Appl. No. 14/867,892, 4 pages.
Final Office Action, dated Aug. 18, 2017, received in U.S. Appl. No. 14/869,873, 20 pages.
Office Action, dated May 3, 2017, received in Danish Patent Application No. 201500581, which corresponds with U.S. Appl. No. 14/867,990, 5 pages.
Final Office Action, dated Jun. 2, 2017, received in U.S. Appl. No. 15/081,771, 17 pages.
Office Action, dated Aug. 29, 2017, received in Korean Patent Application No. 2017-7014536, which corresponds with U.S. Appl. No. 15/081,771, 5 pages.
Final Office Action, dated May 1, 2017, received in U.S. Appl. No. 15/136,782, 18 pages.
Office Action, dated May 23, 2017, received in Danish Patent Application No. 201770190, which corresponds with U.S. Appl. No. 15/136,782, 7 pages.
Office Action, dated Jun. 29, 2017, received in Danish Patent Application No. 201670587, which corresponds with U.S. Appl. No. 15/231,745, 4 pages.
Office Action, dated Jul. 6, 2017, received in Danish Patent Application No. 201670590, which corresponds with U.S. Appl. No. 15/231,745, 3 pages.
Office Action, dated Jul. 27, 2017, received in Australian Patent Application No. 2017100535, which corresponds with U.S. Appl. No. 15/272,341, 4 pages.
Office Action, dated Aug. 4, 2017, received in Danish Patent Application No. 201770377, 9 pages.
Office Action, dated Aug. 30, 2017, received in U.S. Appl. No. 15/655,749, 22 pages.
Search Report, dated Apr. 13, 2017, received in Dutch Patent Application No. 2016452, which corresponds with U.S. Appl. No. 14/864,737, 22 pages.
Search Report, dated Jun. 22, 2017, received in Dutch Patent Application No. 2016375, which corresponds with U.S. Appl. No. 14/866,981, 17 pages.

(56) References Cited

OTHER PUBLICATIONS

Search Report, dated Jun. 19, 2017, received in Dutch Patent Application No. 2016377, which corresponds with U.S. Appl. No. 14/866,159, 13 pages.
Search Report, dated Apr. 13, 2017, received in Dutch Patent Application No. 2016376, which corresponds with U.S. Appl. No. 14/868,078, 15 pages.
Search Report, dated Apr. 18, 2017, received in Dutch Patent Application No. 2016801, which corresponds with U.S. Appl. No. 14/863,432, 34 pages.
Extended European Search Report, dated Jun. 22, 2017, received in European Patent Application No. 16189421.7, which corresponds with U.S. Appl. No. 14/866,987, 7 pages.
Extended European Search Report, dated Sep. 11, 2017, received in European Patent Application No. 17163309.2, which corresponds with U.S. Appl. No. 14/866,987, 8 pages.
Extended European Search Report, dated Jun. 8, 2017, received in European Patent Application No. 16189425.8, which corresponds with U.S. Appl. No. 14/866,989, 8 pages.
Extended European Search Report, dated Jul. 25, 2017, received in European Patent Application No. 17171972.7, which corresponds with U.S. Appl. No. 14/870,882, 12 pages.
Extended European Search Report, dated Jul. 25, 2017, received in European Patent Application No. 17172266.3, which corresponds with U.S. Appl. No. 14/871,336, 9 pages.
Anonymous, "Google Android 5.0 Release Date, Specs and Editors Hands on Review—CNET", http://www.cnet.com/products/google-an-android-5-0-lollipop/, Mar. 12, 2015, 10 pages.
Certificate of Grant, dated Apr. 29, 2017, received in Australian Patent Application No. 2013368440, which corresponds with U.S. Appl. No. 14/536,426, 3 pages.
Office Action, dated Sep. 19, 2017, received in Chinese Patent Application No. 201380035982.1, which corresponds with U.S. Appl. No. 14/536,426, 5 pages.
Office Action, dated Sep. 20, 2017, received in Chinese Patent Application No. 201510566550.4, which corresponds with U.S. Appl. No. 14/536,426, 11 pages.
Office Action, dated Sep. 25, 2017, received in U.S. Appl. No. 14/536,644, 29 pages.
Notice of Allowance, dated Sep. 20, 2017, received in U.S. Appl. No. 14/536,141, 10 pages.
Office Action, dated Sep. 13, 2017, received in European Patent Application No. 16177863.4, which corresponds with U.S. Appl. No. 14/536,267, 6 pages.
Notice of Allowance, dated Sep. 19, 2017, received in Chinese Patent Application No. 201380068399.0, which corresponds with U.S. Appl. No. 14/608,985, 3 pages.
Office Action, dated Sep. 19, 2017, received in Korean Patent Application No. 2015-7019984, which corresponds with U.S. Appl. No. 14/608,985, 4 pages.
Final Office Action, dated Sep. 21, 2017, received in U.S. Appl. No. 14/609,006, 17 pages.
Patent, dated Jul. 12, 2017, received in Dutch Patent Application No. 2016452, which corresponds with U.S. Appl. No. 14/864,737, 2 pages.
Patent, dated Sep. 7, 2017, received in Dutch Patent Application No. 2016377, which corresponds with U.S. Appl. No. 14/866,159, 4 pages.
Notice of Allowance, dated Sep. 1, 2017, received in Korean Patent Application No. 2016229421, which corresponds with U.S. Appl. No. 14/868,078, 3 pages.
Patent, dated Sep. 11, 2017, received in Danish Patent Application No. 201500588, which corresponds with U.S. Appl. No. 14/868,078, 5 pages.
Patent, dated Jul. 12, 2017, received in Dutch Patent Application No. 2016376, which corresponds with U.S. Appl. No. 14/868,078, 2 pages.
Notice of Allowance, dated Sep. 18, 2017, received in U.S. Appl. No. 14/863,432, 8 pages.
Notice of Allowance, dated Oct. 4, 2017, received in U.S. Appl. No. 14/866,511, 37 pages.
Final Office Action, dated Oct. 3, 2017, received in U.S. Appl. No. 14/866,992, 37 pages.
Final Office Action, dated Oct. 4, 2017, received in U.S. Appl. No. 14/856,517, 33 pages.
Office Action, dated Sep. 22, 2017, received in Japanese Patent Application No. 2017-029201, which corresponds with U.S. Appl. No. 14/857,636 8 pages.
Notice of Allowance, dated Sep. 29, 2017, received in Danish Patent Application No. 201670463, which corresponds with U.S. Appl. No. 14/866,987, 2 pages.
Notice of Allowance, dated Sep. 22, 2017, received in Japanese Patent Application No. 2016-233449, which corresponds with U.S. Appl. No. 14/866,987, 5 pages.
Office Action, dated Sep. 29, 2017, received in Australian Patent Application No. 2016231505, which corresponds with U.S. Appl. No. 14/871,462, 5 pages.
Notice of Allowance, dated Jul. 6, 2017, received in U.S. Appl. No. 15/231,745, 18 pages.
MacKenzie et al., "The Tactile Touchpad", Chi '97 Extended Abstracts on Human Factors in Computing Systems Looking to the Future, Chi '97, Mar. 22, 1997, 5 pages.
VisioGuy, "Getting a Handle on Selecting and Subselecting Visio Shapes", http://www.visguy.com/2009/10/13/getting-a-handle-on-selecting-and-subselecting-visio-shapes/, Oct. 13, 2009, 18 pages.
YouTube, "Android Lollipop Lock-Screen Notification Tips", https://www.youtube.com/watch?v=LZTxHBOwzIU, Nov. 13, 2014, 3 pages.
YouTube, "HTC One Favorite Camera Features", http://www.youtube.com/watch?v=sUYHfcjl4RU, Apr. 28, 2013, 3 pages.
Office Action, dated Nov. 30, 2017, received in U.S. Appl. No. 14/535,671, 21 pages.
Final Office Action, dated Feb. 22, 2018, received in U.S. Appl. No. 14/608,895, 20 pages.
Office Action, dated Nov. 6, 2017, received in Chinese Patent Application No. 201380068493.6, which corresponds with U.S. Appl. No. 14/608,895, 5 pages.
Final Office Action, dated Feb. 26, 2018, received in U.S. Appl. No. 14/536,235, 13 pages.
Notice of Allowance, dated Nov. 30, 2017, received in U.S. Appl. No. 14/536,367, 9 pages.
Certificate of Grant, dated Nov. 10, 2017, received in Hong Kong Patent Application No. 15107535.0, which corresponds with U.S. Appl. No. 14/536,426, 2 pages.
Notice of Allowance, dated Dec. 8, 2017, received in Japanese Patent Application No. 2015-511644, which corresponds with U.S. Appl. No. 14/536,426, 6 pages.
Patent, dated Jan. 12, 2018, received in Japanese Patent Application No. 2015-511644, which corresponds with U.S. Appl. No. 14/536,426, 3 pages.
Office Action, dated Feb. 12, 2018, received in U.S. Appl. No. 14/536,464, 33 pages.
Office Action, dated Oct. 19, 2017, received in U.S. Appl. No. 14/608,926, 14 pages.
Notice of Acceptance, dated Dec. 20, 2017, received in Australian Patent Application No. 2016201451, which corresponds with U.S. Appl. No. 14/608,926, 3 pages.
Notice of Allowance, dated Feb. 8, 2018, received in Chinese Patent Application No. 201380068414.1, which corresponds with U.S. Appl. No. 14/608,926, 2 pages.
Oral Summons, dated Feb. 13, 2017, received in European Patent Application No. 13795392.3, which corresponds with U.S. Appl. No. 14/608,926, 11 pages.
Notice of Allowance, dated Dec. 29, 2017, received in Korean Patent Application No. 2017-7018250, which corresponds with U.S. Appl. No. 14/608,926, 3 pages.
Notice of Allowance, dated Oct. 9, 2017, received in Chinese Patent Application No. 2013800362059, which corresponds with U.S. Appl. No. 14/536,646, 3 pages.
Office Action, dated Oct. 19, 2017, received in U.S. Appl. No. 14/536,646, 21 pages.

(56) References Cited

OTHER PUBLICATIONS

Office Action, dated Feb. 2, 2018, received in Chinese Patent Application No. 201380035893.7, which corresponds with U.S. Appl. No. 14/536,141, 5 pages.
Office Action, dated Mar. 7, 2018, received in Australian patent Application No. 2016201303, which corresponds with U.S. Appl. No. 14/608,942, 3 pages.
Notice of Allowance, dated Feb. 28, 2018, received in U.S. Appl. No. 14/536,166, 5 pages.
Office Action, dated Oct. 25, 2017, received in Chinese Patent Application No. 201380035977.0, which corresponds with U.S. Appl. No. 14/536,203, 5 pages.
Office Action, dated Dec. 6, 2017, received in European Patent Application No. 13724104.8, which corresponds with U.S. Appl. No. 14/536,203, 9 pages.
Notice of Allowance, dated Jan. 12, 2018, received in Japanese Patent Application No. 2016173113, which corresponds with U.S. Appl. No. 14/536,203, 5 pages.
Patent, dated Feb. 16, 2018, received in Japanese Patent Application No. 2016173113, which corresponds with U.S. Appl. No. 14/536,203, 3 pages.
Notice of Allowance, dated Oct. 30, 2017, received in Korean Patent Application No. 2016-7033834, which corresponds with U.S. Appl. No. 14/536,203, 5 pages.
Patent, dated Jan. 23, 2018, received in Korean Patent Application No. 20167033834, which corresponds with U.S. Appl. No. 14/536,203, 4 pages.
Office action, dated Oct. 11, 2017, received in Chinese Patent Application No. 201380074060.1, which corresponds with U.S. Appl. No. 14/608,965, 5 pages.
Notice of Allowance, dated Nov. 22, 2017, received in U.S. Appl. No. 14/536,247, 6 pages.
Notice of Allowance, dated Nov. 9, 2017, received in U.S. Appl. No. 14/536,267, 8 pages.
Notice of Acceptance, dated Feb. 27, 2018, received in Australian Patent Application No. 2016204411, which corresponds with U.S. Appl. No. 14/536,267, 3 pages.
Notice of Allowance, dated Jan. 29, 2018, received in Chinese Patent Application No. 201380035968.1, which corresponds with U.S. Appl. No. 14/536,267, 3 pages.
Office Action, dated Jan. 25, 2018, received in European Patent Application No. 13724106.3, which corresponds with U.S. Appl. No. 14/536,267, 5 pages.
Notice of Allowance, dated Nov. 17, 2017, received in Japanese Patent Application No. 2016-125839, which corresponds with U.S. Appl. No. 14/536,267, 5 pages.
Patent, dated Dec. 1, 2017, received in Korean Patent Application No. 20167029533, which corresponds with U.S. Appl. No. 14/536,267, 2 pages.
Notice of Allowance, dated Dec. 1, 2017, received in U.S. Appl. No. 14/536,291, 19 pages.
Office Action, dated Oct. 23, 2017, received in Chinese Patent Application No. 201380035986.X, which corresponds with U.S. Appl. No. 14/536,291, 9 pages.
Office Action, dated Oct. 19, 2017, received in U.S. Appl. No. 14/608,985, 13 pages.
Patent, dated Dec. 8, 2017, received in Chinese Patent Application No. 201380068399.0, which corresponds with U.S. Appl. No. 14/608,985, 4 pages.
Summons, dated Oct. 6, 2017, received in European Patent Application No. 13811032.5, which corresponds with U.S. Appl. No. 14/608,985, 6 pages.
Patent, dated Dec. 19, 2017, received in Korean Patent Application No. 20157019984, which corresponds with U.S. Appl. No. 14/608,985, 3 pages.
Final Office Action, dated Nov. 2, 2017, received in U.S. Appl. No. 14/536,296, 13 pages.
Office Action, dated Nov. 1, 2017, received in U.S. Appl. No. 14/536,648, 22 pages.
Office Action, dated Feb. 14, 2018, received in Korean Patent Application No. 2017-7030129, which corresponds with U.S. Appl. No. 14/864,737, 17 pages.
Patent, Nov. 16, 2017, received in Dutch Patent Application No. 2016375, which corresponds with U.S. Appl. No. 14/866,981, 2 pages.
Office Action, dated Dec. 15, 2017, received in U.S. Appl. No. 14/866,159, 35 pages.
Office Action, dated Jan. 10, 2018, received in Danish Patent Application No. 201500574, which corresponds with U.S. Appl. No. 14/866,159, 2 pages.
Office Action, dated Oct. 6, 2017, received in U.S. Appl. No. 14/868,078, 40 pages.
Certificate of Grant, dated Jan. 3, 2018, received in Australian Patent Application No. 2016229421, which corresponds with U.S. Appl. No. 14/868,078, 1 page.
Office Action, dated Nov. 24, 2017, received in European Patent Application No. 16727900.9, which corresponds with U.S. Appl. No. 14/866,511, 5 pages.
Office Action, dated Jan. 29, 2018, received in Danish Patent Application No. 201500592, which corresponds with U.S. Appl. No. 14/869,899, 2 pages.
Office Action, dated Dec. 14, 2017, received in Danish Patent Application No. 201670594, which corresponds with U.S. Appl. No. 14/869,899, 3 pages.
Office Action, dated Jan. 29, 2018, received in U.S. Appl. No. 14/866,992, 44 pages.
Office Action, dated Jan. 19, 2018, received in Australian Patent Application No. 201761478, which corresponds with U.S. Appl. No. 14/866,992, 6 pages.
Office Action, dated Feb. 12, 2018, received in U.S. Appl. No. 15/009,661, 36 pages.
Office Action, dated Jan. 18, 2018, received in U.S. Appl. No. 15/009,676, 21 pages.
Office Action, dated Mar. 13, 2018, received in U.S. Appl. No. 15/009,688, 10 pages.
Final Office Action, dated Nov. 15, 2017, received in U.S. Appl. No. 14/856,519, 31 pages.
Notice of Allowance, dated Jan. 31, 2018, received in U.S. Appl. No. 14/856,519, 9 pages.
Final Office Action, dated Nov. 16, 2017, received in U.S. Appl. No. 14/856,520, 41 pages.
Notice of Allowance, dated Feb. 9, 2018, received in U.S. Appl. No. 14/856,522, 9 pages.
Office Action, dated Nov. 30, 2017, received in U.S. Appl. No. 14/857,636, 19 pages.
Office Action, dated Jan. 17, 2018, received in Australian Patent Application No. 2017202816, which corresponds with U.S. Appl. No. 14/857,636, 3 pages.
Office Action, dated Dec. 1, 2017, received in U.S. Appl. No. 14/857,663, 15 pages.
Office Action, dated Dec. 15, 2017, received in Danish Patent Application No. 201500584, which corresponds with U.S. Appl. No. 14/864,580, 4 pages.
Office Action, dated Dec. 15, 2017, received in Danish Patent Application No. 201500585, which corresponds with U.S. Appl. No. 14/864,627, 5 pages.
Office Action, dated Jan. 4, 2018, received in Danish Patent Application No. 201500579, which corresponds with U.S. Appl. No. 14/866,361, 2 pages.
Office Action, dated Jan. 22, 2018, received in U.S. Appl. No. 14/866,987, 22 pages.
Patent, dated Nov. 6, 2017, received in Danish Patent Application No. 201670463, which corresponds with U.S. Appl. No. 14/866,987, 6 pages.
Patent, dated Oct. 27, 2017, received in Japanese Patent Application No. 2016233449, which corresponds with U.S. Appl. No. 14/866,987, 3 pages.
Notice of Allowance, dated Mar. 6, 2018, received in Japanese Patent Application No. 2017-126445, which corresponds with U.S. Appl. No. 14/866,987, 5 pages.
Office Action, dated Nov. 29, 2017, received in U.S. Appl. No. 14/866,989, 31 pages.

(56) References Cited

OTHER PUBLICATIONS

Office Action, dated Feb. 26, 2018, received in Australian Patent Application No. 2017201079, which corresponds with U.S. Appl. No. 14/866,989, 6 pages.
Notice of Allowance, dated Feb. 5, 2018, received in Japanese Patent Application No. 2016-233450, which corresponds with U.S. Appl. No. 14/866,989, 5 pages.
Office Action, dated Jan. 29, 2018, received in Danish Patent Application No. 201500595, which corresponds with U.S. Appl. No. 14/871,236, 2 pages.
Final Office Action, dated Mar. 9, 2018, received in U.S. Appl. No. 14/870,754, 19 pages.
Office Action, dated Nov. 14, 2017, received in U.S. Appl. No. 14/870,882, 25 pages.
Notice of Allowance, dated Oct. 31, 2017, received in Danish Patent Application No. 201500596, which corresponds with U.S. Appl. No. 14/870,882, 2 pages.
Patent, dated Jan. 29, 2018, received in Danish Patent Application No. 201500596, which corresponds with U.S. Appl. No. 14/870,882, 4 pages.
Final Office Action, dated Feb. 16, 2018, received in U.S. Appl. No. 14/870,988, 18 pages.
Office Action, dated Nov. 22, 2017, received in U.S. Appl. No. 14/871,227, 24 pages.
Office Action, dated Oct. 16, 2017, received in Australian Patent Application No. 2016203040, which corresponds with U.S. Appl. No. 14/871,227, 5 pages.
Notice of Allowance, dated Jan. 4, 2018, received in Japanese Patent Application No. 2016-533201, which corresponds with U.S. Appl. No. 14/871,227, 4 pages.
Patent, dated Feb. 9, 2018, received in Japanese Patent Application No. 2016533201, which corresponds with U.S. Appl. No. 14/871,227, 4 pages.
Office Action, dated Feb. 20, 2018, received in Korean Patent Application No. 2016-7019816, which corresponds with U.S. Appl. No. 14/871,227, 8 pages.
Office Action, dated Oct. 26, 2017, received in U.S. Appl. No. 14/871,336, 22 pages.
Patent, dated Oct. 30, 2017, Danish Patent Application No. 201500601, which corresponds with U.S. Appl. No. 14/871,336, 5 pages.
Office Action, dated Oct. 16, 2017, received in U.S. Appl. No. 14/871,462, 26 pages.
Innovation Patent, dated Oct. 11, 2017, received in Australian Patent Application No. 2016231505, which corresponds with U.S. Appl. No. 14/871,462, 1 page.
Office Action, dated Nov. 13, 2017, received in Japanese Patent Application No. 2016-183289, which corresponds with U.S. Appl. No. 14/871,462, 5 pages.
Final Office Action, dated Nov. 29, 2017, received in U.S. Appl. No. 14/867,823, 47 pages.
Office Action, dated Jan. 23, 2018, received in Danish Patent Application No. 201500594, which corresponds with U.S. Appl. No. 14/867,823, 8 pages.
Final Office Action, dated Dec. 14, 2017, received in U.S. Appl. No. 14/867,892, 53 pages.
Office Action, dated Oct. 31, 2017, received in Danish Patent Application No. 201500598, which corresponds with U.S. Appl. No. 14/867,892, 2 pages.
Notice of Allowance, dated Jan. 26, 2018, received in Danish Patent Application No. 201500598, which corresponds with U.S. Appl. No. 14/867,892, 2 pages.
Office Action, dated Feb. 28, 2018, received in U.S. Appl. No. 14/869,261, 26 pages.
Final Office Action, dated Oct. 10, 2017, received in U.S. Appl. No. 14/869,855, 16 pages.
Office Action, dated Jan. 23, 2018, received in U.S. Appl. No. 14/869,855, 24 pages.
Office Action, dated Jan. 18, 2018, received in U.S. Appl. No. 14/869,873, 25 pages.
Office Action, dated Jan. 11, 2018, received in U.S. Appl. No. 14/869,997, 17 pages.
Notice of Allowance, dated Jan. 17, 2018, received in U.S. Appl. No. 14/867,990, 12 pages.
Office Action, dated Feb. 19, 2018, received in Danish Patent Application No. 201500581, which corresponds with U.S. Appl. No. 14/867,990, 4 pages.
Office Action, dated Dec. 12, 2017, received in U.S. Appl. No. 15/009,668, 32 pages.
Notice of Allowance, dated Dec. 4, 2017, received in U.S. Appl. No. 15/081,771, 10 pages.
Office Action, dated Feb. 1, 2018, received in Australian Patent Application No. 2017202058, which corresponds with U.S. Appl. No. 15/081,771, 4 pages.
Office Action, dated Jan. 26, 2018, received in Japanese Patent Application No. 2017-086460, which corresponds with U.S. Appl. No. 15/081,771, 6 pages.
Notice of Allowance, dated Oct. 20, 2017, received in U.S. Appl. No. 15/136,782, 9 pages.
Office Action, dated Jan. 8, 2018, received in Danish Patent Application No. 201770190, which corresponds with U.S. Appl. No. 15/136,782, 2 pages.
Office Action, dated Feb. 22, 2018, received in Danish Patent Application No. 201670587, which corresponds with U.S. Appl. No. 15/231,745, 4 pages.
Office Action, dated Jan. 10, 2018, received in Danish Patent Application No. 201670590, which corresponds with U.S. Appl. No. 15/231,745, 2 pages.
Office Action, dated Jan. 30, 2018, received in Danish Patent Application No. 201670592, which corresponds with U.S. Appl. No. 15/231,745, 2 pages.
Patent, dated Oct. 30, 2017, received in Danish Patent Application No. 201670593, which corresponds with U.S. Appl. No. 15/231,745, 3 pages.
Notice of Acceptance, dated Mar. 2, 2018, received in Australian Patent Application No. 2018200705, which corresponds with U.S. Appl. No. 15/272,327, 3 pages.
Notice of Acceptance, dated Mar. 2, 2018, received in Australian Patent Application No. 2016304832, which corresponds with U.S. Appl. No. 15/272,345.
Office Action, dated Feb. 7, 2018, received in Danish Patent Application No. 201770709, 2 pages.
Office Action, dated Oct. 16, 2017, received in Danish Patent Application No. 201770710, 10 pages.
Office Action, dated Mar. 7, 2018, received in U.S. Appl. No. 15/482,618, 7 pages.
Office Action, dated Oct. 31, 2017, received in U.S. Appl. No. 15/723,069, 7 pages.
Notice of Allowance, dated Dec. 21, 2017, received in U.S. Appl. No. 15/723,069, 7 pages.
Extended European Search Report, dated Nov. 24, 2017, received in European Patent Application No. 17186744.3, which corresponds with U.S. Appl. No. 14/536,291, 10 pages.
Extended European Search Report, dated Oct. 17, 2017, received in European Patent Application No. 17184437.6, Which corresponds with U.S. Appl. No. 14/868,078, 8 pages.
Search Report, dated Feb. 15, 2018, received in Dutch Patent Application No. 2019215, which corresponds with U.S. Appl. No. 14/864,529, 13 pages.
Search Report, dated Feb. 15, 2018, received in Dutch Patent Application No. 2019214, which corresponds with U.S. Appl. No. 14/864,601, 12 pages.
Extended European Search Report, dated Oct. 10, 2017, received in European Patent Application No. 17188507.2, which corresponds with U.S. Appl. No. 14/866,361, 9 pages.
Extended European Search Report, dated Mar. 2, 2018, received in European Patent Application No. 17206374.5, which corresponds with U.S. Appl. No. 15/272,343, 11 pages.
Office Action, dated Mar. 9, 2018, received in European Patent Application No. 13795391.5, which corresponds with U.S. Appl. No. 14/536,426, 4 pages.

(56) References Cited

OTHER PUBLICATIONS

Office Action, dated Mar. 9, 2018, received in European Patent Application No. 15183980.0, which corresponds with U.S. Appl. No. 14/536,426, 5 pages.
Oral Proceedings, dated Mar. 7, 2018, received in European Office Action No. 13798465.4, which corresponds with U.S. Appl. No. 14/608,965, 5 pages.
Office Action, dated Mar. 20, 2018, received in U.S. Appl. No. 14/609,006, 13 pages.
Notice of Allowance, dated Mar. 14, 2018, received in U.S. Appl. No. 14/536,296, 8 pages.
Decision to grant, dated Mar. 29, 2018, received in European Patent Application No. 16710871.1, which corresponds with U.S. Appl. No. 14/864,737, 2 pages.
Notice of Allowance, dated Mar. 21, 2018, received in Danish Patent Application No. 201500574, which corresponds with U.S. Appl. No. 14/866,159, 2 pages.
Office Action, dated Mar. 26, 2018, received in Australian Patent Application No. 2016304890, which corresponds with U.S. Appl. No. 14/866,992, 3 pages.
Notice of Allowance, dated Mar. 16, 2018, received in Danish Patent Application No. 201500579, which corresponds with U.S. Appl. No. 14/866,361, 2 pages.
Patent, dated Mar. 9, 2018, received in Japanese Patent Application No. 2016233450, which corresponds with U.S. Appl. No. 14/866,989, 4 pages.
Final Office Action, dated Mar. 15, 2018, received in U.S. Appl. No. 14/871,336, 23 pages.
Office Action, dated Apr. 2, 2018, received in Japanese Patent Application No. 2018-020324, which corresponds with U.S. Appl. No. 14/874,336, 4 pages.
Notice of Allowance, dated Mar. 30, 3018, received in U.S. Appl. No. 14/867,990, 5 pages.
Notice of Allowance, dated Mar. 19, 2018, received in Danish Patent Application No. 201770190, which corresponds with U.S. Appl. No. 15/136,782, 2 pages.
Notice of Allowance, dated Mar. 27, 2018, received in Danish Patent Application No. 201670592, which corresponds with U.S. Appl. No. 15/231,745, 2 pages.
Anonymous, "1-Click Installer for Windows Media Taskbar Mini-Player for Windows 7, 8, 8.1 10", http://metadataconsulting.blogspot.de/2014/05/installer-for-windows-media-taskbar.htm, May 5, 2014, 6 pages.
Anonymous, "[new] WMP12 with Taskbar Toolbar for Windows 7—Windows Customization—WinMatrix", hrrp://www.winmatrix.com/forums/index/php?/topic/25528-new-wmp12-with-taskbar-toolbar-for-windows-7, Jan. 27, 2013, 6 pages.
Anonymous, "Taskbar Extensions", https://web.archive.org/web/20141228124434/http://msdn.microsoft.com:80/en-us/library/windows/desktop/dd378460(v=vs.85).aspx, Dec. 28, 2014, 8 pages.
Easton-Ellett, "Three Free Cydia Utilies to Remove iOS Notification Badges", http://www.ijailbreak.com/cydia/three-free-cydia-utilies-to-remove-ios-notification-badges, Apr. 14, 2012, 2 pages.
iPhoneHacksTV, "Confero allows you to easily manage your Badge notifications—iPhone Hacks", youtube, https://wwwyoutube.com/watch?v=JCk61pnL4SU, Dec. 26, 2014, 3 pages.
Mandi, Confero now available in Cydia, brings a new way to manage Notification badges [Jailbreak Tweak], http://www.iphonehacks.com/2015/01/confero/tweak-manage-notification-badges.html, Jan. 1, 2015, 2 pages.
Ritchie, "How to see all the unread message notifications on your iPhone, all at once, all in the same place | iMore", https://www.imore.com/how-see-all-unread-message-notifications-your-iphone-all-once-all-same-place, Feb. 22, 2014, 2 pages.
Office Action, dated May 8, 2018, received in Australian Patent Application No. 2016216580, which corresponds with U.S. Appl. No. 14/536,426, 5 pages.
Notice of Allowance, dated May 17, 2018, received in Australian Patent Application No. 2016216580, which corresponds with U.S. Appl. No. 14/536,426, 3 pages.
Notice of Allowance, dated May 10, 2018, received in Chinese Patent Application No. 201380035982.1, which corresponds with U.S. Appl. No. 14/536,426, 2 pages.
Certificate of Grant, dated May 3, 2018, received in Australian Patent Application No. 2016201451, which corresponds with U.S. Appl. No. 14/608,926, 1 page.
Patent, dated May 4, 2018, received in Chinese Patent Application No. 201380068414.1, which corresponds with U.S. Appl. No. 14/608,926, 4 pages.
Patent, dated Apr. 27, 2018, received in Japanese Patent Application No. 2017024234, which corresponds with U.S. Appl. No. 14/608,926, 3 pages.
Office Action, dated Apr. 9, 2018, received in European Patent Application No. 13726053.5, which corresponds with U.S. Appl. No. 14/536,141, 9 pages.
Office Action, dated Mar. 28, 2018, received in Chinese Patent Application No. 201380068295.X, which corresponds with U.S. Appl. No. 14/608,942, 5 pages.
Notice of Allowance, dated Apr. 4, 2018, received in Chinese Patent Application No. 201380035977.0, which corresponds with U.S. Appl. No. 14/536,203, 3 pages.
Patent, dated Apr. 20, 2018, received in Chinese Patent Application No. 201380035968.1, which corresponds with U.S. Appl. No. 14/536,267, 4 pages.
Office Action, dated Apr. 27, 2018, received in Japanese Patent Application No. 2017-008764, which corresponds with U.S. Appl. No. 14/536,648, 5 pages.
Office Action, dated Apr. 16, 2018, received in Australian Patent Application No. 2016233792, which corresponds with U.S. Appl. No. 14/864,737, 2 pages.
Grant Certificate, dated Apr. 25, 2018, received in European Patent Application No. 16710871.1, which corresponds with U.S. Appl. No. 14/864,737, 2 pages.
Patent, dated May 22, 2018, received in Danish Patent Application No. 201500574, which corresponds with U.S. Appl. No. 14/866,159, 2 pages.
Office Action, dated Apr. 25, 2018, received in European Patent Application No. 16708916.8, which corresponds with U.S. Appl. No. 14/868,078, 6 pages.
Office Action, dated May 24, 2018, received in European Patent Application No. 16727900.9, which corresponds with U.S. Appl. No. 14/866,511, 7 pages.
Notice of Allowance, dated Apr. 24, 2018, received in Danish Patent Application No. 201500592, which corresponds with U.S. Appl. No. 14/869,899, 2 pages.
Patent, dated May 28, 2018, received in Danish Patent Application No. 201500592, which corresponds with U.S. Appl. No. 14/869,899, 2 pages.
Office Action, dated May 1, 2018, received in Danish Patent Application No. 201670594, which corresponds with U.S. Appl. No. 14/869,899, 2 pages.
Grant of Patent, dated Apr. 16, 2018, received in Dutch Patent Application No. 2019215, 2 pages.
Patent, dated May 22, 2018, received in Danish Patent Application No. 201500579, which corresponds with U.S. Appl. No. 14/866,361, 2 pages.
Office Action, dated Jun. 11, 2018, received in European Patent Application No. 17188507.2, which corresponds with U.S. Appl. No. 14/866,361, 10 pages.
Office Action, dated May 7, 2018, received in European Patent Application No. 16189421.7, which corresponds with U.S. Appl. No. 14/866,987, 5 pages.
Patent, dated Apr. 6, 2018, received in Japanese Patent Application No. 2017126445, which corresponds with U.S. Appl. No. 14/866,987, 3 pages.
Notice of Allowance, dated Apr. 26, 2018, received in Danish Patent Application No. 201500595, which corresponds with U.S. Appl. No. 14/871,236, 2 pages.
Office Action, dated Jun. 1, 2018, received in Japanese Patent Application No. 2018-062161, which corresponds with U.S. Appl. No. 15/136,782, 5 pages.

(56) References Cited

OTHER PUBLICATIONS

Office Action, dated May 4, 2018, received in Australian Patent Application No. 2018202855, which corresponds with U.S. Appl. No. 15/136,782, 3 pages.
Patent, dated May 22, 2018, received in Danish Patent Application No. 201770190, which corresponds with U.S. Appl. No. 15/136,782, 2 pages.
Patent, dated May 28, 2018, received in Danish Patent Application No. 201670590, which corresponds with U.S. Appl. No. 15/231,745, 2 pages.
Office Action, dated Apr. 11, 2018, received in Danish Patent Application No. 201670591, which corresponds with U.S. Appl. No. 15/231,745, 3 pages.
Patent, dated May 28, 2018, received in Danish Patent Application No. 201670592, which corresponds with U.S. Appl. No. 15/231,745, 2 pages.
Office Action, dated Apr. 20, 2018, received in European Patent Application No. 16756862.5, which corresponds with U.S. Appl. No. 15/272,345, 15 pages.
Extended European Search Report, dated May 30, 2018, received in International Patent Application No. 18155939.4, which corresponds with U.S. Appl. No. 15/272,327, 8 pages.
Notice of Allowance, dated May 16, 2018, received in U.S. Appl. No. 14/536,367, 5 pages.
Final Office Action, dated May 3, 2018, received in U.S. Appl. No. 14/536,644, 28 pages.
Final Office Action, dated Jun. 6, 2018, received in U.S. Appl. No. 14/608,926, 19 pages.
Notice of Allowance, dated Jun. 1, 2018, received in U.S. Appl. No. 14/536,267, 5 pages.
Notice of Allowance, dated Mar. 20, 2018, received in U.S. Appl. No. 14/536,291, 5 pages.
Notice of Allowance, dated May 18, 2018, received in U.S. Appl. No. 14/866,159, 8 pages.
Notice of Allowance, dated May 24, 2018, received in U.S. Appl. No. 14/868,078, 6 pages.
Notice of Allowance, dated May 2, 2018, received in U.S. Appl. No. 14/856,519, 10 pages.
Notice of Allowance, dated Apr. 19, 2018, received in U.S. Appl. No. 14/864,529, 11 pages.
Final Office Action, dated Apr. 20, 2018, received in U.S. Appl. No. 14/870,882, 7 pages.
Notice of Allowance, dated Jun. 11, 2018, received in U.S. Appl. No. 14/871,227, 11 pages.
Notice of Allowance, dated Apr. 18, 2018, received in U.S. Appl. No. 14/867,823, 10 pages.
Office Action, dated Apr. 24, 2018, received in U.S. Appl. No. 14/867,892, 63 pages.
Notice of Allowance, dated May 31, 2018, received in U.S. Appl. No. 14/869,855, 10 pages.
Final Office Action, dated May 23, 2018, received in U.S. Appl. No. 14/869,873, 18 pages.
Office Action, dated Apr. 19, 2018, received in U.S. Appl. No. 14/869,703, 19 pages.
Office Action, dated Apr. 23, 2018, received in U.S. Appl. No. 15/499,691, 29 pages.
Final Office Action, dated May 10, 2018, received in U.S. Appl. No. 15/655,749, 19 pages.

\* cited by examiner

DEVICE, METHOD, AND GRAPHICAL USER INTERFACE FOR SWITCHING BETWEEN USER INTERFACES

RELATED APPLICATIONS

This application is a continuation of U.S. application Ser. No. 14/609,006, filed Jan. 29, 2015, which is a continuation of PCT Patent Application Serial No. PCT/US2013/069489, filed on Nov. 11, 2013, entitled "Device, Method, and Graphical User Interface for Switching between User Interfaces," which claims the benefit of and priority to U.S. Provisional Patent Application Ser. No. 61/778,418, filed on Mar. 13, 2013, entitled "Device, Method, and Graphical User Interface for Switching between User Interfaces;" and U.S. Provisional Patent Application No. 61/747,278, filed Dec. 29, 2012, entitled "Device, Method, and Graphical User Interface for Manipulating User Interface Objects with Visual and/or Haptic Feedback," which applications are incorporated by reference herein in their entireties.

This application is also related to the following: U.S. Provisional Patent Application Ser. No. 61/778,092, filed on Mar. 12, 2013, entitled "Device, Method, and Graphical User Interface for Selecting Object within a Group of Objects;" U.S. Provisional Patent Application Ser. No. 61/778,125, filed on Mar. 12, 2013, entitled "Device, Method, and Graphical User Interface for Navigating User Interface Hierarchies;" U.S. Provisional Patent Application Ser. No. 61/778,156, filed on Mar. 12, 2013, entitled "Device, Method, and Graphical User Interface for Manipulating Framed Graphical Objects;" U.S. Provisional Patent Application Ser. No. 61/778,179, filed on Mar. 12, 2013, entitled "Device, Method, and Graphical User Interface for Scrolling Nested Regions;" U.S. Provisional Patent Application Ser. No. 61/778,171, filed on Mar. 12, 2013, entitled "Device, Method, and Graphical User Interface for Displaying Additional Information in Response to a User Contact;" U.S. Provisional Patent Application Ser. No. 61/778,191, filed on Mar. 12, 2013, entitled "Device, Method, and Graphical User Interface for Displaying User Interface Objects Corresponding to an Application;" U.S. Provisional Patent Application Ser. No. 61/778,211, filed on Mar. 12, 2013, entitled "Device, Method, and Graphical User Interface for Facilitating User Interaction with Controls in a User Interface;" U.S. Provisional Patent Application Ser. No. 61/778,239, filed on Mar. 12, 2013, entitled "Device, Method, and Graphical User Interface for Forgoing Generation of Tactile Output for a Multi-Contact Gesture;" U.S. Provisional Patent Application Ser. No. 61/778,284, filed on Mar. 12, 2013, entitled "Device, Method, and Graphical User Interface for Providing Tactile Feedback for Operations Performed in a User Interface;" U.S. Provisional Patent Application Ser. No. 61/778,287, filed on Mar. 12, 2013, entitled "Device, Method, and Graphical User Interface for Providing Feedback for Changing Activation States of a User Interface Object;" U.S. Provisional Patent Application Ser. No. 61/778,363, filed on Mar. 12, 2013, entitled "Device, Method, and Graphical User Interface for Transitioning between Touch Input to Display Output Relationships;" U.S. Provisional Patent Application Ser. No. 61/778,367, filed on Mar. 12, 2013, entitled "Device, Method, and Graphical User Interface for Moving a User Interface Object Based on an Intensity of a Press Input;" U.S. Provisional Patent Application Ser. No. 61/778,265, filed on Mar. 12, 2013, entitled "Device, Method, and Graphical User Interface for Transitioning between Display States in Response to a Gesture;" U.S. Provisional Patent Application Ser. No. 61/778,373, filed on Mar. 12, 2013, entitled "Device, Method, and Graphical User Interface for Managing Activation of a Control Based on Contact Intensity;" U.S. Provisional Patent Application Ser. No. 61/778,412, filed on Mar. 13, 2013, entitled "Device, Method, and Graphical User Interface for Displaying Content Associated with a Corresponding Affordance;" U.S. Provisional Patent Application Ser. No. 61/778,413, filed on Mar. 13, 2013, entitled "Device, Method, and Graphical User Interface for Selecting User Interface Objects;" U.S. Provisional Patent Application Ser. No. 61/778,414, filed on Mar. 13, 2013, entitled "Device, Method, and Graphical User Interface for Moving and Dropping a User Interface Object;" and U.S. Provisional Patent Application Ser. No. 61/778,416, filed on Mar. 13, 2013, entitled "Device, Method, and Graphical User Interface for Determining Whether to Scroll or Select Content," which are incorporated herein by reference in their entireties.

This application is also related to the following: U.S. Provisional Patent Application Ser. No. 61/645,033, filed on May 9, 2012, entitled "Adaptive Haptic Feedback for Electronic Devices;" U.S. Provisional Patent Application Ser. No. 61/665,603, filed on Jun. 28, 2012, entitled "Adaptive Haptic Feedback for Electronic Devices;" and U.S. Provisional Patent Application Ser. No. 61/681,098, filed on Aug. 8, 2012, entitled "Adaptive Haptic Feedback for Electronic Devices," which are incorporated herein by reference in their entireties.

TECHNICAL FIELD

This relates generally to electronic devices with touch-sensitive surfaces, including but not limited to electronic devices with touch-sensitive surfaces that detect inputs for manipulating user interfaces.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Exemplary manipulations include adjusting the position and/or size of one or more user interface objects or activating buttons or opening files/applications represented by user interface objects, as well as associating metadata with one or more user interface objects or otherwise manipulating user interfaces. Exemplary user interface objects include digital images, video, text, icons, control elements such as buttons and other graphics. A user will, in some circumstances, need to perform such manipulations on user interface objects in a file management program (e.g., Finder from Apple Inc. of Cupertino, Calif.), an image management application (e.g., Aperture or iPhoto from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

But existing methods for performing these manipulations are cumbersome and inefficient. In addition, existing methods take longer than necessary, thereby wasting energy. This latter consideration is particularly important in battery-operated devices.

SUMMARY

Accordingly, there is a need for electronic devices with faster, more efficient methods and interfaces for manipulating user interfaces. Such methods and interfaces optionally complement or replace conventional methods for manipulating user interfaces. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

There is a need for electronic devices with faster, more efficient methods and interfaces for conveniently interacting with user interfaces (e.g., for switching from one application interface to another or for displaying a system user interface) on a portable multi-function device. Such methods and interfaces may complement or replace conventional methods for switching between user interfaces (e.g., switching between application user interfaces or for displaying system user interfaces). Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display, and a touch-sensitive surface. The method includes displaying, on the display, a first user interface that corresponds to a first application. The method further includes detecting a first gesture on the touch-sensitive surface, where the first gesture includes movement of a contact in a respective direction on the touch-sensitive surface. The method also includes in response to detecting the first gesture: in accordance with a determination that the movement of the contact is in a first direction, replacing display of the first user interface with display of a second user interface that corresponds to a second application; and in accordance with a determination that the movement of the contact is in a second direction, distinct from the first direction, displaying a first system user interface for interacting with a system-level function.

In accordance with some embodiments, an electronic device includes a display unit configured to display a first user interface that corresponds to a first application, a touch-sensitive surface unit configured to receive a contact on the touch-sensitive surface unit, and a processing unit coupled to the display unit and the touch-sensitive surface unit. The processing unit is configured to: detect a first gesture on the touch-sensitive surface unit, where the first gesture includes movement of a contact in a respective direction on the touch-sensitive surface unit; and in response to detecting the first gesture: in accordance with a determination that the movement of the contact is in a first direction, replace display of the first user interface with display of a second user interface that corresponds to a second application; and in accordance with a determination that the movement of the contact is in a second direction, distinct from the first direction, display a first system user interface for interacting with a system-level function.

Thus, electronic devices with displays and touch-sensitive surfaces are provided with faster, more efficient methods and interfaces for switching between user interfaces, thereby increasing the effectiveness, efficiency, and user satisfaction with such devices. Such methods and interfaces may complement or replace conventional methods for switching between user interfaces.

There is a need for electronic devices with faster, more efficient methods and interfaces for conveniently interacting with user interfaces (e.g., for switching from one application interface to another or launching an application interface from a home screen interface) on a portable multi-function device. Such methods and interfaces may complement or replace conventional methods for switching between user interfaces (e.g., switching between applications or launching applications) on multi-function devices. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display, and a touch-sensitive surface. The method includes: displaying, on the display, a respective user interface. The method further includes detecting a first gesture on the touch-sensitive surface, where the first gesture includes movement of a contact on the touch-sensitive surface. The method also includes, in response to detecting the first gesture: in accordance with a determination that the movement of the contact is in a first direction, displaying a first user interface that corresponds to a first application, where the first application is one of a set of applications selected based on application use criteria; and in accordance with a determination that the movement of the contact is in a second direction, distinct from the first direction, displaying a second user interface that corresponds to a second application, where the second application is a predefined application.

In accordance with some embodiments, an electronic device includes a display unit configured to display a respective user interface, a touch-sensitive surface unit configured to receive a contact on the touch-sensitive surface unit and a processing unit coupled to the display unit and the touch-sensitive surface unit. In some embodiments, the processing unit includes a detecting unit, a display enabling unit, a receiving unit, and an associating unit. The processing unit is configured to: detect a first gesture on the touch-sensitive surface, where the first gesture includes movement of a contact on the touch-sensitive surface; and in response to detecting the first gesture: in accordance with a determination that the movement of the contact is in a first direction, display a first user interface that corresponds to a first application, where the first application is one of a set of applications selected based on application use criteria; and in accordance with a determination that the movement of the contact is in a second direction, distinct from the first direction, display a second user interface that corresponds to a second application, where the second application is a predefined application.

Thus, electronic devices with displays, touch-sensitive surfaces are provided with faster, more efficient methods and interfaces for switching between user interfaces, thereby increasing the effectiveness, efficiency, and user satisfaction with such devices. Such methods and interfaces may complement or replace conventional methods for switching between user interfaces on a multi-function device.

There is a need for electronic devices with faster, more efficient methods and interfaces for conveniently interacting with user interfaces (e.g., switching from one application to another or launching an application from a home screen interface) on a portable multi-function device. Conventional approaches to switching between user interfaces (e.g., applications) on portable devices frequently involve multiple sequential user inputs or contacts (e.g., returning to a home screen and then toggling through pages of the home screen to select a desired application to be launched). These conventional approaches for interacting with user interfaces (e.g., applications) place undue cognitive burden on the users. The disclosed embodiments provide a convenient method of launching selected applications or switching between applications through a single moving gesture (such as a single swipe gesture) detected in a portion on the touch-sensitive surface of a portable electronic device (e.g., a touch-sensitive chin or bezel of the device). Such methods and interfaces may complement or replace conventional methods for switching between applications or launching applications on multi-function devices. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display, and a touch-sensitive surface. The method includes: displaying, on the display, a first user interface. The method further includes detecting a gesture on the touch-sensitive surface, where the gesture includes movement of a contact in a respective direction on the touch-sensitive surface. The method also includes in response to detecting the gesture: in accordance with a determination that the movement of the contact is entirely on a first portion of the touch-sensitive surface, performing an operation in the first user interface that corresponds to the gesture; and in accordance with a determination that the movement of the contact is entirely on a second portion of the touch-sensitive surface, replacing display of the first user interface with display of a second user interface different from the first user interface.

In accordance with some embodiments, an electronic device includes a display unit configured to display a first user interface, a touch-sensitive surface unit configured to receive a contact on the touch-sensitive surface unit, and a processing unit coupled to the display unit, and the touch-sensitive surface unit. The processing unit is configured to: detect a gesture on the touch-sensitive surface unit, wherein the gesture includes movement of a contact in a respective direction on the touch-sensitive surface unit; in response to detecting the gesture: in accordance with a determination that the movement of the contact is entirely on a first portion of the touch-sensitive surface unit, perform an operation in the first user interface that corresponds to the gesture; and in accordance with a determination that the movement of the contact is entirely on a second portion of the touch-sensitive surface unit, replace display of the first user interface with display of a second user interface different from the first user interface.

Thus, electronic devices with displays, touch-sensitive surfaces are provided with faster, more efficient methods and interfaces for switching between user interfaces (e.g., switching between applications or launching applications from a home screen) through user interaction with a touch-sensitive portion of a multi-function device, thereby increasing the effectiveness, efficiency, and user satisfaction with such devices. Such methods and interfaces may complement or replace conventional methods for switching between user interfaces or launching applications through user interaction with a touch-sensitive portion of a multi-function device.

There is a need for electronic devices with faster, more efficient methods and interfaces for undoing a previously performed content-modification operation. Such methods and interfaces may complement or replace conventional methods for facilitating text manipulation through user interaction with a multi-function device. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display, a touch-sensitive surface. The method includes: displaying, on the display, a user interface that includes content resulting from a sequence of previously performed content-modification operations; detecting a first gesture that includes movement of a contact in a first direction in a predefined area of the touch-sensitive surface; and in response to detecting the first gesture, displaying the content as it appeared just prior to performance of a most-recent content-modification operation of the sequence of content-modification operations.

In accordance with some embodiments, an electronic device includes a display unit configured to display content resulting from a sequence of previously performed content-modification operations; a touch-sensitive surface unit configured to receive a contact on the touch-sensitive surface unit; and a processing unit coupled to the display unit and the touch-sensitive surface unit. The processing unit is configured to: detect a first gesture that includes movement of a contact in a first direction in a predefined area of the touch-sensitive surface; and in response to detecting the first gesture, display the content as it appeared just prior to performance of a most-recent content-modification operation of the sequence of content-modification operations.

Thus, electronic devices with displays, touch-sensitive surfaces are provided with faster, more efficient methods and interfaces for facilitating user interaction with a touch-sensitive chin portion of a multi-function device, thereby increasing the effectiveness, efficiency, and user satisfaction with such devices. Such methods and interfaces may complement or replace conventional methods for facilitating user interaction with touch-sensitive portions of a multi-function device.

In accordance with some embodiments, an electronic device includes a display, a touch-sensitive surface, optionally one or more sensors to detect intensity of contacts with the touch-sensitive surface, one or more processors, memory, and one or more programs; the one or more programs are stored in the memory and configured to be executed by the one or more processors and the one or more programs include instructions for performing the operations of any of the methods referred to in the fifth paragraph of the Description of Embodiment. In accordance with some embodiments, a graphical user interface on an electronic device with a display, a touch-sensitive surface, optionally one or more sensors to detect intensity of contacts with the touch-sensitive surface, a memory, and one or more processors to execute one or more programs stored in the memory includes one or more of the elements displayed in any of the methods referred to in the fifth paragraph of the Description of Embodiment, which are updated in response to inputs, as described in any of the methods referred to in the fifth paragraph of the Description of Embodiments. In accordance with some embodiments, a computer readable storage medium has stored therein instructions which when executed by an electronic device with a display, a touch-sensitive surface, and optionally one or more sensors to detect intensity of contacts with the touch-sensitive surface, cause the device to perform the operations of any of the methods referred to in the fifth paragraph of the Description of Embodiments. In accordance with some embodiments, an electronic device includes: a display, a touch-sensitive surface, and optionally one or more sensors to detect intensity of contacts with the touch-sensitive surface; and means for performing the operations of any of the methods referred to in the fifth paragraph of the Description of Embodiments. In accordance with some embodiments, an information processing apparatus, for use in an electronic device with a display and a touch-sensitive surface, optionally one or more sensors to detect intensity of contacts with the touch-sensitive surface, includes means for performing the operations of any of the methods referred to in the fifth paragraph of the Description of Embodiments.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1A:
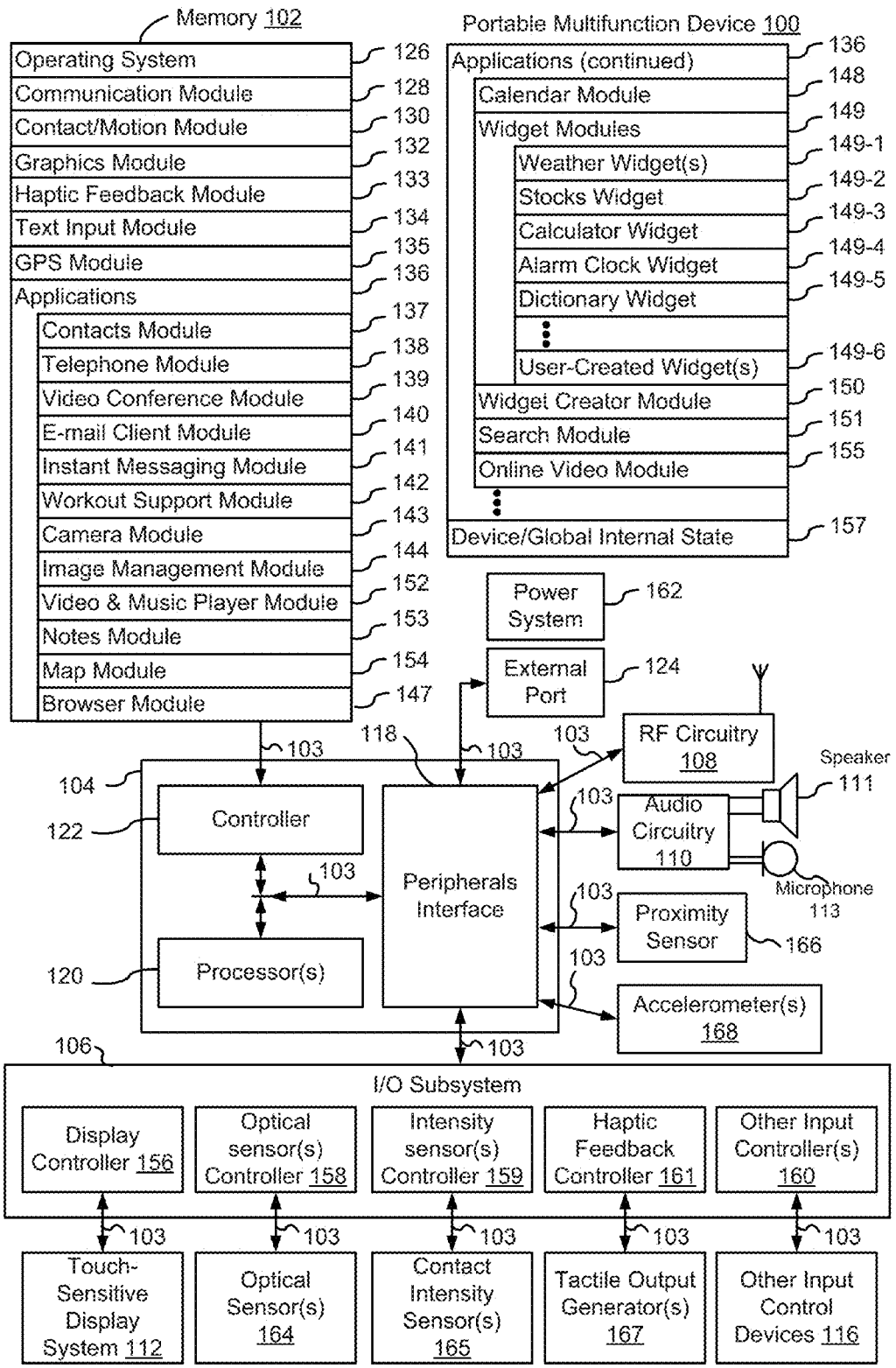
FIG. 1A is a block diagram illustrating a portable multifunction device with a touch-sensitive display in accordance with some embodiments.

The methods, devices and GUIs described herein provide visual and/or haptic feedback that makes manipulation of user interface objects more efficient and intuitive for a user. For example, in a system where the clicking action of a trackpad is decoupled from the contact intensity (e.g., contact force, contact pressure, or a substitute therefore) that is needed to reach an activation threshold, the device can generate different tactile outputs (e.g., "different clicks") for different activation events (e.g., so that clicks that accomplish a particular result are differentiated from clicks that do not produce any result or that accomplish a different result from the particular result). Additionally, tactile outputs can be generated in response to other events that are not related to increasing intensity of a contact, such as generating a tactile output (e.g., a "detent") when a user interface object is moved to a particular position, boundary or orientation, or when an event occurs at the device.

Additionally, in a system where a trackpad or touch-screen display is sensitive to a range of contact intensity that includes more than one or two specific intensity values (e.g., more than a simple on/off, binary intensity determination), the user interface can provide responses (e.g., visual or tactile cues) that are indicative of the intensity of the contact within the range. In some implementations, a pre-activation-threshold response and/or a post-activation-threshold response to an input are displayed as continuous animations. As one example of such a response, a preview of an operation is displayed in response to detecting an increase in contact intensity that is still below an activation threshold for performing the operation. As another example of such a response, an animation associated with an operation continues even after the activation threshold for the operation has been reached. Both of these examples provide a user with a continuous response to the force or pressure of a user's contact, which provides a user with visual and/or haptic feedback that is richer and more intuitive. More specifically, such continuous force responses give the user the experience of being able to press lightly to preview an operation and/or press deeply to push "past" or "through" a predefined user interface state corresponding to the operation.

Additionally, for a device with a touch-sensitive surface that is sensitive to a range of contact intensity, multiple contact intensity thresholds can be monitored by the device and different functions can be mapped to different contact intensity thresholds. This serves to increase the available "gesture space" providing easy access to advanced features for users who know that increasing the intensity of a contact at or beyond a second "deep press" intensity threshold will cause the device to perform a different operation from an operation that would be performed if the intensity of the contact is between a first "activation" intensity threshold and the second "deep press" intensity threshold. An advantage of assigning additional functionality to a second "deep press" intensity threshold while maintaining familiar functionality at a first "activation" intensity threshold is that inexperienced users who are, in some circumstances, confused by the additional functionality can use the familiar functionality by just applying an intensity up to the first "activation" intensity threshold, whereas more experienced users can take advantage of the additional functionality by applying an intensity at the second "deep press" intensity threshold.

Additionally, for a device with a touch-sensitive surface that is sensitive to a range of contact intensity, the device can provide additional functionality by allowing users to perform complex operations with a single continuous contact. For example, when selecting a group of objects, a user can move a continuous contact around the touch-sensitive surface and can press while dragging (e.g., applying an intensity greater than a "deep press" intensity threshold) to add additional elements to a selection. In this way, a user can intuitively interact with a user interface where pressing harder with a contact causes objects in the user interface to be "stickier."

Figure 5A:
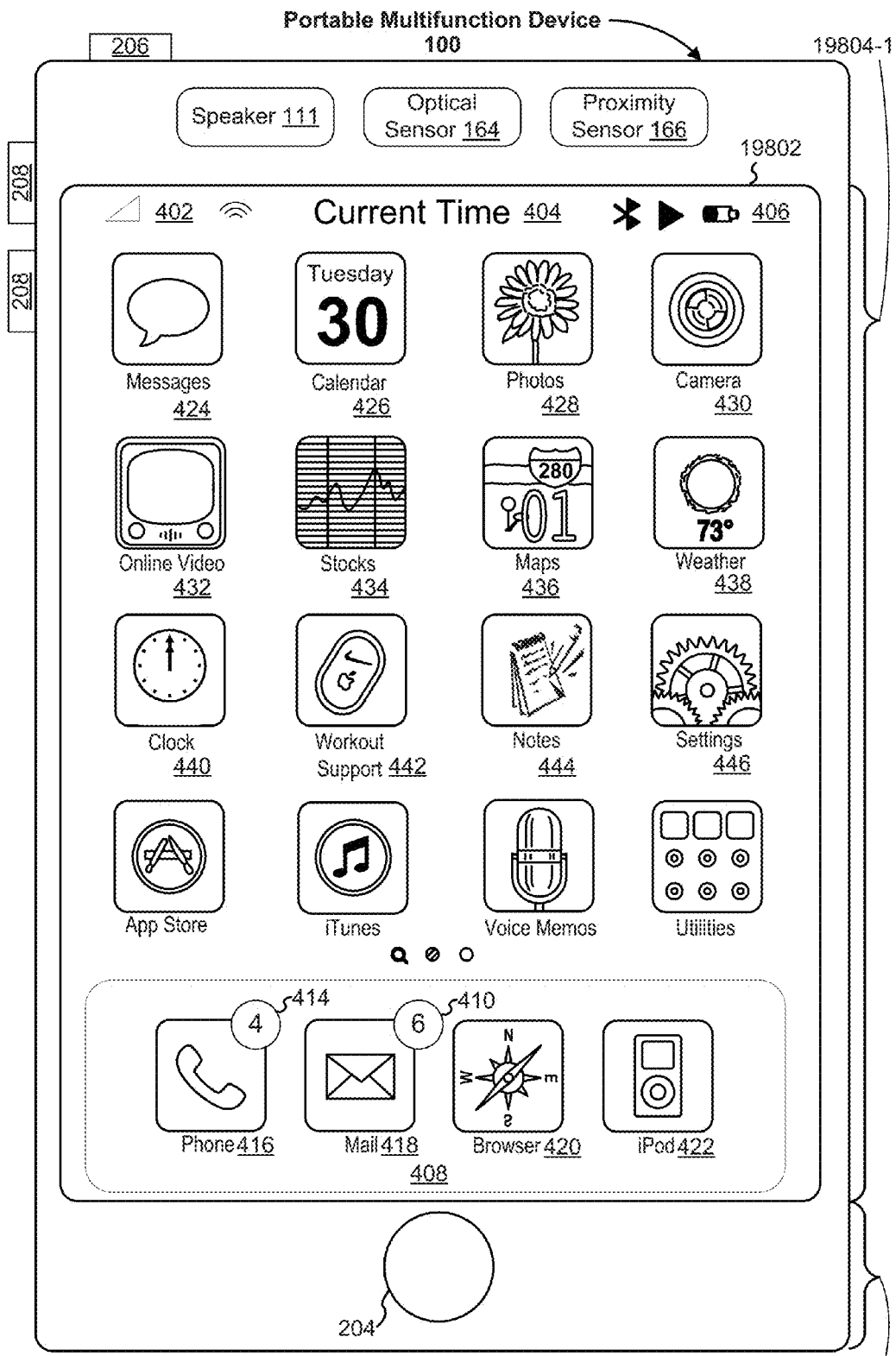
FIGS. 5A-5Q illustrate exemplary user interfaces for switching between user interfaces in accordance with some embodiments.
Figure 5B:
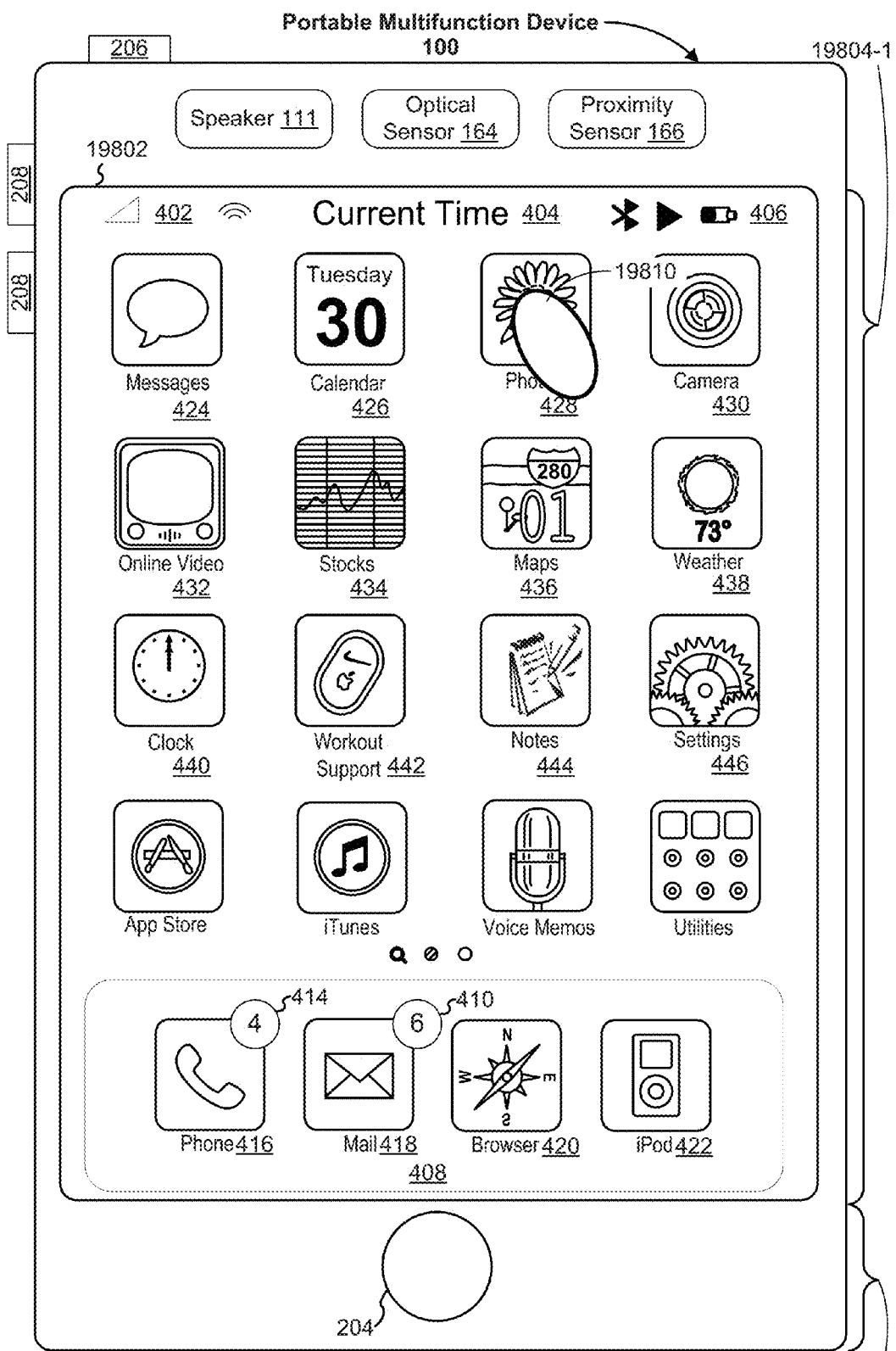

A number of different approaches to providing an intuitive user interface on a device where a clicking action is decoupled from the force that is needed to reach an activation threshold and/or the device is sensitive to a wide range of contact intensities are described below. Using one or more of these approaches (optionally in conjunction with each other) helps to provide a user interface that intuitively provides users with additional information and functionality, thereby reducing the user's cognitive burden and improving the human-machine interface. Such improvements in the human-machine interface enable users to use the device faster and more efficiently. For battery-operated devices, these improvements conserve power and increase the time between battery charges. For ease of explanation, systems, methods and user interfaces for including illustrative examples of some of these approaches are described below, as follows:

Many electronic devices have graphical user interfaces that allow users to perform a variety of functions and operations associated with the respective user interfaces. While interacting with such interfaces, the user frequently desires to switch from one user interface to another (e.g., from a calculator application interface to a photo viewing application interface; or from a home screen interface to a camera application interface; and the like) or from an application user interface to a system user interface. However, switching between different user interfaces can be a confusing and complex process including navigating through menus or providing complicated sequences of inputs. The embodiments described below provide a convenient and intuitive method of determining whether to switch from an application user interface to a different application user interface or a system user interface in accordance with a direction of movement of a contact. In particular, FIGS. 5A-5Q illustrate exemplary user interfaces for switching between user interfaces. FIGS. 6A-6C are flow diagrams illustrating a method of switching between user interfaces. The user interfaces in FIGS. 5A-5Q are used to illustrate the processes in FIGS. 6A-6C.

Many electronic devices have graphical user interfaces that allow users to perform a variety of functions and operations associated with the respective user interfaces. While interacting with such interfaces, the user frequently desires to switch from one user interface to another (e.g., from a calculator application interface to a photo viewing application interface; or from a home screen interface to a camera application interface; and the like) or from an application user interface to a system user interface. However, switching between different user interfaces can be a confusing and complex process including navigating through menus or providing complicated sequences of inputs. The embodiments described below provide a convenient and intuitive method of determining whether to switch from an application user interface to a predefined user interface or a recently accessed user interface in accordance with a direction of movement of a contact. In particular, FIGS. 8A-8K illustrate exemplary user interfaces for switching between user interfaces. FIGS. 9A-9D are flow diagrams illustrating a method of switching between user interfaces. The user interfaces in FIGS. 8A-8K are used to illustrate the processes in FIGS. 9A-9D.

Figure 11A:
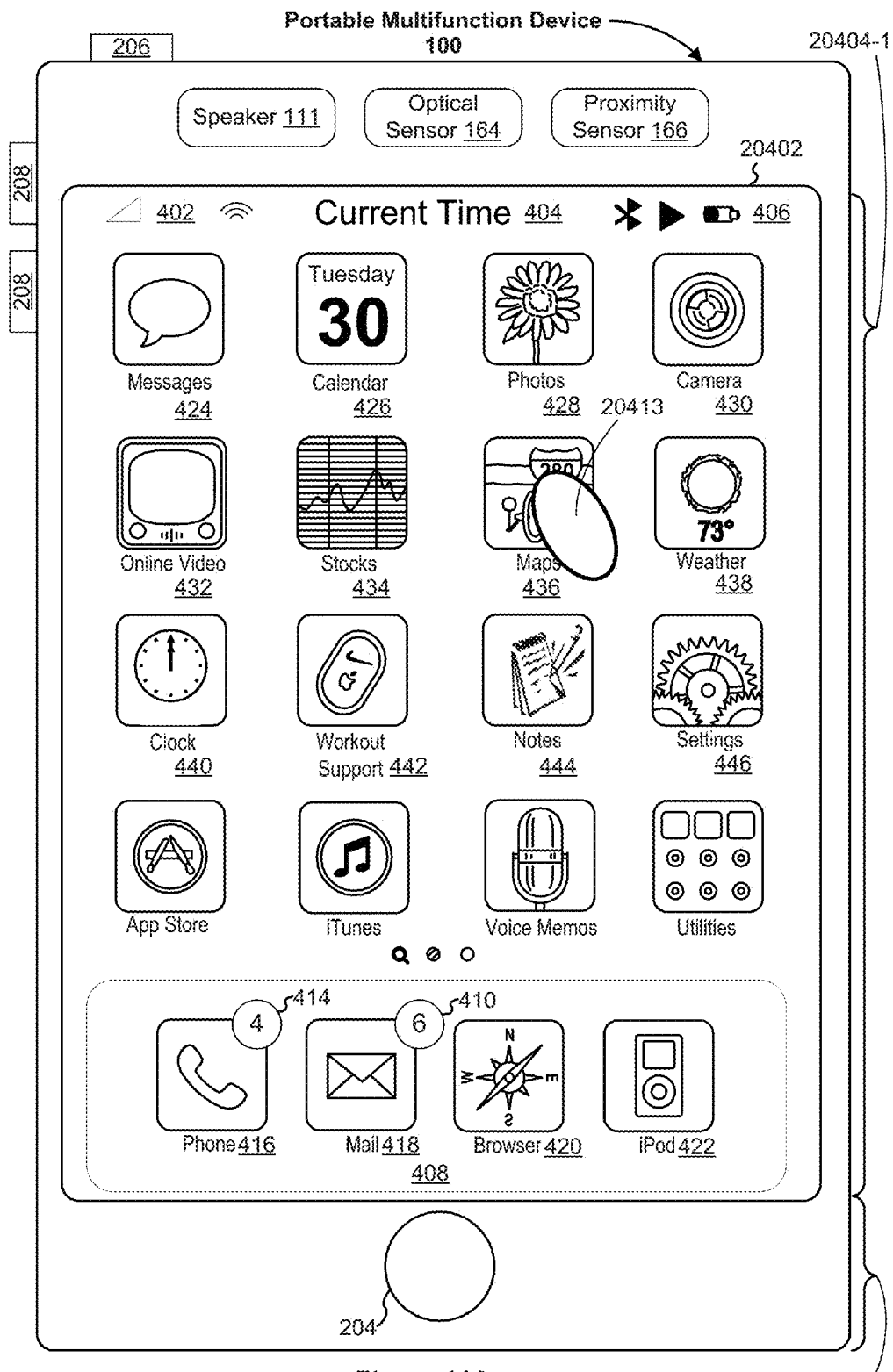
FIGS. 11A-11P illustrate exemplary user interfaces for switching between user interfaces in accordance with some embodiments.
Figure 11B:
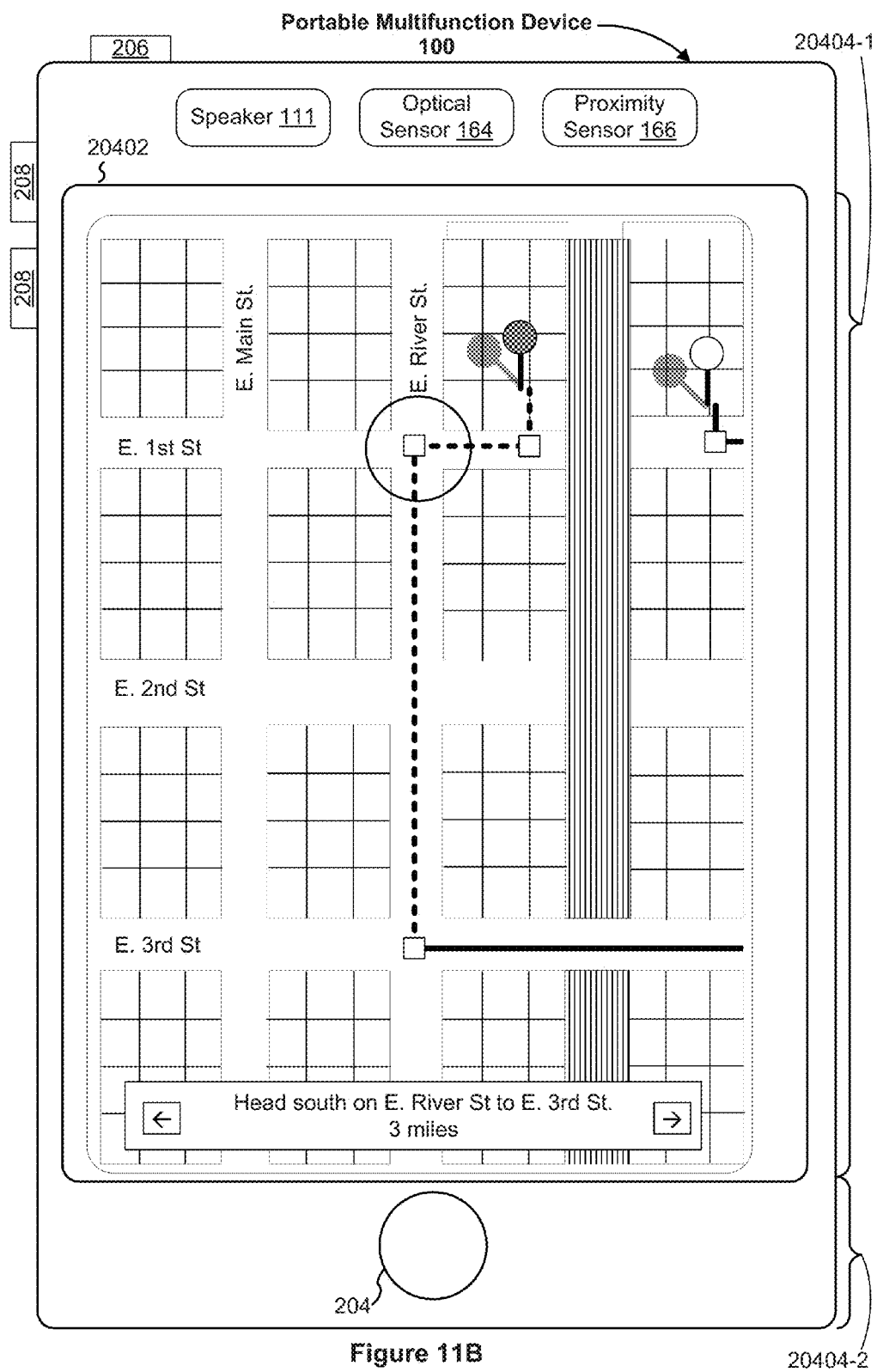
Figure 11P:
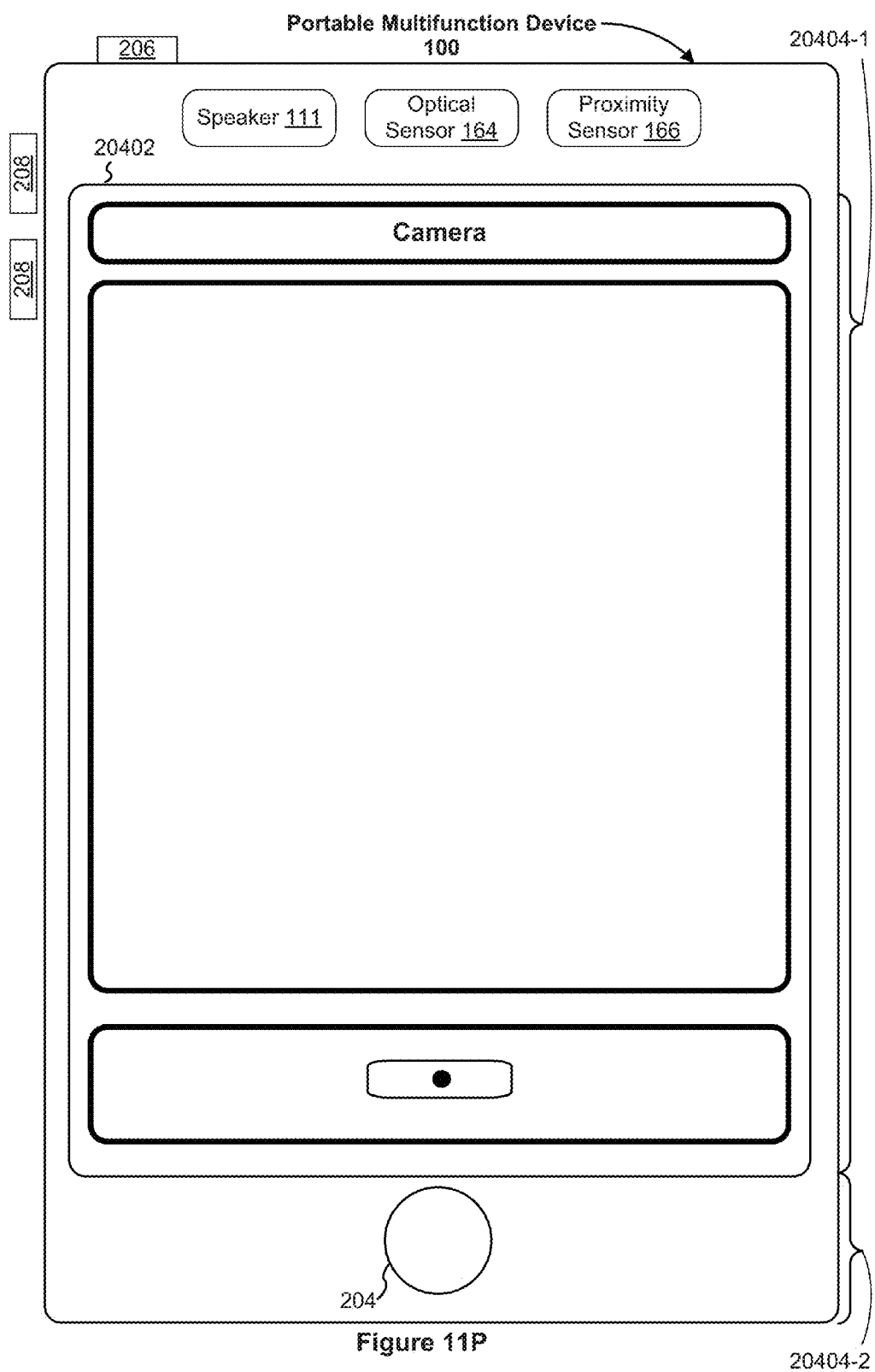
Figure 12A:
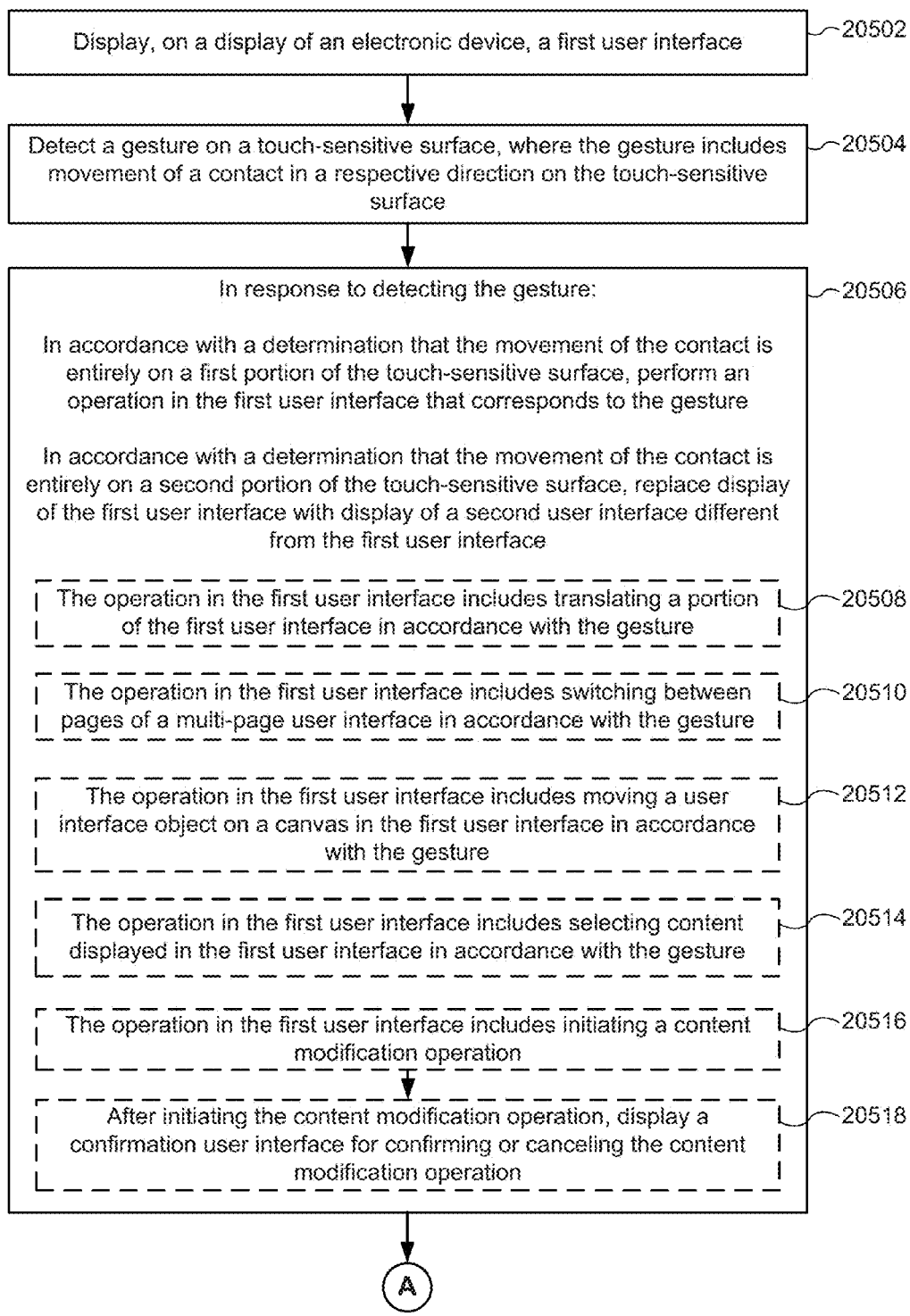
FIGS. 12A-12C are flow diagrams illustrating a method of switching between user interfaces in accordance with some embodiments.
Figure 12B:
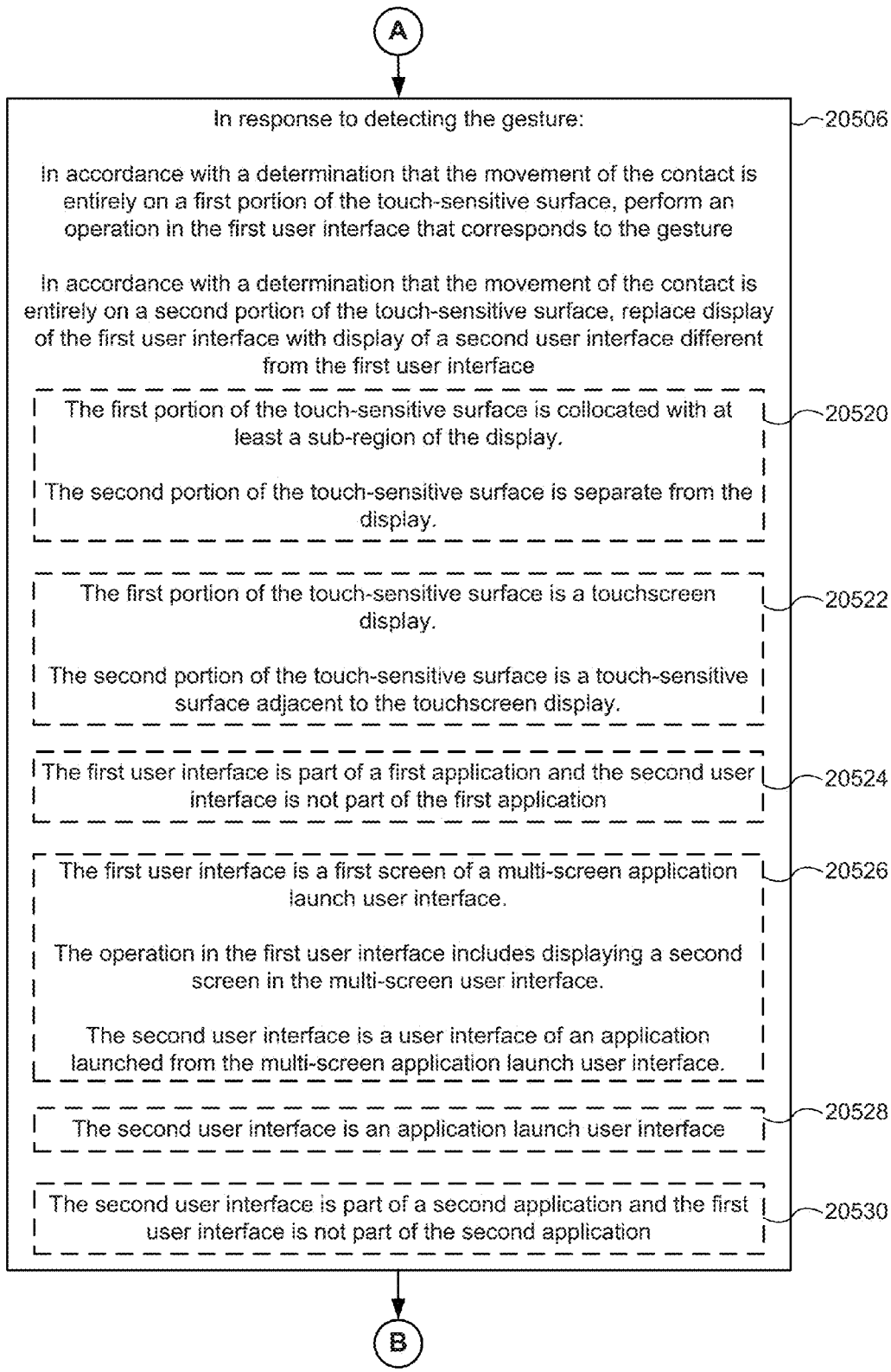
Figure 12C:
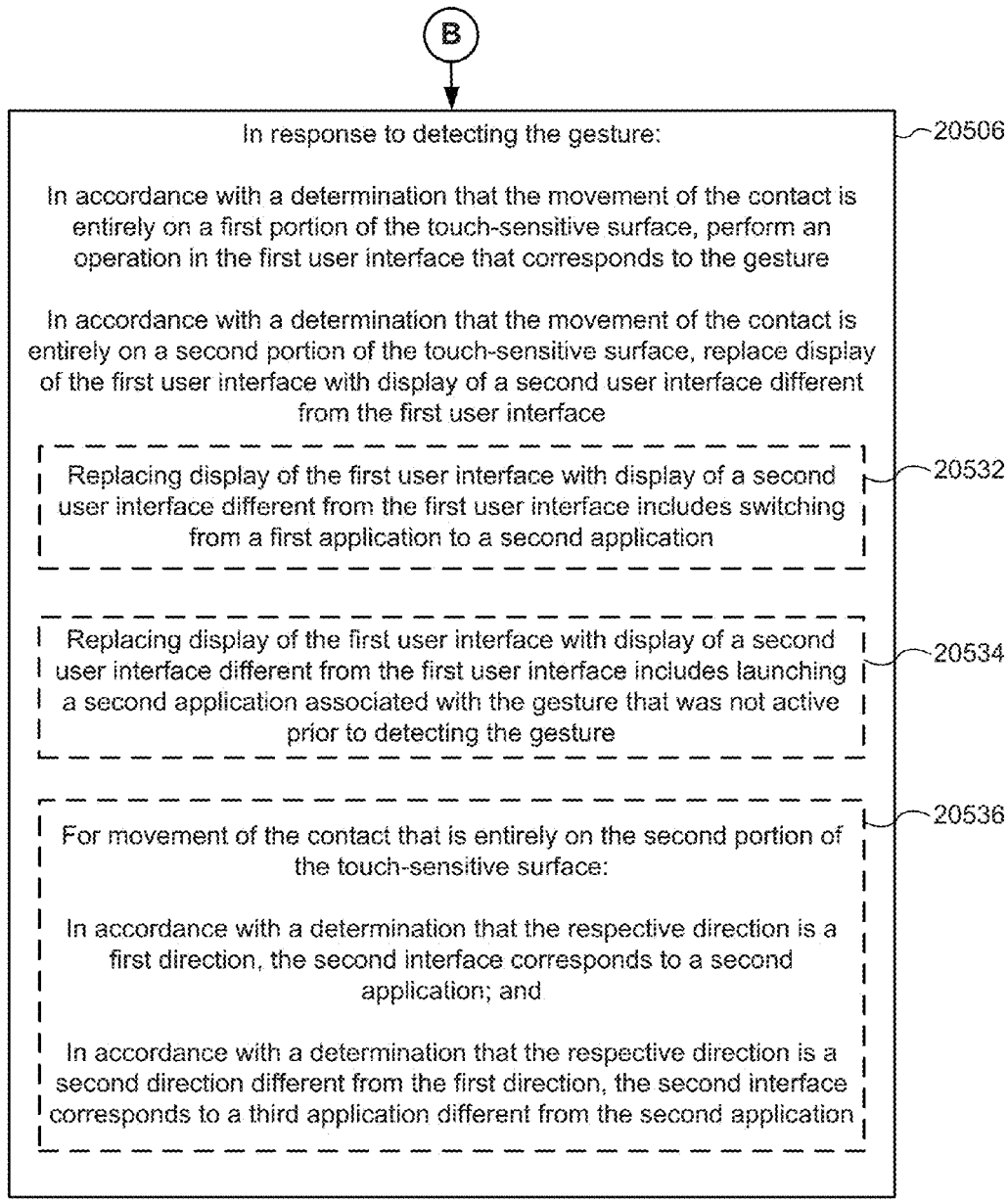

Many electronic devices have graphical user interfaces that allow users to perform a variety of functions and operations associated with the respective user interfaces. While interacting with such interfaces, the user frequently desires to switch from one user interface to another (e.g., from a calculator application interface to a photo viewing application interface; or from a home screen interface to a camera application interface; and the like) or from an application user interface to a system user interface. However, switching between different user interfaces can be a confusing and complex process including navigating through menus or providing complicated sequences of inputs. The embodiments described below provide a convenient and intuitive method of determining whether to perform an operation within a currently displayed application user interface or switch to a different application user interface in accordance with a location of a gesture on a touch-sensitive surface. In particular, FIGS. 11A-11P illustrate exemplary user interfaces for switching between user interfaces. FIGS. 12A-12C are flow diagrams illustrating a method of switching between user interfaces. The user interfaces in FIGS. 11A-11P are used to illustrate the processes in FIGS. 12A-12C.

Many electronic devices have graphical user interfaces that allow users to enter and modify content (e.g., interfaces with modifiable text in an email composition window, notepad, word document and the like) and sometimes undo or redo content modifications. However, undoing and redoing content modifications can be a confusing and complex process including navigating through menus or providing complicated sequences of inputs. The embodiments described below provide a convenient and intuitive method of undoing and/or redoing content-modification operations in accordance with a gesture detected in a predefined area of the touch-sensitive surface of a device. In particular, FIGS. 14A-14K illustrate exemplary user interfaces for undoing a previously performed content-modification operation. FIGS. 15A-15C are flow diagrams illustrating a method of undoing a previously performed content-modification operation. The user interfaces in FIGS. 14A-14K are used to illustrate the processes in FIGS. 15A-15C.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
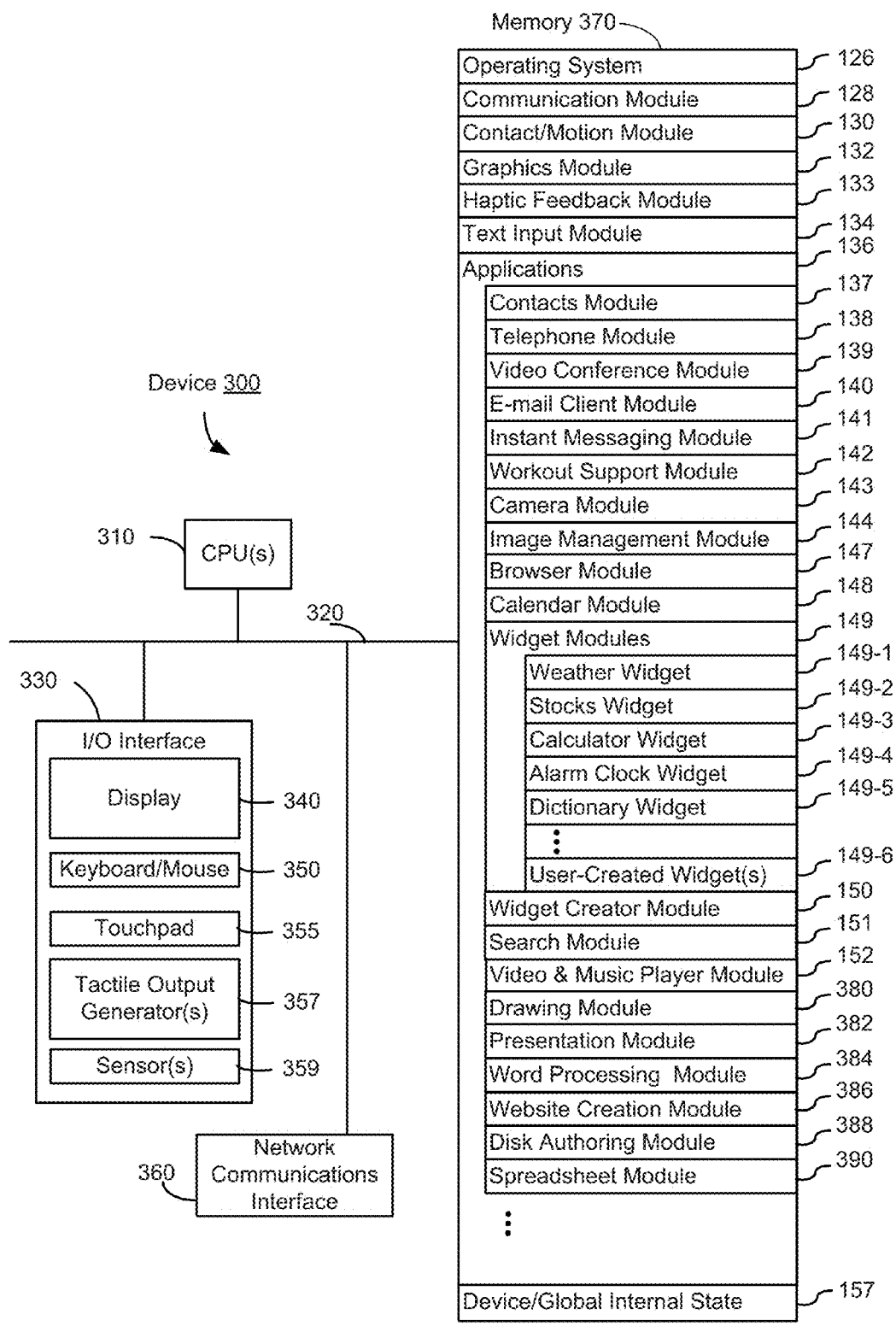
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns and intensities. Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
contacts module 137 (sometimes called an address book or contact list);
telephone module 138;
video conferencing module 139;
e-mail client module 140;
instant messaging (IM) module 141;
workout support module 142;
camera module 143 for still and/or video images;
image management module 144;
browser module 147;
calendar module 148;
widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which is, optionally, made up of a video player module and a music player module;
notes module 153;
map module 154; and/or
online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
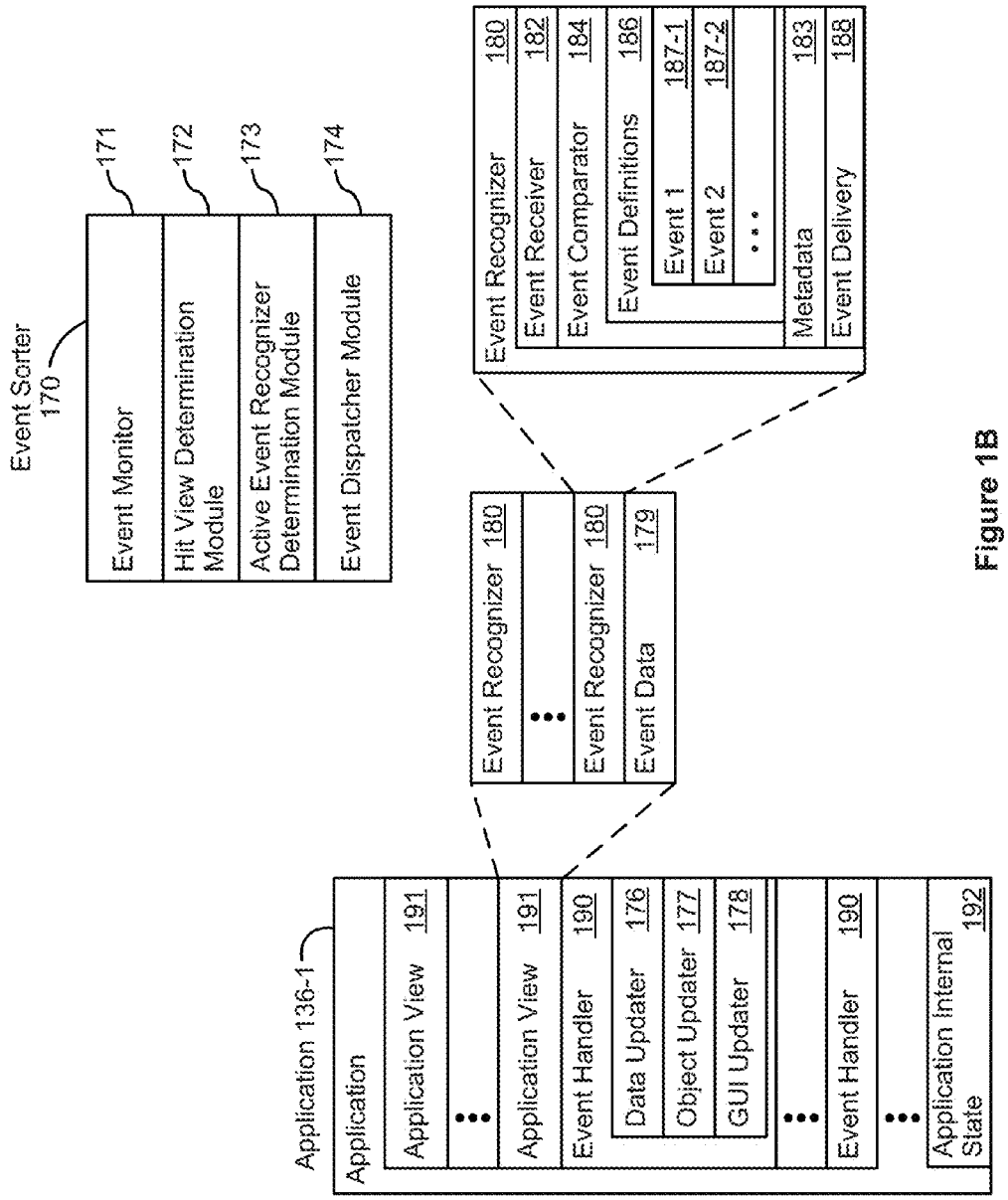
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
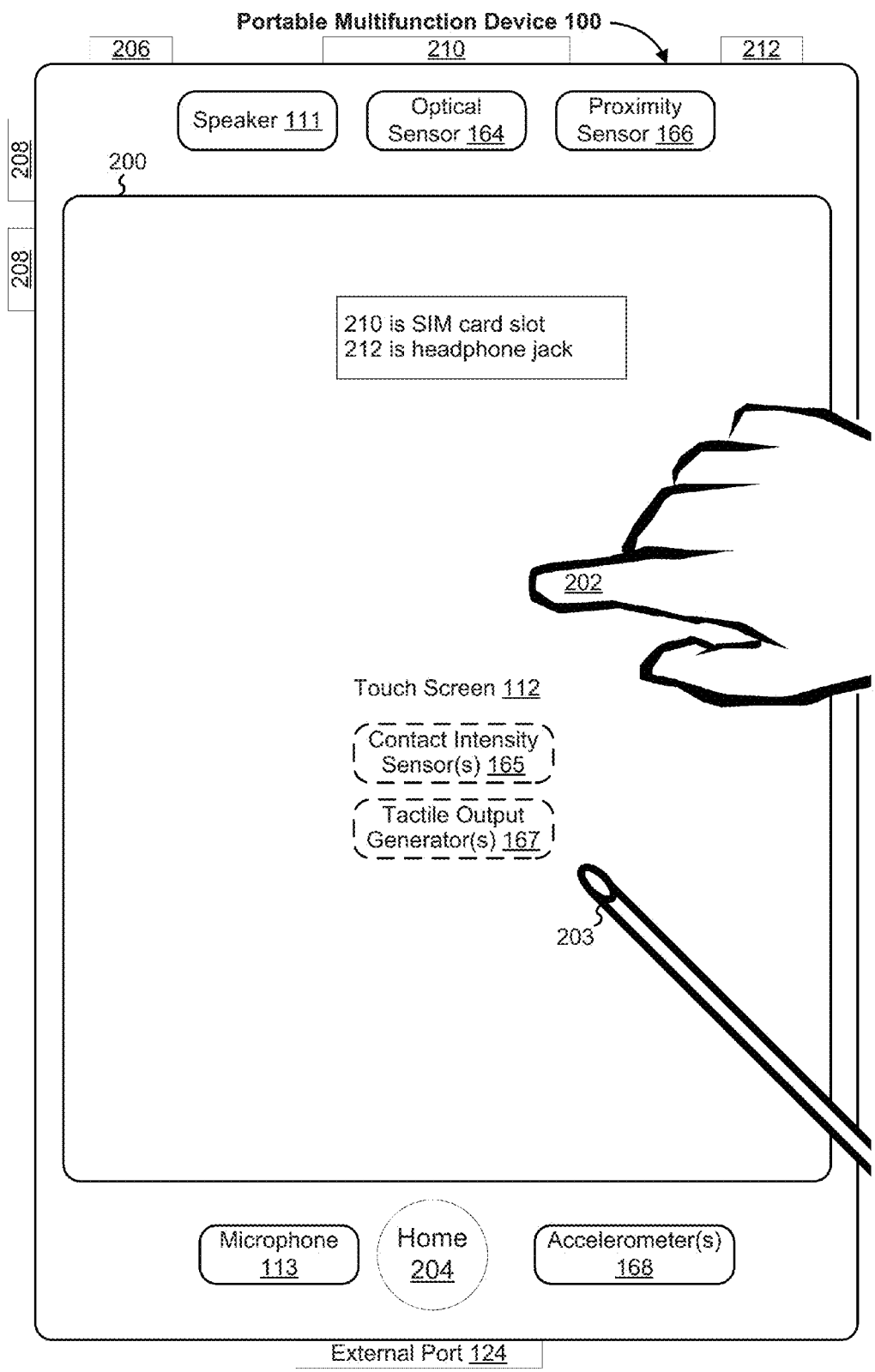
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

Figure 4A:
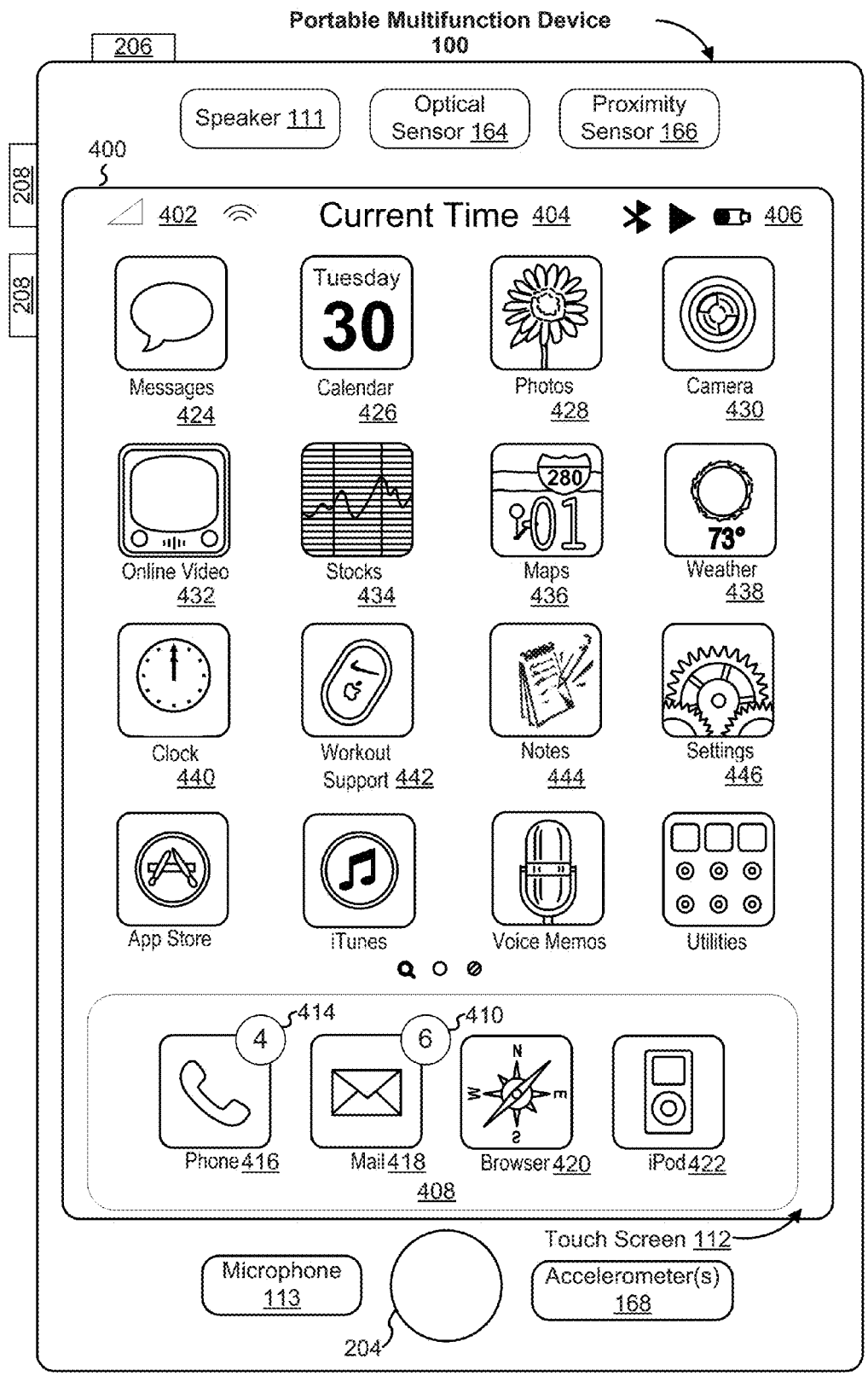
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;

Tray 408 with icons for frequently used applications, such as:

- Icon 416 for telephone module 138, labeled "Phone," which optionally includes an indicator 414 of the number of missed calls or voicemail messages;
- Icon 418 for e-mail client module 140, labeled "Mail," which optionally includes an indicator 410 of the number of unread e-mails;
- Icon 420 for browser module 147, labeled "Browser;" and
- Icon 422 for video and music player module 152, also referred to as iPod (trademark of Apple Inc.) module 152, labeled "iPod;" and Icons for other applications, such as:

- Icon 424 for IM module 141, labeled "Text;"
- Icon 426 for calendar module 148, labeled "Calendar;"
- Icon 428 for image management module 144, labeled "Photos;"
- Icon 430 for camera module 143, labeled "Camera;"
- Icon 432 for online video module 155, labeled "Online Video"
- Icon 434 for stocks widget 149-2, labeled "Stocks;"
- Icon 436 for map module 154, labeled "Map;"
- Icon 438 for weather widget 149-1, labeled "Weather;"
- Icon 440 for alarm clock widget 149-4, labeled "Clock;"
- Icon 442 for workout support module 142, labeled "Workout Support;"
- Icon 444 for notes module 153, labeled "Notes;" and
- Icon 446 for a settings application or module, which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
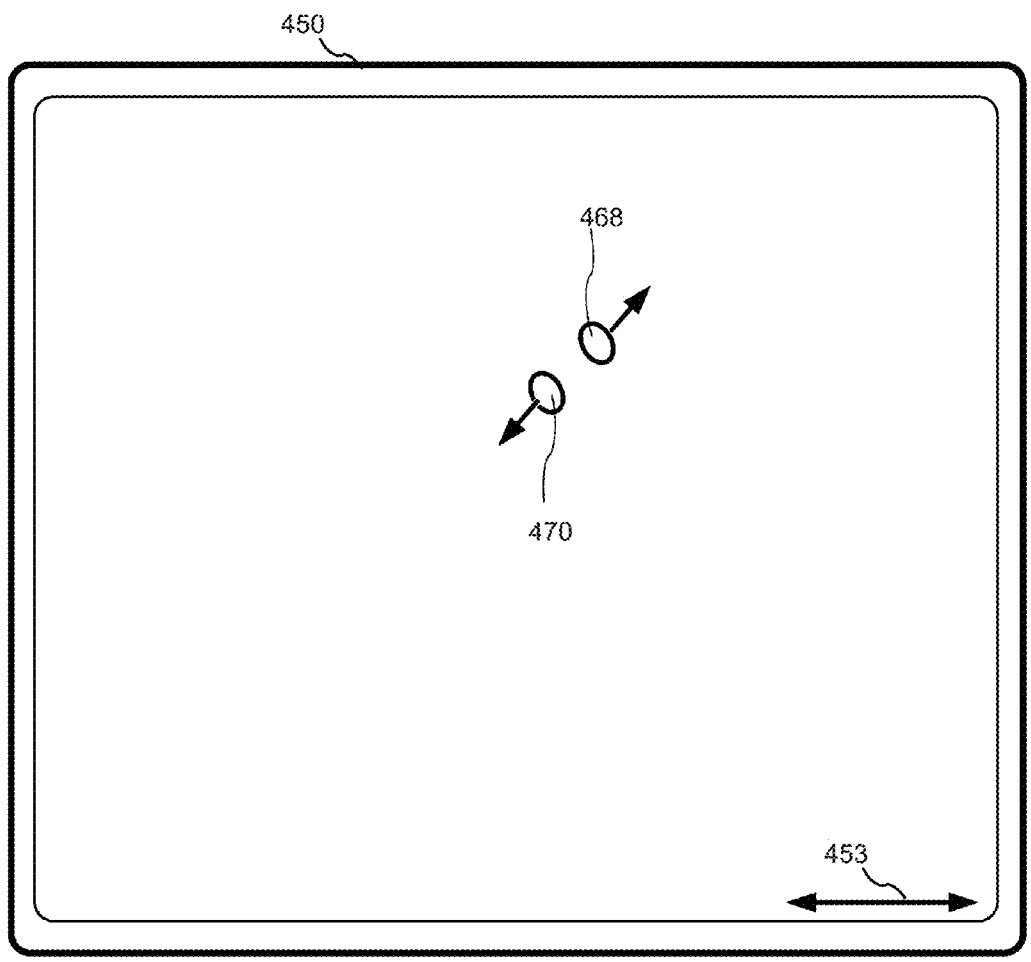
FIG. 4B illustrates an exemplary user interface for a multifunction device with a touch-sensitive surface that is separate from the display in accordance with some embodiments.
Figure 4B:
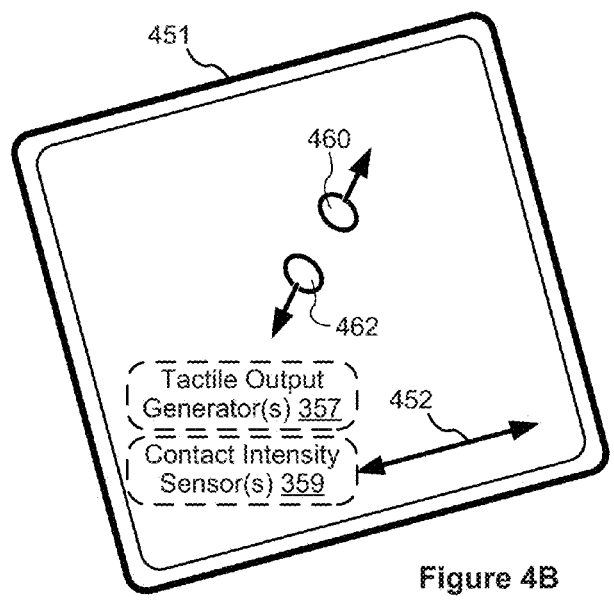

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

The user interface figures described below include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$, and/or one or more other intensity thresholds). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with an intensity below the light press intensity threshold (e.g., and above a nominal contact-detection intensity threshold $IT_D$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of intensity of the contact from an intensity below the light press intensity threshold $IT_L$ to an intensity between the light press intensity threshold $IT_L$ and the deep press intensity threshold $IT_D$ is sometimes referred to as a "light press" input. An increase of intensity of the contact from an intensity below the deep press intensity threshold $IT_D$ to an intensity above the deep press intensity threshold $IT_D$ is sometimes referred to as a "deep press" input. An increase of intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of intensity of the contact from an intensity above the contact-detection intensity threshold $IT_0$ to an intensity below the contact intensity threshold $IT_0$ is sometimes referred to as detecting liftoff of the contact from the touch-surface. In some embodiments $IT_0$ is zero. In some embodiments $IT_0$ is greater than zero. In some illustrations a shaded circle or oval is used to represent intensity of a contact on the touch-sensitive surface. In some illustrations a circle or oval without shading is used represent a respective contact on the touch-sensitive surface without specifying the intensity of the respective contact.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

User Interfaces and Associated Processes

Switching Between User Interfaces

Many electronic devices have graphical user interfaces that allow users to perform a variety of functions and operations associated with the respective user interfaces (e.g., home screen or application launch interfaces with user-selectable icons for selecting applications to be launched; application interfaces associated with applications such as maps for performing navigation operations, calculators for performing computation, photo viewers for viewing digital photographs, search applications, camera applications and the like; system user interfaces associated with various system level functions). While interacting with such interfaces, the user frequently desires to switch from one user interface to another (e.g., from a calculator application interface to a photo viewing application interface; or from a home screen interface to a camera application interface; and the like) or from an application user interface to a system user interface. Some approaches for switching between application user interfaces (e.g., switching between applications) involve returning to a home screen and then toggling through pages of the home screen to view an icon corresponding to a desired application, and then selecting the icon corresponding to the desired application to launch the desired application. Similarly, some approaches to switching to a system user interface involve making multiple concurrent contacts with the home or menu button in order to display a system user interface. These approaches are cumbersome and require the user to make multiple sequential contacts with the device, thereby placing undue cognitive burden on the user.

The disclosed embodiments provide a convenient method of switching between user interfaces (e.g., switching between applications or displaying a system user interface) through the use of a single gesture that includes movement of a contact (e.g., a swipe gesture) detected on a touch-sensitive surface of the device in one of two directions. In response to detecting a gesture with movement of a contact in a first direction (e.g., horizontally, from right to left), the device displays a different user interface corresponding to a different application (e.g., an application based on application use criteria, such as a most recently used application) and in response to detecting a gesture with movement of a contact in a second direction (e.g., a vertical direction, upward), the device displays a system user interface associated with a system-level function. As a result, the user has the improved convenience of selecting one of two different interfaces to be displayed—e.g., either displaying a different application user interface or displaying a system user interface—simply by performing a gesture that involves the movement of a contact in one of two directions.

FIGS. 5A-5Q illustrate exemplary user interfaces for switching between user interfaces in accordance with some embodiments. The user interfaces in these figures are used to illustrate the processes described below, including the processes in FIGS. 6A-6C.

FIG. 5A illustrates a user interface (e.g., an application launch user interface, such as a home screen) with user-selectable icons (e.g., icons 424-446 for launching various applications) that are displayed on a display 19802 of a portable multi-function device 100. In some embodiments, display 19802 is a touch-sensitive display with an array of touch sensors that are responsive to touch. In some embodiments, the array of touch sensors is in a plane coincident (e.g., collocated or co-planar) with a plane that defines the display elements forming display 19802. In alternative embodiments, the array of touch sensors is in a plane different from the plane of the display elements forming display 19802. In some embodiments, portable multi-function device 100 includes a touch-sensitive surface with a first portion (e.g., first touch-sensitive portion 504-1) and a second portion (e.g., second touch-sensitive portion 19804-2). In some embodiments, as shown in FIG. 5A, first touch-sensitive portion 19804-1 is collocated with at least a portion of display 19802 and second touch-sensitive portion 19804-2 is separate from (e.g., adjacent to) display 19802. In some embodiments, first touch-sensitive portion 19804-1 and the second touch-sensitive portion 19804-2 are part of a single continuous touch-sensitive surface that is divided based on which part of the touch-sensitive surface is coincident with the display. In some embodiments, the first touch-sensitive portion 19804-1 is a touch screen module, and the second touch-sensitive portion 19804-2 is a touch-sensitive surface module that is separate from the touch screen module.

FIGS. 5A-5Q illustrate detecting a gesture (including movement of a contact) on a touch-sensitive surface of a portable multi-function device while displaying a first user interface (e.g., an application launch user interface or an application user interface) on the display 19802. FIGS. 5A-5Q further illustrate in response to detecting movement of the contact in one of two different directions—either in a first direction or in a second direction—displaying one of two different user interfaces corresponding either to a different application user interface or to a system user interface. In response to detecting a gesture with movement of a contact in a first direction (e.g., a lateral or horizontal direction or along the short-axis of the multi-purpose device; from right to left with reference to the orientation of the device shown in FIGS. 5A-5Q), the device displays a second user interface corresponding to a second application (e.g., a most recently used application), as explained below with reference to FIGS. 5C-5D and FIGS. 5G-5I. On the other hand, in response to detecting a gesture with movement of a contact in a second direction (e.g., a vertical direction or along the long-axis of the multi-purpose device; upward with reference to the orientation of the device shown in FIGS. 5A-5Q), the device displays a second user interface corresponding to a system user interface (e.g., associated with a system-level function), as explained below with reference to FIGS. 5J-5K.

As shown in FIG. 5A, a user interface (e.g., an application launch user interface, such as a home screen) is displayed on display 19802 of device 100. The user interface includes user-selectable icons (e.g., icons 424-446 for launching various applications). As shown in FIG. 5B, a tap gesture performed with contact 19810 is detected on icon 428 corresponding to the photo viewer application. In response to detecting the tap gesture performed with contact 19810 on icon 428, a first application (e.g., the photo viewer application shown in FIG. 5C) is launched and a first user interface corresponding to the first application is displayed (as shown in FIG. 5C) on display 19802.

Figure 5C:
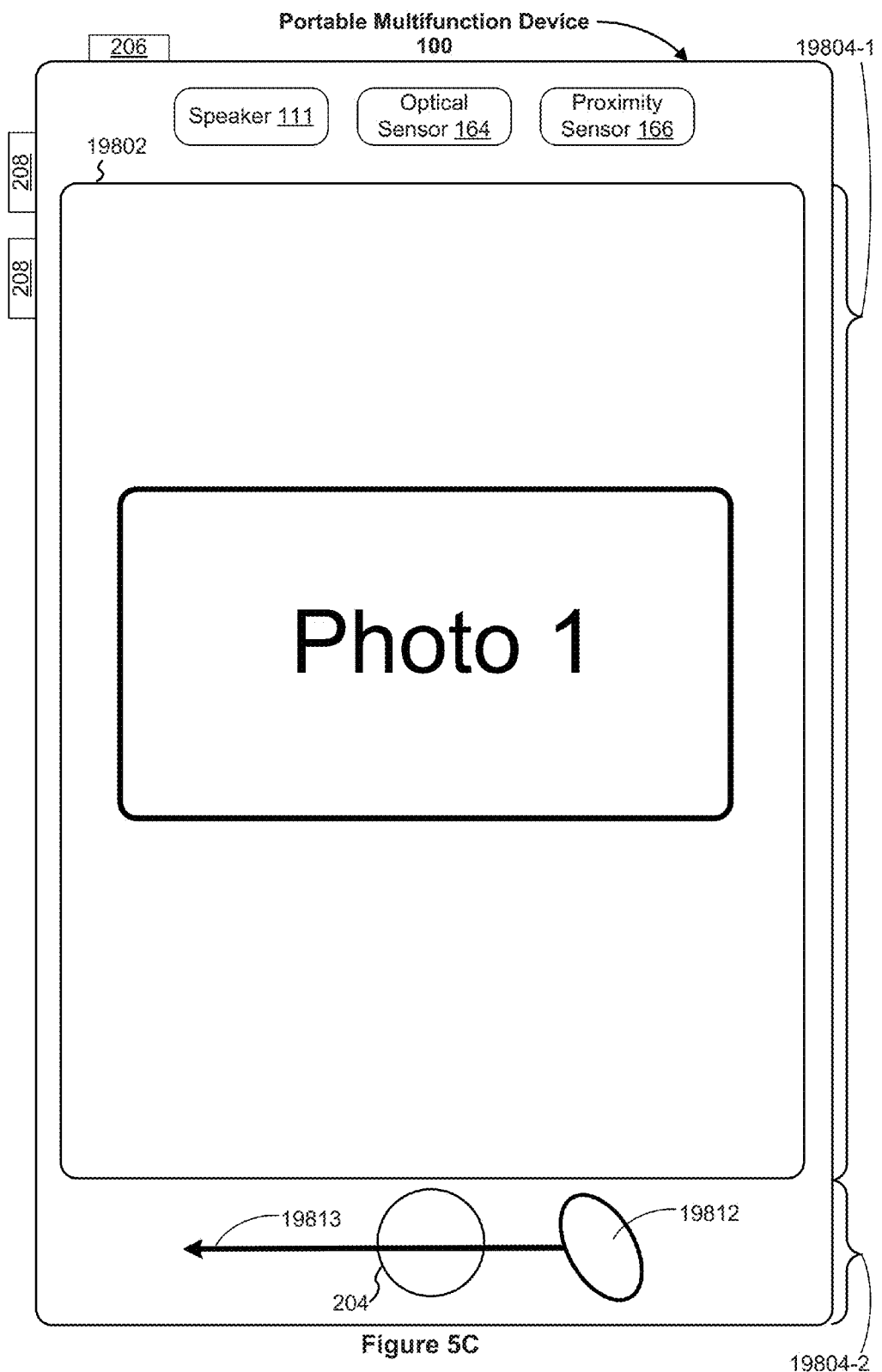
Figure 5D:
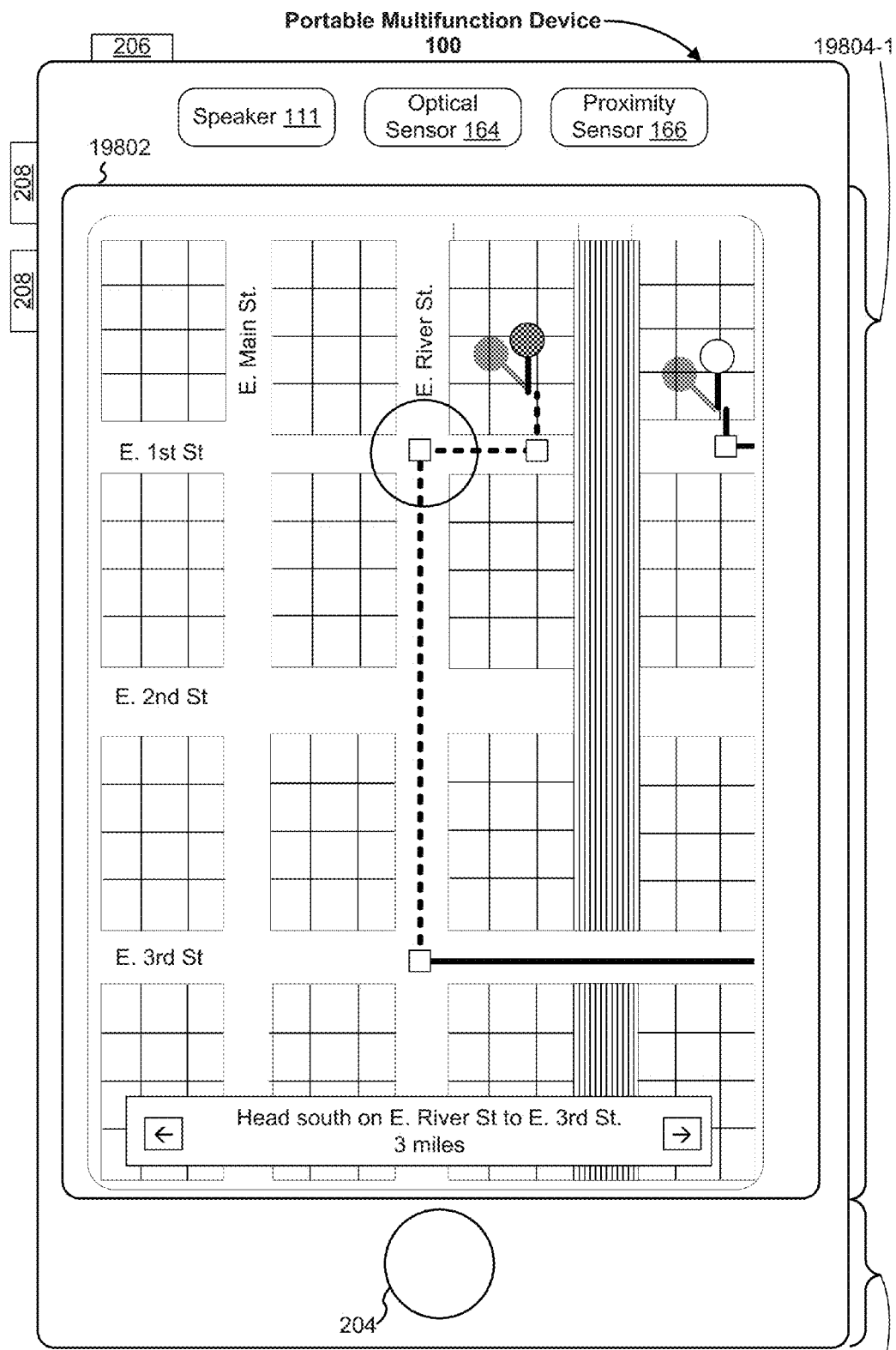

Further, in some embodiments, as shown in FIG. 5C, a first gesture including a contact associated with a corresponding movement (e.g., a single finger gesture including contact 19812 and associated movement 19813 on second touch-sensitive portion 19804-2 of device 100) is detected on a touch-sensitive surface of device 100, the corresponding movement being in a first direction (e.g., from right to left with reference to the orientation of device 100 shown in FIG. 5C). In accordance with a determination that movement 19813 of contact 19812 is in the first direction (e.g., from right to left), a second user interface corresponding to a second application (e.g., a map or navigation application) is displayed (e.g., is launched), as shown in FIG. 5D. Accordingly, in some embodiments, the first user interface (e.g., the photo viewer application user interface shown in FIG. 5C) is replaced by the second user interface (e.g., the map application shown in FIG. 5D). In some embodiments, the second application (e.g., the map application, FIG. 5C) is selected based on application use criteria (e.g., the map application shown in FIG. 5D is a most-recently used application).

Figure 5E:
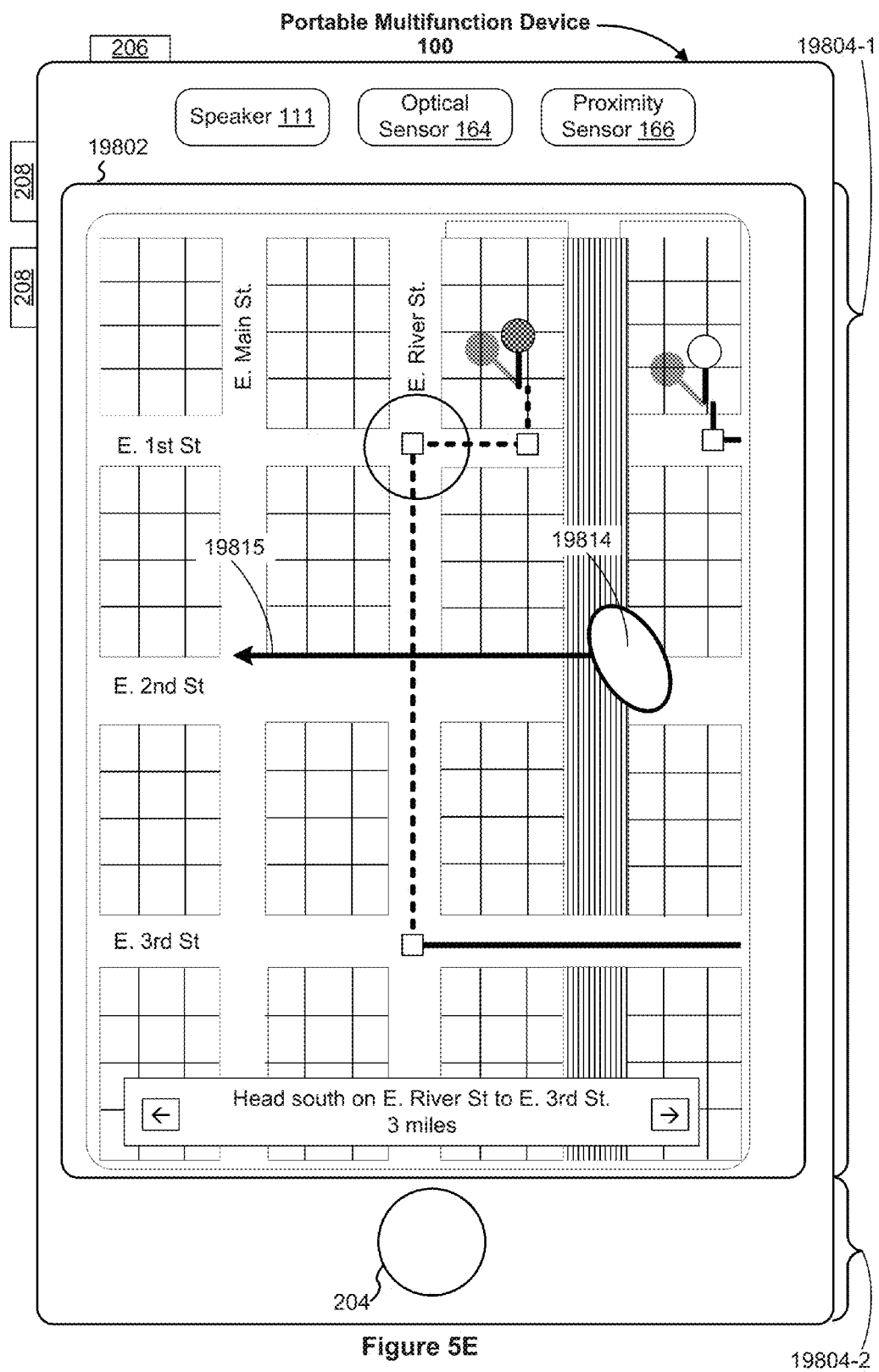
Figure 5F:
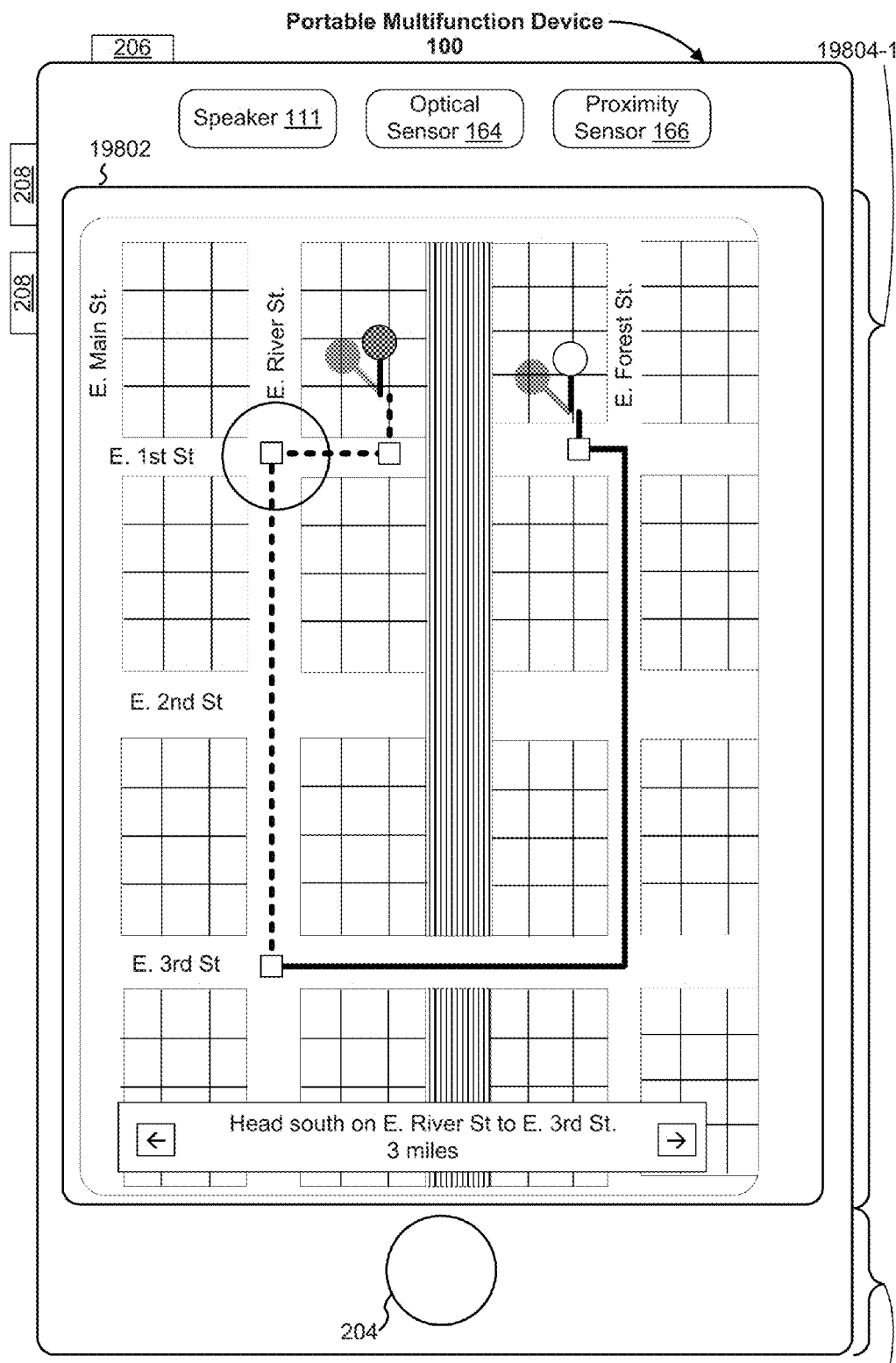

In some embodiments, while the second user interface (e.g., the map user interface) is displayed on display 19802, a second gesture starting on the touch-sensitive display 19802 or on first touch-sensitive portion 19804-1 of device 100 (which is collocated with display 19802), the second gesture including a contact associated with a corresponding movement (e.g., a single finger gesture including contact 19814 and associated movement 19815), is detected as shown in FIG. 5E. In response to detecting the second gesture including contact 19814 and associated movement 19815 starting on the touch-sensitive display 19802 or on first touch-sensitive portion 19804-1 of device 100, the device performs an operation in the second user interface (e.g., the device translates at least a portion of the second user interface in the direction of movement 19815 of the contact 19814 to display additional portions of the second user interface, as shown in FIG. 5F, that were not previously displayed in FIG. 5E).

Figure 5G:
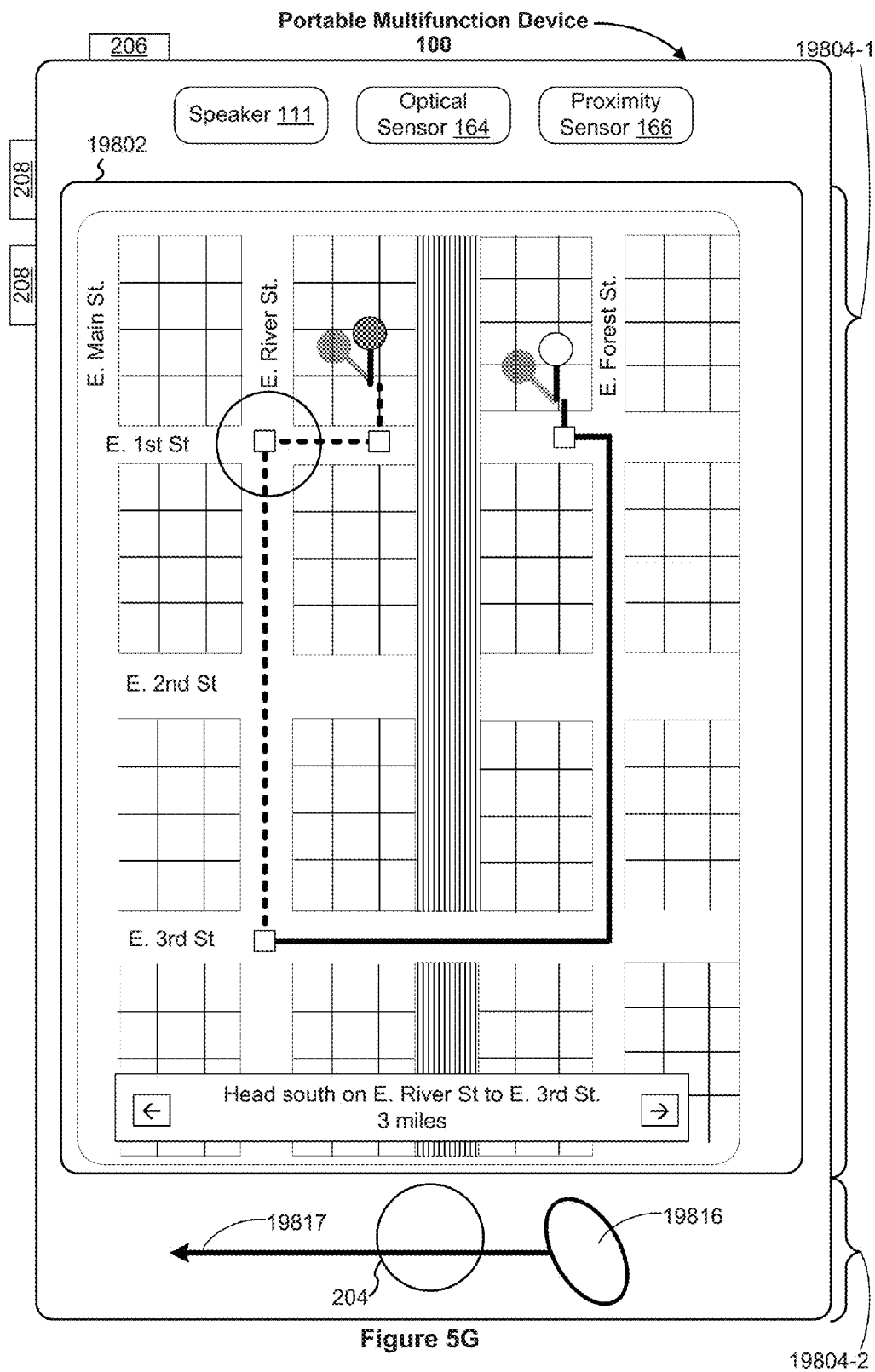
Figure 5H:

Continuing the example described with reference to FIGS. 5C-5D above, as shown in FIG. 5G, a gesture including contact 19816 associated with a corresponding movement 19817 is detected on second touch-sensitive portion 19804-2 of device 100, the corresponding movement 19817 being in the first direction (e.g., horizontally, from right to left with reference to the orientation of device 100 shown in FIG. 5G). In accordance with a determination that movement 19817 of contact 19816 is in the first direction (e.g., from right to left), a different user interface corresponding to a different application (e.g., a notepad application) is displayed (e.g., is launched), as shown in FIG. 5H. Accordingly, in some embodiments, the previously displayed user interface (e.g., the second user interface or the map application user interface shown in FIG. 5G) is replaced by the different user interface (e.g., the notepad application user interface shown in FIG. 5H).

Figure 5I:
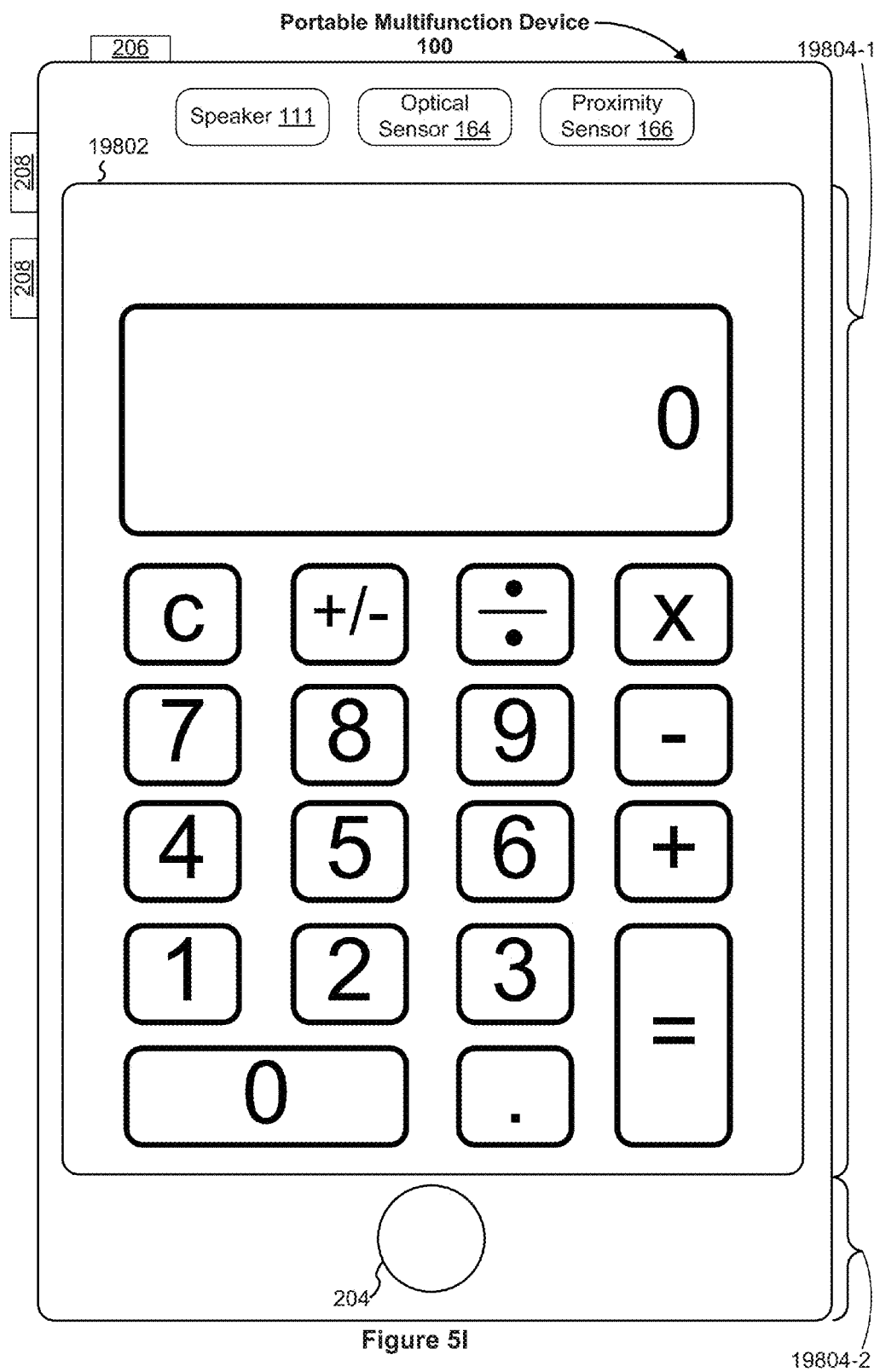

Along similar lines, as shown in FIG. 5H, a gesture including contact 19818 associated with a corresponding movement 19819 is detected on second touch-sensitive portion 19804-2 of device 100, the corresponding movement 19819 being in the first direction (e.g., horizontally, from right to left with reference to the orientation of device 100 shown in FIG. 5H). In accordance with a determination that movement 19819 of contact 19818 is in the first direction (e.g., from right to left), another different user interface corresponding to another different application (e.g., a calculator application) is displayed (e.g., is launched), as shown in FIG. 5I. Accordingly, in some embodiments, the previously displayed user interface (e.g., the notepad application user interface shown in FIG. 5H) is replaced by the calculator user interface shown in FIG. 5I.

Thus, in some embodiments, while displaying a first user interface (e.g., corresponding to a first application or to an application launch user interface), in response to detecting a gesture in a portion of the touch sensitive surface (e.g., not collocated with the display), the gesture including a movement of a contact in a first direction (e.g., in a lateral or horizontal direction or along the short-axis of the multi-purpose device; from right to left), the device displays a second user interface (e.g., corresponding to a second application).

Figure 5J:
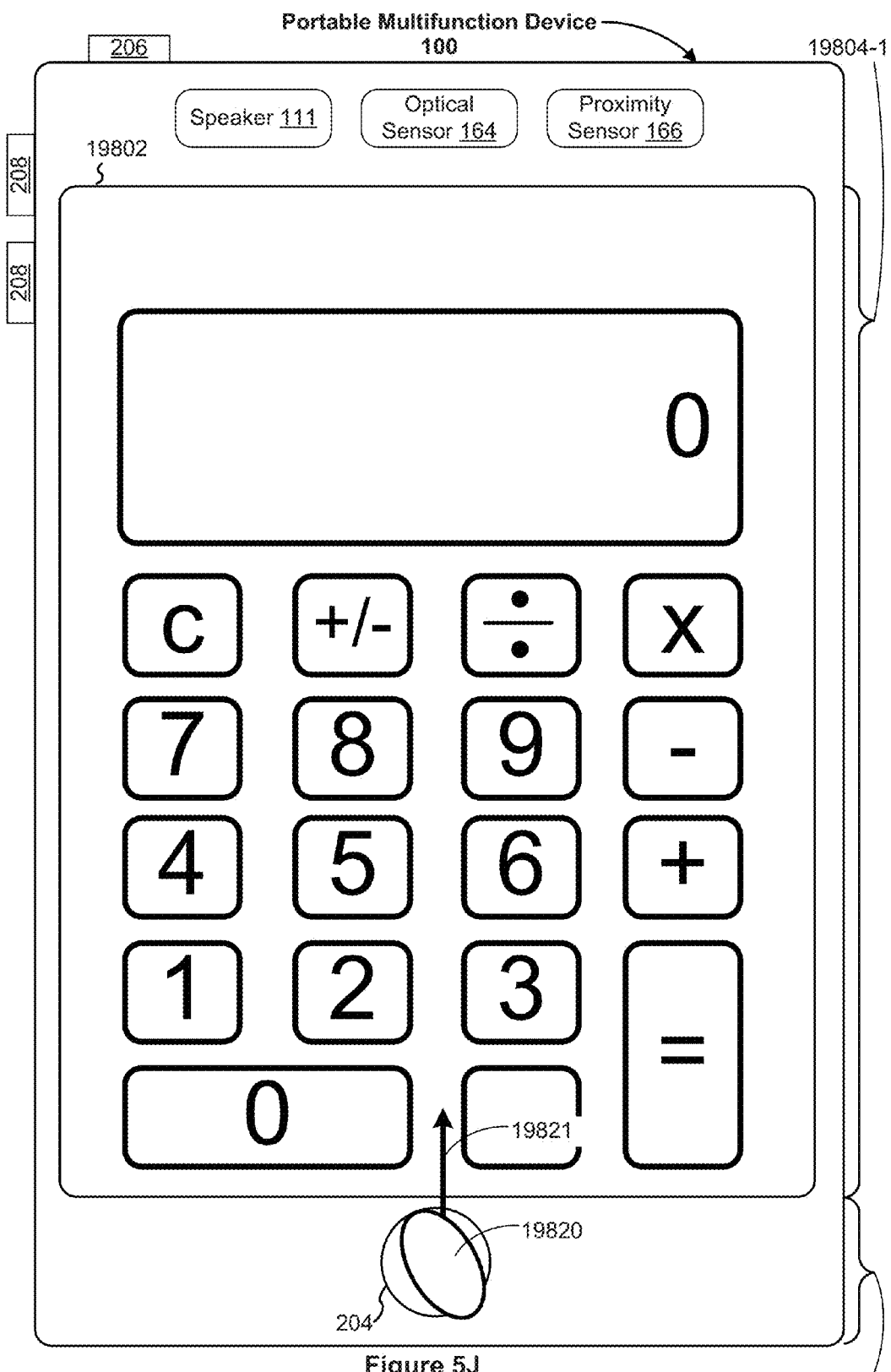

As shown in FIG. 5J, in some embodiments, while displaying the calculator application, a first gesture including a contact associated with a corresponding movement (e.g., a single finger gesture including contact 19820 and associated movement 19821 at least partially on second touch-sensitive portion 19804-2 of device 100) is detected on a touch-sensitive surface of device 100, the corresponding movement being in a second direction (e.g., in a vertical direction or along the long-axis of the multi-purpose device; upward, with reference to the orientation of device 100 shown in FIG. 5J). In accordance with a determination that movement 19821 of contact 19820 is in the second direction (e.g., in a vertical upward direction), a first system user interface associated with a system-level function (e.g., multi-tasking user interface 19870-1 including user selectable icons corresponding to the most-recently used applications, such as the notepad application, the map application, the photo viewer application, and the camera application, where selection of one of the icons in the multi-tasking user interface 19870-1 will cause the device to run an application corresponding to the selected icon as a currently active application, sometimes called a foreground application) is displayed, as shown in FIG. 5K.

Figure 5K:
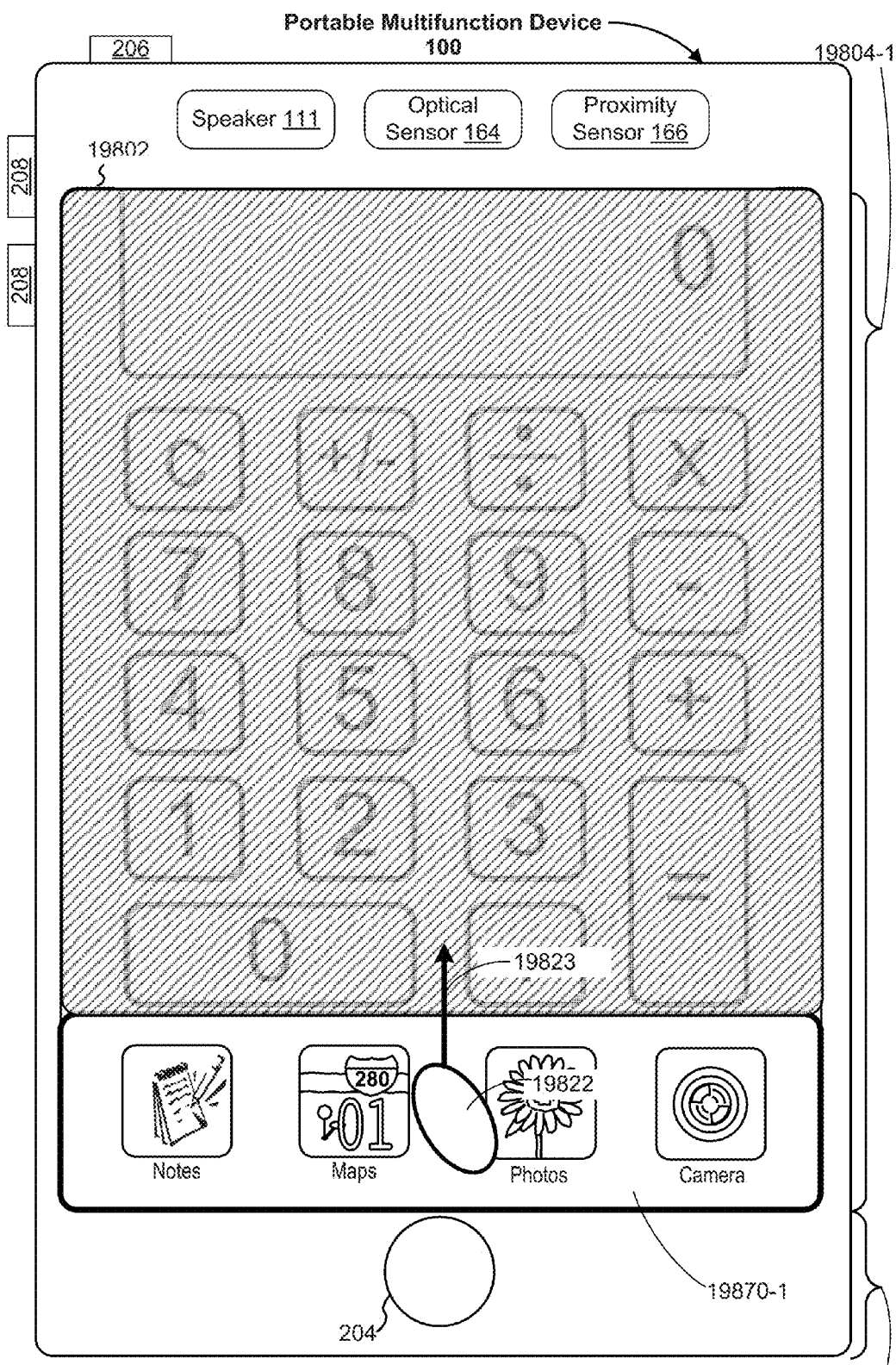
Figure 5L:
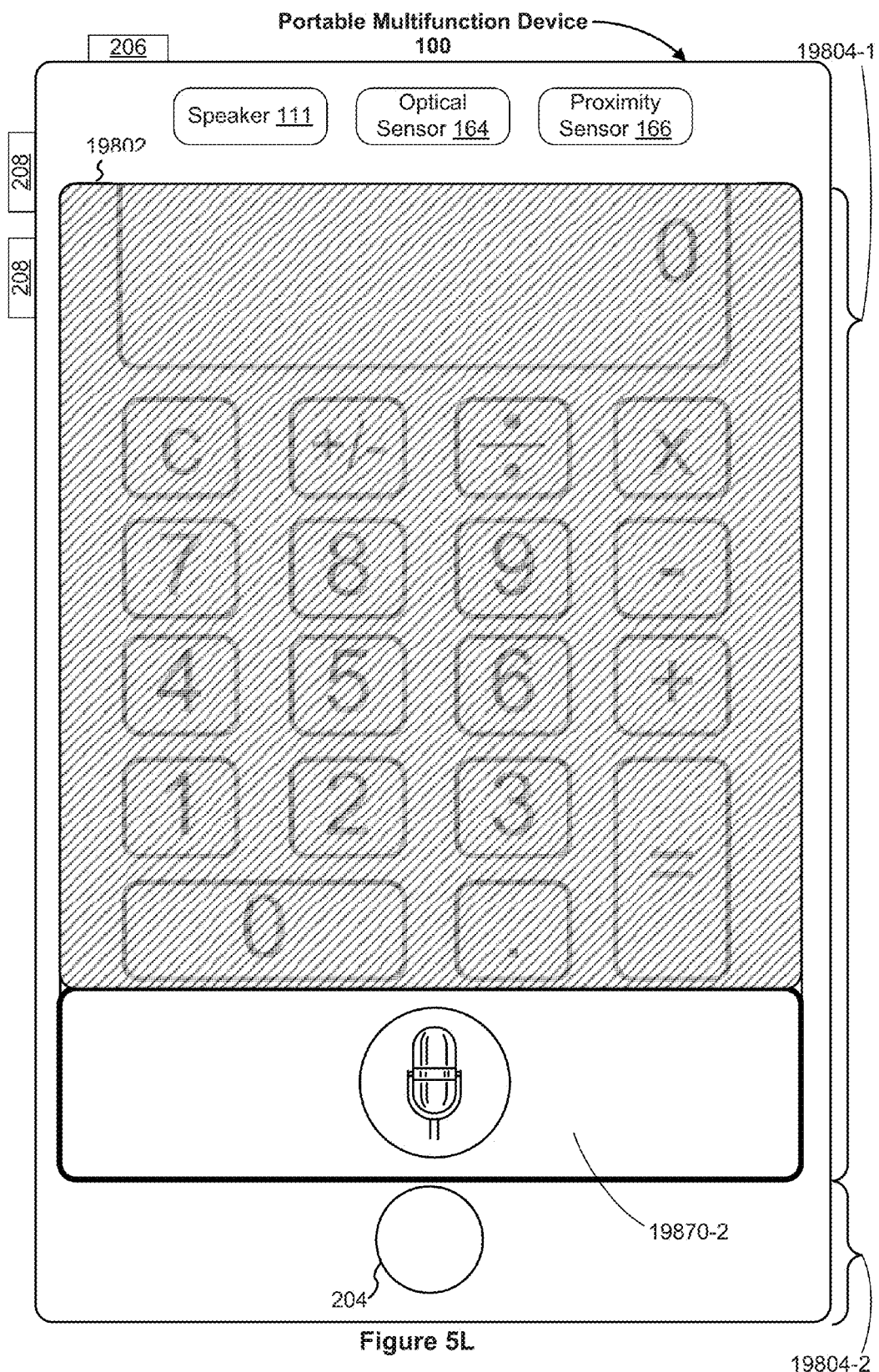

Accordingly, in some embodiments, the application user interface (e.g., the calculator application user interface shown in FIG. 5J) is at least partially replaced by the first system user interface (e.g., the calculator application is partially displaced upward and/or at least partially concealed by the first system-user interface shown in FIG. 5K). In some embodiments, upon displaying the first system user interface (e.g., multi-tasking user interface 19870-1, FIG. 5K) one or more interactive elements in the application user interface are disabled from user-interaction (e.g., numeral keys in the calculator application are disabled as illustrated or indicated by the shaded or grayed out appearance of the calculator application interface).

Further, in some embodiments, while displaying the first system user interface (e.g., multi-tasking user interface 19870-1, FIG. 5K), a second gesture including a contact associated with a corresponding movement (e.g., a single finger gesture including contact 19822 and associated movement 19823 at least partially on second touch-sensitive portion 19804-2 of device 100) is detected on a touch-sensitive surface of device 100, the corresponding movement being in a second direction (e.g., in a vertical direction or along the long-axis of the multi-purpose device; upward, with reference to the orientation of device 100 shown in FIG. 5K). In response to detecting the second gesture, the first system user interface (e.g., multi-tasking user interface 19870-1, FIG. 5K) is replaced by a second system user interface (e.g., a personal digital assistant user interface 19870-2, FIG. 5L). In some embodiments, personal digital assistant user interface 19870-2 includes a selectable icon that, when selected causes a personal digital assistant to be activated and enables the user to make verbal or other requests to the personal digital assistant, which are optionally answered, responded to or otherwise acted upon by the device via the personal digital assistant.

Thus, in some embodiments, while displaying a first user interface (e.g., corresponding to a first application or to an application launch user interface), in response to detecting a gesture in a portion of the touch sensitive surface (e.g., not collocated with the display), the gesture including a movement of a contact in a second direction (e.g., a vertical direction or along the long-axis of the multi-purpose device; upward), the device displays a first system user interface (e.g., corresponding to a system-level function).

Figure 5M:
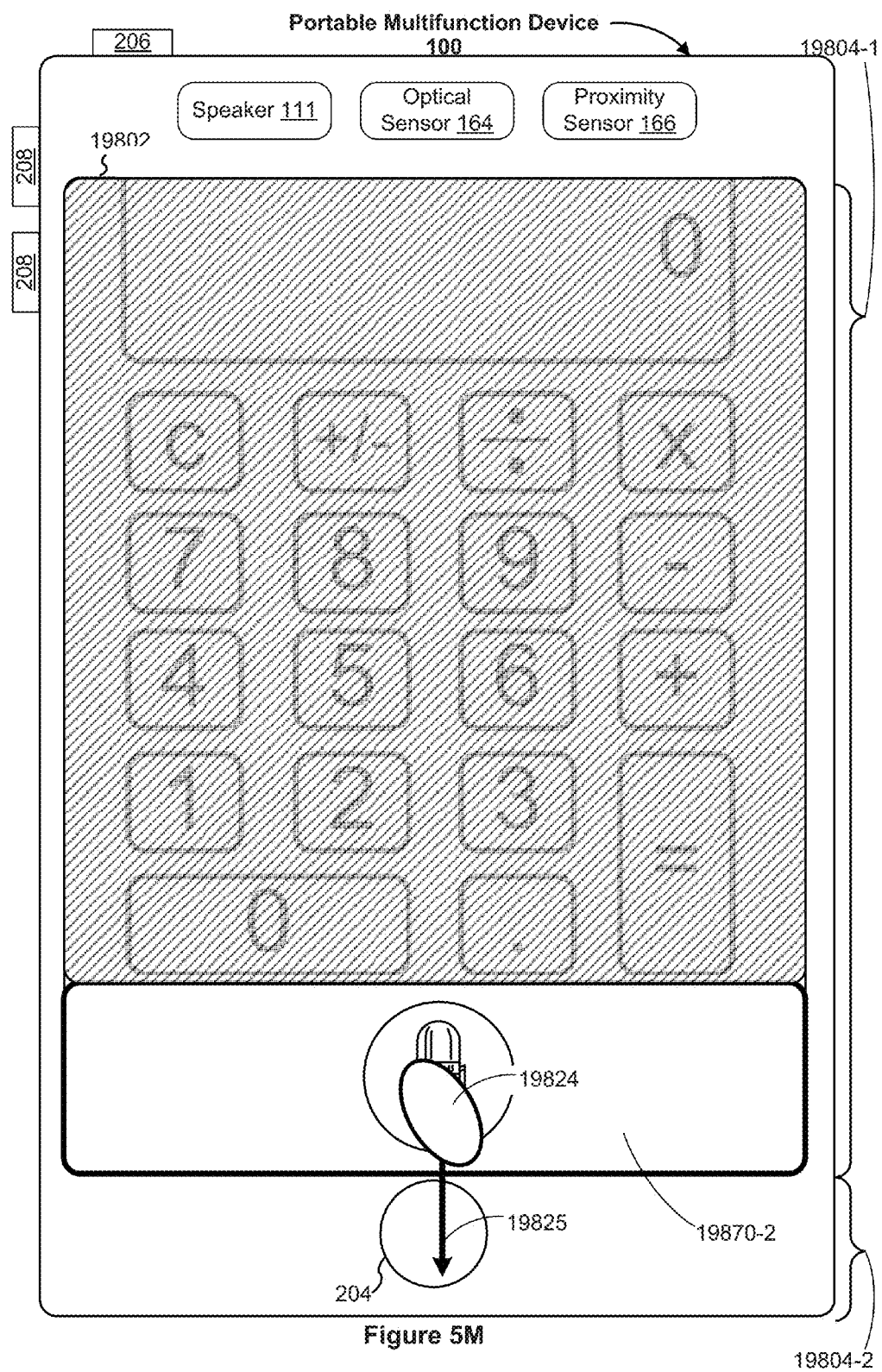
Figure 5N:
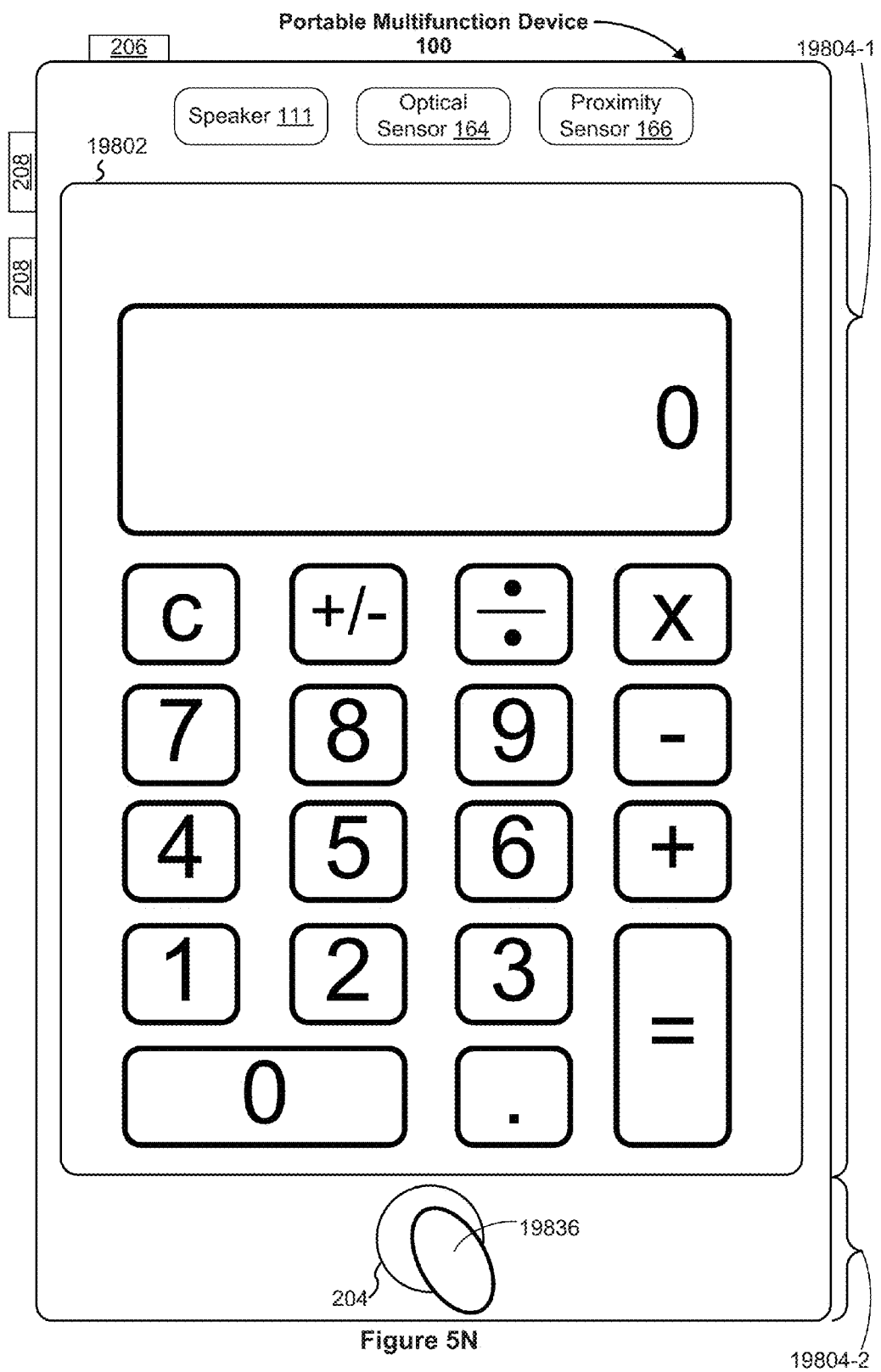

In some embodiments, as illustrated in FIGS. 5M-5N, while displaying the second system user interface (or the first system user interface) a second gesture including contact 19824 and associated movement 19825 is detected on a touch-sensitive surface of device 100 (e.g., at least partially on second touch-sensitive portion 19804-2 of device 100), the corresponding movement being in a direction substantially opposite to the second direction (e.g., in a vertical direction downward along the long-axis of the multi-purpose device with reference to the orientation of device 100 shown in FIG. 5M). In response to detecting the second gesture, the device ceases to display the second system user interface (e.g., the personal digital assistant user interface 19870-2) or the first system user interface (e.g., multi-tasking user interface 19870-1, FIG. 5K), whichever was displayed immediately prior to detection of the second gesture.

Figure 5O:
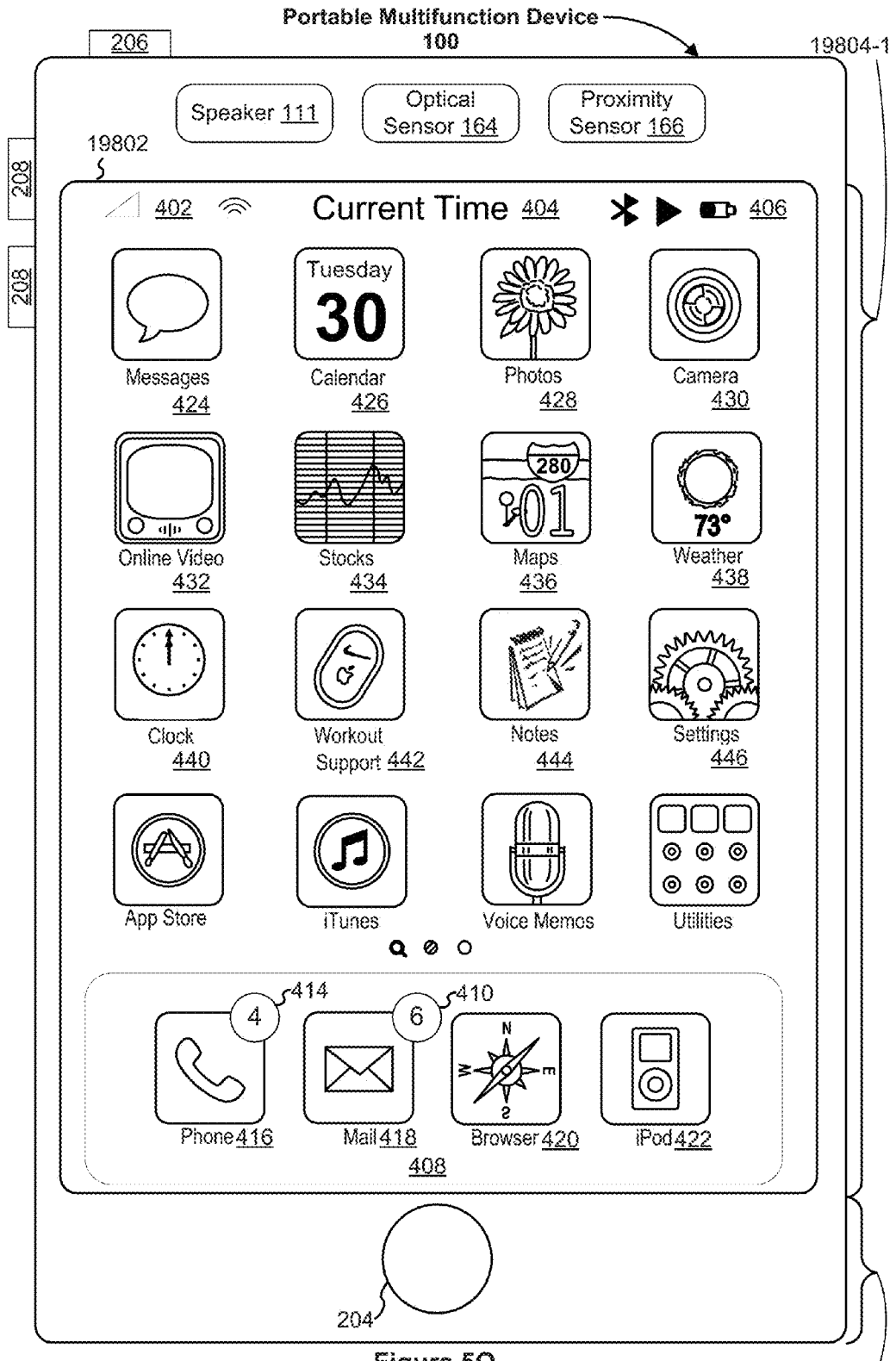

As illustrated in FIGS. 5N-5O, upon detecting activation of the home button or menu button 204 (e.g., via tap or press input 19836), the home screen or application launch user interface shown previously in FIG. 5A with user-selectable icons (e.g., icons 424-446 for launching applications) is displayed on display 19802, as shown in FIG. 5O.

Figure 5P:
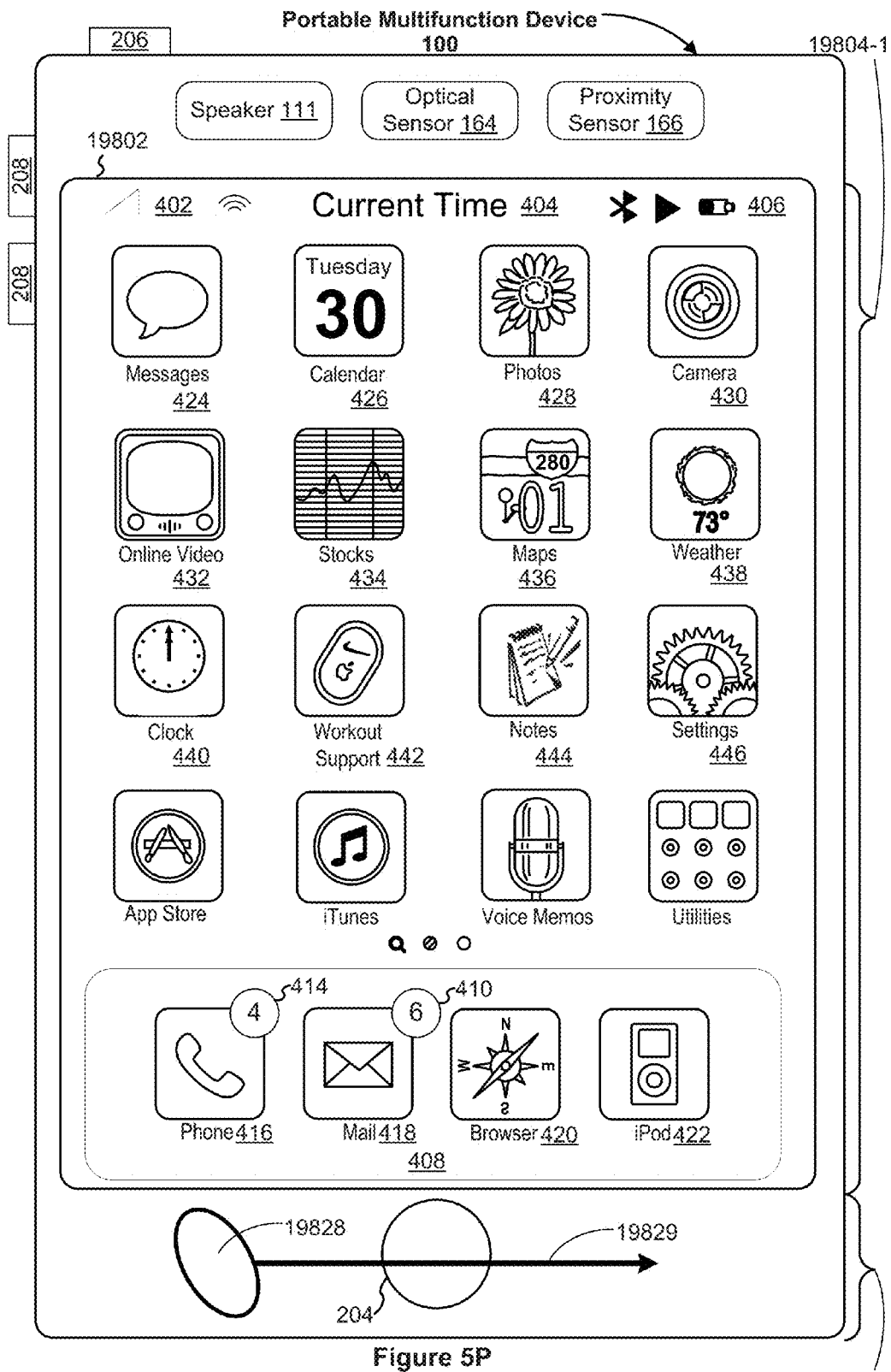
Figure 5Q:
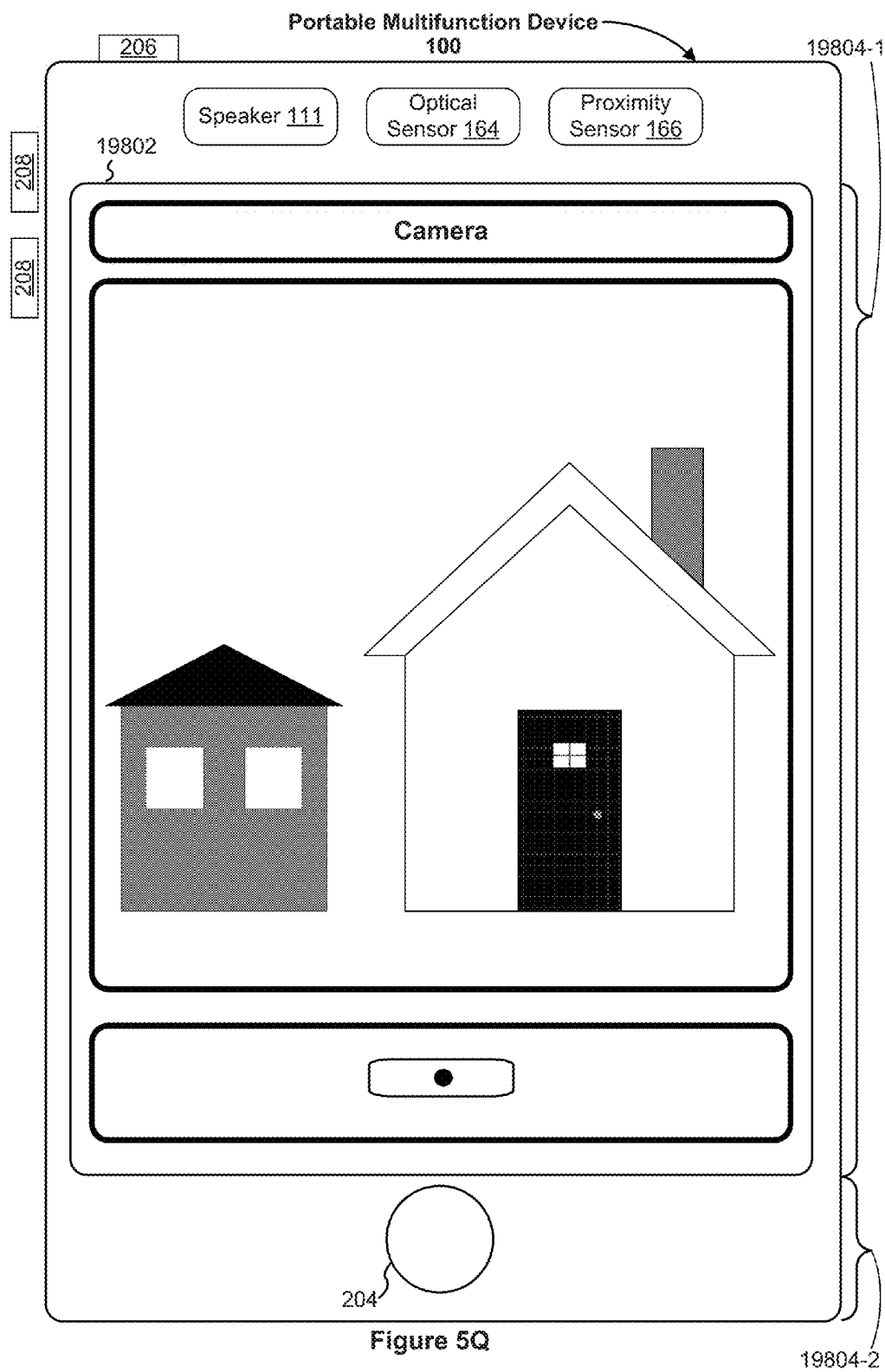
Figure 6A:
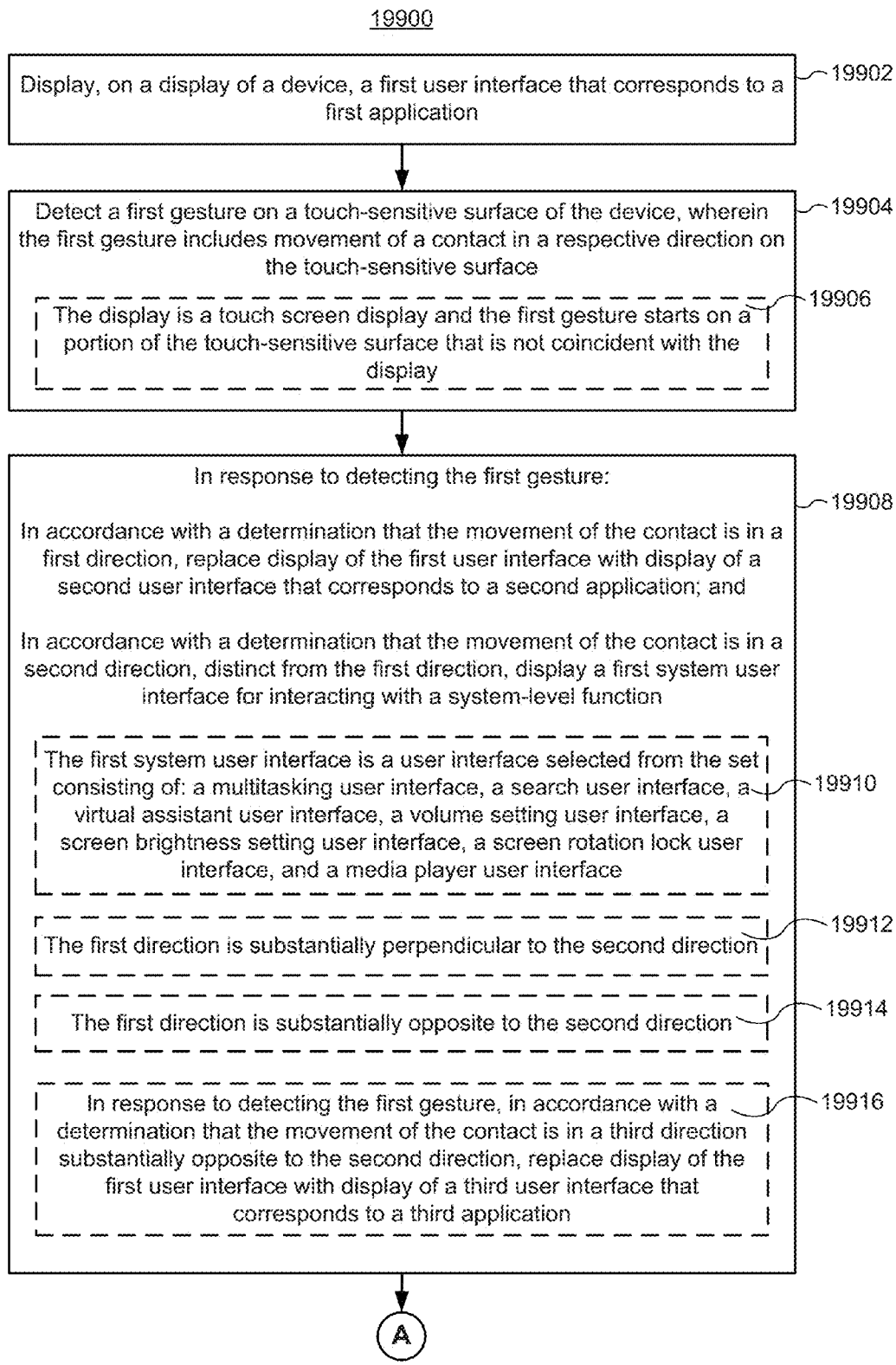
FIGS. 6A-6C are flow diagrams illustrating a method of switching between user interfaces in accordance with some embodiments.
Figure 6B:
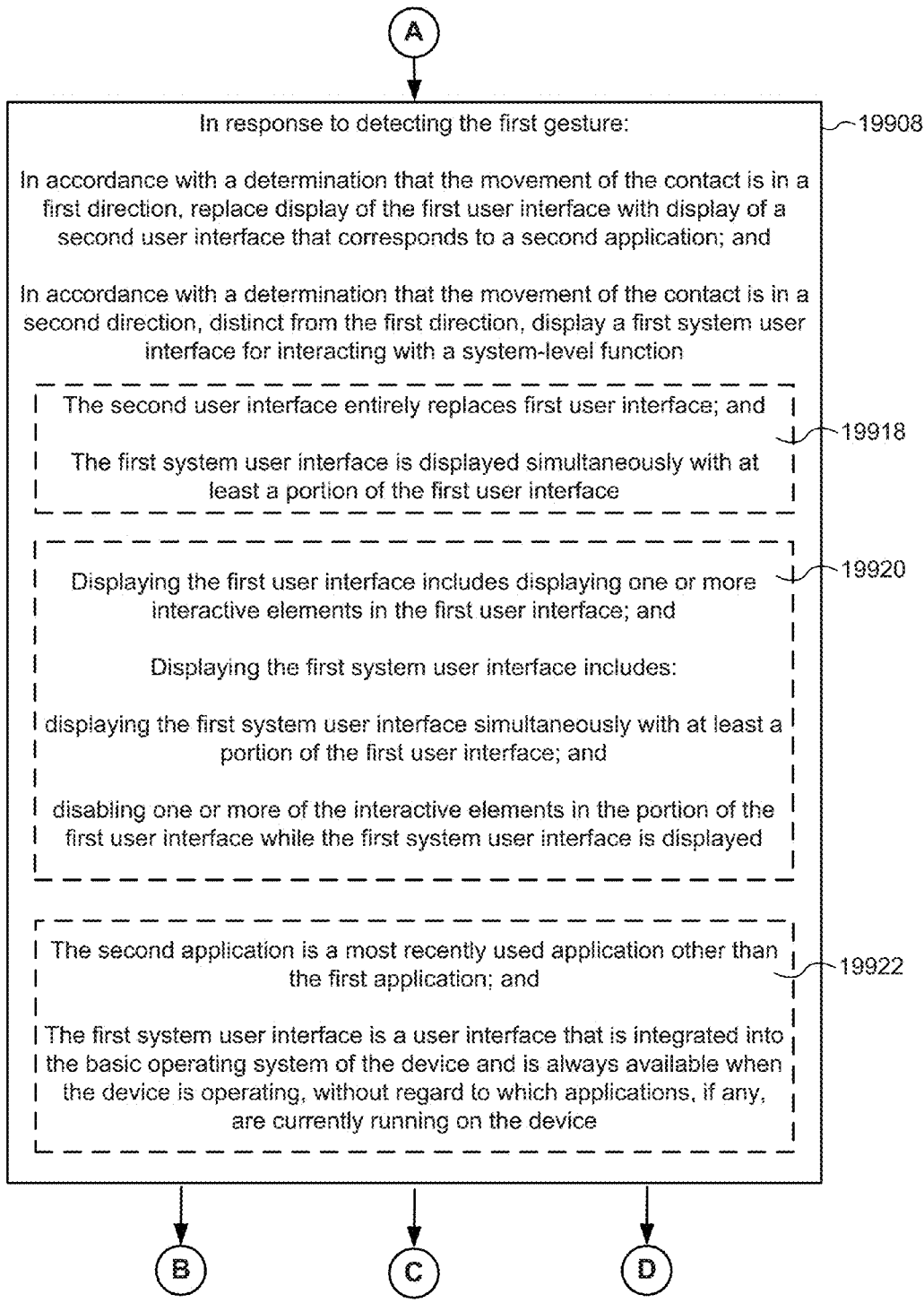
Figure 6C:
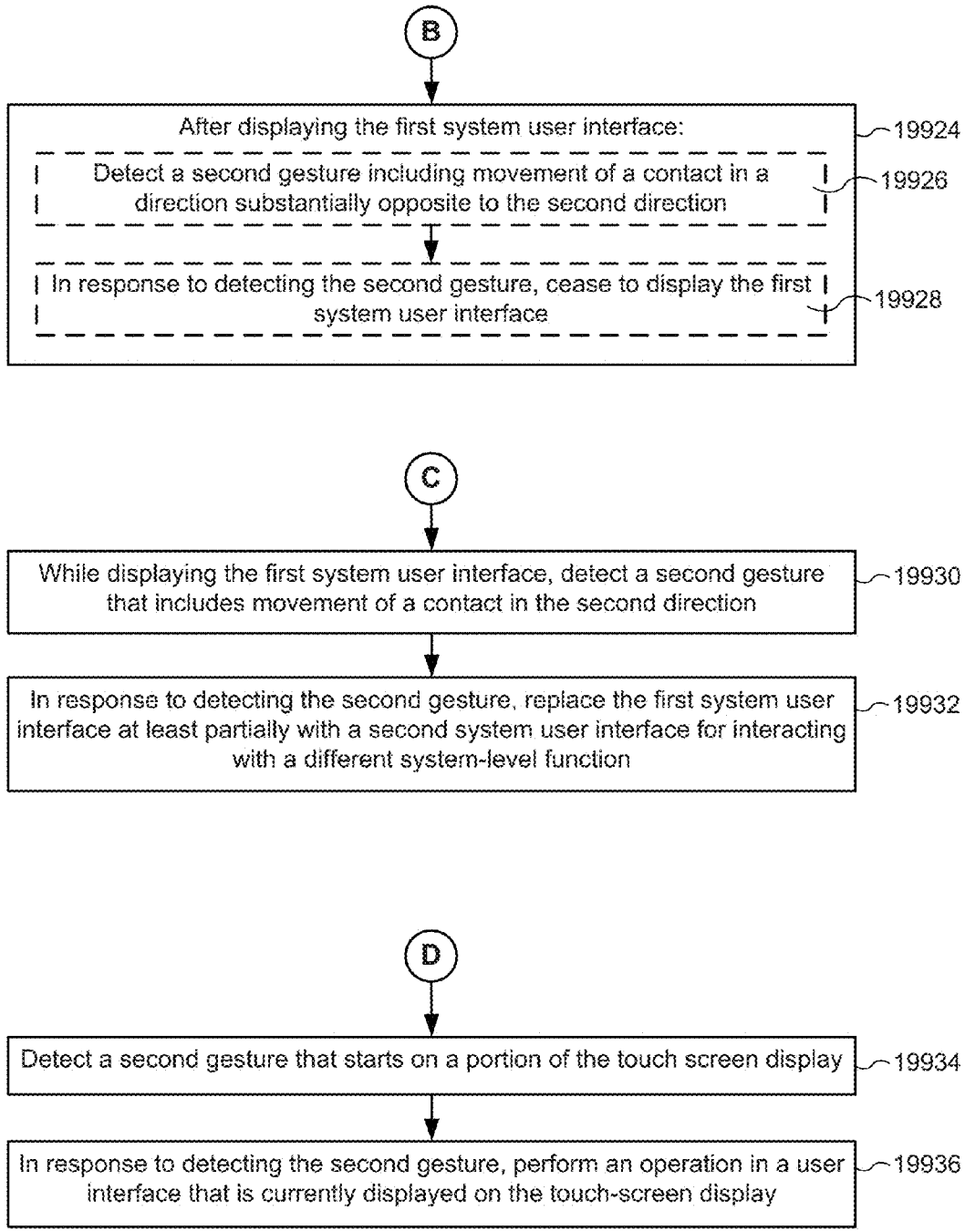

In some embodiments, as illustrated in FIGS. 5P-5Q, while displaying a first user interface (e.g., a home screen or application launch user interface) a second gesture including contact 19828 and associated movement 19829 is detected on a touch-sensitive surface of device 100 (e.g., on second touch-sensitive portion 19804-2 of device 100), the corresponding movement being in a direction substantially opposite to the first direction (e.g., in a horizontal direction or along the short-axis of the multi-purpose device from left to right with reference to the orientation of device 100 shown in FIG. 5P). In response to detecting the second gesture, the device displays a third user interface corresponding to a third application (e.g., a camera application user interface or a predefined user interface). Accordingly, in some embodiments, the first user interface (e.g., the home screen or application launch user interface shown in FIG. 5P) is replaced by the third user interface (e.g., the camera application user interface shown in FIG. 5Q).

FIGS. 6A-6C are flow diagrams illustrating a method 19900 of switching between user interfaces in accordance with some embodiments. The method 19900 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 19900 are, optionally, combined and/or the order of some operations is, optionally, changed.

As described below, the method 19900 provides an intuitive way to switch between user interfaces. The method reduces the cognitive burden on a user when switching between user interfaces, thereby creating a more efficient human-machine interface. For battery-operated electronic devices, enabling a user to switch between user interfaces faster and more efficiently conserves power and increases the time between battery charges.

The device displays (19902) on the display, a first user interface that corresponds to a first application. In some embodiments, the first user interface corresponds to an application launch interface (e.g., the home screen or application launch interface shown in FIG. 5B and in FIG. 5P). The device detects (19904) a first gesture on the touch-sensitive surface, where the first gesture includes movement of a contact in a respective direction on the touch-sensitive surface (e.g., first gesture including contact 19812 and associated movement 19813, as shown in FIG. 5C; first gesture including contact 19816 and associated movement 19817, as shown in FIG. 5G; first gesture including contact 19820 and associated movement 19821, as shown in FIG. 5J; or first gesture including contact 19828 and associated movement 19829, as shown in FIG. 5P). In some embodiments, the display is (19906) a touch screen display and the first gesture starts on a portion of the touch-sensitive surface that is not coincident with the display. For example, the first gesture starts on a portion of the touch-sensitive surface that is a "chin" portion of the touch-sensitive surface that is laterally adjacent to the touch screen display (e.g., on second touch-sensitive portion 19804-2 of device 100, as described with reference to FIG. 5A).

In response to detecting (19908) the first gesture: in accordance with a determination that the movement of the contact is in a first direction, the device replaces display of the first user interface with display of a second user interface that corresponds to a second application (e.g., different from the first application). For example, as explained with reference to FIGS. 5C-5D, in accordance with a determination that movement 19813 of contact 19812 is in the first direction (e.g., a lateral or horizontal direction or along the short-axis of the multi-purpose device; from right to left with reference to the orientation of device 100 shown in FIG. 5C), a second user interface corresponding to a second application (e.g., a map or navigation application as shown in FIG. 5D) is displayed (e.g., is launched) in place of the first user interface corresponding to the first application (e.g., the photo viewer application user interface shown in FIG. 5C). In some embodiments, the first user interface corresponds to an application launch interface (e.g., the application launch user interface or home screen interface shown in FIG. 5B), and in accordance with a determination that the movement of the contact is in the first direction, the device replaces display of the application launch interface with the second user interface.

In accordance with a determination that the movement of the contact is in a second direction, distinct from the first direction, the device displays a first system user interface for interacting with a system-level function (e.g., the second direction is substantially opposite to the first direction or the second direction is substantially perpendicular to the first direction). For example, as explained with reference to FIGS. 5J-5K, in accordance with a determination that movement 19821 of contact 19820 is in the second direction (e.g., in a vertical direction or along the long-axis of the multi-purpose device; upward), a first system user interface associated with a system-level function (e.g., multi-tasking user interface 19870-1 including user selectable icons corresponding to the most-recently used applications, such as the notepad application, the map application, the photo viewer application, and the camera application) is displayed, as shown in FIG. 5K. These steps are further described with reference to operations 19910-19922.

In some embodiments, the first system user interface is a user interface selected (19910) from the set consisting of: a multitasking user interface (e.g., user interface 19870-1 as shown in FIG. 5K), a search user interface, a virtual assistant user interface, a volume setting user interface (e.g., user interface 19870-2 as shown in FIG. 5L), a screen brightness setting user interface, a screen rotation lock user interface, and a media player user interface. In some embodiments, the first direction is (19912) substantially perpendicular to the second direction. As explained with reference to FIGS. 5C-5D, the first direction is, optionally, a lateral or horizontal direction or along the short-axis of the multi-purpose device to the "left" or from right to left with reference to the orientation of device 100 shown in FIG. 5C; and as explained with reference to FIGS. 5J-5K, the second direction is, optionally, a vertical direction or along the long-axis of the multi-purpose device from upward with reference to the orientation of the device shown in FIG. 5J. In some embodiments, the first direction is (19914) substantially opposite to the second direction (e.g., the first direction is to the "left" and the second direction is to the "right").

In some embodiments, in response to detecting (19916) the first gesture, in accordance with a determination that the movement of the contact is in a third direction substantially opposite to the first direction, replacing display of the first user interface with display of a third user interface that corresponds to a third application (e.g., as explained with reference to FIGS. 5P-5Q, in accordance with a determination that movement 19829 of contact 19828 is along the horizontal or short axis of the device, but from left-to-right, the application launch user interface shown in FIG. 5P is replaced with a predefined camera application user interface shown in FIG. 5Q). For example, the first direction is to the "right-to-left" as described with reference to FIGS. 5C-5D, the second direction is "down-to-up" as described with reference to FIGS. 5J-5K and the third direction is to the "left-to-right" as described with reference to FIGS. 5P-5Q).

In some embodiments, the second user interface entirely replaces (19918) first user interface (e.g., as explained with reference to FIGS. 5C-5D, when the movement is in the first direction or horizontal from right to left, the device ceases to display first user interface or the photo viewer application user interface); and the first system user interface is displayed simultaneously with at least a portion of the first user interface (e.g., as explained with reference to FIGS. 5J-5K, when the movement is in the second direction or vertically upward, the device slides the first user interface or the calculator application user interface partially off of the display to make room for display of the first system user interface or for the multi-tasking user interface 19870-1).

In some embodiments, displaying (19920) the first user interface includes displaying one or more interactive elements in the first user interface; and displaying the first system user interface includes: displaying the first system user interface simultaneously with at least a portion of the first user interface; and disabling one or more of the interactive elements in the portion of the first user interface while the first system user interface is displayed (e.g., while the system user interface is displayed, the device does not respond to inputs to the first user interface or displayed portion thereof that would normally perform operations in the first user interface, except the device does respond to inputs to the first user interface or displayed portion thereof that cease display of the system level user interface and re-enable the one or more interactive elements in the first user interface). For example, as explained with reference to FIGS. 5J-5K, upon displaying the first system user interface (e.g., multi-tasking user interface 19870-1, FIG. 5K) one or more interactive elements in the application user interface (e.g., the calculator application user interface) are disabled from user-interaction (e.g., numeral keys in the calculator application are disabled as illustrated or indicated by the shaded or grayed out appearance of the calculator application interface).

In some embodiments, the second application is (19922) a most recently used application other than the first application (e.g., the map application shown in FIG. 5D is a most-recently used application other than the photo viewer application); and the first system user interface is a user interface that is integrated into the basic operating system of the device and is always available (e.g., in response to the first gesture) when the device is operating, without regard to which applications, if any, are currently running on the device.

In some embodiments, after displaying (19924) the first system user interface: the device detects (19926) a second gesture including movement of a contact in a direction substantially opposite to the second direction (e.g., as explained with reference to FIG. 5M, a down swipe or downward movement 19825 of contact 19824 while the multitasking tray or the volume setting user interface is displayed). In response to detecting the second gesture, the device ceases (19928) to display the first system user interface (e.g., as explained with reference to FIGS. 5M-5N).

In some embodiments, while displaying the first system user interface, the device detects (19930) a second gesture that includes movement of a contact in the second direction (e.g., as explained with reference to FIG. 5K-5L, a second up swipe or upward movement 19823 of contact 19822 while the multitasking tray is displayed). In response to detecting the second gesture, the device replaces (19932) the first system user interface at least partially with a second system user interface (e.g., the volume setting user interface 19870-2, FIG. 5L) for interacting with a different system-level function.

In some embodiments, the device detects (19934) a second gesture that starts on a portion of the touch screen display. In response to detecting the second gesture, the device performs (19936) an operation in a user interface (e.g., the second user interface that corresponds to the second application or the first system user interface for interacting with the system-level function) that is currently displayed on the touch-screen display. For example, as explained with reference to FIGS. 5E-5F, in response to detecting a single finger gesture including contact 19814 and associated movement 19815 that starts on a portion of the touch screen display (e.g., the first portion of the touch-sensitive surface 19802-1 that is coincident with the display), the device performs an operation in the second user interface (e.g., the device translates at least a portion of the map application user interface to display additional portions of the second user interface, as shown in FIG. 5F, that were not previously displayed in FIG. 5E).

It should be understood that the particular order in which the operations in FIGS. 6A-6C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments) are also applicable in an analogous manner to method 19900 described above with respect to FIGS. 6A-6C. For example, the contacts, gestures, user interfaces, applications described above with reference to method 19900 optionally have one or more of the characteristics of the contacts, gestures, user interfaces, applications described herein with reference to other methods described herein (e.g., those listed in the fifth paragraph of the Description of Embodiemtns). For brevity, these details are not repeated here.

Figure 7:
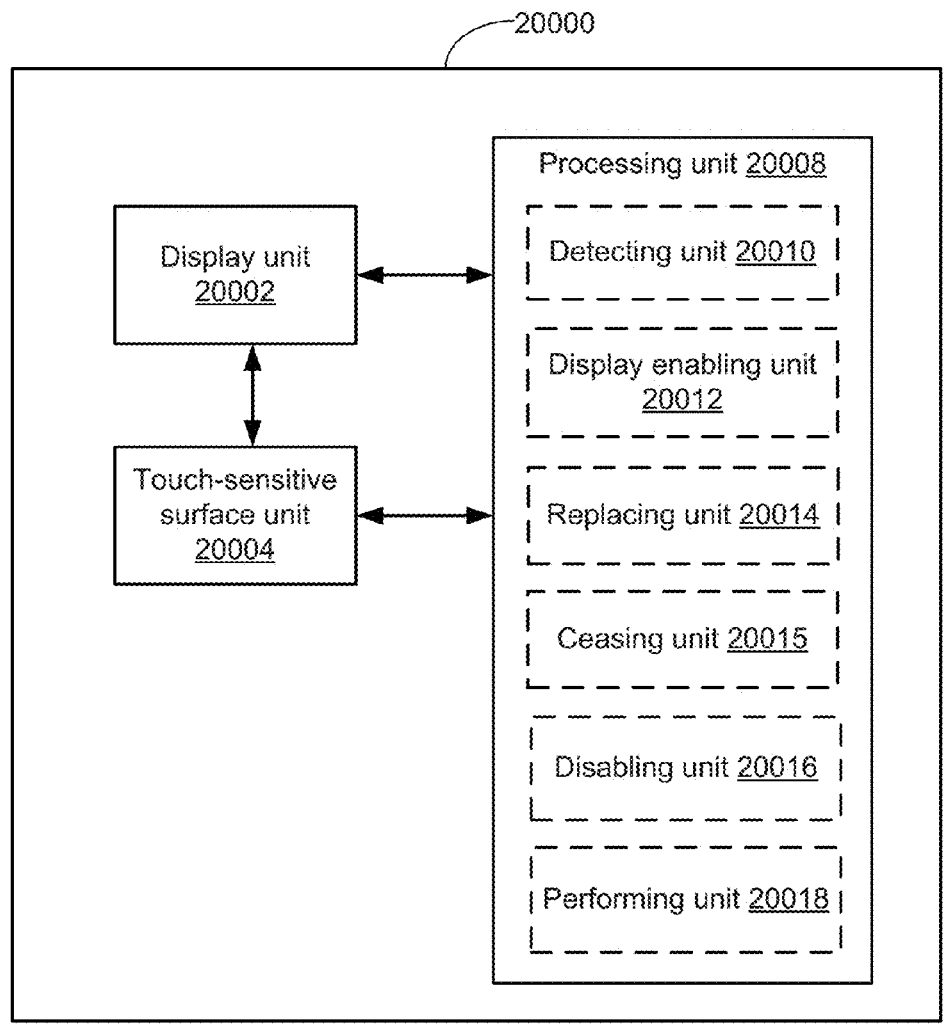
FIG. 7 is a functional block diagram of an electronic device in accordance with some embodiments.

In accordance with some embodiments, FIG. 7 shows a functional block diagram of an electronic device 20000 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 7 are, optionally, combined or separated into sub-blocks to implement the principles of the various described embodiments. Therefore, the description herein optionally supports any possible combination or separation or further definition of the functional blocks described herein.

As shown in FIG. 7, an electronic device 20000 includes a display unit 20002 configured to display a first user interface that corresponds to a first application, a touch-sensitive surface unit 20004 configured to receive a contact on the touch-sensitive surface unit 20004, and a processing unit 20008 coupled to the display unit 20002 and the touch-sensitive surface unit 20004. In some embodiments, the processing unit 20008 includes a detecting unit 20010, a display enabling unit 20012, a replacing unit 20014, a ceasing unit 20015, a disabling unit 20016, and a performing unit 20018.

The processing unit 20008 is configured to: detect a first gesture on the touch-sensitive surface unit, where the first gesture includes movement of a contact in a respective direction on the touch-sensitive surface unit (e.g., with the detecting unit 20010); and in response to detecting the first gesture: in accordance with a determination that the movement of the contact is in a first direction, replace display of the first user interface with display of a second user interface that corresponds to a second application (e.g., with the replacing unit 20014); and in accordance with a determination that the movement of the contact is in a second direction, distinct from the first direction, enable display of a first system user interface for interacting with a system-level function (e.g., with the display enabling unit 20012).

In some embodiments, the first system user interface is a user interface selected from the set consisting of: a multi-tasking user interface, a search user interface, a virtual assistant user interface, a volume setting user interface, a screen brightness setting user interface, a screen rotation lock user interface, and a media player user interface.

In some embodiments, the first direction is substantially perpendicular to the second direction.

In some embodiments, the first direction is substantially opposite to the second direction.

In some embodiments, the processing unit 20008 is configured to, in response to detecting the first gesture, in accordance with a determination that the movement of the contact is in a third direction substantially opposite to the first direction, replace display of the first user interface with display of a third user interface that corresponds to a third application (e.g., with the replacing unit 20014).

In some embodiments, the processing unit 20008 is configured to, after displaying the first system user interface: detect a second gesture including movement of a contact in a direction substantially opposite to the second direction (e.g., with the detecting unit 20010); and in response to detecting the second gesture, cease to enable display of the first system user interface (e.g., with the ceasing unit 20015).

In some embodiments, the processing unit 20008 is configured to: while displaying the first system user interface, detect a second gesture that includes movement of a contact in the second direction (e.g., with the detecting unit 20010); and in response to detecting the second gesture, replace the first system user interface at least partially with a second system user interface for interacting with a different system-level function (e.g., with the replacing unit 20014).

In some embodiments, the second user interface entirely replaces first user interface; and the first system user interface is displayed simultaneously with at least a portion of the first user interface.

In some embodiments, enabling display of the first user interface includes displaying one or more interactive elements in the first user interface; and displaying the first system user interface includes: enabling display of the first system user interface simultaneously with at least a portion of the first user interface (e.g., with the display enabling unit 20012); and disabling one or more of the interactive elements in the portion of the first user interface while the first system user interface is displayed (e.g., with the disabling unit 20016).

In some embodiments, the second application is a most recently used application other than the first application; and the first system user interface is a user interface that is integrated into the basic operating system of the device and is always available when the device is operating, without regard to which applications, if any, are currently running on the device.

In some embodiments, the display unit 20002 is a touch screen display and the first gesture starts on a portion of the touch-sensitive surface unit 20004 that is not coincident with the display unit 20002.

In some embodiments, the processing unit 20008 is configured to: detect a second gesture that starts on a portion of the touch screen display (e.g., with the detecting unit 20010); and in response to detecting the second gesture, perform an operation in a user interface that is currently displayed on the touch-screen display (e.g., with the performing unit 20018).

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 6A-6C are, optionally, implemented by components depicted in FIGS. 1A-1B or FIG. 7. For example, display operation 19902, detection operation 19904, and replacing operation 19932 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Switching Between User Interfaces

Many electronic devices have graphical user interfaces that allow users to perform a variety of functions and operations associated with the respective user interfaces (e.g., home screen or application launch interfaces with user-selectable icons for selecting applications to be launched; application interfaces associated with applications such as maps for performing navigation operations, calculators for performing computation, photo viewers for viewing digital photographs, search applications, camera applications and the like). While interacting with such interfaces, in some circumstances, the user wants to switch from one user interface to another (e.g., from a calculator application interface to a photo viewing application interface; or from a home screen interface to a camera application interface; and the like). Some approaches for switching between user interfaces (e.g., switching between applications) involve returning to a home screen and then toggling through pages of the home screen to view an icon corresponding to a desired application, and then selecting the icon corresponding to the desired application to launch the desired application. These approaches are cumbersome and require the user to make multiple sequential contacts with a touch-sensitive surface of the device, thereby placing undue cognitive burden on the user. Furthermore, the user might prefer to directly switch to a most recently used application or to a predefined application (e.g., the user's "favorite" or preferred application or most commonly used application). Some approaches for switching between applications do not enable a simple and convenient way to provide these features to directly switch to a most recently used application or to a predefined application.

The disclosed embodiments provide a convenient method of switching between user interfaces (e.g., switching between applications or launching an application from a home screen interface) through the use of a single gesture that includes movement of a contact (e.g., a swipe gesture) detected on a touch-sensitive surface of the device in one of two directions. In addition, the disclosed embodiments provide the user improved capability to switch to one of two applications—either an application based on application use criteria (e.g., a most recently used application) or a predefined application (e.g., the user's favorite application or the user's most frequently used application)—based on the direction of movement of the contact associated with the single gesture. Accordingly, in response to detecting movement of a contact in one of two different directions—either in a first direction or in a second direction—the device displays one of two different user interfaces corresponding to one of two different applications. In response to detecting a gesture with movement of a contact in a first direction (e.g., from right to left), the device displays a first user interface corresponding to a first application (e.g., an application based on application use criteria, such as a most recently used application) and in response to detecting a gesture with movement of a contact in a second direction (e.g., from left to right), the device displays a second user interface corresponding to a second application (e.g., a predefined application, such as the user's most frequently used application). As a result, the user has the improved convenience of selecting one of two applications to be launched or displayed—e.g., either displaying a first application based on application use criteria or displaying a predefined application—simply by performing a gesture that involves the movement of a contact in one of two directions. Indeed, in some of the disclosed embodiments, the user does not need to make multiple sequential contacts with the touch-sensitive surface in order to switch between user interfaces, but rather can transition between user interfaces simply through a single moving gesture (e.g., a swipe gesture) in a portion of the device. Additionally, the user can conveniently switch to one of a most recently used application or a predefined application (e.g., a preferred or most commonly used application) based on a direction of movement of contact associated with the single moving gesture.

FIGS. 8A-8K illustrate exemplary user interfaces for switching between user interfaces in accordance with some embodiments. The user interfaces in these figures are used to illustrate the processes described below, including the processes in FIGS. 9A-9D.

Figure 8A:
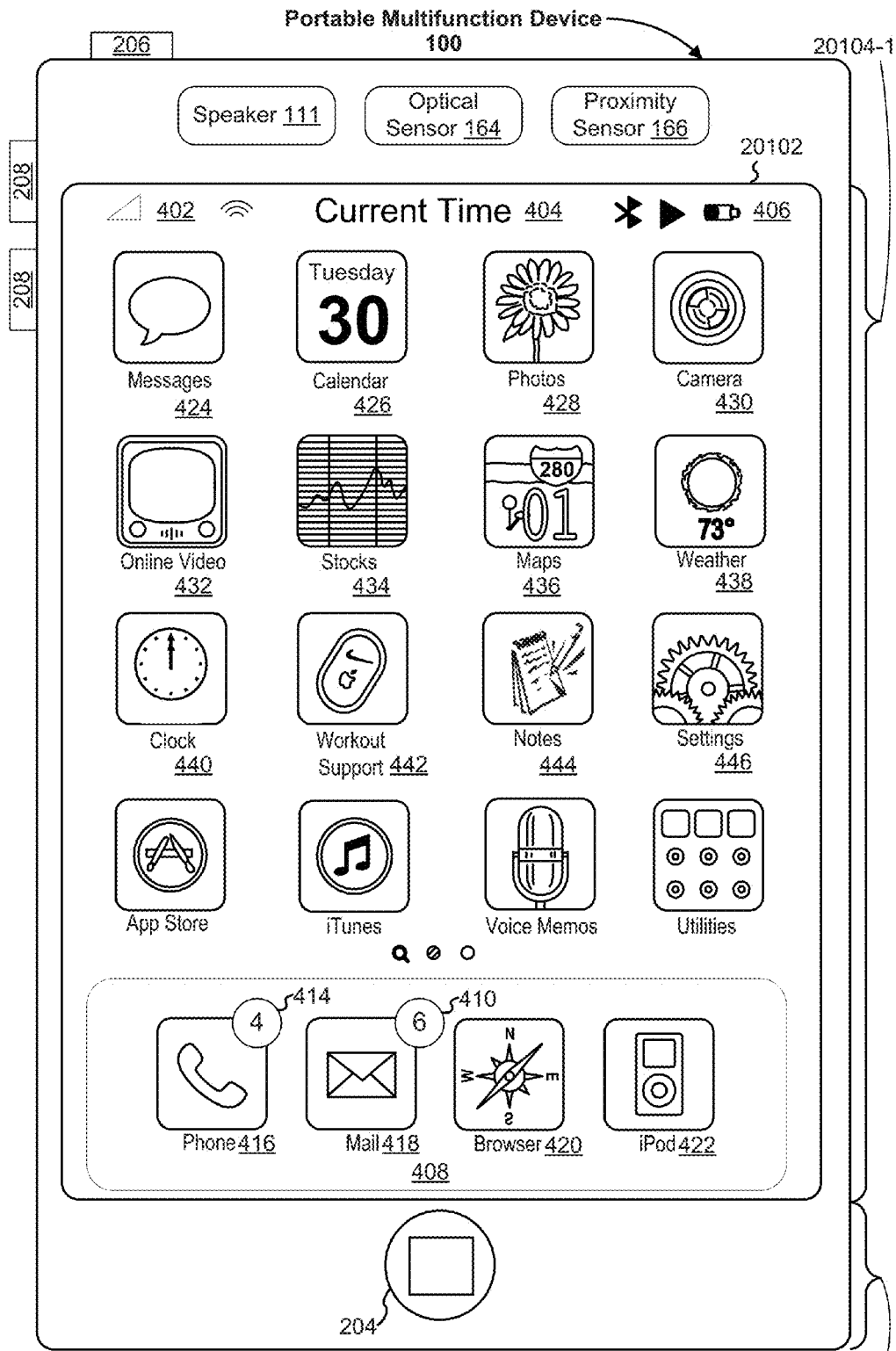
FIGS. 8A-8K illustrate exemplary user interfaces for switching between user interfaces in accordance with some embodiments.

FIG. 8A illustrates a user interface (e.g., an application launch user interface, such as a home screen) with user-selectable icons (e.g., icons 424-446 for launching various applications) that are displayed on a display 20102 of a portable multi-function device 100. In some embodiments, display 20102 is a touch-sensitive display with an array of touch sensors that are responsive to touch. In some embodiments, the array of touch sensors is in a plane coincident (e.g., collocated or co-planar) with a plane that defines the display elements forming display 20102. In alternative embodiments, the array of touch sensors is in a plane different from the plane of the display elements forming display 20102. In some embodiments, portable multi-function device 100 includes a touch-sensitive surface with a first portion (e.g., first touch-sensitive portion 20104-1) and a second portion (e.g., second touch-sensitive portion 20104-2). In some embodiments, as shown in FIG. 8A, first touch-sensitive portion 20104-1 is collocated with at least a portion of display 20102 and second touch-sensitive portion 20104-2 is separate from (e.g., adjacent to) display 20102. In some embodiments, first touch-sensitive portion 20104-1 and the second touch-sensitive portion 20104-2 are part of a single continuous touch-sensitive surface that is divided based on which part of the touch-sensitive surface is coincident with the display. In some embodiments, the first touch-sensitive portion 20104-1 is a touch screen module, and the second touch-sensitive portion 20104-2 is a touch-sensitive surface module that is separate from the touch screen module.

FIGS. 8A-8K illustrate detecting a gesture (including movement of a contact) on a touch-sensitive surface while displaying a respective user interface (e.g., the home screen or an application user interface) on the display 20102. FIGS. 8A-8K further illustrate in response to detecting movement of the contact in one of two different directions—either in a first direction or in a second direction—displaying one of two different user interfaces corresponding to one of two different applications. In response to detecting a gesture with movement of a contact in a first direction (e.g., from right to left), the device displays a first user interface corresponding to a first application (e.g., a most recently used application) and in response to detecting a gesture with movement of a contact in a second direction (e.g., from left to right), the device displays a second user interface corresponding to a second application (e.g., a predefined application).

Figure 8B:
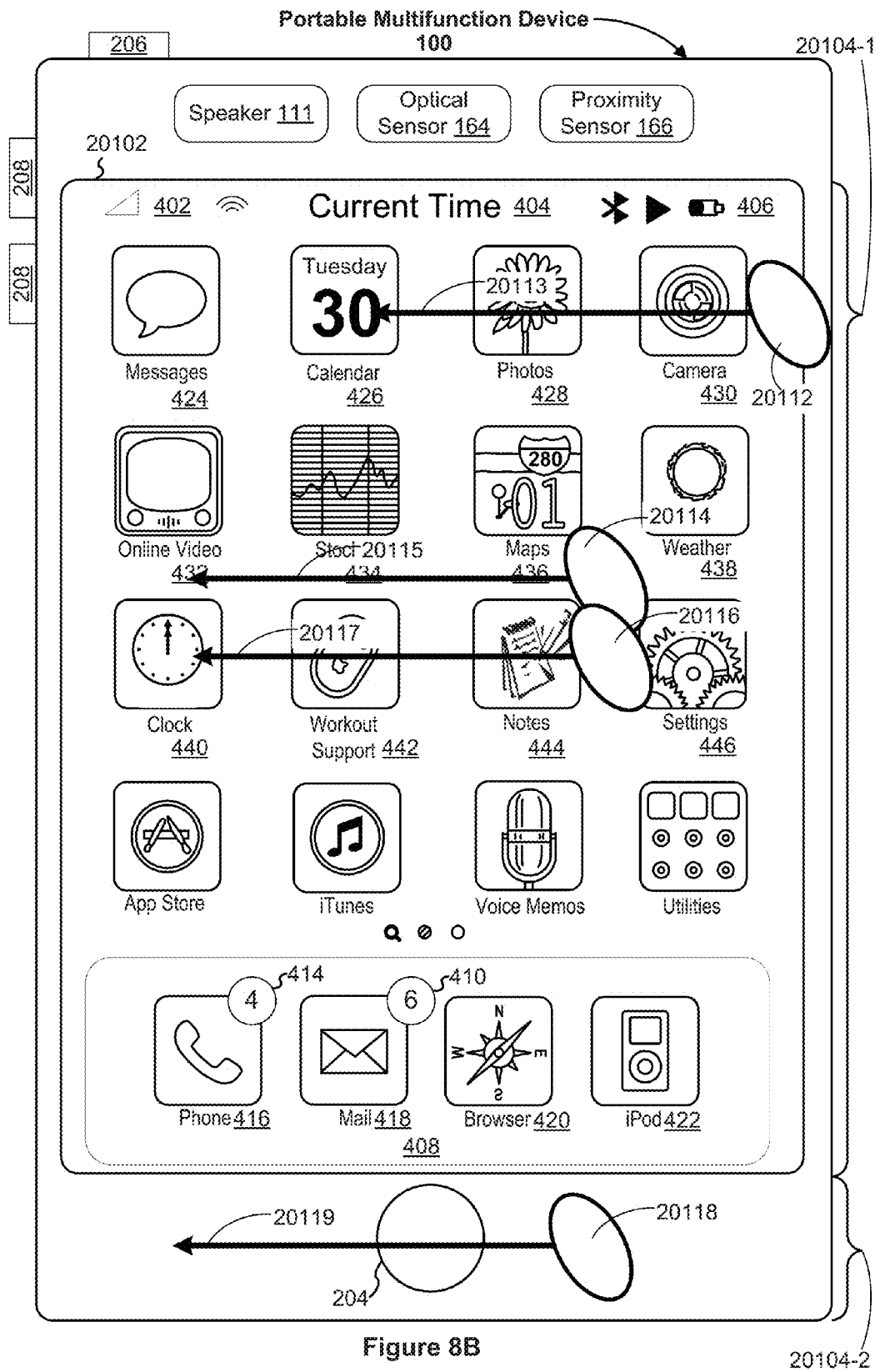

As shown in FIG. 8A, a respective user interface (e.g., an application launch user interface, such as a home screen) is displayed on display 20102 of device 100. The user interface includes user-selectable icons (e.g., icons 424-446 for launching various applications). As shown in FIG. 8B, a gesture including a contact associated with a corresponding movement (e.g., a single finger gesture including contact 20112 and associated movement 20113 starting from an edge/bezel or another portion of device 100 that is not coincident with display 20102 or is not coincident with first touch-sensitive portion 20104-1 but includes movement 20113 substantially on display 20102 or on first touch-sensitive portion 20104-1; a two-finger gesture including two concurrent contacts 20114 and 20116 and associated movements 20115 and 20117 on touch sensitive display 20102 or on first touch-sensitive portion 20104-1 of device 100; or single finger gesture including contact 20118 and associated movement 20119 on second touch-sensitive portion 20104-2 of device 100) is detected on a touch-sensitive surface of device 100, the corresponding movement being in a first direction (e.g., from right to left with reference to the orientation of device 100 shown in FIG. 8B). In some embodiments, the gesture (e.g., from the gestures shown in FIG. 8B) including a contact associated with a corresponding movement is distinguished from a single finger swipe gesture detected entirely on display 20102 or on first touch-sensitive portion 20104-1 which is associated with a predefined operation corresponding to content displayed on the respective user interface (e.g., a single finger swipe gesture detected entirely on display 20102 or on first touch-sensitive portion 20104-1 which causes translation of at least a portion of the respective user interface in the direction of movement of the contact associated with the swipe gesture).

Figure 8C:
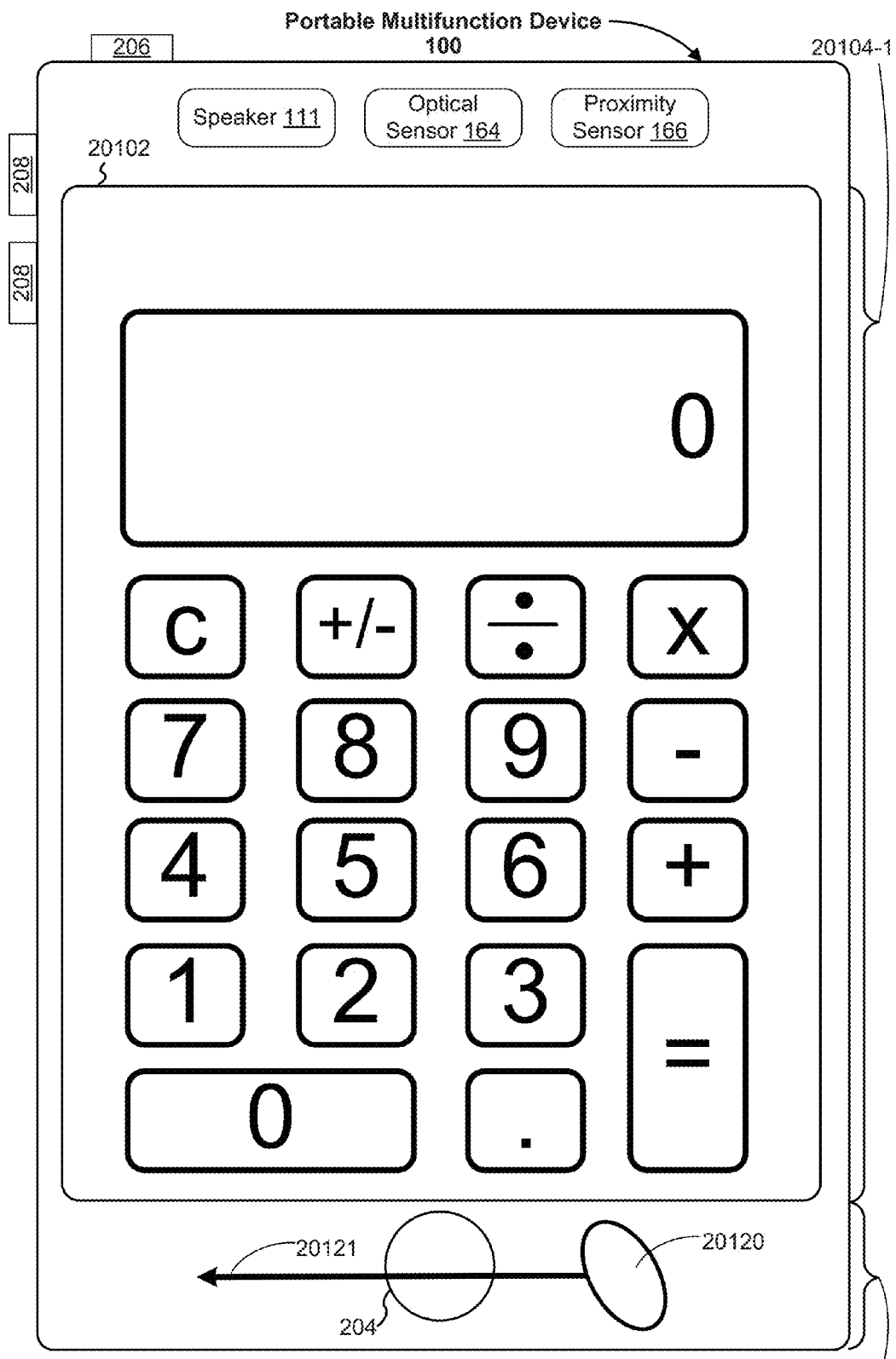

In response to detecting movement of the contact in the first direction (e.g., from right to left), a first user interface corresponding to a first application (e.g., a calculator application) is displayed (e.g., is launched). Accordingly, in some embodiments, the respective user interface (e.g., the application launch user interface, such as the home screen shown in FIG. 8B) is replaced by a first user interface (FIG. 8C). In some embodiments, the first application (e.g., the calculator application, FIG. 8C) is selected based on application use criteria (e.g., the calculator application shown in FIG. 8C is a most-recently used application).

Figure 8D:
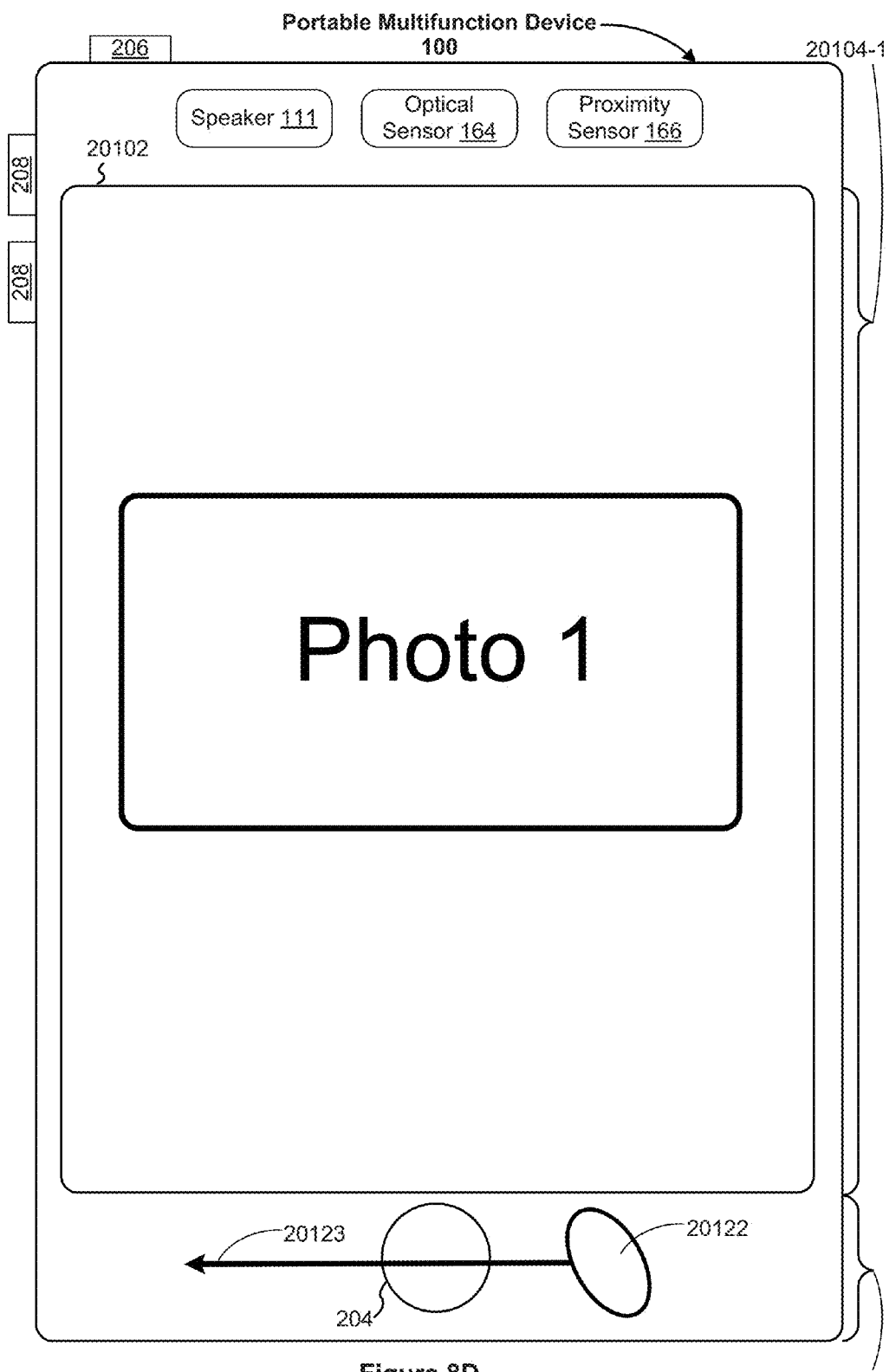

As shown in FIG. 8C, a gesture including contact 20120 associated with a corresponding movement 20121 is detected on a touch sensitive portion (e.g., second touch-sensitive portion 20104-2) of device 100, the corresponding movement 20121 being in the first direction (e.g., from right to left). In response to detecting movement 20121 of contact 20120 in the first direction (e.g., from right to left), a different user interface (e.g., different from the first user interface shown in FIG. 8C) corresponding to a different application from the first application (e.g., a photo viewer application different from the calculator application) is displayed (FIG. 8D). In some embodiments, the different user interface (e.g., the user interface corresponding to the photo viewer application shown in FIG. 8D) is the next-most recently used application after the most recently used calculator application.

Figure 8E:

Continuing the example described above, as shown in FIG. 8D, a gesture including contact 20122 associated with a corresponding movement 20123 is detected on a touch sensitive portion (e.g., second touch-sensitive portion 20104-2) of device 100, the corresponding movement 20123 being in the first direction (e.g., from right to left). In response to detecting movement 20123 of contact 20122 in the first direction (e.g., from right to left), another different user interface (e.g., different from the first user interface shown in FIG. 8C or the user interface shown in FIG. 8D) corresponding to another different application from the first application (e.g., a notepad application different from the calculator application or photo viewer application) is displayed (FIG. 8E).

Thus, in some embodiments, in response to detecting a gesture with movement of a contact in a first direction (e.g., from right to left), the device displays a first user interface corresponding to a first application (e.g., where the first application is selected based on application use criteria, such as the first application is the most recently used application).

Figure 8F:
Figure 8G:
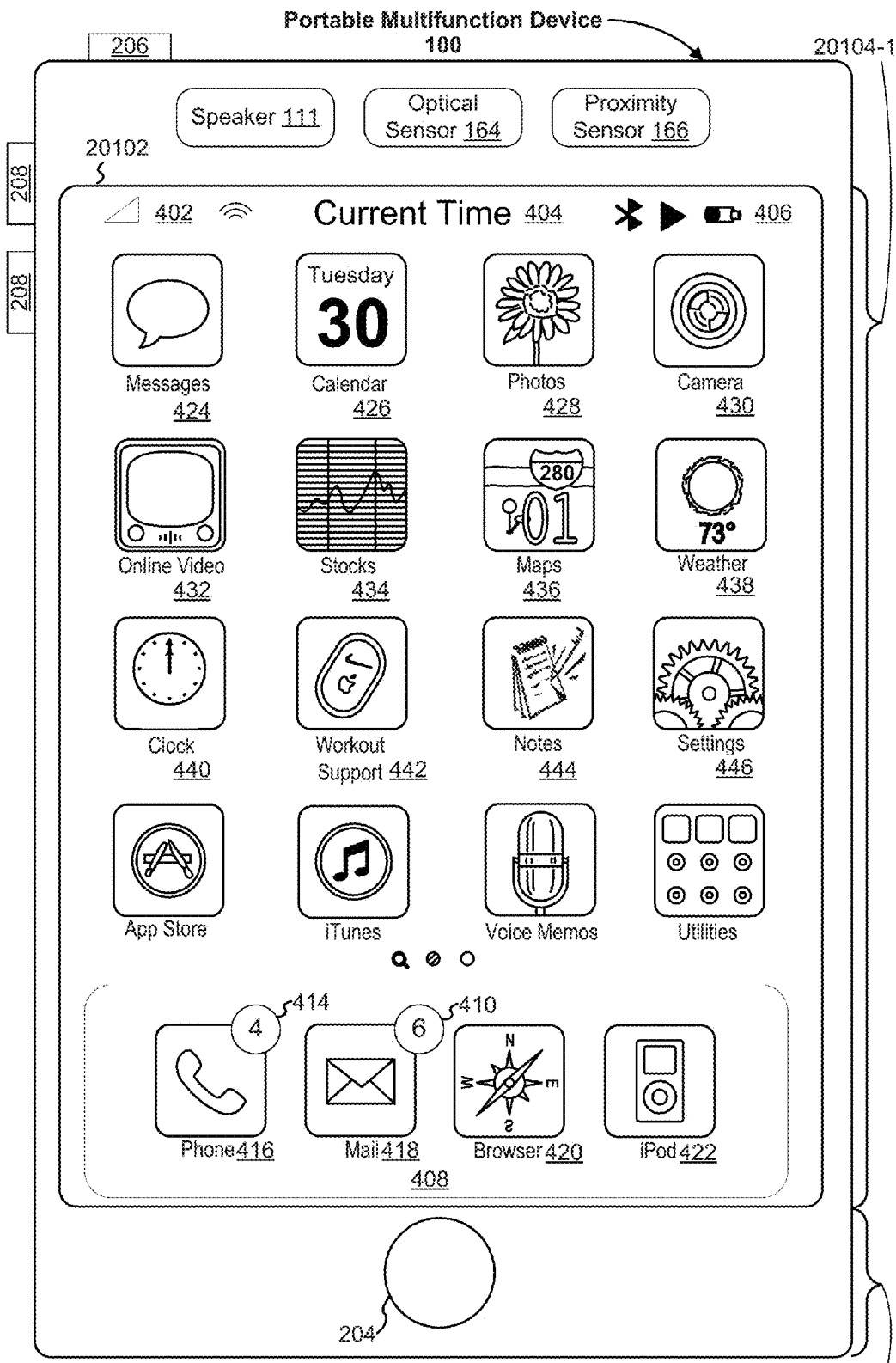

As illustrated in FIGS. 8F-8G, upon detecting activation of the home button or menu button 204 (e.g., via tap or press input 20124), the respective user interface shown previously in FIG. 8A (e.g., an application launch user interface, such as a home screen) with user-selectable icons (e.g., icons 424-446 for launching applications) is displayed on display 20102.

Figure 8H:
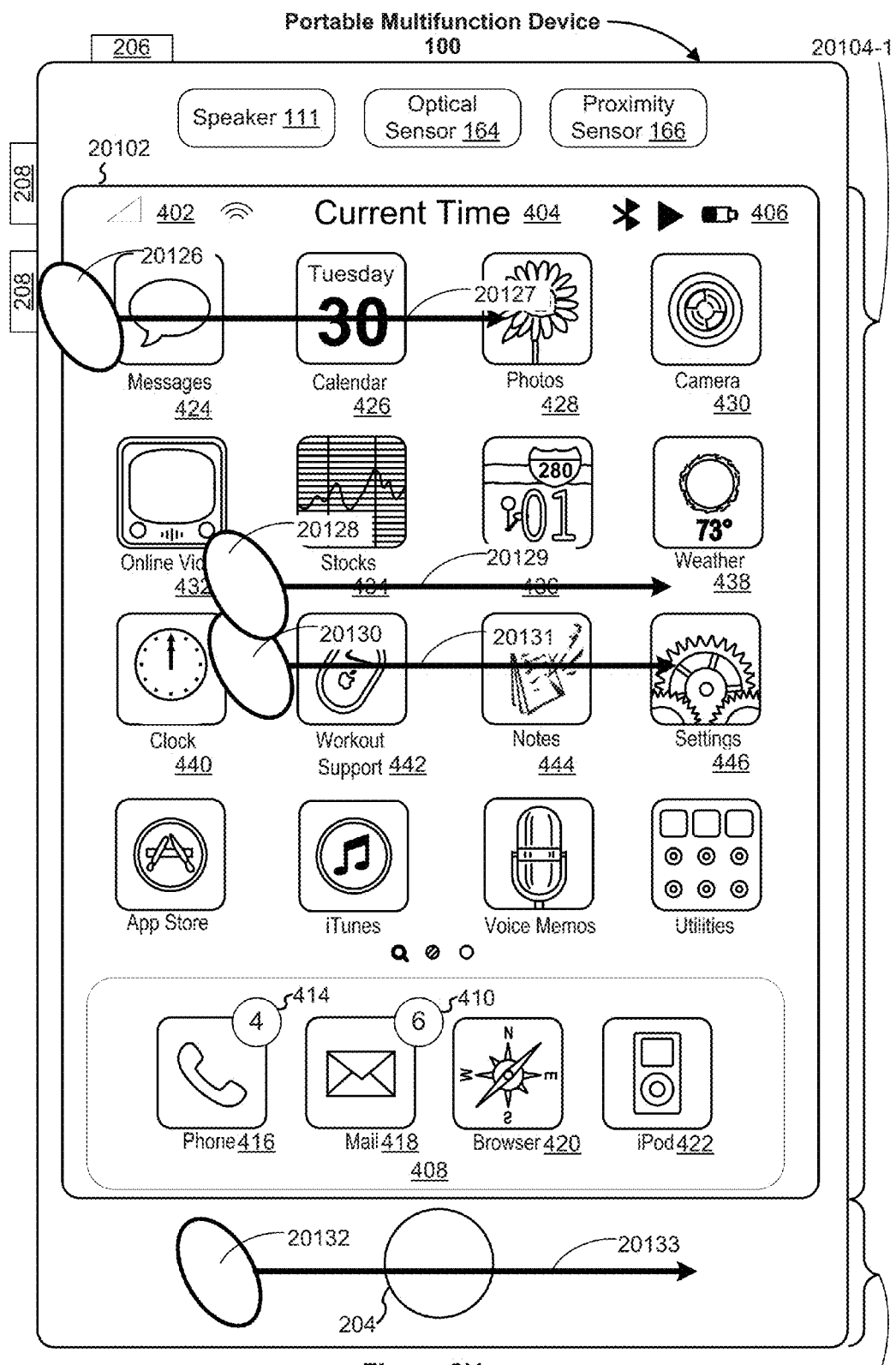

As shown in FIG. 8H, a gesture including a contact associated with a corresponding movement (e.g., a single finger gesture including contact 20126 and associated movement 20127 starting from an edge/bezel or another portion of device 100 that is not coincident with display 20102 or not coincident with first touch-sensitive portion 20104-1; a two-finger gesture including two concurrent contacts 20128 and 20130 and associated movements 20129 and 20131 on touch sensitive display 20102 or on first touch-sensitive portion 20104-1 of device 100; or single finger gesture including contact 20132 and associated movement 20133 on second touch-sensitive portion 20104-2 of device 100) is detected on a touch-sensitive surface of device 100, the corresponding movement being in a second direction (e.g., from left to right with reference to the orientation of device 100 shown in FIG. 8H). As noted previously with reference to FIG. 8B, in some embodiments, the gesture (e.g., from the gestures shown in FIG. 8H) including a contact associated with a corresponding movement is distinguished from a single finger swipe gesture detected entirely on display 20102 or on first touch-sensitive portion 20104-1 which is associated with a predefined operation corresponding to content displayed on the respective user interface (e.g., a single finger swipe gesture detected entirely on display 20102 or on first touch-sensitive portion 20104-1 which causes translation of at least a portion of the respective user interface in the direction of movement of the contact associated with the swipe gesture).

Figure 8I:
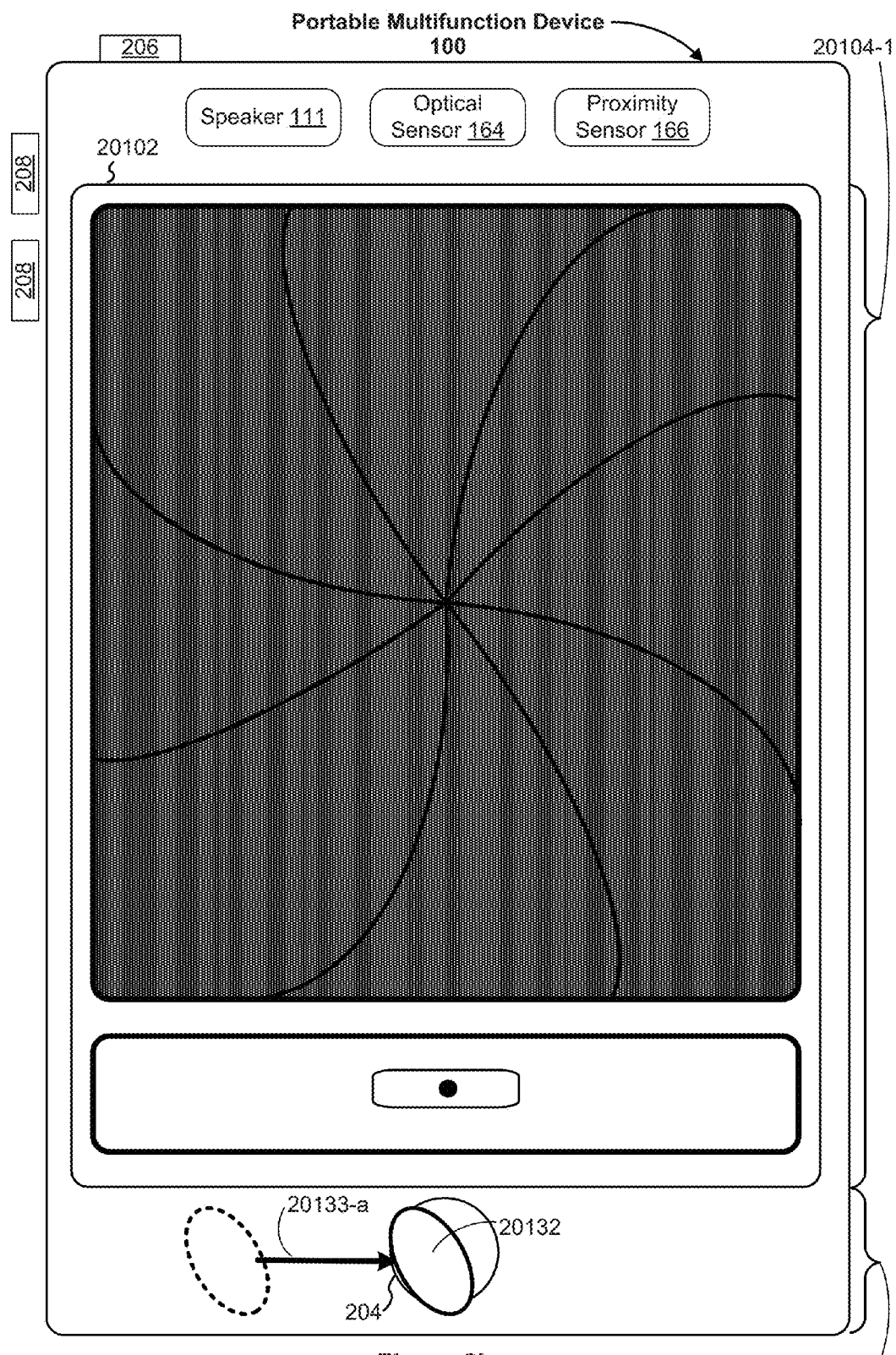
Figure 8J:
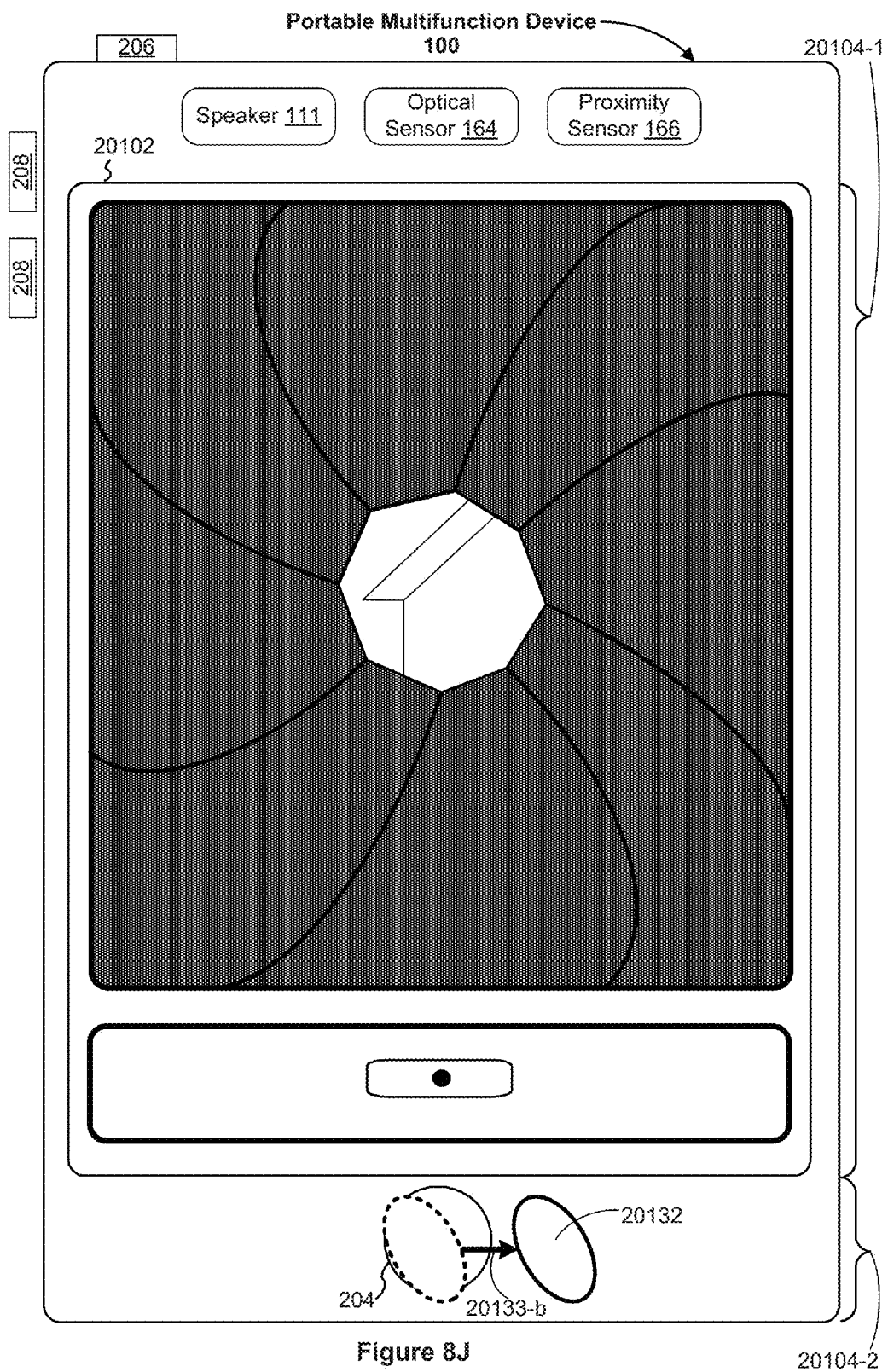
Figure 8K:
Figure 9A:
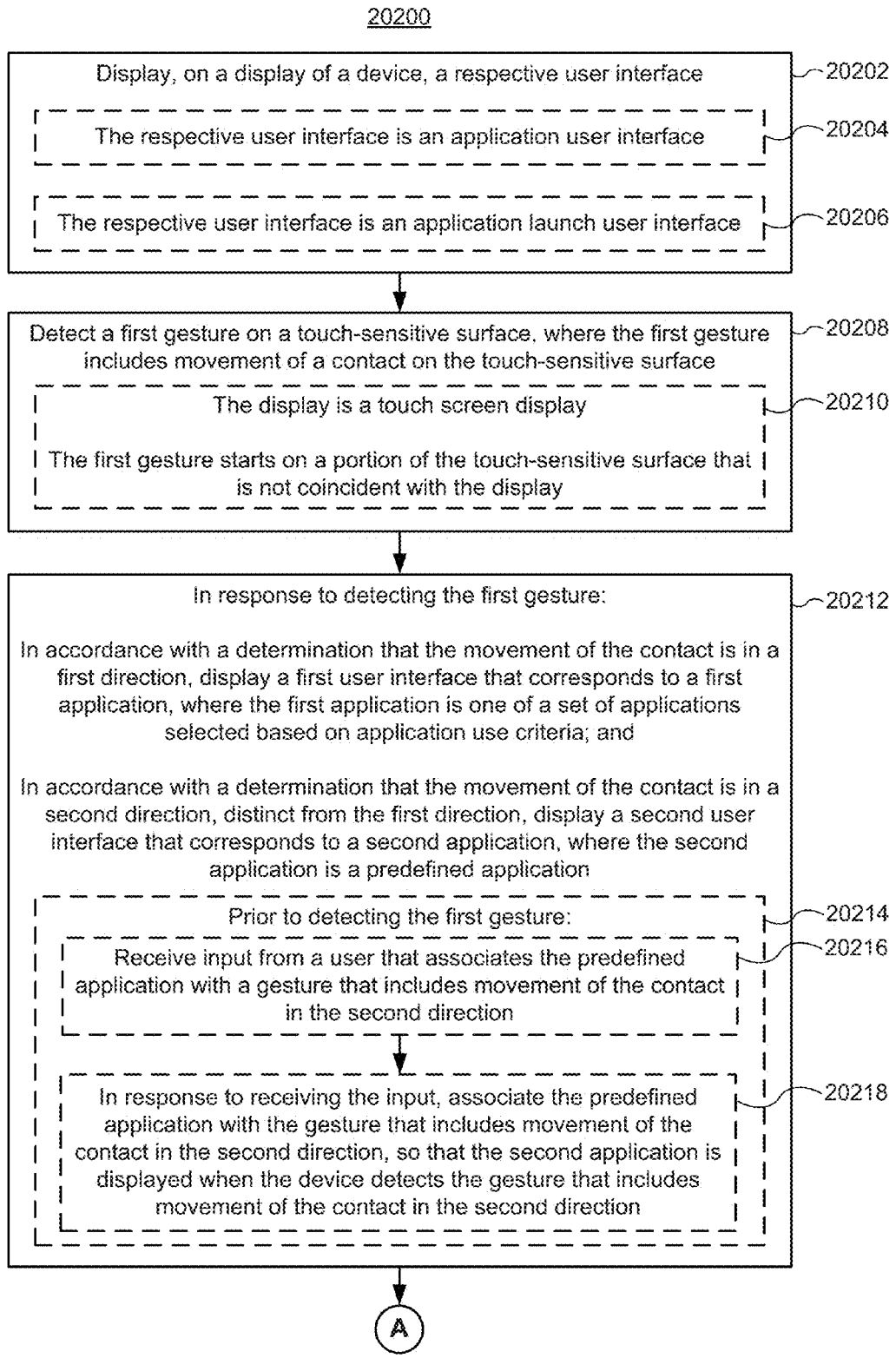
FIGS. 9A-9D are flow diagrams illustrating a method of switching between user interfaces in accordance with some embodiments.
Figure 9B:
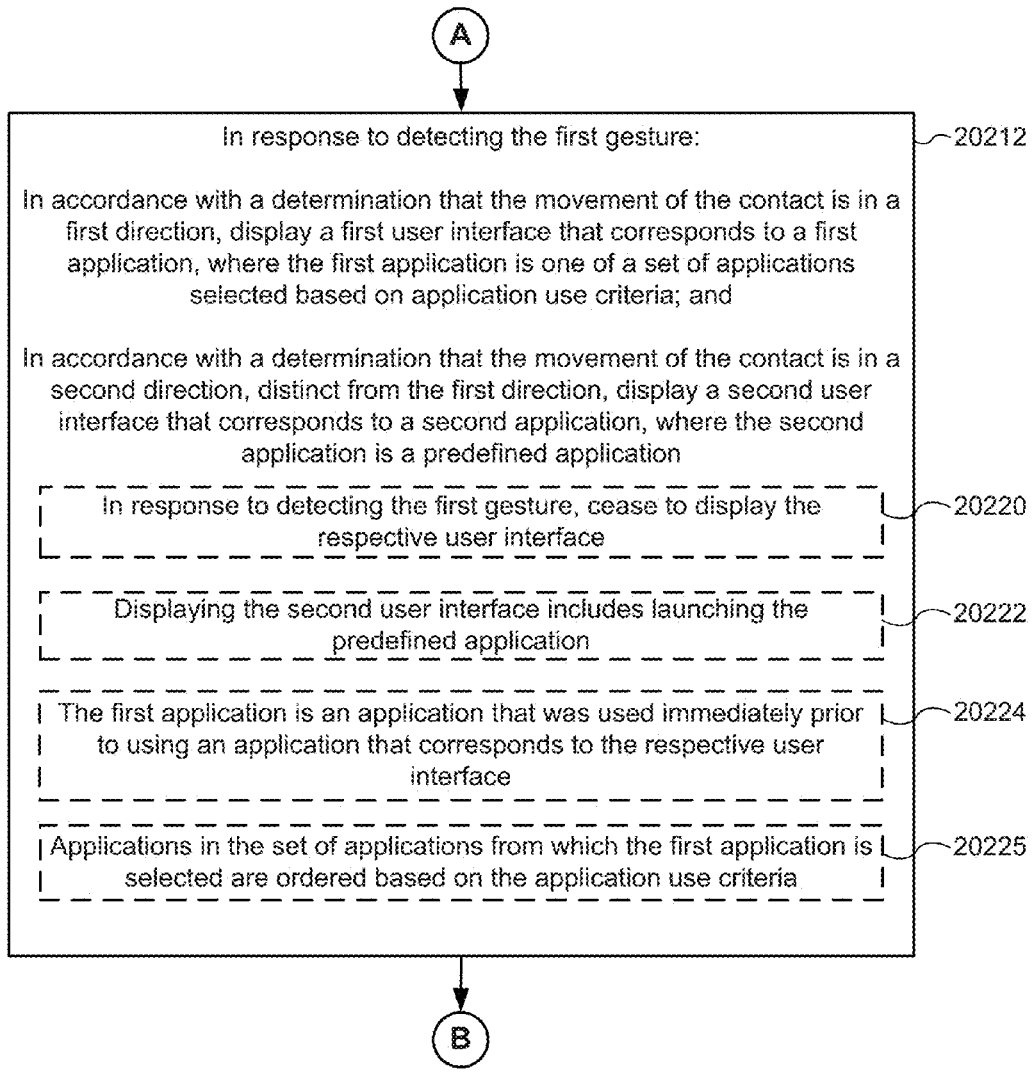
Figure 9C:
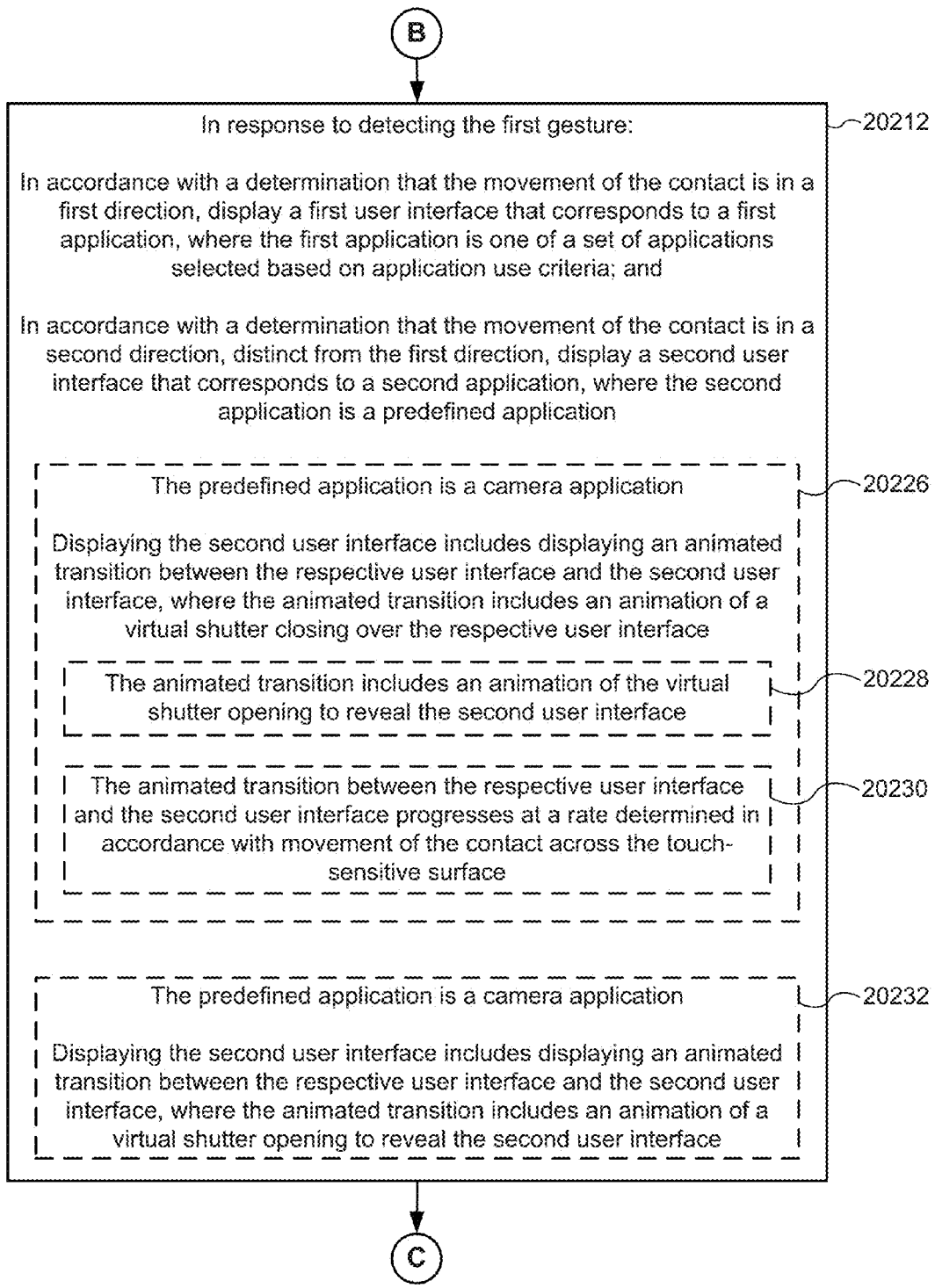
Figure 9D:
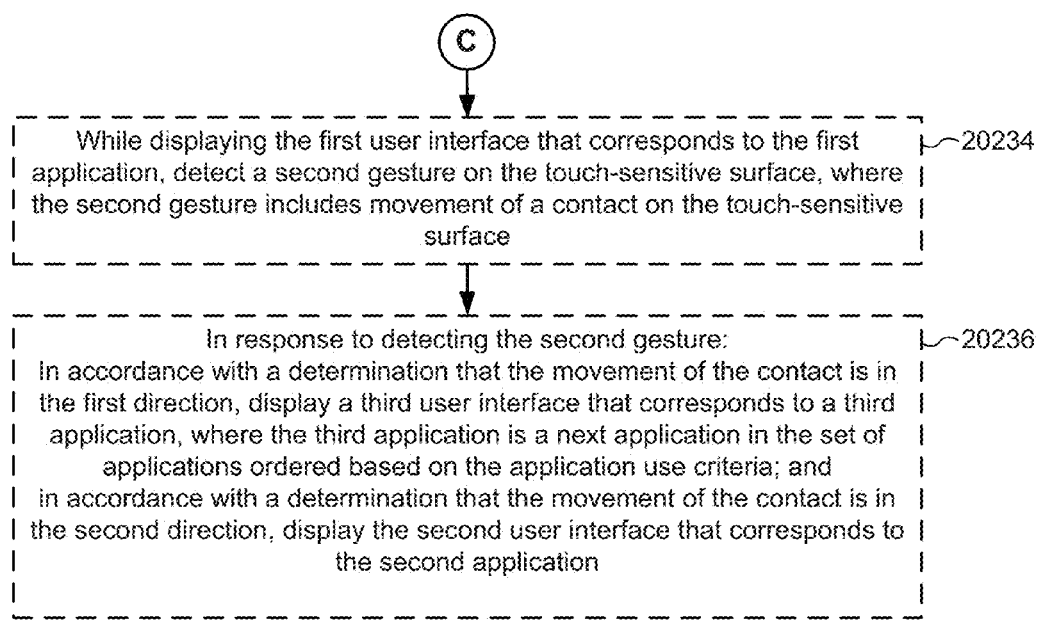

In response to detecting movement of the contact in the second direction (e.g., from left to right), a second user interface corresponding to a second application (e.g., a predefined application, such as a camera application as shown in FIGS. 8I-8K) is displayed (e.g., is launched). Accordingly, in some embodiments, the respective user interface (e.g., the application launch user interface, such as the home screen shown in FIG. 8H) is replaced by the second user interface (the user interface corresponding to the predefined camera application, FIG. 8K). In some embodiments, the second application (e.g., the camera application, FIG. 8I) is predefined by the user to be associated with a gesture that includes movement of a contact in the second direction.

In some embodiments, the device displays an animated transition between the respective user interface (e.g., between the application launch or home screen interface shown in FIG. 8H) and the second user interface (e.g., camera view finder interface shown in FIG. 8K). For example, as shown in FIGS. 8H-8K the device displays an animation of a virtual camera shutter closing over the launch or home screen interface shown in FIG. 8H (e.g., the animation shown in FIGS. 8H-8I occurs in accordance with the movement 20133-a of contact 20132 across touch-sensitive portion 20104-2) and subsequently opening (e.g., the animation shown in FIGS. 8I-8K occurs in accordance with the movement 20133-b and 20133-c of contact 20132 across touch-sensitive portion 20104-2) to reveal the second user interface or the camera view finder (FIG. 8K). Thus, in some embodiments, in response to detecting a gesture with movement of a contact in a second direction (e.g., from left to right), the device displays a second user interface corresponding to a second application (e.g., where the second application is a predefined application, such as a camera application predefined by the user to be associated with a gesture that includes movement of a contact in the second direction).

FIGS. 9A-9D are flow diagrams illustrating a method 20200 of switching between user interfaces in accordance with some embodiments. The method 20200 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 20200 are, optionally, combined and/or the order of some operations is, optionally, changed.

As described below, the method 20200 provides an intuitive way to switch between user interfaces. The method reduces the cognitive burden on a user when switching between user interfaces, thereby creating a more efficient human-machine interface. For battery-operated electronic devices, enabling a user to switch between user interfaces faster and more efficiently conserves power and increases the time between battery charges.

The device displays (20202) on the display, a respective user interface. In some embodiments, the respective user interface is (20204) an application user interface (e.g., a user interface that corresponds to a respective, currently active or foreground application, such as a calculator application shown in FIG. 8C or a photo viewer application shown in FIG. 8D). In some embodiments, the respective user interface is (20206) an application launch user interface (e.g., a desktop, or the home screen shown in FIG. 8B).

The device detects (20208) a first gesture on the touch-sensitive surface, where the first gesture includes movement of a contact on the touch-sensitive surface. For example, as shown in FIG. 8B, the first gesture includes a single finger gesture including contact 20112 and associated movement 20113 starting from an edge/bezel or another portion of device 100 that is not coincident with display 20102 or not coincident with first touch-sensitive portion 20104-1 but includes movement 20113 substantially on display 20102; or a two-finger gesture including two concurrent contacts 20114 and 20116 and associated movements 20115 and 20117 on touch sensitive display 20102 or on first touch-sensitive portion 20104-1 of device 100. In some embodiments, the display is (20210) a touch screen display; and the first gesture starts on a portion of the touch-sensitive surface that is not coincident with the display. For example, the first gesture (e.g., including contact 20118 and associated movement 20119, FIG. 8B) starts on the portion of the touch-sensitive surface is a "chin" portion (e.g., second touch-sensitive portion 20104-2) of the touch-sensitive surface that is laterally adjacent to or on a bezel of the touch screen display.

In response to detecting (20212) the first gesture: in accordance with a determination that the movement of the contact is in a first direction, the device displays a first user interface that corresponds to a first application, where the first application is one of a set of applications selected based on application use criteria. In some embodiments, displaying the first user interface includes replacing the respective user interface with the first user interface. For example, as explained with reference to FIGS. 8B-8C, in response to detecting movement of the contact in a first direction (e.g., from right to left with reference to the orientation of device 100 shown in FIG. 8B), a first user interface corresponding to a first application (e.g., a calculator application) is displayed (e.g., is launched). Accordingly, in some embodiments, the respective user interface (e.g., the application launch user interface, such as the home screen shown in FIG. 8B) is replaced by a first user interface (e.g., the calculator application shown in FIG. 8C). In some embodiments, the first application (e.g., the calculator application, FIG. 8C) is selected based on application use criteria (e.g., the calculator application shown in FIG. 8C is a most-recently used application).

In contrast, in accordance with a determination that the movement of the contact is in a second direction, distinct from the first direction (e.g., the second direction is substantially opposite to the first direction or the second direction is substantially perpendicular to the first direction) the device displays a second user interface that corresponds to a second application, where the second application is a predefined application. In some embodiments, displaying the second user interface includes replacing the respective user interface with the second user interface. For example, as explained with reference to FIGS. 8H-8K, in response to detecting movement of the contact in the second direction (e.g., from left to right with reference to the orientation of device 100 shown in FIG. 8H), a second user interface corresponding to a second application (e.g., a predefined application, such as a camera application as shown in FIGS. 8I-8K) is displayed (e.g., is launched). In some embodiments, the respective user interface (e.g., the application launch user interface, such as the home screen shown in FIG. 8H) is replaced by the second user interface (the user interface corresponding to the predefined camera application, FIG. 8K). In some embodiments, the first application and the second application are full screen applications (e.g., applications which take up all or substantially all of the display of the device such as the calculator application in FIG. 8C and the camera application in FIG. 8K).

In some embodiments, prior to detecting (20214) the first gesture: the device receives (20216) input from a user that associates the predefined application (e.g., of a plurality of candidate applications) with a gesture that includes movement of the contact in the second direction; and in response to receiving the input, the device associates (20218) the predefined application with the gesture that includes movement of the contact in the second direction, so that the second application is displayed when the device detects the gesture that includes movement of the contact in the second direction. In some embodiments, the predefined application is a user-selected application (e.g., in a "settings" application where the user is provided with options for configuring behavior of the device). In some embodiments, the predefined application is a default application, such as a camera application (e.g., as explained with reference to FIGS. 8H-8K), or a search application. Thus, in some embodiments, the predefined application is an application selected from a plurality of candidate applications by a user of the device.

In some embodiments, in response to detecting the first gesture, the device ceases (20220) to display the respective user interface. For example, as shown in FIGS. 8B-8C, the first user interface (e.g., the calculator application user interface, FIG. 8C) replaces the respective user interface (e.g., the home screen user interface, FIG. 8B). As another example, as shown in FIGS. 8H-8K, the second user interface (e.g., the camera application user interface, FIG. 8K) replaces the respective user interface (e.g., the home screen user interface, FIG. 8H). In some embodiments, displaying the second user interface includes (20222) launching the predefined application (e.g., launching the camera application as shown in FIGS. 8H-8K). For example, in some circumstances, the predefined application has not been used recently or since turning the device on, and the process of executing the predefined application has been terminated or has not yet been started, so as to free up or avoid unnecessarily utilizing processing resources of the device. In some embodiments, the first application is (20224) an application that was used immediately prior to using an application that corresponds to the respective user interface. For example, the first application is a most recently used application (e.g., the calculator application shown in FIG. 8C is a most recently used application when the gesture including movement 20119 of contact 20118 is detected in FIG. 8B). In some embodiments, applications in the set of applications from which the first application is selected are ordered (20225) based on the application use criteria. For example, the applications in the set of applications are ordered based on when they were last used, with more recently used applications being ahead of less recently used applications in the order (e.g., as explained with reference to FIGS. 8C-8E, the calculator application shown in FIG. 8C is the most recently used application, followed by the photo viewer application shown in FIG. 8D which is the next-most recently used, followed by the notepad application shown in FIG. 8E which is the third most recently used application, and so on).

In some embodiments, the predefined application is (20226) a camera application; and displaying the second user interface includes displaying an animated transition between the respective user interface and the second user interface, where the animated transition includes an animation of a virtual shutter closing over the respective user interface (e.g., in FIGS. 8H-8I, a virtual shutter closes over the home screen user interface shown in FIG. 8H). In some embodiments, the animated transition includes (20228) an animation of the virtual shutter opening to reveal the second user interface (e.g., in FIGS. 8I-8K, a virtual shutter opens to reveal the camera user interface shown in FIG. 8K). In some embodiments, the animated transition between the respective user interface and the second user interface progresses (20230) at a rate determined in accordance with movement of the contact across the touch-sensitive surface (e.g., the shutter gradually closes over the respective user interface as the contact moves along a bottom edge of the touch-sensitive surface and then gradually opens as the contact continues to move along the bottom edge of the touch-sensitive surface, as shown in FIGS. 8H-8K with shutter gradually closing and then opening in accordance with movement 20133 of contact 20132 across touch-sensitive portion 20104-2).

In some embodiments, the predefined application is (20232) a camera application; and displaying the second user interface includes displaying an animated transition between the respective user interface and the second user interface (e.g., as explained with reference to FIGS. 8H-8K), where the animated transition includes an animation of a virtual shutter opening to reveal the second user interface (e.g., as illustrated in FIGS. 8I-8K, where a virtual shutter opens to reveal the camera user interface shown in FIG. 8K).

In some embodiments, while displaying the first user interface that corresponds to the first application, the device detects (20234) a second gesture on the touch-sensitive surface, where the second gesture includes movement of a contact on the touch-sensitive surface. In response to detecting the second gesture: in accordance with a determination that the movement of the contact is in the first direction, the device displays a third user interface that corresponds to a third application (e.g., different from the first application and the second application), where the third application is a next application in the set of applications ordered based on the application use criteria (e.g., as explained with reference to FIGS. 8C-8D), while displaying the first application or the calculator application of FIG. 8C, in accordance with a determination that the movement 20121 of the contact 20120 is in the first direction or from right-to-left, a third user interface or the photo viewer interface shown in FIG. 8D is displayed); and in accordance with a determination that the movement of the contact is in the second direction, the device displays the second user interface that corresponds to the second application (e.g., if the direction of movement 20121 of contact 20120 were from left-to-right instead of from right-to-left, the device would have displayed a predefined application such as camera application, as described above with reference to FIGS. 8H-8K and contact 20132 and associated movement 20133).

It should be understood that the particular order in which the operations in FIGS. 9A-9D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments) are also applicable in an analogous manner to method 20200 described above with respect to FIGS. 9A-9D. For example, the contacts, gestures, user interfaces, inputs, animations described above with reference to method 20200 optionally have one or more of the characteristics of the contacts, gestures, user interfaces, inputs, animations described herein with reference to other methods described herein (e.g., those listed in the fifth paragraph of the Description of Embodiments). For brevity, these details are not repeated here.

Figure 10:
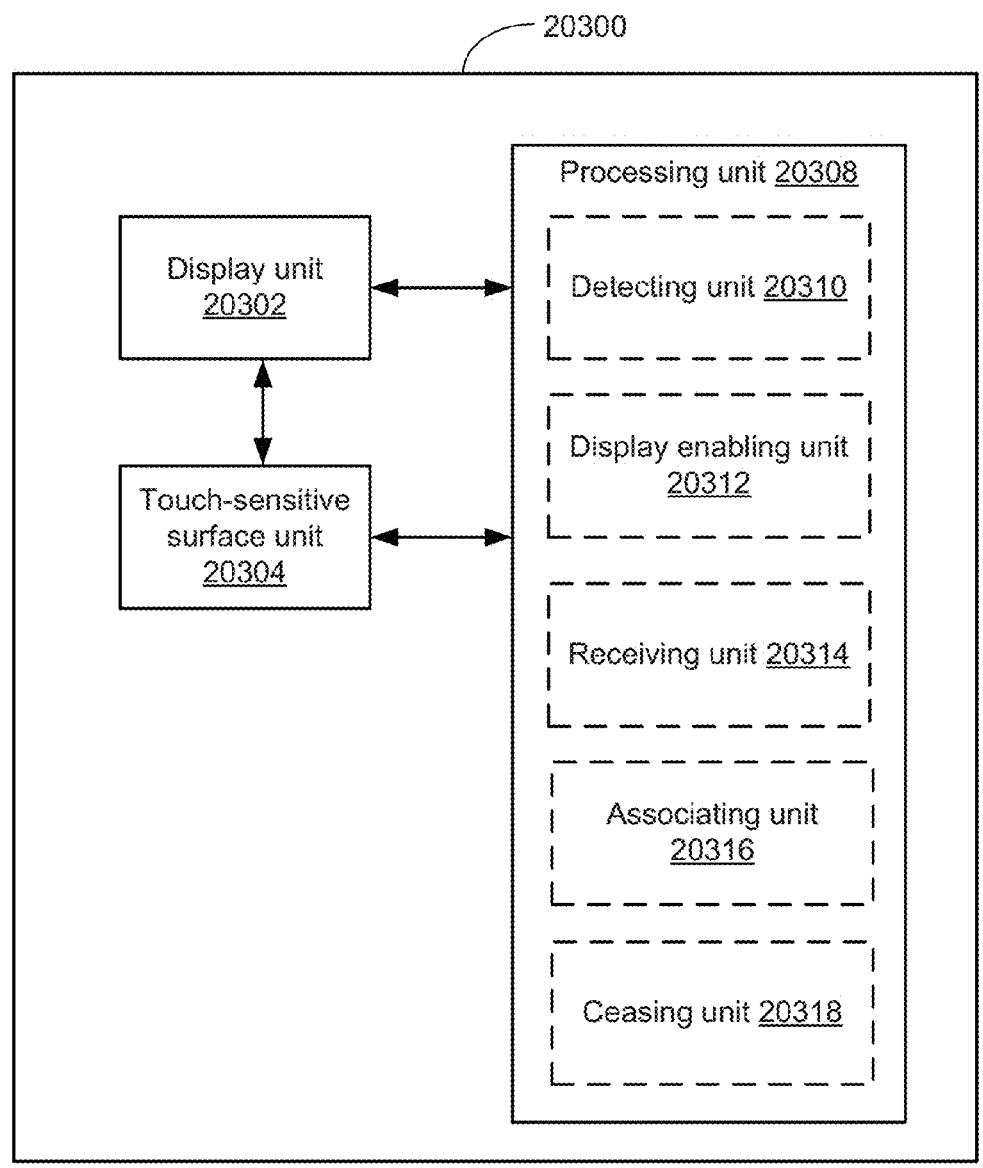
FIG. 10 is a functional block diagram of an electronic device in accordance with some embodiments.

In accordance with some embodiments, FIG. 10 shows a functional block diagram of an electronic device 20300 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 10 are, optionally, combined or separated into sub-blocks to implement the principles of the various described embodiments. Therefore, the description herein optionally supports any possible combination or separation or further definition of the functional blocks described herein.

As shown in FIG. 10, an electronic device 20300 includes a display unit 20302 configured to display a respective user interface, a touch-sensitive surface unit 20304 configured to receive a contact on the touch-sensitive surface unit and a processing unit 20308 coupled to the display unit 20302, and the touch-sensitive surface unit 20304. In some embodiments, the processing unit 20308 includes a detecting unit 20310, a display enabling unit 20312, a receiving unit 20314, an associating unit 20316, and a ceasing unit 20318.

The processing unit 20308 is configured to: detect a first gesture on the touch-sensitive surface, wherein the first gesture includes movement of a contact on the touch-sensitive surface (e.g., with the detecting unit 20310); and in response to detecting the first gesture: in accordance with a determination that the movement of the contact is in a first direction, enable display of a first user interface that corresponds to a first application (e.g., with the display enabling unit 20312), where the first application is one of a set of applications selected based on application use criteria; and in accordance with a determination that the movement of the contact is in a second direction, distinct from the first direction, enable display of a second user interface that corresponds to a second application (e.g., with the display enabling unit 20312), where the second application is a predefined application.

In some embodiments, the processing unit 20308 is configured to, prior to detecting the first gesture: receive input from a user (e.g., with the receiving unit 20314) that associates the predefined application with a gesture that includes movement of the contact in the second direction; and in response to receiving the input, associate the predefined application with the gesture that includes movement of the contact in the second direction (e.g., with the associating unit 20316), so that the second application is displayed when the device detects the gesture that includes movement of the contact in the second direction.

In some embodiments, the respective user interface is an application user interface.

In some embodiments, the respective user interface is an application launch user interface.

In some embodiments, the processing unit 20308 is configured to, in response to detecting the first gesture, cease to display the respective user interface (e.g., with the ceasing unit 20318).

In some embodiments, enabling display of the second user interface includes launching the predefined application.

In some embodiments, the first application is an application that was used immediately prior to using an application that corresponds to the respective user interface.

In some embodiments, applications in the set of applications from which the first application is selected are ordered based on the application use criteria.

In some embodiments, the processing unit 20308 is configured to: while displaying the first user interface that corresponds to the first application, detect a second gesture on the touch-sensitive surface (e.g., with the detecting unit 20310), where the second gesture includes movement of a contact on the touch-sensitive surface unit 20304. In response to detecting the second gesture: in accordance with a determination that the movement of the contact is in the first direction, enable display of a third user interface that corresponds to a third application (e.g., with the display enabling unit 20312), where the third application is a next application in the set of applications ordered based on the application use criteria; and in accordance with a determination that the movement of the contact is in the second direction, enable display of the second user interface that corresponds to the second application (e.g., with the display enabling unit 20312).

In some embodiments, the display unit 20302 is a touch screen display; and the first gesture starts on a portion of the touch-sensitive surface unit 20304 that is not coincident with the display unit 20302.

In some embodiments, the predefined application is a camera application; and enabling display of the second user interface includes enabling display of an animated transition between the respective user interface and the second user interface, where the animated transition includes an animation of a virtual shutter closing over the respective user interface.

In some embodiments, the animated transition includes an animation of the virtual shutter opening to reveal the second user interface.

In some embodiments, the animated transition between the respective user interface and the second user interface progresses at a rate determined in accordance with movement of the contact across the touch-sensitive surface unit 20304.

In some embodiments, the predefined application is a camera application; and enabling display of the second user interface includes enabling display of an animated transition between the respective user interface and the second user interface, where the animated transition includes an animation of a virtual shutter opening to reveal the second user interface.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 9A-9D are, optionally, implemented by components depicted in FIGS. 1A-1B or FIG. 10. For example, display operation 20202, detection operation 20208, receiving operation 20216 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Switching Between User Interfaces

Many electronic devices have graphical user interfaces that allow users to perform a variety of functions and operations associated with the respective user interfaces (e.g., home screen or application launch interfaces with user-selectable icons for selecting applications to be launched; application interfaces such as maps for performing navigation operations, calculators for performing computation, photo viewers for viewing digital photographs, search applications, camera applications and the like). While interacting with such interfaces, the user may want to switch from one user interface to another (e.g., from a calculator application to a map application; or from a home screen interface to a photo viewing application; and the like). Some approaches for switching between user interfaces (e.g., switching between applications) involve returning to a home screen and then toggling through pages of the home screen to view an icon corresponding to a desired application, and then selecting the icon corresponding to a desired application to launch the desired application. These approaches are cumbersome and require the user to make multiple sequential contacts with a touch-sensitive surface of the device, thereby placing undue cognitive burden on the user.

The disclosed embodiments provide a convenient method of switching between user interfaces (e.g., switching between applications or launching an application from a home screen interface) through the use of a single moving gesture (e.g., a swipe gesture) detected in a predefined portion of the touch-sensitive surface of the device. However, the disclosed embodiments still preserve the traditional functionality associated with the single moving gesture (e.g., the swipe gesture) by providing one of two different responses to the gesture depending on the portion of the touch-sensitive surface that the gesture is detected on. Accordingly, the touch-sensitive surface of the device has two portions. Depending on which of the two touch-sensitive portions of the device the user gesture lies on—e.g., either entirely on the first touch-sensitive portion or entirely on the second touch-sensitive portion—the device performs one of two tasks; in response to detecting the gesture entirely on a first touch-sensitive portion, the device performs an operation in the user interface (e.g., translates a portion the first user interface displayed on the display or selects content in the user interface) corresponding to the gesture, and in response to detecting the gesture entirely on the second touch-sensitive portion, the device replaces display of the first user interface with display of a second user interface (e.g., either launches an application from the home screen user interface or switches from a first application interface to a different second application interface). As a result, the user has the improved convenience of selecting one of two tasks to be performed—e.g., either performing an operation in a current interface, or switching from a current interface to a different user interface—simply by performing a moving gesture entirely in one of two touch-sensitive portions of the device. As a result, the user does not need to make multiple sequential contacts with touch-sensitive surface in order to switch between user interfaces, but rather can transition between user interfaces simply through a single moving gesture (e.g., a swipe gesture) in a portion of the device. Moreover, the traditional functionality of the single moving gesture (e.g., a swipe gesture) is still preserved if detected in a different portion of the touch-sensitive surface.

FIGS. 11A-11P illustrate exemplary user interfaces for switching between user interfaces (e.g., switching between applications or launching an application from a home screen interface) through user interaction with a touch-sensitive portion of a multi-function device in accordance with some embodiments. The user interfaces in these figures are used to illustrate the processes described below, including the processes in FIGS. 12A-12C.

FIG. 11A illustrates a user interface (e.g., an application launch user interface, such as a home screen) with user-selectable icons (e.g., icons 424-446 for launching various applications) that are displayed on a display 20402 of a portable multi-function device 100. In some embodiments, display 20402 is a touch-sensitive display with an array of touch sensors that are responsive to touch. In some embodiments, the array of touch sensors is in a plane coincident (e.g., collocated or co-planar) with a plane that defines the display elements forming display 20402. In alternative embodiments, the array of touch sensors is in a plane different from (optionally, adjacent and parallel to) the plane of the display elements forming display 20402. In some embodiments, portable multi-function device 100 includes a touch-sensitive surface with a first portion (e.g., first touch-sensitive portion 20404-1) and a second portion (e.g., second touch-sensitive portion 20404-2). In some embodiments, as shown in FIG. 11A, first touch-sensitive portion 20404-1 is collocated with at least a portion of display 20402 and second touch-sensitive portion 20404-2 is separate from (e.g., adjacent to) display 20402. In some embodiments, first touch-sensitive portion 20404-1 and the second touch-sensitive portion 20404-2 are part of a single continuous touch-sensitive surface that is divided based on which part of the touch-sensitive surface is coincident with the display. In some embodiments, the first touch-sensitive portion 20404-1 is a touch screen module, and the second touch-sensitive portion 20404-2 is a touch-sensitive surface module that is separate from the touch screen module.

FIGS. 11A-11P illustrate detecting a gesture (including movement of a contact) entirely in either of the first touch-sensitive portion 20404-1 or the second touch-sensitive portion 20404-2 of device 100 while displaying a first user interface (e.g., the home screen or an application user interface) on the display 20402, and in response to detecting the gesture entirely on one of the two touch-sensitive portions—either entirely on the first touch-sensitive portion 20404-1 or entirely on the second touch-sensitive portion 20404-2—performing one of two distinct tasks. In response to detecting the gesture entirely on the first touch-sensitive portion 20404-1, performing an operation (e.g., translating the first user interface displayed on display 20402) corresponding to the gesture and in response to detecting the gesture entirely on the second touch-sensitive portion 20404-2, replacing display of the first user interface with display of a second user interface (e.g., either launching an application from the home screen or switching from a first application to a different second application).

As shown in FIG. 11A, a user interface (e.g., an application launch user interface, such as a home screen) is displayed on display 20402 of device 100. The user interface includes user-selectable icons (e.g., icons 424-446 for launching various applications). Contact 20413 is detected on one of the multiple user-selectable icons (e.g., Maps 436) displayed in the user interface. In response to detecting contact 20413 on the user-selectable icon for Maps 436, a first user interface (e.g., a map or navigation application) is launched, as shown in FIG. 11B.

Figure 11C:
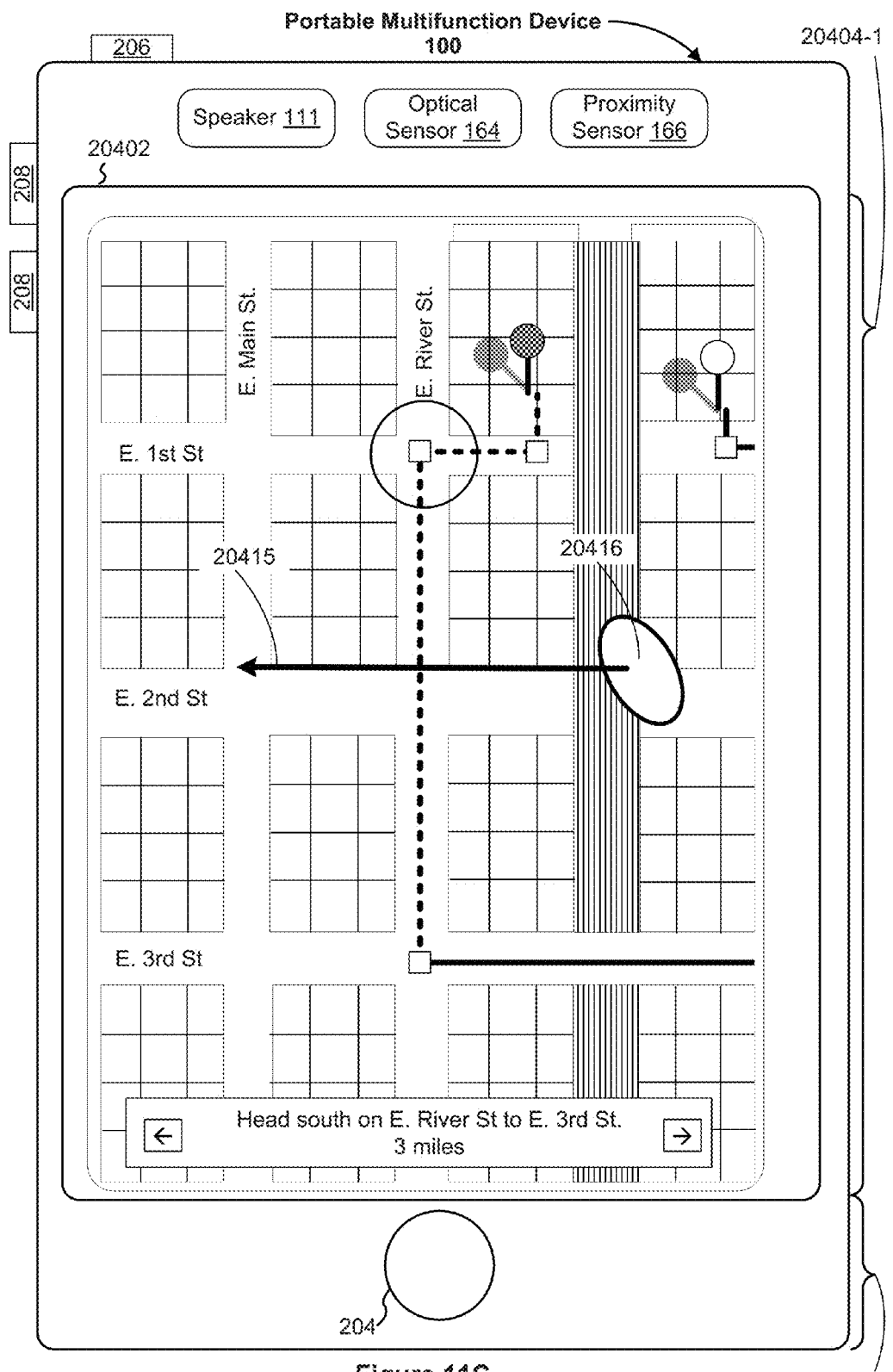
Figure 11D:
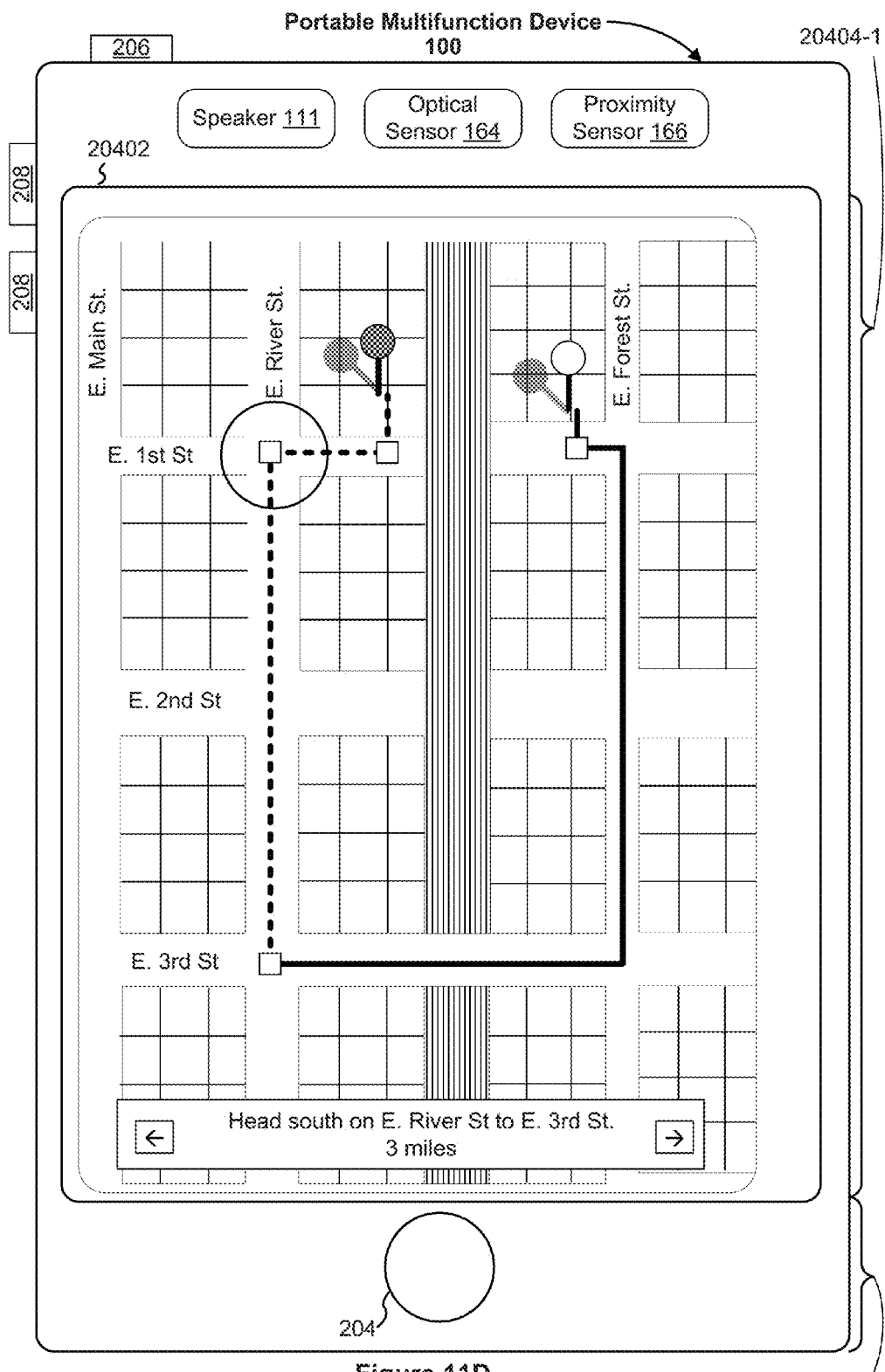

As shown in FIG. 11C, while displaying the first user interface (e.g., the map or navigation application), a gesture including movement 20415 of contact 20416 is detected entirely on first touch-sensitive portion 20404-1 of device 100. Since the gesture is detected entirely on the first touch-sensitive portion 20404-1 of device 100 (e.g., as opposed to the second touch-sensitive portion 20404-2), an operation corresponding to the gesture is performed. For example, the first user interface shown in FIG. 11C—including the map displayed on display 20402—is translated in the direction of movement of contact 20416 (e.g., from right to left with reference to the orientation of device 100 shown in FIG. 11C). As a result of performing the operation (e.g., translation of the map application user interface) corresponding to the gesture shown in FIG. 11C, additional portions of the first user interface (e.g., additional portions of the map application) are displayed as shown in FIG. 11D, which were not previously displayed in FIG. 11C.

Figure 11E:
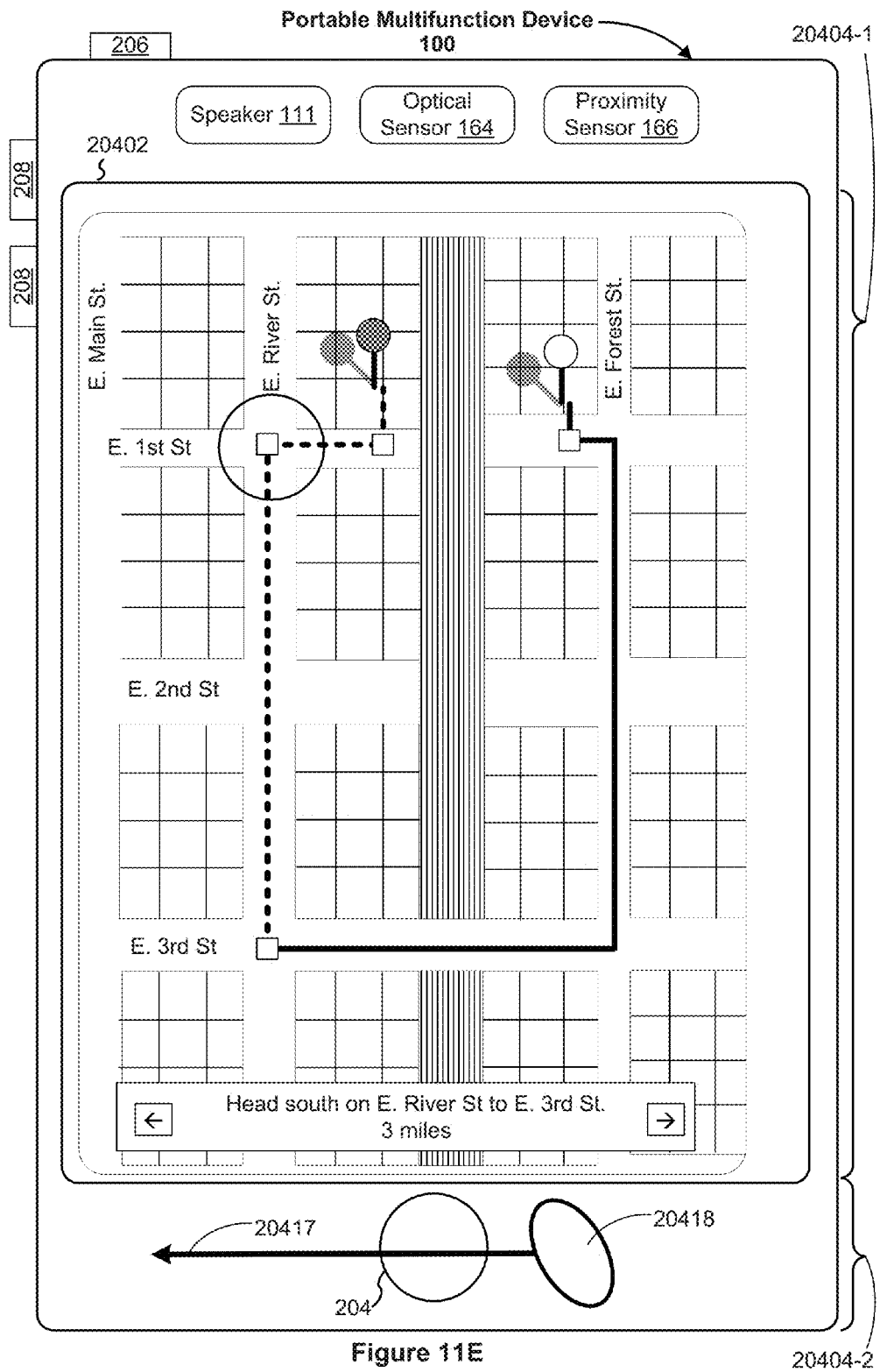

As shown in FIG. 11E, while displaying the first user interface (e.g., the map or navigation application), a gesture including movement 20417 of contact 20418 is detected entirely on second touch-sensitive portion 20404-2 of device 100. Since the gesture is detected entirely on the second touch-sensitive portion 20404-2 of device 100 (e.g., as opposed to being partially on first touch-sensitive portion 20404-1; or fully on first touch-sensitive portion 20404-1, as explained with reference to FIG. 11C), display of the first user interface (e.g., the map or navigation application) is replaced by display of a second user interface (e.g., a calculator application) as shown in FIG. 11F.

Figure 11F:
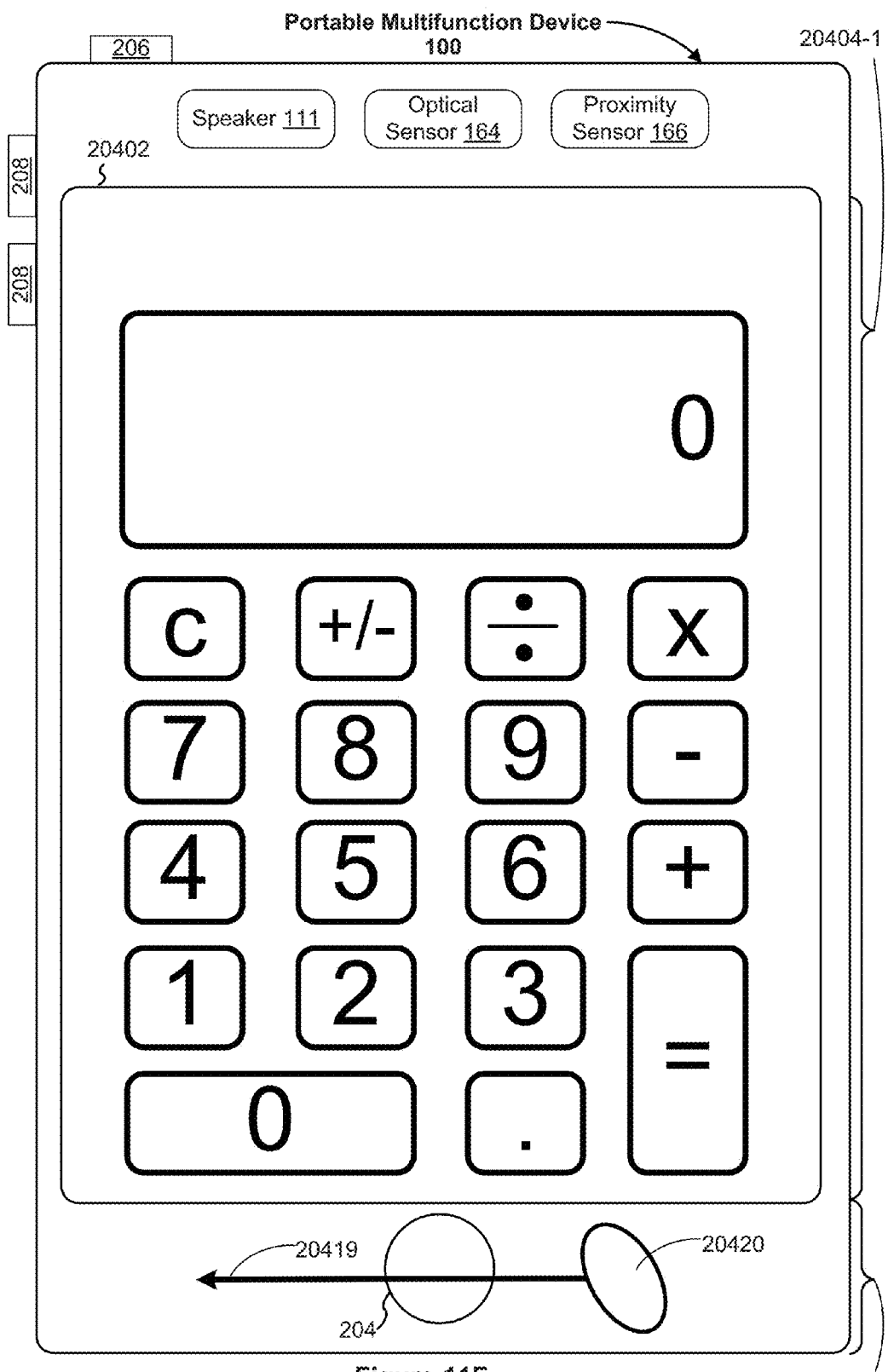

In some embodiments, if the movement of the detected contact is in a first direction (e.g., the direction of motion of contact 20418 shown in FIG. 11E from right to left with reference to the orientation of device 100 shown in FIG. 11E), the second interface displayed corresponds to a most recently used application (e.g., the calculator application, as shown in FIG. 11F).

Figure 11G:
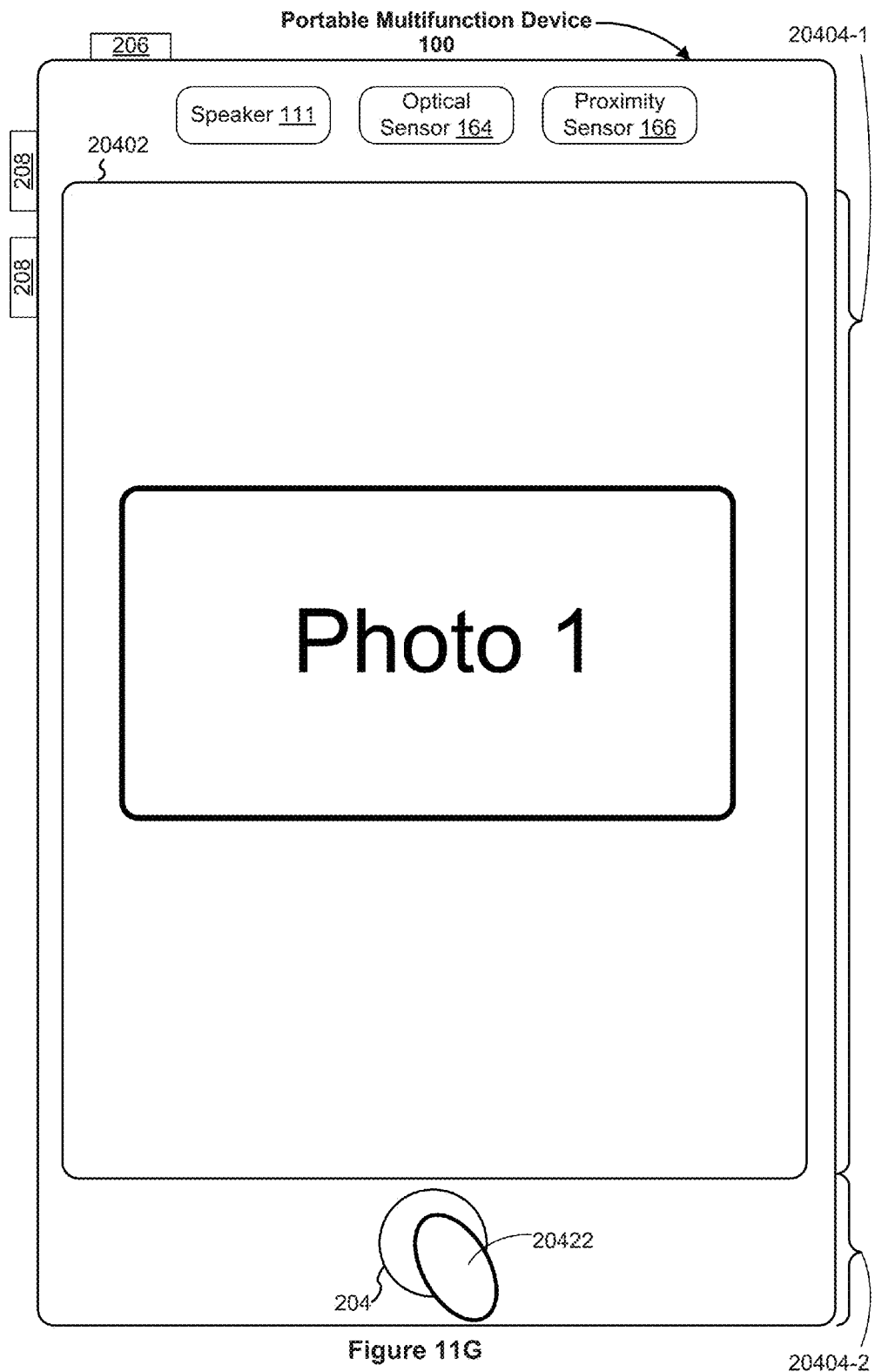

As shown in FIG. 11F, while displaying the second user interface (e.g., the calculator application), a gesture including movement 20419 of contact 20420 is detected on second touch-sensitive portion 20404-2 of device 100. Since the gesture is detected entirely on the second touch-sensitive portion 20404-2 of device 100, display of the second user interface (e.g., the calculator application) is replaced by display of a third user interface (e.g., a photo viewing application) as shown in FIG. 11G. In some embodiments, since the movement of the detected contact is in the first direction (e.g., from right to left with reference to the orientation of device 100 shown in FIG. 11F), the third interface displayed corresponds to a next-most recently used application (e.g., the photo viewing application, FIG. 11G).

Figure 11H:
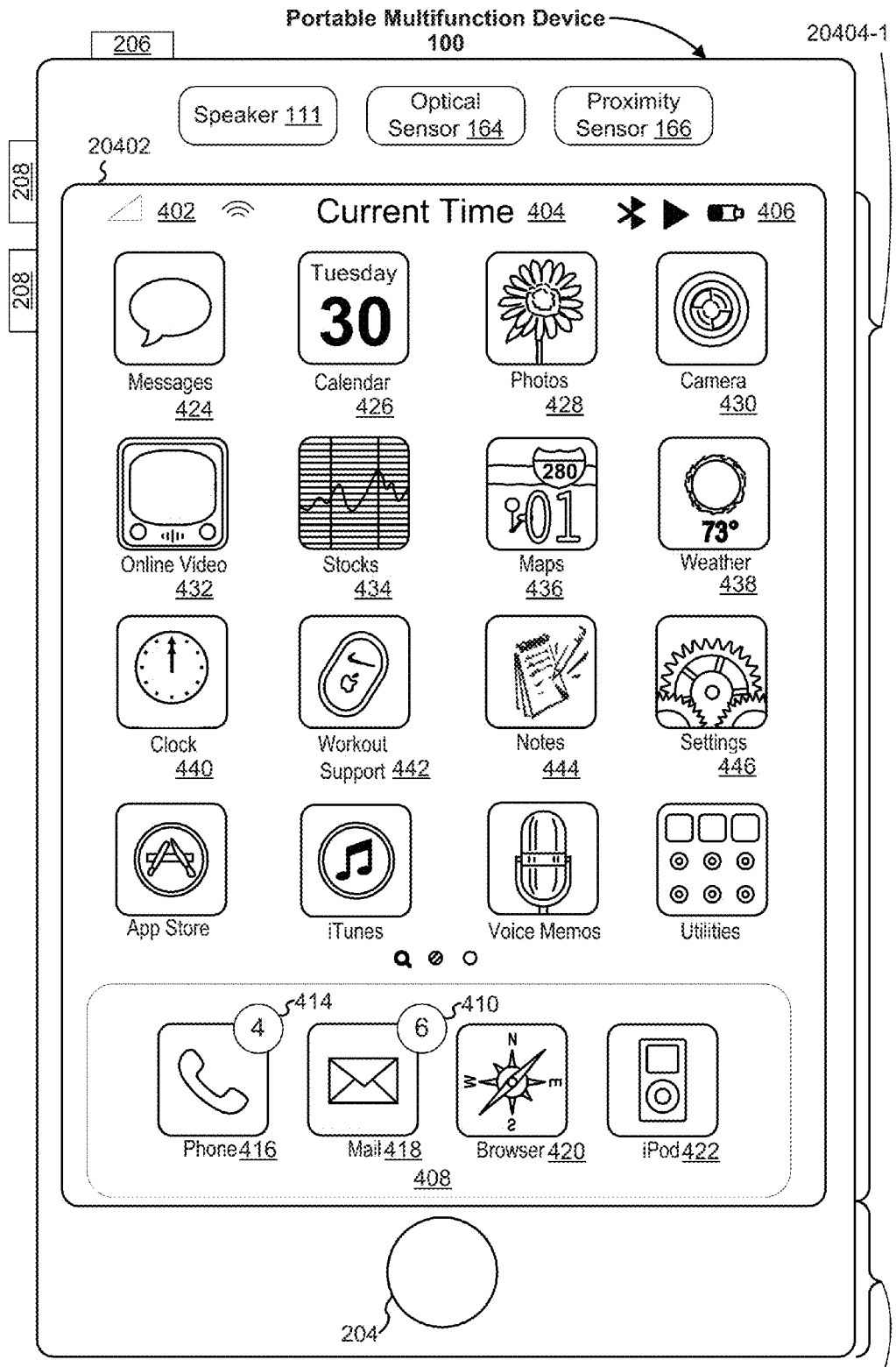

As shown in FIG. 11G-11H, upon detecting activation of the home button or menu button 204 (e.g., via a tap or press input 20422), the user interface shown previously in FIG. 11A (e.g., an application launch user interface, such as a home screen) with user-selectable icons (e.g., icons 424-446 for launching applications) is displayed on display 20402, as shown in FIG. 11H.

Figure 11I:
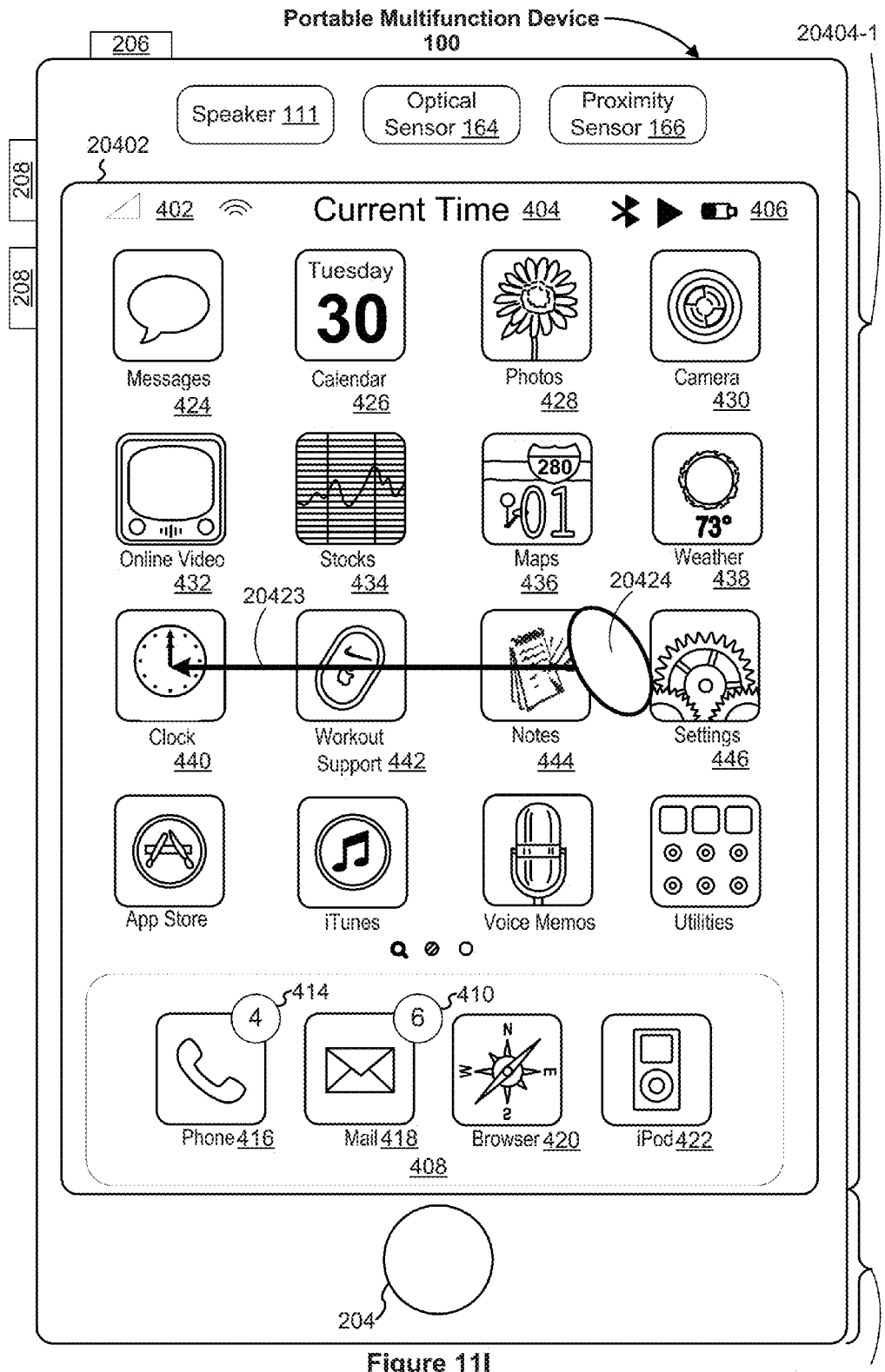
Figure 11J:
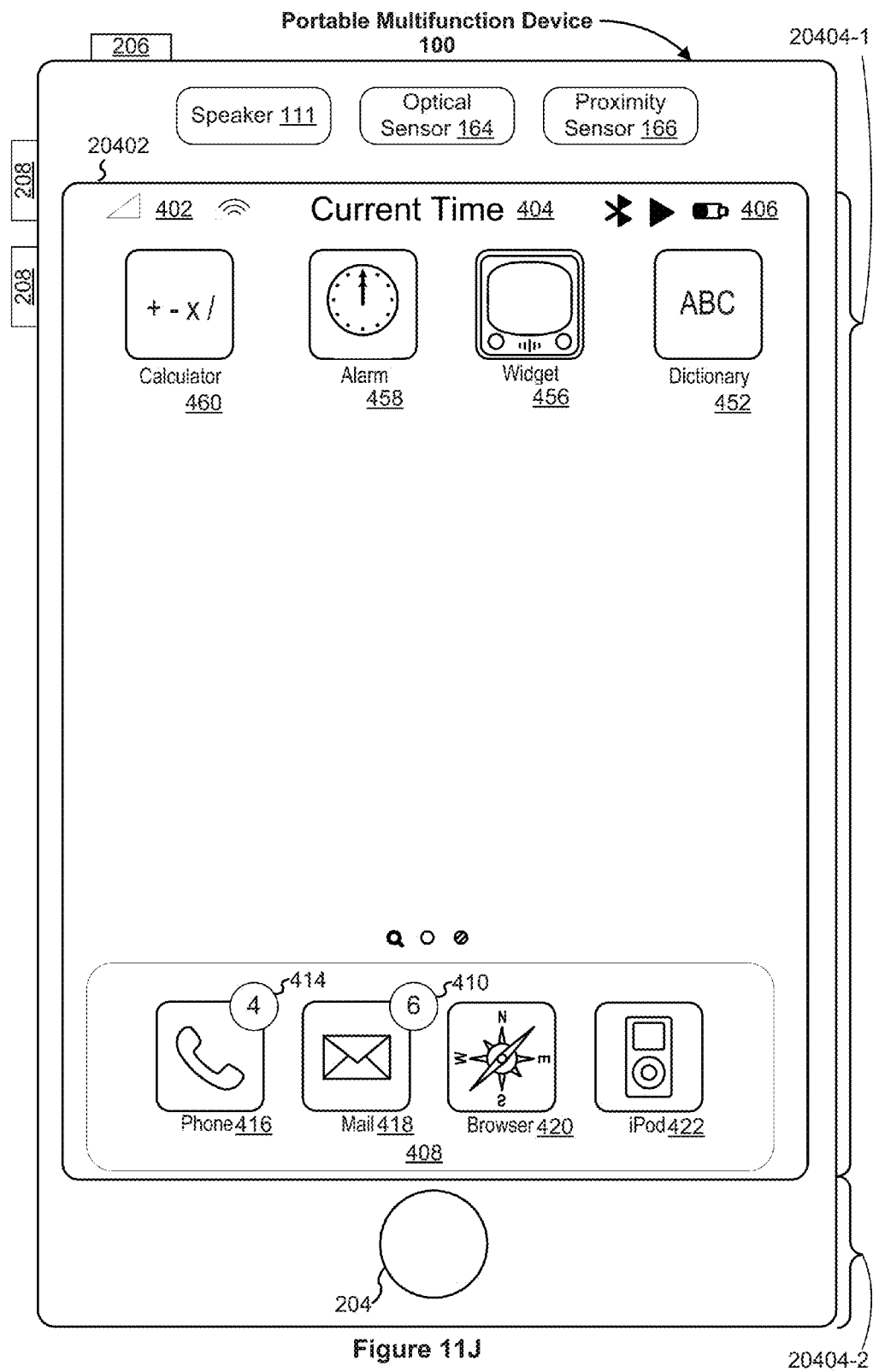

In some embodiments, as shown in FIG. 11I, while displaying the application launch user interface (e.g., the home screen), a gesture including movement 20423 of contact 20424 is detected entirely on first touch-sensitive portion 20404-1 of device 100. Since the gesture is detected entirely on first touch-sensitive portion 20404-1 of device 100 (e.g., as opposed to the second touch-sensitive portion 20404-2), an operation corresponding to the gesture is performed. For example, the application launch user interface (e.g., the home screen) shown in FIG. 11I—including the multiple user-selectable icons displayed on display 20402—is translated in the direction of movement of contact 20424 (e.g., from right to left with reference to the orientation of device 100 shown in FIG. 11I). As a result of performing the operation (e.g., translation of the application launch user interface) corresponding to the gesture shown in FIG. 11I, additional portions of the application launch user interface (e.g., additional user-selectable icons 452-460) are displayed as shown in FIG. 11J, which were not previously displayed in FIG. 11I.

Figure 11K:
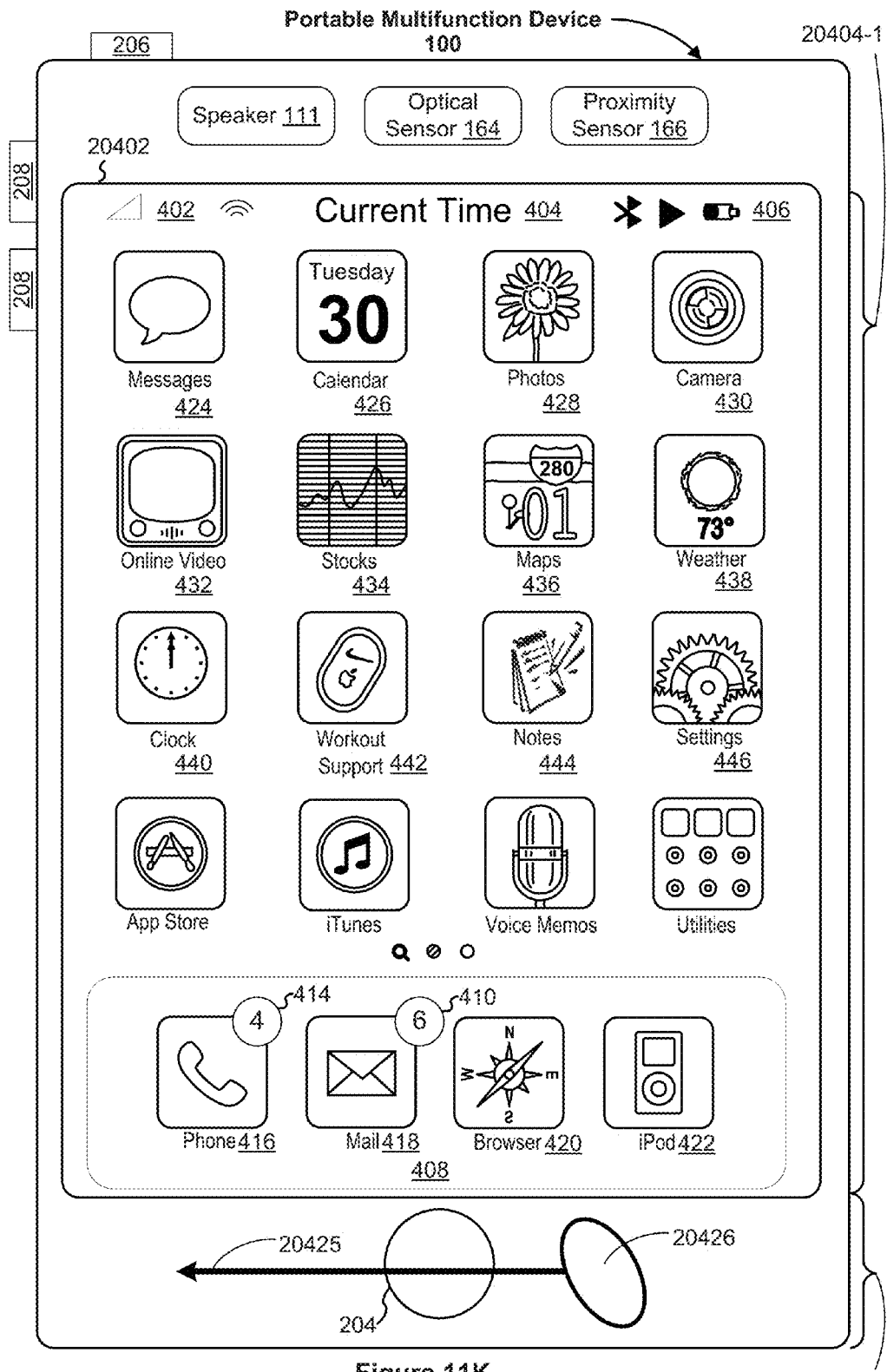

As shown in FIG. 11K, while displaying the application launch user interface (e.g., the home screen), a gesture including movement 20425 of contact 20426 is detected entirely on second touch-sensitive portion 20404-2 of device 100. Since the gesture is detected entirely on the second touch-sensitive portion 20404-2 of device 100 (e.g., as opposed to partially or fully on the first touch-sensitive portion 20404-1), display of the application launch user interface (e.g., the home screen), is replaced by display of a different user interface (e.g., the most recently used photo viewer application user interface previously used or accessed in FIG. 11G), as shown in FIG. 11L.

Figure 11L:
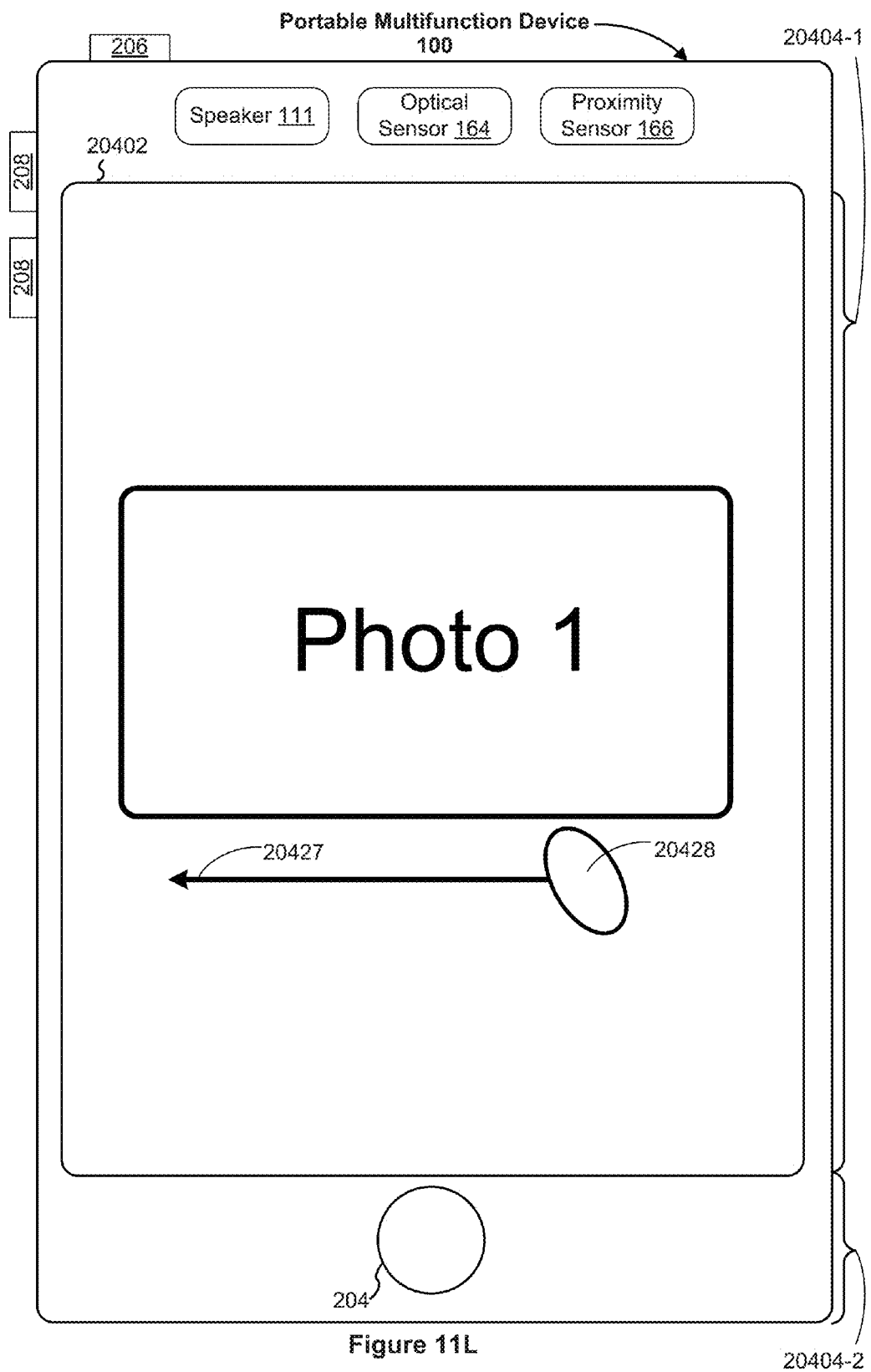

As described above with reference to FIG. 11E, in some embodiments, if the movement of the detected contact on the second touch-sensitive portion is in a first direction (e.g., the direction of motion of contact 20418 shown in FIG. 11K from right to left with reference to the orientation of device 100 shown in FIG. 11E), the second or different user interface displayed in response to the gesture corresponds to a most recently used application (e.g., the photo viewer application, FIG. 11L).

Figure 11M:
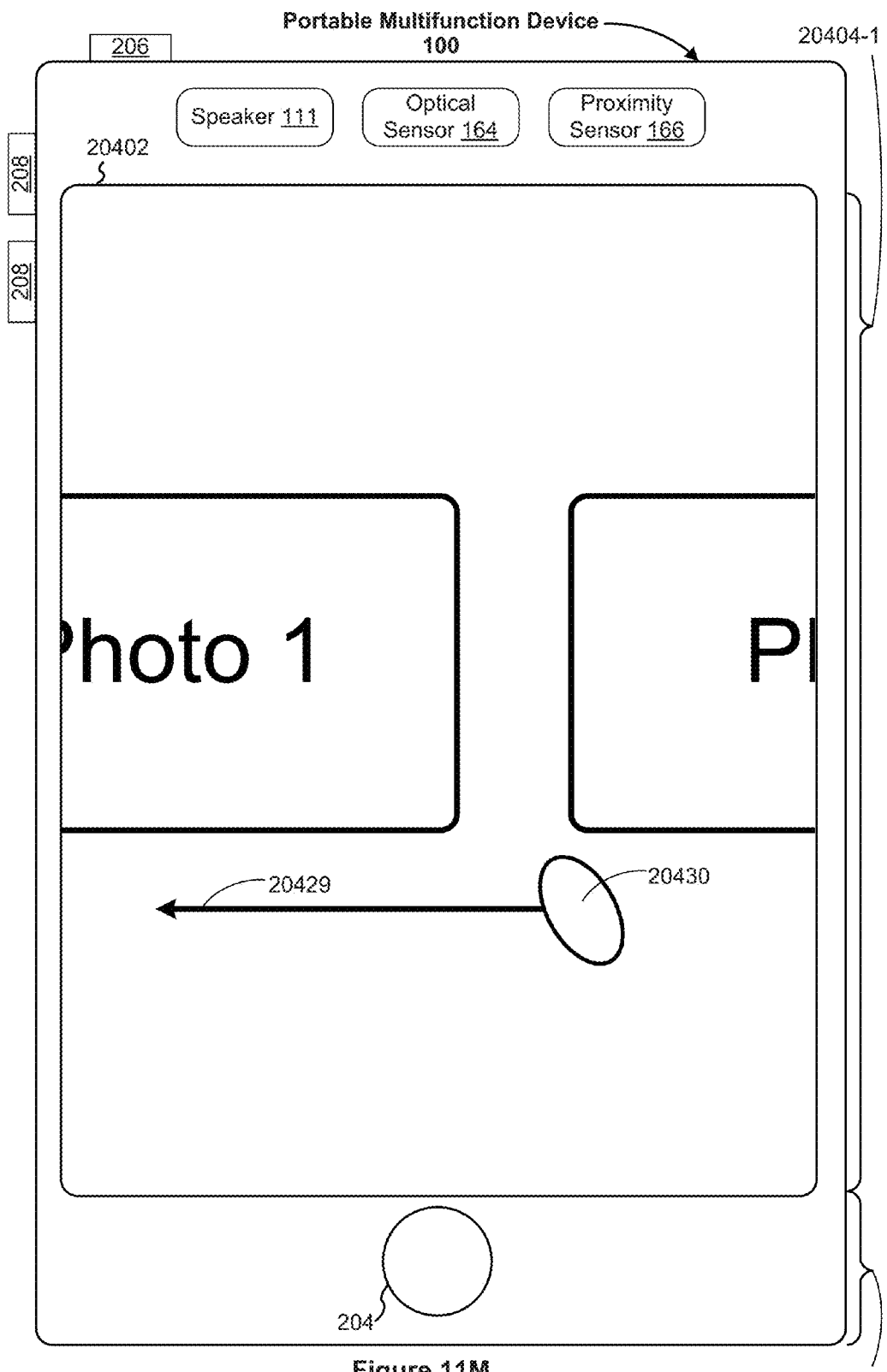
Figure 11N:
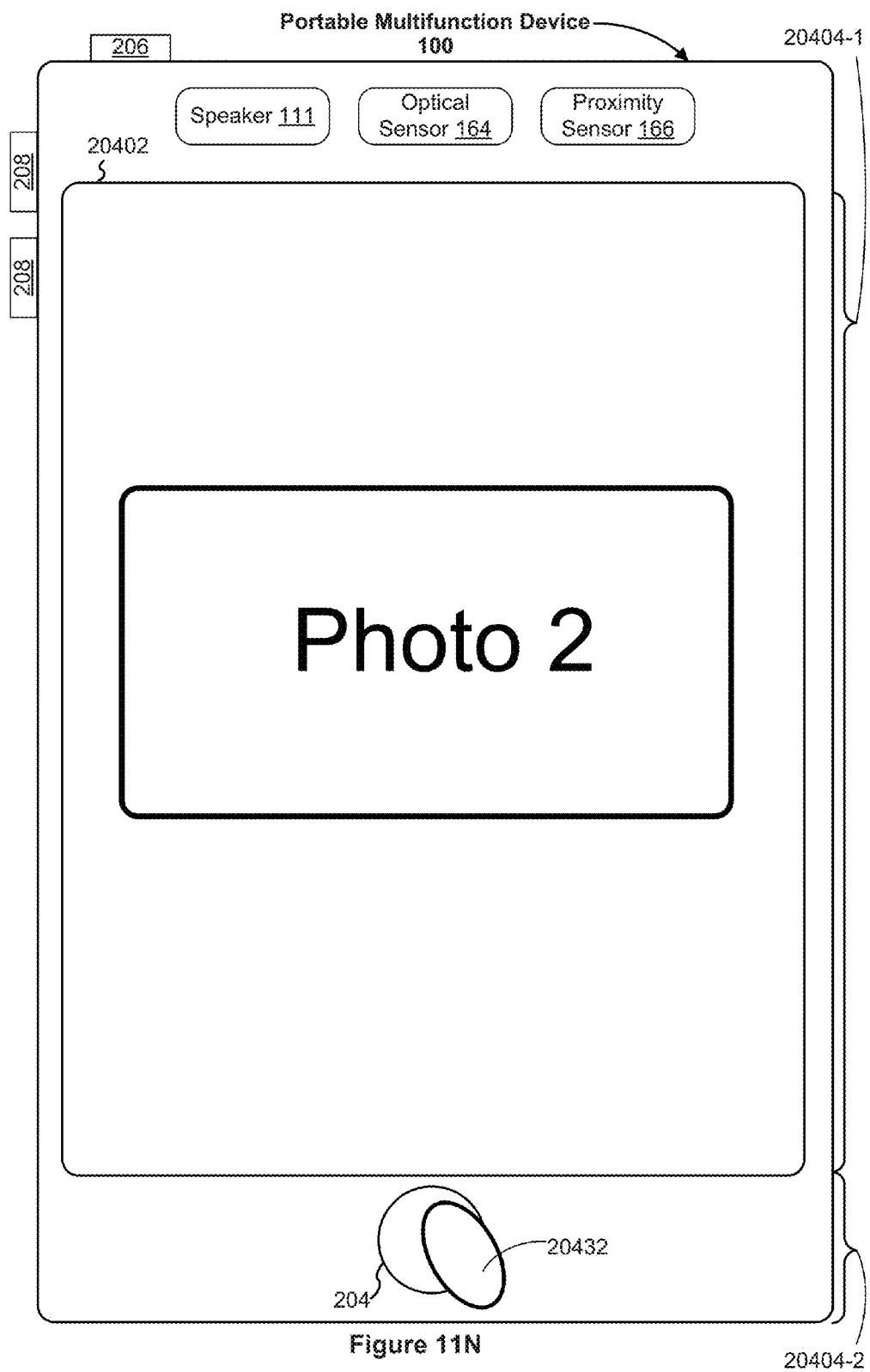

As shown in FIGS. 11L-11N, while displaying the photo viewer interface, a gesture including movement 20427 of contact 20428 and movement 20429 of contact 20430 is detected entirely on first touch-sensitive portion 20404-1 of device 100. Since the gesture is detected entirely on the first touch-sensitive portion 20404-1 of device 100 (e.g., as opposed to the second touch-sensitive portion 20404-2), an operation corresponding to the gesture is performed. For example, the photo viewer user interface shown in FIG. 11L—including 'Photo 1' displayed on display 20402—is translated in the direction of movement of contacts 20428 and 20430 (e.g., from right to left with reference to the orientation of device 100 shown in FIG. 11L). As a result of performing the operation (e.g., translation of the user interface) corresponding to the gesture shown in FIG. 11L, additional portions of the photo viewer user interface (e.g., an additional photo, such as 'Photo 2') are displayed as shown in FIGS. 11M-11N, which were not previously displayed in FIG. 11L.

Figure 11O:
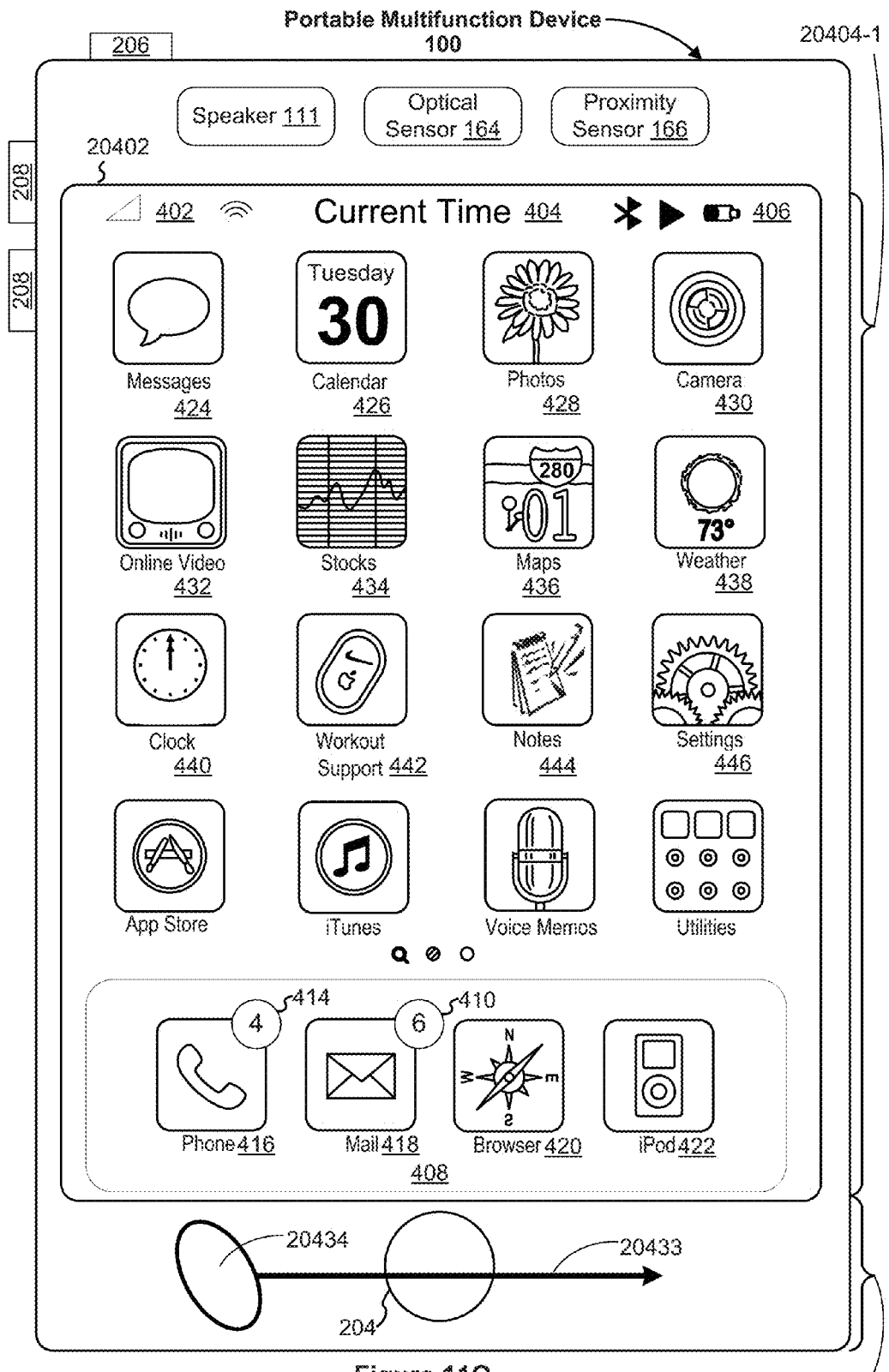

As shown in FIGS. 11N-11O, upon detecting activation of the home button or menu button 204 (e.g., via tap or press input 20432 in FIG. 11N), the user interface shown previously in FIG. 11A (e.g., an application launch user interface, such as a home screen) with user-selectable icons (e.g., icons 424-446 for launching applications) is displayed on display 20402, as shown in FIG. 11O.

As shown in FIG. 11O, while displaying the application launch user interface (e.g., the home screen), a gesture including movement 20433 of contact 20434 is detected entirely on second touch-sensitive portion 20404-2 of device 100. Since the gesture is detected entirely on the second touch-sensitive portion 20404-2 of device 100 (e.g., as opposed to partially or fully on the first touch-sensitive portion 20404-1), display of the application launch user interface (e.g., the home screen), is replaced by display of a different application user interface (e.g., a predefined camera application as shown in FIG. 11P).

In some embodiments, if the movement of the detected contact on the second touch-sensitive portion is in a second direction (e.g., the direction of motion of contact 20434 shown in FIG. 11K from left to right with reference to the orientation of device 100 shown in FIG. 11O)—for example, different from the first direction described with reference to FIG. 11K—the second or different user interface displayed in response to the gesture corresponds to a predefined application (e.g., the camera application shown in FIG. 11P in response to detecting the gesture in FIG. 11O is different from the photo viewing application shown in FIG. 11L in response to detecting the gesture in 204K).

Thus, in some embodiments, the device displays a first user interface and while displaying the first user interface, detects a gesture (including movement of a contact, such as a swipe gesture) entirely on one of two touch-sensitive portions of the device. Depending on which of the two touch-sensitive portions of the device the gesture entirely lies on—e.g., either entirely on the first touch-sensitive portion 20404-1 or entirely on the second touch-sensitive portion 20404-2—the device performs one of two response; in response to detecting the gesture entirely on the first touch-sensitive portion, the device performs an operation (e.g., translates the first user interface displayed on the display) corresponding to the gesture and in response to detecting the gesture entirely on the second touch-sensitive portion, the device replaces display of the first user interface with display of a second user interface (e.g., either launches an application from the home screen or switches from a first application to a different second application). As a result, the user has the improved convenience of selecting one of two tasks to be performed—e.g., either performing an operation in a current interface or switching from a current interface to a different interface simply by performing a moving gesture entirely in one of two touch-sensitive portions of the device.

FIGS. 12A-12C are flow diagrams illustrating a method 20500 of switching between user interfaces (e.g., switching between applications or launching applications from a home screen) through user interaction with a touch-sensitive portion of a multi-function device in accordance with some embodiments. The method 20500 is performed at an electronic device (e.g., device 300, FIG. 3, or portable multi-function device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 20500 are, optionally, combined and/or the order of some operations is, optionally, changed.

As described below, the method 20500 provides an intuitive way to switch between user interfaces (e.g., switching between applications or launching applications from a home screen) through user interaction with a touch-sensitive portion of a multi-function device. The method reduces the cognitive burden on a user when switching between user interfaces (e.g., switching between applications or launching applications from a home screen), thereby creating a more efficient human-machine interface. For battery-operated electronic devices, enabling a user to switch between or launch applications faster and more efficiently conserves power and increases the time between battery charges.

The device displays (20502) on the display, a first user interface (e.g., the map application user interface, FIG. 11C). The device detects (20504) a gesture on the touch-sensitive surface, wherein the gesture includes movement of a contact in a respective direction on the touch-sensitive surface. For example, the gestures shown in FIG. 11C (including movement 20415 of contact 20416), FIG. 11E (including movement 20417 of contact 20418), FIG. 11F (including movement 20419 of contact 20420), FIG. 11I (including movement 20423 of contact 20424), FIG. 11O (movement 20434 of contact 20433) and the like correspond to swipe gestures including movements of the respective contacts across the touch-sensitive surface of device 100.

In response to detecting (20506) the gesture: in accordance with a determination that the movement of the contact is entirely on a first portion of the touch-sensitive surface, the device performs an operation in the first user interface that corresponds to the gesture; and in accordance with a determination that the movement of the contact is entirely on a second portion of the touch-sensitive surface, replacing display of the first user interface with display of a second user interface different from the first user interface; as described with reference to operations 20508-20536. For example, as shown in FIGS. 11C-11D, in response to detecting a gesture including movement 20415 of contact 20416 entirely on first touch-sensitive portion 20404-1 of device 100, the first user interface shown in FIG. 11C—including the map displayed on display 20402—is translated in the direction of movement of contact 20416 (e.g., from right to left with reference to the orientation of device 100 shown in FIG. 11C). Furthering the example, on the other hand, as shown in FIGS. 11E-11F, in response to detecting a gesture including movement 20417 of contact 20418 entirely on second touch-sensitive portion 20404-2 of device 100, display of the first user interface (e.g., the map or navigation application) is replaced by display of a second user interface (e.g., a calculator application) as shown in FIG. 11F.

In some embodiments, the operation in the first user interface includes (20508) translating a portion of the first user interface in accordance with the gesture; for example translating a map (e.g., as explained with reference to FIGS. 11C-11D) or a webpage in one or two dimensions in accordance with movement of the contact on the touch-sensitive surface. For example, as shown in FIGS. 11C-11D, the map displayed on display 20402 is translated in the direction of movement of contact 20416 (e.g., from right to left with reference to the orientation of device 100 shown in FIG. 11C).

In some embodiments, the operation in the first user interface includes (20510) switching between pages of a multi-page user interface (e.g., pages of a book in an ebook or pdf reader application or a document editing application) in accordance with the gesture. In some embodiments, the operation in the first user interface includes (20512) moving a user interface object on a canvas in the first user interface (e.g., moving a picture or text frame in a document editing application) in accordance with the gesture. In some embodiments, the operation in the first user interface includes (20514) selecting content displayed in the first user interface (e.g., selecting text displayed in the first user interface) in accordance with the gesture.

In some embodiments, the operation in the first user interface includes (20516) initiating a content modification operation. After initiating the content modification operation, the device displays (20518) a confirmation user interface for confirming or canceling the content modification operation. For example, the device displays a dialogue requesting confirmation of a delete operation when a user swipes their finger across a representation of an email message in an email application.

In some embodiments, the first portion of the touch-sensitive surface is (20520) collocated with at least a sub-region of the display (e.g., as shown in FIG. 11A, first touch-sensitive portion 20404-1 is collocated with display 20402); and the second portion of the touch-sensitive surface is separate from the display (e.g., as shown in FIG. 11A, second touch-sensitive portion 20404-2 is separate from display 20402).

In some embodiments, the first portion of the touch-sensitive surface is (20522) a touchscreen display (e.g., as shown in FIG. 11A, first touch-sensitive portion 20404-1 is a touchscreen display 20402); and the second portion of the touch-sensitive surface is a touch-sensitive surface adjacent to the touchscreen display (e.g., second touch-sensitive portion 20404-2 is a touch-sensitive bezel of device 100 and is adjacent to touchscreen display 20402, as shown in FIG. 11A).

In some embodiments, the first user interface is part of (20524) a first application and the second user interface is not part of the first application. For example, in response to detecting a swipe gesture within the user interface of a currently displayed application, the device performs an operation within the application (for example, the device translates a map as explained with reference to FIGS. 11C-11D or switches between photos as explained with reference to FIGS. 11L-11N in response to detecting a swipe gesture entirely in first touch-sensitive portion 20404-1 of device 100). Furthering the example described above with reference to FIGS. 11C-11D, in response to detecting a swipe gesture on a chin portion of a bezel surrounding the display, the device switches from the currently displayed application to a different application (e.g., as explained with reference to FIGS. 11E-11G, the device switches from a map application to a calculator application and then to a photo viewing application in response to detecting a swipe gesture entirely on the chin portion or second touch-sensitive portion 20404-2 of device 100) or an application launch interface such as a home screen.

In some embodiments, the first user interface is (20526) a first screen of a multi-screen application launch user interface (e.g., a home screen or a desktop). In some of these embodiments, the operation in the first user interface includes displaying a second screen in the multi-screen user interface (e.g., the device transitions from a first screen of the home screen user interface shown in FIG. 11I to a second screen in the home screen shown in FIG. 11J, in response to detecting a swipe entirely in first touch-sensitive portion 20404-1 of device 100). In some of these embodiments, the second user interface is a user interface of an application launched from the multi-screen application launch user interface (e.g., the device transitions from a home screen user interface shown in FIG. 11K to a user interface of the photo viewer application shown in FIG. 11L, in response to detecting a swipe entirely in second touch-sensitive portion 20404-2 of device 100).

In some embodiments, the second user interface is (20528) an application launch user interface (e.g., a home screen or a desktop). In some embodiments, the second user interface is (20530) part of a second application and the first user interface is not part of the second application. For example, in response to detecting the gesture entirely on the second portion of the touch-sensitive surface (e.g., on second touch-sensitive portion 20404-2 of device 100), the device switches to an application that is different from a home screen or a currently displayed application (e.g., switches to the photo viewer application from the home screen interface as explained with reference to FIGS. 11K-11L above).

In some embodiments, replacing display of the first user interface with display of a second user interface different from the first user interface includes (20532) switching from a first application to a second application (e.g., switching from a map application to a calculator application, as explained with reference to FIGS. 11E-11F). In some embodiments, the device switches to a most recently used application other than the first application.

In some embodiments, replacing display of the first user interface with display of a second user interface different from the first user interface includes (20534) launching a second application associated with the gesture that was not active prior to detecting the gesture. For example, as explained with reference to FIGS. 11O-11P, the device launches a predefined application such as a camera application; or a predefined search application.

In some embodiments, for movement of the contact that is (20536) entirely on the second portion of the touch-sensitive surface: in accordance with a determination that the respective direction is a first direction, the second interface corresponds to a second application (e.g., as explained with reference to FIGS. 11K-11L, a swipe with movement 20425 to the left on the bezel or second touch-sensitive portion 20404-2 of device 100 causes the display to switch to a most recently used application—such as the photo viewer application—other than the first application); and in accordance with a determination that the respective direction is a second direction different from the first direction, the second interface corresponds to a third application different from the second application (e.g., as explained with reference to FIGS. 11O-11P, a swipe with movement 20433 to the right on the bezel or second touch-sensitive portion 20404-2 of device 100 causes the display to switch to a predefined application, such as a camera application or a search application).

It should be understood that the particular order in which the operations in FIGS. 12A-12C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments) are also applicable in an analogous manner to method 20500 described above with respect to FIGS. 12A-12C. For example, the contacts, gestures, user interface objects, applications described above with reference to method 20500 optionally have one or more of the characteristics of the contacts, gestures, user interface objects, applications described herein with reference to other methods described herein (e.g., those listed in the fifth paragraph of the Description of Embodiments). For brevity, these details are not repeated here.

Figure 13:
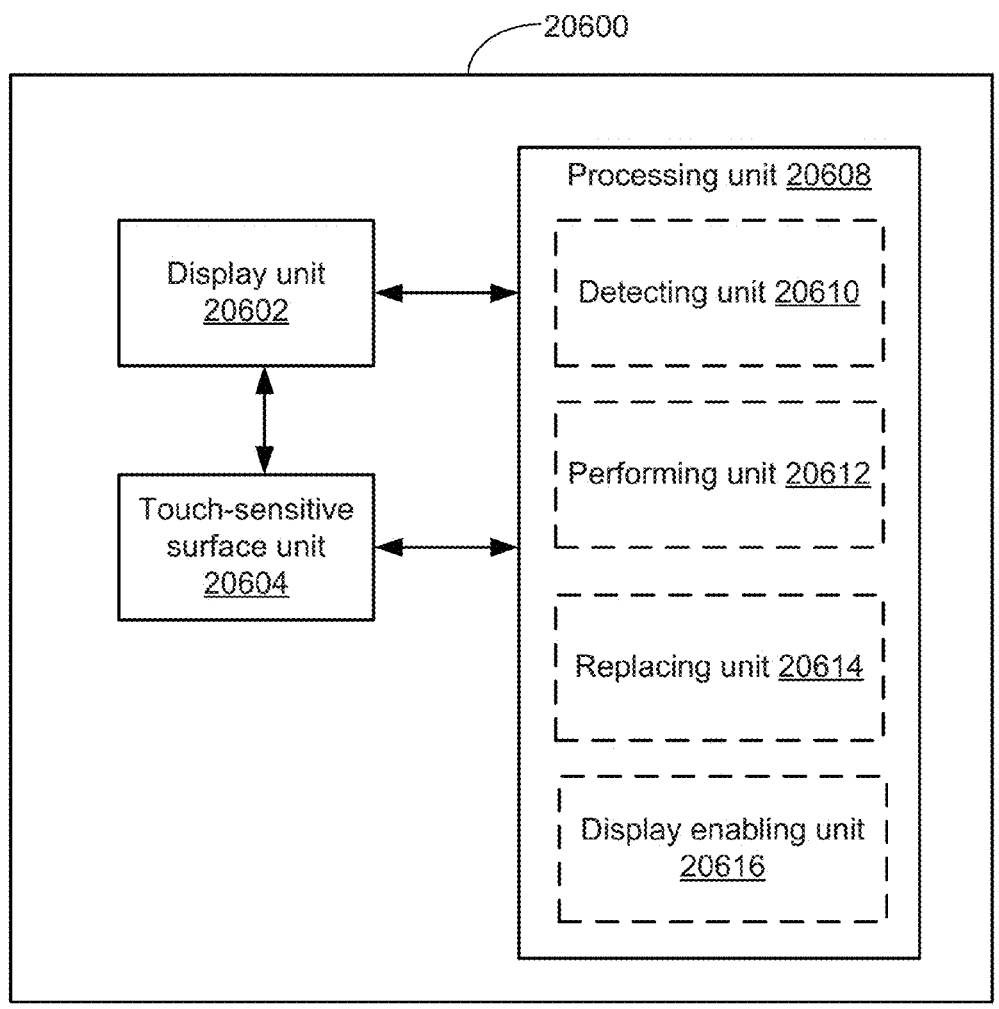
FIG. 13 is a functional block diagram of an electronic device in accordance with some embodiments.

In accordance with some embodiments, FIG. 13 shows a functional block diagram of an electronic device 20600 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein.

As shown in FIG. 13, an electronic device 20600 includes a display unit 20602 configured to display a first user interface, a touch-sensitive surface unit 20604 configured to receive a contact on the touch-sensitive surface unit, and a processing unit 20608 coupled to the display unit 20602, and the touch-sensitive surface unit 20604. In some embodiments, the processing unit 20608 includes a detecting unit 20610, a performing unit 20612, a replacing unit 20614, and a display enabling unit 20616.

The processing unit 20608 is configured to: detect a gesture on the touch-sensitive surface unit 20604, where the gesture includes movement of a contact in a respective direction on the touch-sensitive surface unit 20604 (e.g., with the detecting unit 20610); in response to detecting the gesture: in accordance with a determination that the movement of the contact is entirely on a first portion of the touch-sensitive surface unit, perform an operation in the first user interface that corresponds to the gesture (e.g., with the performing unit 20612); and in accordance with a determination that the movement of the contact is entirely on a second portion of the touch-sensitive surface unit, replace display of the first user interface with display of a second user interface different from the first user interface (e.g., with the replacing unit 20614).

In some embodiments, the first portion of the touch-sensitive surface unit 20604 is collocated with at least a sub-region of the display unit 20602; and the second portion of the touch-sensitive surface unit 20604 is separate from the display unit 20602.

In some embodiments, the first portion of the touch-sensitive surface unit 20604 is a touchscreen display unit; and the second portion of the touch-sensitive surface unit 20604 is a touch-sensitive surface adjacent to the touchscreen display unit.

In some embodiments, the first user interface is part of a first application and the second user interface is not part of the first application.

In some embodiments, the first user interface is a first screen of a multi-screen application launch user interface; the operation in the first user interface includes displaying a second screen in the multi-screen user interface; and the second user interface is a user interface of an application launched from the multi-screen application launch user interface.

In some embodiments, the second user interface is an application launch user interface.

In some embodiments, the second user interface is part of a second application and the first user interface is not part of the second application.

In some embodiments, replacing display of the first user interface with display of a second user interface different from the first user interface includes switching from a first application to a second application.

In some embodiments, replacing display of the first user interface with display of a second user interface different from the first user interface includes launching a second application associated with the gesture that was not active prior to detecting the gesture.

In some embodiments, for movement of the contact that is entirely on the second portion of the touch-sensitive surface unit 20604: in accordance with a determination that the respective direction is a first direction, the second interface corresponds to a second application; and in accordance with a determination that the respective direction is a second direction different from the first direction, the second interface corresponds to a third application different from the second application.

In some embodiments, the operation in the first user interface includes translating a portion of the first user interface in accordance with the gesture.

In some embodiments, the operation in the first user interface includes switching between pages of a multi-page user interface in accordance with the gesture.

In some embodiments, the operation in the first user interface includes moving a user interface object on a canvas in the first user interface in accordance with the gesture.

In some embodiments, the operation in the first user interface includes selecting content displayed in the first user interface in accordance with the gesture.

In some embodiments, the operation in the first user interface includes initiating a content modification operation; and the processing unit 20608 is configured to, after initiating the content modification operation, enable display of a confirmation user interface for confirming or canceling the content modification operation (e.g., with the display enabling unit 20616).

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 12A-12C are, optionally, implemented by components depicted in FIGS. 1A-1B or FIG. 13. For example, display operation 20502, detection operation 20504, performing or replacing operation 20506, and replacing operation 20532 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Undoing a Previously Performed
Content-Modification Operation

Many electronic devices have graphical user interfaces that allow users to enter and modify content (e.g., interfaces with modifiable text in an email composition window, notepad, word document and the like). Such interfaces provide users with the capability to perform content-modification operations (e.g., operations for entering content, such as words, into the user interface; and operations for subsequently modifying the entered content—for example, deleting a previously entered word by undoing a previous operation, or redisplaying a previously deleted word by redoing a previously performed operation). Some content modification approaches, such as keyboard shortcuts for undoing and redoing content-modification operations, are cumbersome and require the user to make multiple concurrent contacts with the keyboard (e.g., the concurrent use of the 'Ctrl' key and the 'Z' key on the keyboard for undoing a previously performed content-modification operation; or the concurrent use of the 'Ctrl' key and the 'Y' key on the keyboard for redoing a previously performed content-modification operation), thereby placing undue cognitive burden on the user.

The disclosed embodiments provide a convenient method of manipulating modifiable content (e.g., enabling easy undoing and/or redoing of previously performed content-modification operations) through a single moving gesture detected in a predefined area of the touch-sensitive surface of a device. For example, the device allows the user to undo a previously performed content-modification operation by performing a right to left swipe gesture in a predefined touch-sensitive portion of the device; and the device allows the user to redo a previously performed (and subsequently canceled or undone) content-modification operation by performing a left to right swipe gesture in the predefined touch-sensitive portion of the device. As a result, the user does not need to make multiple concurrent contacts with the keyboard to manipulate text, but rather can modify preexisting content through a single moving gesture in a predefined touch-sensitive portion of the device.

FIGS. 14A-14K illustrate exemplary user interfaces for undoing a previously performed content-modification operation in accordance with some embodiments. The user interfaces in these figures are used to illustrate the processes described below, including the processes in FIGS. 15A-15C.

Figure 14A:
FIGS. 14A-14K illustrate exemplary user interfaces for undoing a previously performed content-modification operation in accordance with some embodiments.
Figure 15A:
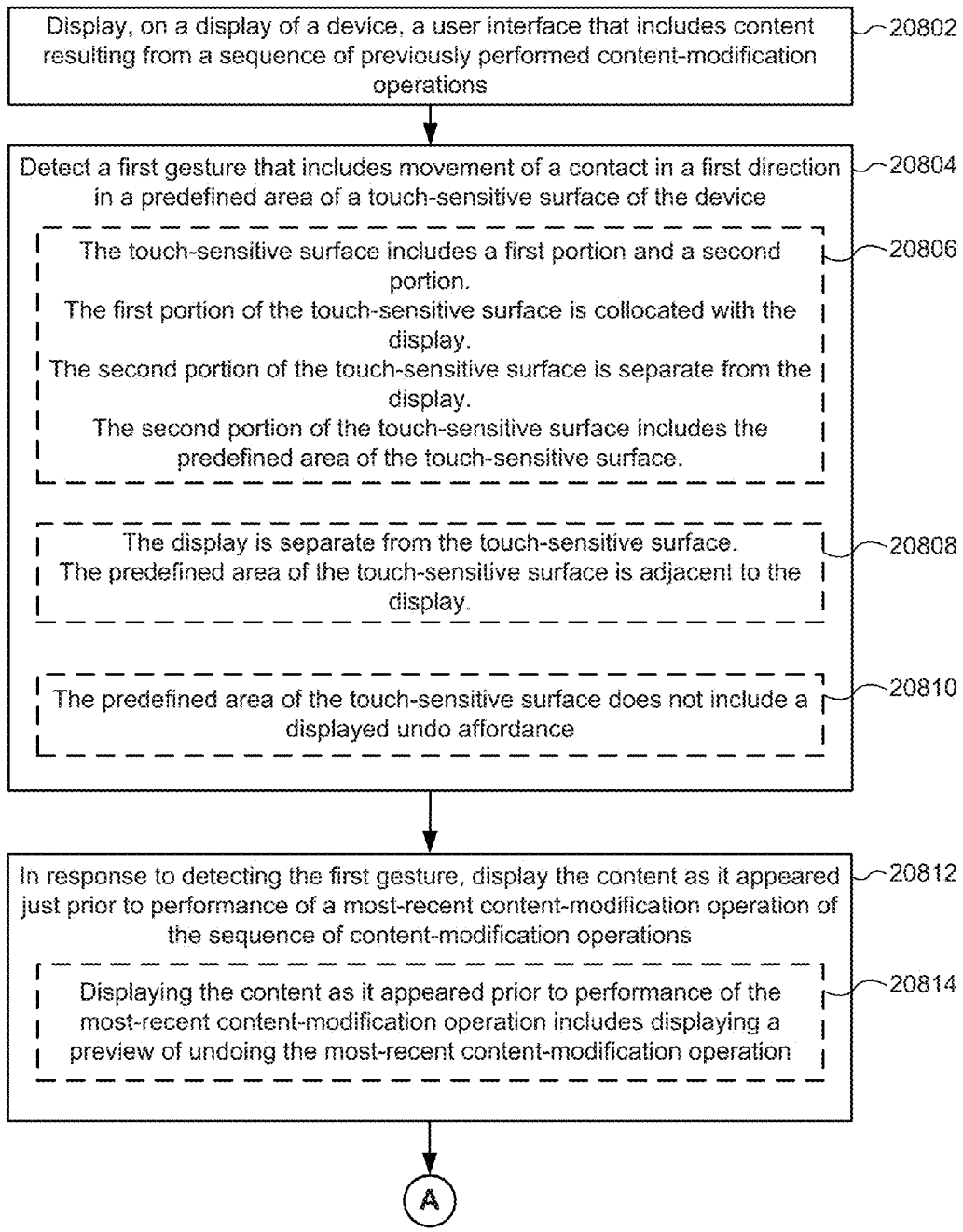
FIGS. 15A-15C are flow diagrams illustrating a method of undoing a previously performed content-modification operation in accordance with some embodiments.
Figure 15B:
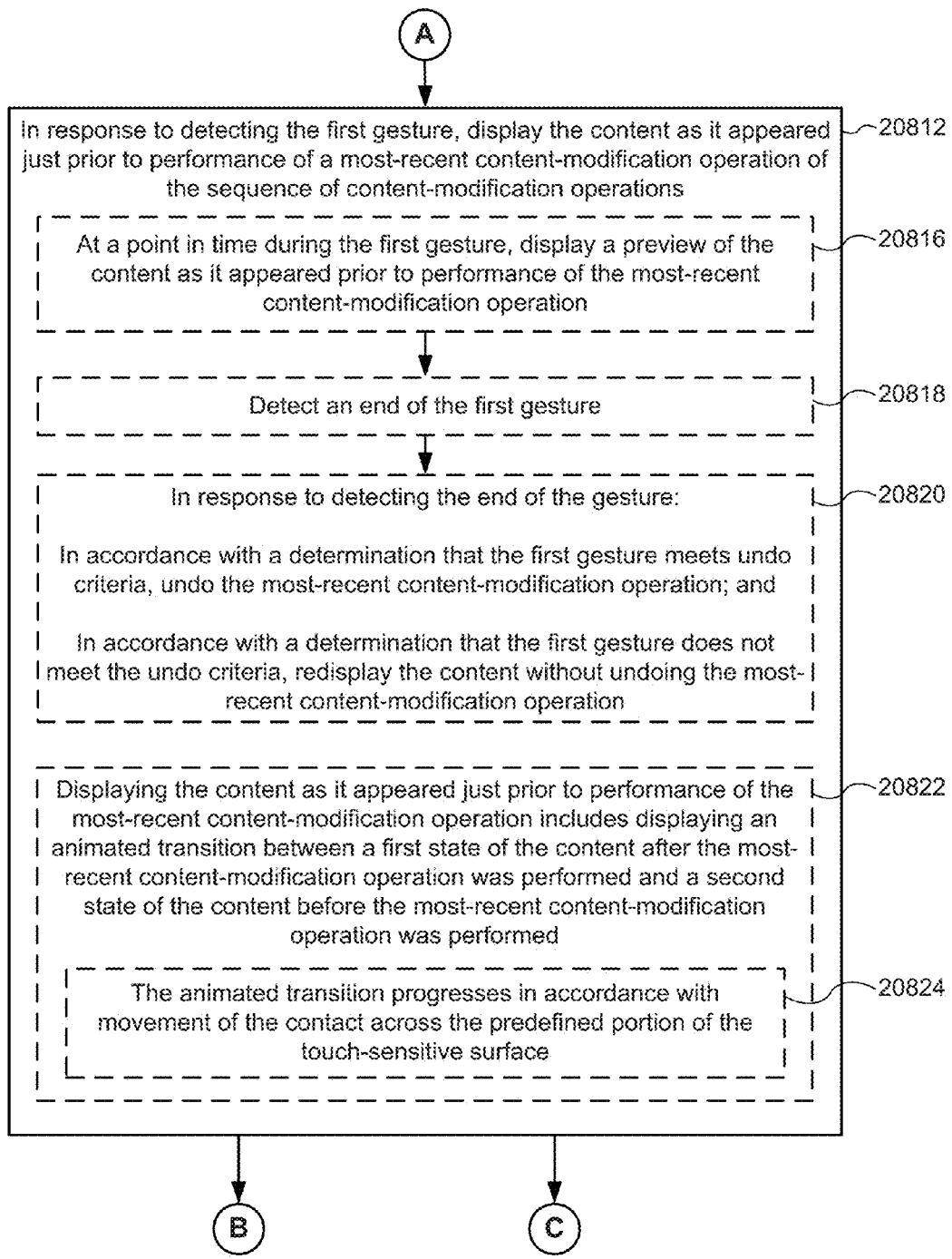
Figure 15C:
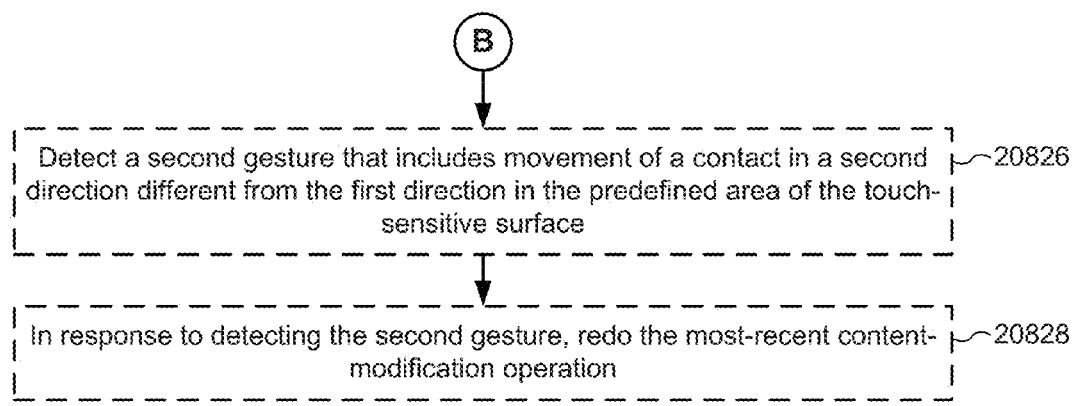
Figure 15C:
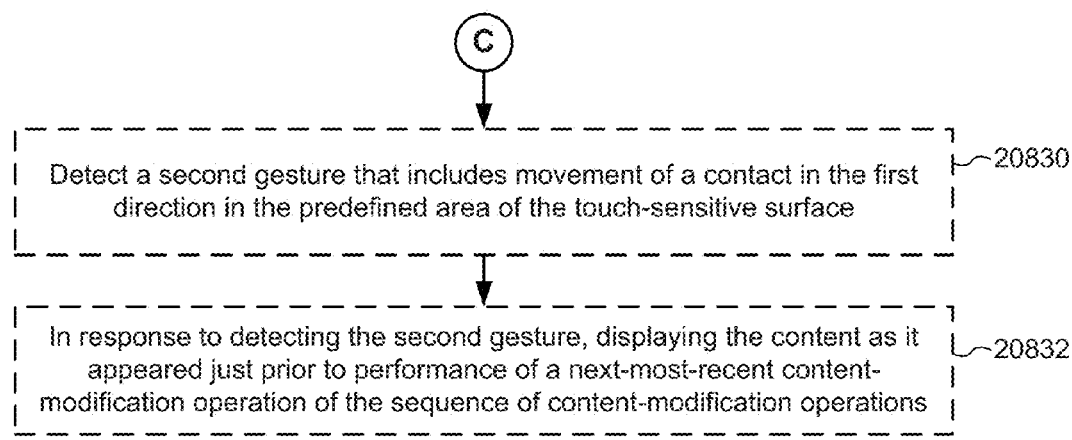

FIG. 14A illustrates a user interface (e.g., an email interface) with modifiable content (e.g., content 20706—the body of an email message being composed) that is displayed on a display 20702 of a device 100. In some embodiments, display 20702 is a touch-sensitive display with an array of touch sensors that are responsive to touch. In some embodiments, the array of touch sensors lies in a plane coincident (e.g., collocated or co-planar) with a plane that defines the display elements forming display 20702. In alternative embodiments, the array of touch sensors is configured to lie in a plane different from the plane of the display elements forming display 20702. In some embodiments, device 100 includes a touch-sensitive surface with a first portion (e.g., first touch-sensitive portion 20704-1) and a second portion (e.g., second touch-sensitive portion 20704-2). In some embodiments, as shown in FIG. 14A, first touch-sensitive portion 20704-1 is collocated with display 20702 and second touch-sensitive portion 20704-2 is separate from display 20702. In some embodiments, first touch-sensitive portion 20704-1 and the second touch-sensitive portion 20704-2 are part of a single continuous touch-sensitive surface that is divided based on which part of the touch-sensitive surface is coincident with the display. In some embodiments, the first touch-sensitive portion 20704-1 is a touch screen module, and the second touch-sensitive portion 20704-2 is a touch-sensitive surface module that is separate from the touch screen module.

FIGS. 14A-14E illustrate performing an undo operation (e.g., displaying content as it appeared just prior to performing a most-recent content-modification operation) in response to a first gesture (e.g., a gesture that includes a movement of a contact in a first direction, such as a left to right swipe gesture) detected in the predefined area of the touch-sensitive surface (e.g., a predefined area in second portion 20704-2, FIG. 14A of the touch-sensitive surface).

Shown in FIG. 14A is a user interface (e.g., an email interface) with modifiable content 20706. Content 20706 shown in FIG. 14A is displayed on display 20702 and includes the body of an email message being composed by a user as a result of a sequence of words (e.g., 'Good,' to,"hear," from, "you," and 'again!') entered sequentially, for example by the user (e.g., using a virtual keypad or keyboard 20708 or, optionally, using a physical keyboard in place of virtual keyboard 20708), through a sequence of content-modification operations performed on the device. In this example, the most-recent content modification operation is the entering of the word 'again!' and the next-most recent content-modification operation is the entering of the word 'you.'

Figure 14B:

As shown in FIG. 14B, a first gesture that includes contact 20720 is detected on the touch-sensitive surface (e.g., in a predefined area on the second touch-sensitive portion 20704-2) of device 100. As shown in FIG. 14B, contact 20720 moves (20730-a) in a first direction (e.g., from right to left with reference to the orientation of device 100 shown in FIG. 14B) to a position of contact 20720 shown in FIG. 14C. As shown in FIG. 14D, contact 20720 further moves (20730-b) in the first direction to a position of contact 20720 shown in FIG. 14D. Subsequently, the movement (20730-c, FIG. 14E) of contact 20720 continues in the first direction, and an end of the gesture is detected (e.g., contact 20720 is lifted off of the touch-sensitive portion 20704-2 of device 100 in FIG. 14E).

In response to the first gesture as described above (e.g., including movements 20730-a, 20730-b, and 20730-c and optional lift-off of contact 20720; FIGS. 14B-14E), device 100 undoes the most-recent content modification operation (e.g., the device deletes the last word 'again!' entered on the device) to display content 20706 as it appeared just prior to the most-recent content modification operation (e.g., just prior to entering of the word 'again!').

Figure 14C:
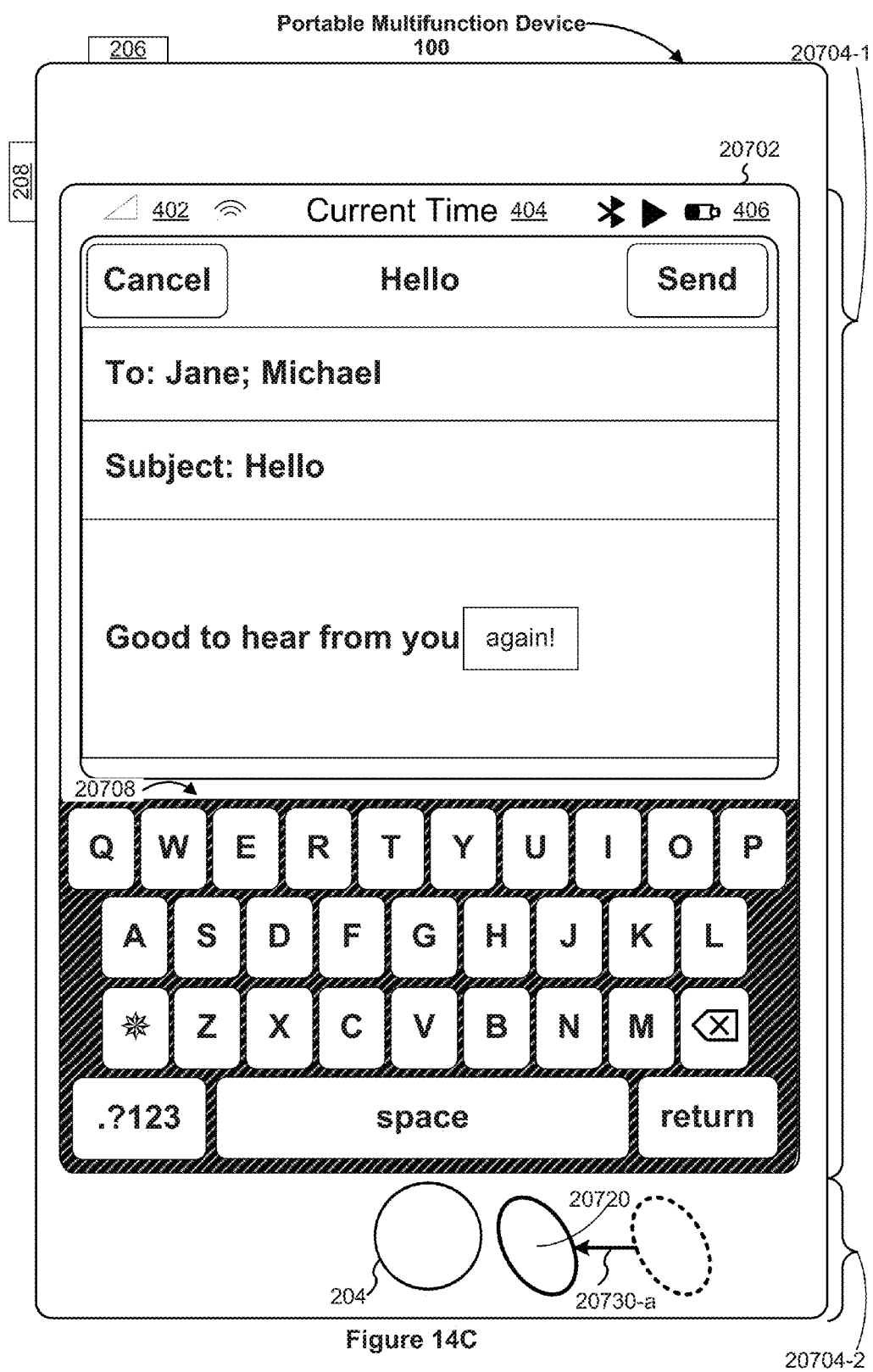
Figure 14D:
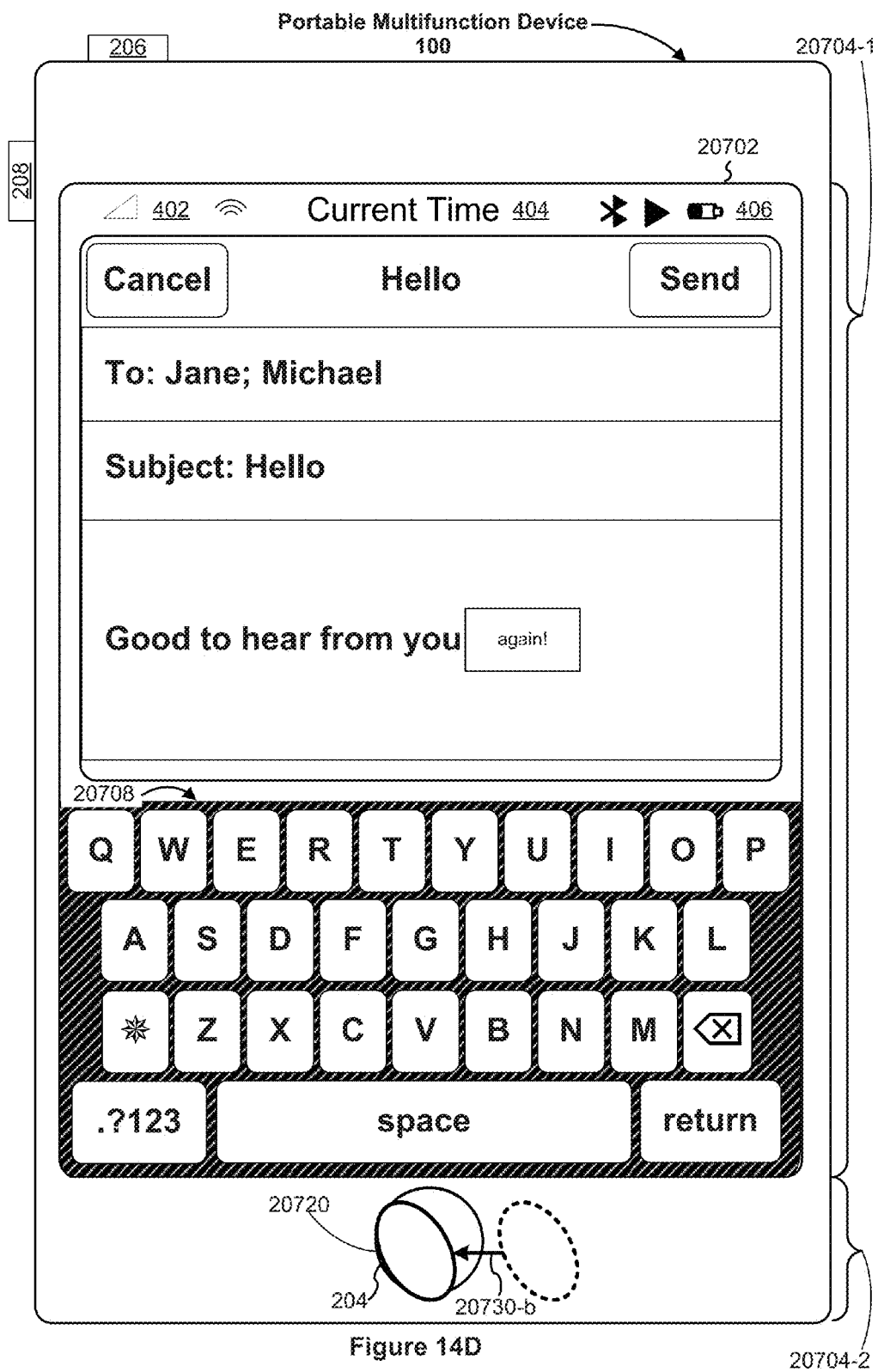

Optionally, as shown in FIGS. 14B-14D, device 100 displays an animated transition (e.g., gradual reduction of the font size of the word 'again!' from the large font size shown in FIG. 14B to the small font size shown in FIG. 14D) from a first state of content 20706 after the most-recent operation (e.g., operation corresponding to the entering of the word 'again!') was performed toward a second state of content 20706 just before the most-recent operation was performed, based on the extent of movement (e.g., the word "again!" is gradually reduced in size and/or faded out as contact 20720 moves 20730 across touch-sensitive portion 20704-2, as shown in FIGS. 14B-14D).

Thus, in some embodiments, the device displays content resulting from a sequence of content-modification operations (e.g., a sequence of words being sequentially entered to the device by a user typing on a keyboard). Subsequently, upon detecting a first gesture (e.g., including movement of a contact in a first direction) in a predefined area of a touch-sensitive portion of the device, the device displays content as it appeared just prior to a most-recent content-modification operation (e.g., the device undoes the most-recent content-modification operation by deleting the most recently entered word). As a result, the user has the improved convenience of undoing a previously performed operation by simply moving a finger contact (e.g., by performing a right to left swipe gesture) across a predefined touch-sensitive portion of the device.

Figure 14E:
Figure 14F:
Figure 14G:
Figure 14H:

FIGS. 14F-14H illustrate performing a redo operation (e.g., redoing the most-recent content-modification operation) in response to a second gesture (e.g., a gesture that includes a movement of a contact in a second direction) detected in the predefined area of the touch-sensitive surface.

Continuing the example described above with reference to FIGS. 14A-14E, after the device undoes the most recent content-modification operation to delete the word 'again!' (e.g., to display content 20706 as it appeared just prior to entering of the word 'again!' as shown in FIG. 14E), a second gesture that includes contact 20722 (FIG. 14F) is detected on the touch-sensitive surface (e.g., in the predefined area on the second touch-sensitive portion 20704-2) of the device 100. As shown in FIG. 14F, contact 20722 moves 20732 in a second direction (e.g., from left to right with reference to the orientation of device 100 shown in FIG. 14F; optionally opposite or substantially opposite to the first direction described with reference to FIGS. 14B-14D) through a position of contact 20722 (e.g., after movement 20732-a) shown in FIG. 14G to a position of contact 20722 (e.g., after movement 20732-b) shown in FIG. 14H. Subsequently, contact 20722 is optionally lifted off (e.g., no longer detected on) the touch-sensitive portion 20704-2 of device 100 in FIG. 14H.

In response to the second gesture as described above (e.g., including movement 20732, and optional lift-off of contact 20722; FIGS. 14F-14H), device 100 redoes the most-recent content modification operation (e.g., the device redisplays the last word 'again!' entered on the device, that was deleted previously in response to detecting the first gesture as described with reference to FIGS. 14B-14E above). Thus, in some embodiments, the device displays content resulting from a sequence of content-modification operations (e.g., a sequence of words being entered to the device). After performing a first undo operation in response to a first gesture (e.g., as described with reference to FIGS. 14A-14E above), the device detects a second gesture (e.g., including movement of a contact in a second direction) in a predefined area of a touch-sensitive portion of the device (e.g., portion 20704-2). Upon detecting the second gesture, the device displays content as it appeared just prior to performing the first undo operation (e.g., the device redoes the most-recent content-modification operation by redisplaying the most recently entered word as described above with reference to FIGS. 14F-14H). As a result, the user has the improved convenience of redoing a previously canceled or undone operation by simply moving a finger contact (e.g., by performing a left to right swipe gesture) across a predefined touch-sensitive portion of the device.

Figure 14I:
Figure 14J:
Figure 14K:
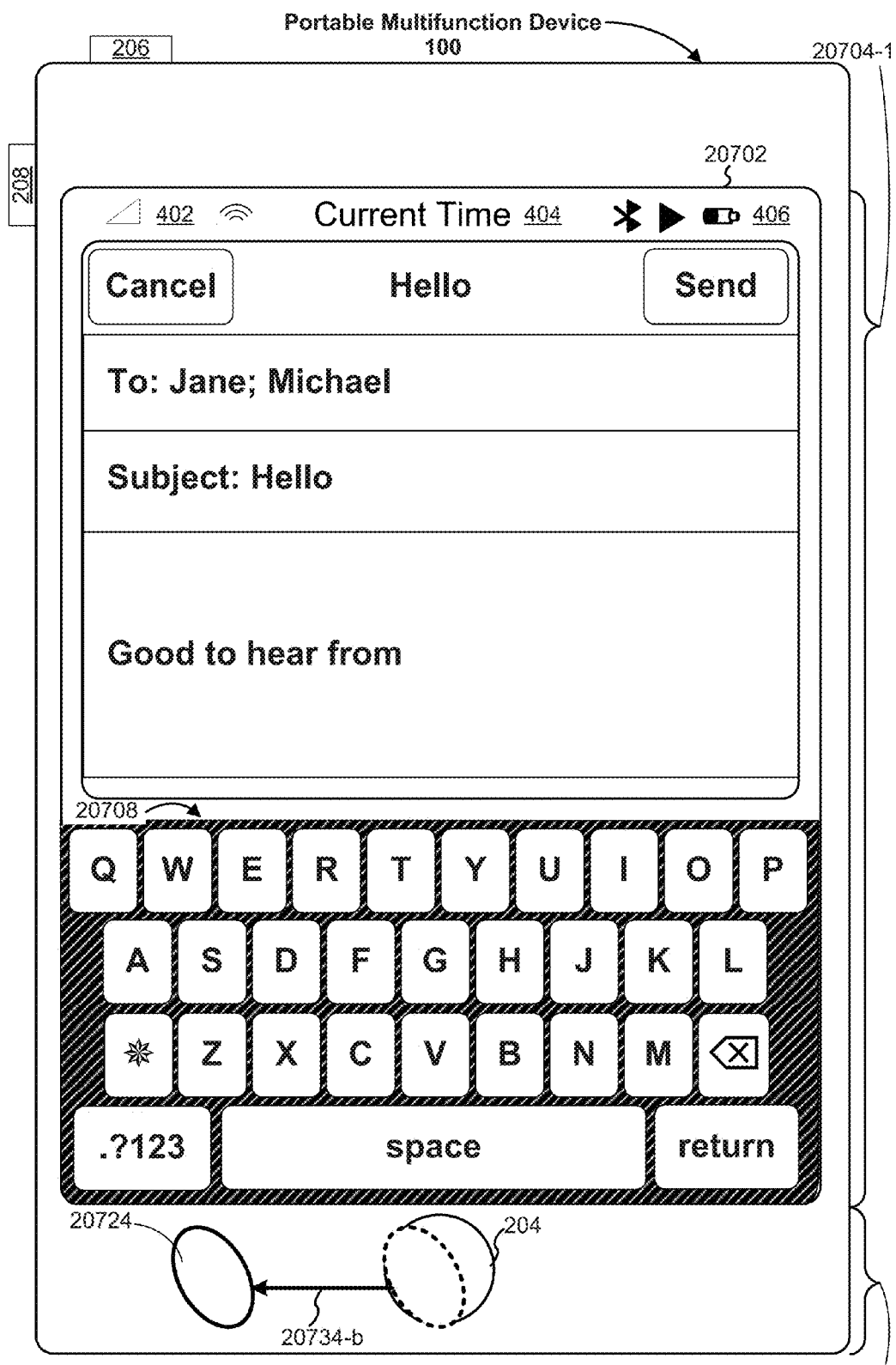

FIGS. 14I-14K illustrate performing a second consecutive undo operation (e.g., displaying the content as it appeared just prior to performance of a next-most-recent content-modification operation) in response to a second gesture (e.g., a gesture that includes a movement of a contact in the first direction) detected in the predefined area of the touch-sensitive surface. Continuing the example described above with reference to FIGS. 14A-14E, after the device undoes the most recent content-modification operation to delete the word 'again!' (e.g., to display content 20706 as it appeared prior to the entering of the word 'again!' as shown in FIG. 14E), a second gesture that includes contact 20724 (FIG. 14I) is detected on the touch-sensitive surface (e.g., in the predefined area on the second touch-sensitive portion 20704-2) of the device 100. As shown in FIG. 14I, contact 20724 moves 20734 in the first direction (e.g., from right to left with reference to the orientation of device 100 shown in FIG. 14I; for example, the same direction described previously with reference to FIGS. 14B-14E above) through a position of contact 20724 (e.g., after movement 20734-*a*) shown in FIG. 14J to a position of contact 20724 (e.g., after movement 20734-*b*) shown in FIG. 14K. Subsequently, contact 20724 is optionally lifted off (e.g., no longer detected on) the touch-sensitive portion 20704-2 of device 100 in FIG. 14K.

In response to the second gesture described with reference to FIGS. 14I-14K (e.g., including movement 20734, and optional lift-off of contact 20724; FIGS. 14I-14K), device 100 undoes the next-most-recent content modification operation (e.g., the device deletes the next-to-last word 'you' entered on the device) to display content 20706 as it appeared just prior to the next-most-recent content modification operation. Thus, in some embodiments, the device displays content resulting from a sequence of content-modification operations (e.g., a sequence of words being entered to the device). After performing a first undo operation in response to a first gesture (e.g., as described with reference to FIGS. 14A-14E above), upon detecting a second gesture (e.g., including movement of a contact in the first direction) in a predefined area of a touch-sensitive portion of the device, the device displays content as it appeared just prior to a next-most-recent content-modification operation (e.g., the device performs a second successive undo operation and undoes the next-most-recent content- modification operation by deleting the next-most recently entered word as described with reference to FIGS. 14I-14K above).

FIGS. 15A-15C are flow diagrams illustrating a method 20800 of undoing a previously performed content-modification operation in accordance with some embodiments. The method 20800 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 20800 are, optionally, combined and/or the order of some operations is, optionally, changed.

As described below, the method 20800 provides an intuitive way to undo a previously performed content-modification operation. The method reduces the cognitive burden on a user when undoing a previously performed content-modification operation, thereby creating a more efficient human-machine interface. For battery-operated electronic devices, enabling a user to undo a previously performed content-modification operation faster and more efficiently conserves power and increases the time between battery charges.

The device displays (20802), on the display, a user interface that includes content resulting from a sequence of previously performed content-modification operations. In some embodiments, content-modification operations are operations performed by the device in response to one or more previously detected content-modification inputs. For example, as explained with reference to FIG. 14A, content 20706 displayed on display 20702 includes the body of an email message being composed by a user as a result of a sequence of words (e.g., 'Good,' to,"hear," from, "you," and 'again!') entered sequentially, for example by the user, through a sequence of content-modification operations performed on device 100.

The device detects (20804) a first gesture that includes movement of a contact in a first direction in a predefined area of the touch-sensitive surface (e.g., a first gesture including movements 20730-*a*, 20730-*b*, and 20730-*c* of contact 20720 from left to right with reference to the orientation of device 100 shown in FIGS. 14B-14D). In some embodiments, the touch-sensitive surface includes (20806) a first portion (e.g., first touch-sensitive portion 20704-1) and a second portion (e.g., second touch-sensitive portion 20704-2). In some embodiments, the first portion of the touch-sensitive surface is collocated with the display (e.g., content 20706 is displayed on touch-screen display 20702 which coincides with first touch-sensitive portion 20704-1). In some embodiments, the second portion of the touch-sensitive surface is separate from (e.g., not coincident with) the display. For example, the second portion of the touch-sensitive surface (e.g., second touch-sensitive portion 20704-2) is a "chin" portion of the touch-sensitive surface or a touch-sensitive bezel of the display that is laterally adjacent to the touch screen display (e.g., touch-screen display 20702). In some embodiments, the second portion of the touch-sensitive surface includes the predefined area of the touch-sensitive surface. In some embodiments, detecting the first gesture on the first portion of the display causes the device to perform a navigation operation within the user interface (e.g., scrolling a document or changing pages of a document). In some embodiments, the display is separate (20808) from the touch-sensitive surface and the predefined area of the touch-sensitive surface is adjacent to the display. For example, the touch-sensitive surface is located on a "chin" portion of the device or a touch-sensitive bezel of the display that is laterally adjacent to the touch screen display (e.g., second touch-sensitive portion 20704-2 is adjacent to display 20702).

In some embodiments, the predefined area of the touch-sensitive surface does not include (20810) a displayed undo affordance (e.g., second touch-sensitive portion 20704-2 does not have a displayed undo affordance, FIG. 14A). In some embodiments, the touch-sensitive surface does not include a displayed undo affordance because the predefined area is a part of the touch-sensitive surface that is not coincident with the display and does not have an undo-affordance permanently visible on the surface of the touch-sensitive surface (e.g., a undo affordance permanently printed or otherwise inscribed on the surface of the device).

In some embodiments, in response to detecting the first gesture, the device displays (20812) the content as it appeared just prior to performance of a most-recent content-modification operation of the sequence of content-modification operations (e.g., as explained with reference to steps 20814-20824). For example, as explained with reference to FIGS. 14A-14E above, in response to the first gesture (e.g., including movement 20730-*a*, 20730-*b*, and 20730-*c* and an optional lift-off of contact 20720; FIGS. 14B-14E), device 100 undoes the most-recent content modification operation (e.g., the device deletes the last word 'again!' entered on the device) to display content 20706 as it appeared just prior to the most-recent content modification operation (e.g., just prior to entering of the word 'again!' as shown in FIG. 14E).

In some embodiments, displaying the content as it appeared prior to performance of the most-recent content-modification operation includes (20814) displaying a preview of undoing the most-recent content-modification operation. In some embodiments, at a point in time during the first gesture, the device displays (20816) a preview of the content as it appeared prior to performance of the most-recent content-modification operation. For example, the device displays a preview of the undo operation that will be performed if the gesture meets undo criteria (e.g., if the first gesture includes movement of the contact past a mid-way point along the predefined area of the touch sensitive surface, the device displays a preview of the content as it would be displayed upon termination of the first gesture). For example, in FIG. 14E, the device has ceased to display the word, which is a preview of how the text would appear once the word "again!" is deleted from the text.

In some embodiments, the device detects (20818) an end of the first gesture (e.g., lift-off of contact 20720 as explained with reference to FIGS. 14D-14E). In some embodiments, in response to (20820) detecting the end of the gesture: in accordance with a determination that the first gesture meets undo criteria (e.g., if the first gesture includes movement of the contact past a mid-way point along the predefined area of the touch sensitive surface), the device undoes the most-recent content-modification operation (e.g., the device deletes the last word 'again!' entered on the device to display content 20706 as it appeared just prior to the most-recent content modification operation or just prior to entering of the word 'again!'; FIGS. 14D-14E); and in accordance with a determination that the first gesture does not meet the undo criteria (e.g., if the first gesture does not include movement of the contact past a mid-way point along the predefined area of the touch sensitive surface), the device redisplays the content without undoing the most-recent content-modification operation. For example, a preview of the undo operation is displayed when the contact has moved halfway across the predefined area (e.g., the word "again!" is, optionally, completely removed when contact 20720 is detected at the location shown in FIG. 14D), and the content is redisplayed when the gesture ends (e.g., the device detects liftoff of the contact) while the contact is less than halfway across the predefined area (e.g., if the gesture including contact 20720 ends while contact 20720 is at the location shown in FIG. 14C, the word "again!" continues to be displayed in the text as shown in FIG. 14A). Conversely, the undo operation (e.g., deleting the word "again!") is performed if the device detects liftoff of the contact while the contact is more than halfway across the predefined area (e.g., if the gesture including contact 20720 ends while contact 20720 is at the location shown in FIG. 14D, the word "again!" is removed from the text as shown in FIG. 14E).

In some embodiments, displaying the content as it appeared just prior to performance of the most-recent content-modification operation includes (20822) displaying an animated transition (e.g., the gradual reduction of the font size of the word 'again!' from the larger font size shown in FIG. 14B to the smaller font size shown in FIG. 14D) between a first state of the content after the most-recent content-modification operation was performed (e.g., first state of content 20706 shown in FIG. 14A after the entering of the word 'again!') and a second state of the content before the most-recent content-modification operation was performed (e.g., second state of content 20706 shown in FIG. 14E before the entering of the word 'again!'). For example, as the user slides a contact across the "chin" portion of the touch-sensitive surface, the currently displayed content is gradually replaced with previously displayed content (e.g., the undo operation gradually fades in, in accordance with movement of the contact across the "chin" portion of the touch-sensitive surface), as shown in FIGS. 14B-14D. In some embodiments, during the animated transition, the first state and the second state are superimposed on each other so as to provide an intuitive visual indication of the changes that will be caused by the undo operation. In some embodiments, the animated transition progresses (20824) in accordance with movement of the contact across the predefined portion of the touch-sensitive surface. For example, the device gradually reduces the font size of the word 'again!' from the larger font size shown in FIG. 14B to the smaller font size shown in FIG. 14D is in accordance with the extent of movement 20730-*a*, 20730-*b*, and 20730-*c* of contact 20720 across the predefined area of the touch-sensitive surface, as shown in FIGS. 14B-14D).

In some embodiments, the device detects (20826) a second gesture that includes movement of a contact in a second direction different from (e.g., opposite to) the first direction in the predefined area of the touch-sensitive surface. In response to detecting the second gesture, the device redoes (20828) the most-recent content-modification operation. For example, as explained with reference to FIGS. 14E-14H, device detects a second gesture including movement 20732 of contact 20722 in a second direction (e.g., from left to right with reference to the orientation of device 100 shown in FIG. 14F; optionally opposite to the first direction of movement described with reference to FIGS. 14B-14E); in response to the second gesture, device 100 redoes the most-recent content modification operation (e.g., the device redisplays the last word 'again!'—as shown in FIG. 14H—that was deleted previously in response to detecting the first gesture as described with reference to FIGS. 14B-14E).

In some embodiments, the device detects (20830) a second gesture that includes movement of a contact in the first direction in the predefined area of the touch-sensitive surface. In some embodiments, in response to detecting the second gesture, the device displays (20832) the content as it appeared just prior to performance of a next-most-recent content-modification operation (e.g., a content-modification operation that is adjacent to the most-recent content-modification operation in the sequence) of the sequence of content-modification operations. For example, as explained with reference to FIGS. 14I-14K, device detects a second gesture including movement (20734) of contact 20724 in the first direction (e.g., from right to left with reference to the orientation of device 100 shown in FIG. 14I; for example, the same direction described previously with reference to FIGS. 14B-14E above); in response to the second gesture, device 100 undoes the next-most-recent content modification operation (e.g., the device deletes the next-to-last word 'you' entered on the device) to display content 20706 as it appeared—as shown in FIG. 14K just prior to the next-most-recent content modification operation.

It should be understood that the particular order in which the operations in FIGS. 15A-15C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments) are also applicable in an analogous manner to method 20800 described above with respect to FIGS. 15A-15C. For example, the contacts, gestures, content, animations described above with reference to method 20800 optionally have one or more of the characteristics of the contacts, gestures, content, animations described herein with reference to other methods described herein (e.g., those listed in the fifth paragraph of the Description of Embodiments). For brevity, these details are not repeated here.

Figure 16:
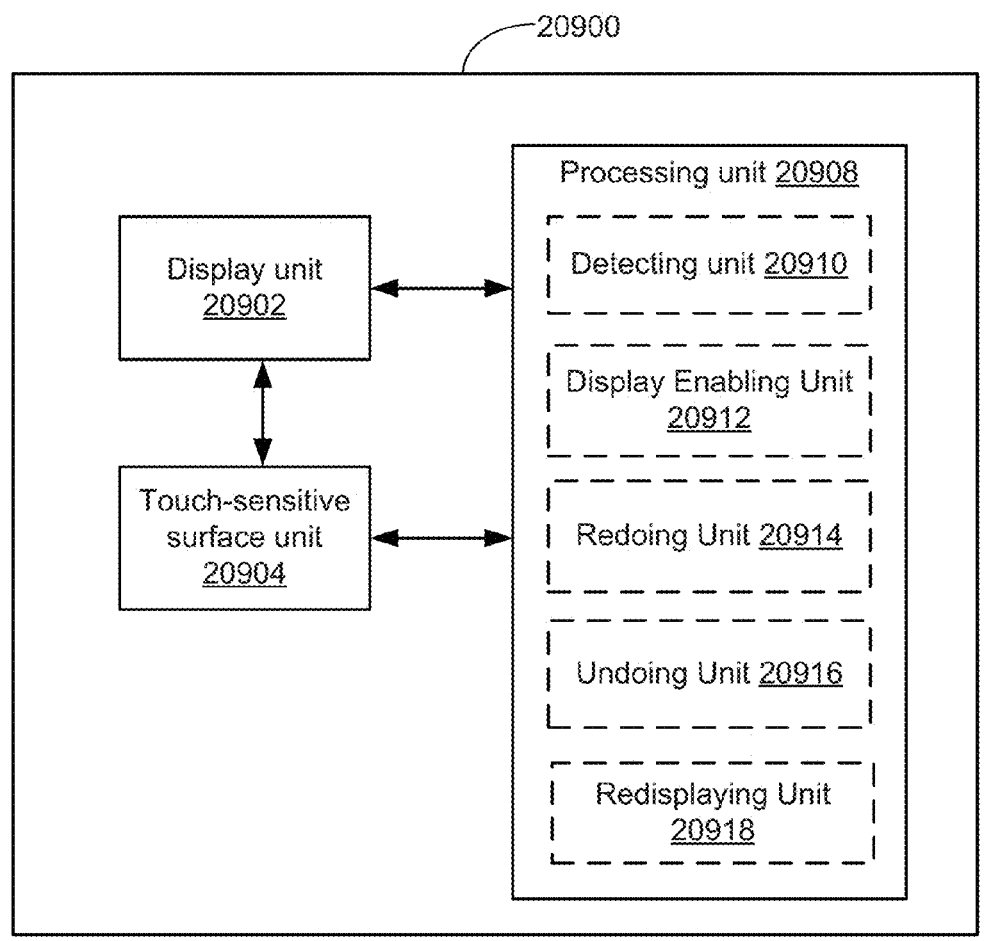
FIG. 16 is a functional block diagram of an electronic device in accordance with some embodiments.

In accordance with some embodiments, FIG. 16 shows a functional block diagram of an electronic device 20900 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 16 are, optionally, combined or separated into sub-blocks to implement the principles of the various described embodiments. Therefore, the description herein optionally supports any possible combination or separation or further definition of the functional blocks described herein.

As shown in FIG. 16, an electronic device 20900 includes a display unit 20902 configured to display content resulting from a sequence of previously performed content-modification operations, a touch-sensitive surface unit 20904 configured to receive a contact on the touch-sensitive surface unit, and a processing unit 20908 coupled to the display unit 20902, and the touch-sensitive surface unit 20904. In some embodiments, the processing unit 20908 includes a detecting unit 20910, a display enabling unit 20912, a redoing unit 20914, an undoing unit 20916, and a redisplaying unit 20918.

The processing unit 20908 is configured to: detect a first gesture that includes movement of a contact in a first direction in a predefined area of the touch-sensitive surface (e.g., with the detecting unit 20910); in response to detecting the first gesture, enable display of the content as it appeared just prior to performance of a most-recent content-modification operation of the sequence of content-modification operations (e.g., with the display enabling unit 20912).

In some embodiments, the processing unit 20908 is configured to: detect a second gesture that includes movement of a contact in a second direction different from the first direction in the predefined area of the touch-sensitive surface unit 20904 (e.g., with the detecting unit 20910); and in response to detecting the second gesture, redo the most-recent content-modification operation (e.g., with the redoing unit 20914).

In some embodiments, the processing unit 20908 is configured to: detect a second gesture that includes movement of a contact in the first direction in the predefined area of the touch-sensitive surface unit 20904 (e.g., with the detecting unit 20910); and in response to detecting the second gesture, enable display of display the content as it appeared just prior to performance of a next-most-recent content-modification operation of the sequence of content-modification operations (e.g., with the display enabling unit 20912).

In some embodiments, the touch-sensitive surface unit 20904 includes a first portion and a second portion; the first portion of the touch-sensitive surface unit 20904 is collocated with the display unit 20902; the second portion of the touch-sensitive surface unit 20904 is separate from the display unit 20902; and the second portion of the touch-sensitive surface unit 20904 includes the predefined area of the touch-sensitive surface unit 20904.

In some embodiments, the display unit 20902 is separate from the touch-sensitive surface unit 20904; and the predefined area of the touch-sensitive surface unit 20904 is adjacent to the display unit 20902.

In some embodiments, enabling display of the content as it appeared prior to performance of the most-recent content-modification operation includes enabling display of a preview of undoing the most-recent content-modification operation (e.g., with the display enabling unit 20912).

In some embodiments, the processing unit 20908 is configured to: at a point in time during the first gesture, enable display of a preview of the content as it appeared prior to performance of the most-recent content-modification operation (e.g., with the display enabling unit 20912); detect an end of the first gesture (e.g., with the detecting unit 20910); and in response to detecting the end of the gesture: in accordance with a determination that the first gesture meets undo criteria, undo the most-recent content-modification operation (e.g., with the undoing unit 20916); and in accordance with a determination that the first gesture does not meet the undo criteria, redisplay the content without undoing the most-recent content-modification operation (e.g., with the redisplaying unit 20918).

In some embodiments, the predefined area of the touch-sensitive surface unit 20904 does not include a displayed undo affordance.

In some embodiments, enabling display of the content as it appeared just prior to performance of the most-recent content-modification operation includes enabling display of an animated transition between a first state of the content after the most-recent content-modification operation was performed and a second state of the content before the most-recent content-modification operation was performed (e.g., with the display enabling unit 20912).

In some embodiments, the animated transition progresses in accordance with movement of the contact across the predefined portion of the touch-sensitive surface unit 20904.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 15A-15C, are, optionally, implemented by components depicted in FIGS. 1A-1B or FIG. 16. For example, display operation 20802, the detection operation 20804, and display operation 20812 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

It should be understood that the particular order in which the operations have been described above is merely exemplary and is not intended to indicate that the described order is the only order in which the operations could be performed. One of ordinary skill in the art would recognize various ways to reorder the operations described herein. Additionally, it should be noted that the various processes separately described herein (e.g., those listed in the fifth paragraph of the Description of Embodiments) can be combined with each other in different arrangements. For example, the contacts, user interface objects, tactile sensations, intensity thresholds, and/or focus selectors described above with reference to any one of the various processes separately described herein (e.g., those listed in the fifth paragraph of the Description of Embodiments) optionally have one or more of the characteristics of the contacts, gestures, user interface objects, tactile sensations, intensity thresholds, and focus selectors described herein with reference to one or more of the other methods described herein (e.g., those listed in the fifth paragraph of the Description of Embodiments). For brevity, all of the various possible combinations are not specifically enumerated here, but it should be understood that the claims described above may be combined in any way that is not precluded by mutually exclusive claim features.

The foregoing description, for purpose of explanation, has been described with reference to specific embodiments. However, the illustrative discussions above are not intended to be exhaustive or to limit the various described embodiments to the precise forms disclosed. Many modifications and variations are possible in view of the above teachings. The embodiments were chosen and described in order to best explain the principles of the various described embodiments and their practical applications, to thereby enable others skilled in the art to best utilize the various described embodiments with various modifications as are suited to the particular use contemplated.

What is claimed is:

1. A method, comprising:
at an electronic device with a touch-sensitive surface and a display:
displaying, on the display, a user interface that includes content resulting from a sequence of previously performed content-modification operations;
detecting a first gesture that includes movement of a contact in a first direction in a predefined area of the touch-sensitive surface;
in response to detecting movement of the contact in the first direction and while the contact is still detected in the predefined area of the touch-sensitive surface, in accordance with the movement of the contact meeting a respective movement threshold, displaying, during the first gesture, a preview of undoing the most-recent content-modification operation, wherein displaying the preview of undoing the most-recent content-modification operation in response to detecting movement of the contact in the first direction includes displaying an animation of undoing the most-recent content-modification operation that progresses as the contact moves in the first direction; and
in response to detecting an end of the first gesture:
in accordance with a determination that the first gesture met undo criteria at the end of the first gesture, the undo criteria including a requirement that the movement of the contact meets the respective movement threshold at the end of the first gesture, displaying the content as it appeared just prior to performance of a most-recent content-modification operation of the sequence of content-modification operations; and
in accordance with a determination that the first gesture did not meet the undo criteria at the end of the first gesture, displaying the content resulting from the sequence of previously performed content-modification operations.

2. The method of claim 1, including:
detecting a second gesture that includes movement of a contact in a second direction different from the first direction in the predefined area of the touch-sensitive surface; and
in response to detecting the second gesture, redoing the most-recent content-modification operation.

3. The method of claim 1, including:
detecting a second gesture that includes movement of a contact in the first direction in the predefined area of the touch-sensitive surface; and
in response to detecting the second gesture, displaying the content as it appeared just prior to performance of a next-most-recent content-modification operation of the sequence of content-modification operations.

4. The method of claim 1, wherein:
the touch-sensitive surface includes a first portion and a second portion;
the first portion of the touch-sensitive surface is collocated with the display;
the second portion of the touch-sensitive surface is separate from the display; and
the second portion of the touch-sensitive surface includes the predefined area of the touch-sensitive surface.

5. The method of claim 1, wherein:
the display is separate from the touch-sensitive surface; and
the predefined area of the touch-sensitive surface is adjacent to the display.

6. The method of claim 1, wherein the predefined area of the touch-sensitive surface does not include a displayed undo affordance.

7. The method of claim 1, wherein the first gesture is a predefined gesture.

8. An electronic device, comprising:
a display;
a touch-sensitive surface;
one or more processors;
memory; and
one or more programs, wherein the one or more programs are stored in the memory and configured to be executed by the one or more processors, the one or more programs including instructions for:
displaying, on the display, a user interface that includes content resulting from a sequence of previously performed content-modification operations;
detecting a first gesture that includes movement of a contact in a first direction in a predefined area of the touch-sensitive surface;
in response to detecting movement of the contact in the first direction and while the contact is still detected in the predefined area of the touch-sensitive surface, in accordance with the movement of the contact meeting a respective movement threshold, displaying, during the first gesture, a preview of undoing the most-recent content-modification operation, wherein displaying the preview of undoing the most-recent content-modification operation in response to detecting movement of the contact in the first direction includes displaying an animation of undoing the most-recent content-modification operation that progresses as the contact moves in the first direction; and
in response to detecting an end of the first gesture:
in accordance with a determination that the first gesture met undo criteria at the end of the first gesture, the undo criteria including a requirement that the movement of the contact meets the respective movement threshold at the end of the first gesture, displaying the content as it appeared just prior to performance of a most-recent content-modification operation of the sequence of content-modification operations; and
in accordance with a determination that the first gesture did not meet the undo criteria at the end of the first gesture, displaying the content resulting from the sequence of previously performed content-modification operations.

9. The device of claim 8, including instructions for:
detecting a second gesture that includes movement of a contact in a second direction different from the first direction in the predefined area of the touch-sensitive surface; and
in response to detecting the second gesture, redoing the most-recent content-modification operation.

10. The device of claim 8, including instructions for:
detecting a second gesture that includes movement of a contact in the first direction in the predefined area of the touch-sensitive surface; and
in response to detecting the second gesture, displaying the content as it appeared just prior to performance of a next-most-recent content-modification operation of the sequence of content-modification operations.

11. The device of claim 8, wherein:
the touch-sensitive surface includes a first portion and a second portion;
the first portion of the touch-sensitive surface is collocated with the display;
the second portion of the touch-sensitive surface is separate from the display; and
the second portion of the touch-sensitive surface includes the predefined area of the touch-sensitive surface.

12. The device of claim 8, wherein:
the display is separate from the touch-sensitive surface; and
the predefined area of the touch-sensitive surface is adjacent to the display.

13. The device of claim 8, wherein the predefined area of the touch-sensitive surface does not include a displayed undo affordance.

14. The electronic device of claim 8, wherein the first gesture is a predefined gesture.

15. A non-transitory computer readable storage medium storing one or more programs, the one or more programs comprising instructions which, when executed by an electronic device with a display, and a touch-sensitive surface, cause the electronic device to:
display, on the display, a user interface that includes content resulting from a sequence of previously performed content-modification operations;
detect a first gesture that includes movement of a contact in a first direction in a predefined area of the touch-sensitive surface;
in response to detecting movement of the contact in the first direction and while the contact is still detected in the predefined area of the touch-sensitive surface, in accordance with the movement of the contact meeting a respective movement threshold, display, during the first gesture, a preview of undoing the most-recent content-modification operation, wherein displaying the preview of undoing the most-recent content-modification operation in response to detecting movement of the contact in the first direction includes displaying an animation of undoing the most-recent content-modification operation that progresses as the contact moves in the first direction; and
in response to detecting an end of the first gesture:
in accordance with a determination that the first gesture met undo criteria at the end of the first gesture, the undo criteria including a requirement that the movement of the contact meets the respective movement threshold at the end of the first gesture, display the content as it appeared just prior to performance of a most-recent content-modification operation of the sequence of content-modification operations; and
in accordance with a determination that the first gesture did not meet the undo criteria at the end of the first gesture, display the content resulting from the sequence of previously performed content-modification operations.

16. The storage medium of claim 15, including instructions which, when executed by the electronic device, cause the electronic device to:
detect a second gesture that includes movement of a contact in a second direction different from the first direction in the predefined area of the touch-sensitive surface; and
in response to detecting the second gesture, redo the most-recent content-modification operation.

17. The storage medium of claim 15, including instructions which, when executed by the electronic device, cause the electronic device to:

detect a second gesture that includes movement of a contact in the first direction in the predefined area of the touch-sensitive surface; and in response to detecting the second gesture, display the content as it appeared just prior to performance of a next-most-recent content-modification operation of the sequence of content-modification operations.

18. The storage medium of claim 15, wherein:

the touch-sensitive surface includes a first portion and a second portion;

the first portion of the touch-sensitive surface is collocated with the display;

the second portion of the touch-sensitive surface is separate from the display; and the second portion of the touch-sensitive surface includes the predefined area of the touch-sensitive surface.

19. The storage medium of claim 15, wherein:

the display is separate from the touch-sensitive surface; and the predefined area of the touch-sensitive surface is adjacent to the display.

20. The storage medium of claim 15, wherein the predefined area of the touch-sensitive surface does not include a displayed undo affordance.

21. The storage medium of claim 15, wherein the first gesture is a predefined gesture.

* * * * *